United States Patent
Walkin et al.

(10) Patent No.: US 11,928,483 B2
(45) Date of Patent: Mar. 12, 2024

(54) DEVICES, METHODS, AND GRAPHICAL USER INTERFACES FOR SEAMLESS TRANSITION OF USER INTERFACE BEHAVIORS

(71) Applicant: Apple Inc., Cupertino, CA (US)

(72) Inventors: Brandon M. Walkin, San Francisco, CA (US); Chanaka G. Karunamuni, San Jose, CA (US); Dmitry A. Gorbik, San Francisco, CA (US); Marcos Alonso Ruiz, San Francisco, CA (US); Nathan de Vries, San Francisco, CA (US); Joseph P Cerra, San Francisco, CA (US); Emanuele Rudel, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 345 days.

(21) Appl. No.: 15/841,229

(22) Filed: Dec. 13, 2017

(65) Prior Publication Data
US 2018/0336043 A1    Nov. 22, 2018

Related U.S. Application Data

(60) Provisional application No. 62/507,184, filed on May 16, 2017.

(51) Int. Cl.
G06F 9/44    (2018.01)
G06F 3/04845    (2022.01)
(Continued)

(52) U.S. Cl.
CPC .......... G06F 9/451 (2018.02); G06F 3/04845 (2013.01); G06F 3/0485 (2013.01);
(Continued)

(58) Field of Classification Search
CPC .......................... G06F 3/04845; G06F 3/0485
See application file for complete search history.

(56) References Cited

U.S. PATENT DOCUMENTS

| 10,084,664 B1* | 9/2018 | Casper ................ H04M 1/0202 |
| 2006/0132457 A1 | 6/2006 | Rimas-Ribikauskas et al. |

(Continued)

FOREIGN PATENT DOCUMENTS

| CN | 101371217 A | 2/2009 |
| CN | 101593077 A | 12/2009 |

(Continued)

OTHER PUBLICATIONS

Haase, Chet,. "Timing is Everything" [published Aug. 2, 2016], [online], [retrieved on May 3, 2019]. Retrieved from the internet <URL: https://medium.com/google-developers/timing-is-everything-8218b8df5485> (Year: 2016) (Year: 2016).*

(Continued)

Primary Examiner — Matthew Ell
Assistant Examiner — Samuel Shen
(74) Attorney, Agent, or Firm — Morgan, Lewis & Bockius LLP

(57) ABSTRACT

An electronic device presents a user interface including an output property that represents a first type of output. The device detects a first input associated with modifying the first type of output via a first behavior model, and changes the output property over time based on the first behavior model and updates the user interface based on the changes in the output property. While updating the user interface, the device detects a change to the user input; and changes the output property over time based on a second behavior model based on: a value of the output property determined based on the first behavior model; and a first derivative of the value of the output property with respect to time determined based (Continued)

on the first behavior model. The device updates the user interface based on the changes in the output property that occur based on the second behavior model.

65 Claims, 77 Drawing Sheets

(51) Int. Cl.
*G06F 3/0485* (2022.01)
*G06F 3/0486* (2013.01)
*G06F 3/0487* (2013.01)
*G06F 3/0488* (2022.01)
*G06F 3/04883* (2022.01)
*G06F 3/04886* (2022.01)
*G06F 9/451* (2018.01)
*G06T 13/00* (2011.01)
*G06T 13/80* (2011.01)

(52) U.S. Cl.
CPC .......... *G06F 3/0486* (2013.01); *G06F 3/0487* (2013.01); *G06F 3/04883* (2013.01); *G06F 3/04886* (2013.01); *G06T 13/00* (2013.01); *G06T 13/80* (2013.01); *G06F 2203/04806* (2013.01); *G06T 2200/24* (2013.01)

(56) References Cited

U.S. PATENT DOCUMENTS

| | | | |
|---|---|---|---|
| 2007/0088735 | A1 | 4/2007 | Aggarwal et al. |
| 2007/0150830 | A1 | 6/2007 | Ording et al. |
| 2009/0073194 | A1* | 3/2009 | Ording .............. H04M 1/72544 345/672 |
| 2009/0201270 | A1 | 8/2009 | Pikkujamsa et al. |
| 2010/0235794 | A1* | 9/2010 | Ording .................. G06F 3/0488 715/863 |
| 2011/0231797 | A1 | 9/2011 | Huhtala et al. |
| 2012/0030636 | A1 | 2/2012 | Miyazaki et al. |
| 2012/0272181 | A1 | 10/2012 | Rogers et al. |
| 2013/0132889 | A1 | 5/2013 | Takayasu et al. |
| 2013/0151959 | A1* | 6/2013 | Flynn, III .............. G06Q 50/01 715/702 |
| 2013/0169648 | A1* | 7/2013 | Bates ........................ G06F 3/00 345/473 |
| 2014/0267362 | A1 | 9/2014 | Kosienda et al. |
| 2015/0062052 | A1 | 3/2015 | Bernstein et al. |
| 2015/0070283 | A1* | 3/2015 | Irwin .................... G06F 3/0416 345/173 |
| 2015/0350735 | A1* | 12/2015 | Koser .................. H04N 21/435 725/37 |
| 2015/0355715 | A1* | 12/2015 | Smith .................... G06F 1/1694 715/863 |
| 2015/0355778 | A1 | 12/2015 | Kim et al. |
| 2015/0370529 | A1 | 12/2015 | Zambetti et al. |
| 2016/0259536 | A1 | 9/2016 | Kurdurshian et al. |

FOREIGN PATENT DOCUMENTS

| | | | |
|---|---|---|---|
| CN | 101980128 | A | 2/2011 |
| CN | 104471521 | A | 3/2015 |
| CN | 104903834 | A | 9/2015 |
| CN | 105264476 | A | 1/2016 |
| CN | 105264479 | A | 1/2016 |
| CN | 105930031 | A | 9/2016 |
| CN | 105955520 | A | 9/2016 |
| CN | 105955642 | A | 9/2016 |
| CN | 106415474 | A | 2/2017 |
| EP | 1 674 977 | A2 | 6/2006 |
| EP | 2 402 851 | A1 | 1/2012 |
| EP | 2 413 228 | A2 | 2/2012 |
| EP | 2 750 016 | A1 | 7/2014 |
| GB | 2552431 | A * | 1/2018 ......... H04N 21/4821 |
| WO | WO 2014/165417 | A1 | 10/2014 |

OTHER PUBLICATIONS

Haase, Chet,. "Timing is Everything" [published Aug. 2, 2016], [online], [retrieved on May 3, 2019]. Retrieved from the internet <URL: https://medium.com/google-developers/timing-is-everything-8218b8df5485> (Year: 2016).*
Office Action, dated Jan. 16, 2019, received in Danish Patent Application No. 201770375, which corresponds with U.S. Appl. No. 15/841,229, 4 pages.
Office Action, dated Jun. 25, 2018, received in Danish Patent Application No. 201770375, which corresponds with U.S. Appl. No. 15/841,229, 6 pages.
International Search Report and Written Opinion, dated Aug. 14, 2018, received in International Patent Application No. PCT/US2018/032882, which corresponds with U.S. Appl. No. 15/841,229, 14 pages..
Office Action, dated Jun. 26, 2017, received in Danish Patent Application No. 201770375, which corresponds with U.S. Appl. No. 15/841,229, 11 pages.
Office Action, dated Dec. 12, 2017, received in Danish Patent Application No. 201770375, which corresponds with U.S. Appl. No. 15/841,229, 7 pages.
Office Action, dated Jan. 11, 2023, received in Chinese U.S. Appl. No. 15/841,229.0, which corresponds with U.S. Appl. No. 15/841,229, 2 pages.
Office Action, dated May 21, 2021, received in European Patent Application No. 18730531.3, 7 pages.
Office Action, dated Dec. 30, 2022, received in Chinese Patent Application No. 201880032214.3, 2 pages.
Office Action, dated Jun. 1, 2023, received in Chinese Patent Application No. 201880032214.3, 2 pages.
Notice of Allowance, dated Jul. 24, 2023, received in Chinese Patent Applicaton No. 201911402976.0, which corresponds with U.S. Appl. No. 15/841,229, 4 pages.
Patent, dated Sep. 19, 2023, received in Chinese Patent Application No. 201911402976.0, which corresponds with U.S. Appl. No. 15/841,229, 6 pages.
Notice of Allowance, dated Oct. 17, 2023, received in Chinese Patent Application No. 201880032214.3, 4 pages.

* cited by examiner

Behavior (before liftoff): direct manipulation $x_{input} = x2$ → $x_{object} = x2$
$d/dt(x_{object}) = v2$ (calculated)
$d^2/dt^2(x_{object}) = a2$ (calculated)

Behavior (after liftoff):

friction/bounce ← $x_{object} = x2$
$d/dt(x_{object}) = v2$
$d^2/dt^2(x_{object}) = a2$ Behavior: direct manipulation $x_{input} = x4$ ⟶ $x_{object} = x4$
$d/dt(x_{object}) = v4$ (calculated)
$d^2/dt^2(x_{object}) = a4$ (calculated)

Portable Multifunction Device 100 — UI 520

9:26 PM   164   111

422   426   428   483

432   434   436   438

440

522

523

416   418   420   424

Touch Screen 112

Behavior (after liftoff):

friction/bounce ⟵ $x_{object} = x4$
$d/dt(x_{object}) = v4$
$d^2/dt^2(x_{object}) = a4$ Behavior: friction/bounce $x_{intermediate} = f(x5, v5)$
$x_{target} = f(x_{intermediate}, \text{boundary criteria})$
updated $x = x6 = f(x_{target}, v5)$
updated $v = v6 = f(v5, a5, \mu)$ $x_{object} = x6$
$d/dt(x_{object}) = v6$
$d^2/dt^2(x_{object}) = a6$ (calculated)

Portable Multifunction Device 100 — UI 520

9:26 PM 484  442  444  446

488  430  486

← - - - - - - - -

523

416  418  420  424

Touch Screen 112

632 In response to detecting the first input:

634 Change the output property over time based on a second behavior model that is different from the first behavior model, including starting changing the output property over time based on:

636 A value of the output property that was determined based on the first behavior model

638 The value of the output property is limited to a range of values between a first predefined value and a second predefined value

640 A first derivative of the value of the output property with respect to time. The first derivative of the value was determined based on the first behavior model

642 A second derivative of the value of the output property with respect to time. The second derivative of the value was determined based on the first behavior model

644 The first derivative of the value of the output property with respect to time corresponds to values of a first continuous function with respect to time. The second derivative of the value of the output property with respect to time corresponds to values of a second continuous function

646 Update the presentation of the user interface via the one or more output devices based on the changes in the output property that occur based on the second behavior model

Figure 6C

648 While updating the presentation of the user interface via the one or more output devices based on the changes in the output property that occur based on the second behavior model, detect a second change to the user input; and
    in response to detecting the second change to the user input:
        change the output property over time based on a third behavior model that is different from the second behavior model, including starting changing the output property over time based on:
            a value of the output property that was determined based on the second behavior model; and
            a first derivative of the value of the output property with respect to time, wherein the first derivative of the value was determined based on the second behavior model; and
        update the presentation of the user interface via the one or more output devices based on the changes in the output property that occur based on the second behavior model 650 The user input includes a touch input, and detecting the user input includes detecting changes to a first input parameter in a plurality of input parameters that describe the touch input;
    in response to detecting the touch input, a target value of the output property at a respective point in time is determined based on the first input parameter via the first behavior model;
    detecting the change to the user input includes detecting liftoff of the touch input; and
    in response to detecting liftoff of the touch input, the target value of the output property is a respective predetermined value in a set of predetermined values, determined based on the changes in the output property that occur based on the second behavior model 652 A target value of the output property is limited to a range of values between a first predefined value and a second predefined value 654 The user input includes a touch input, detecting the user input includes detecting changes to a first input parameter in a plurality of input parameters that describe the touch input, and detecting the change to the user input includes detecting liftoff of the touch input;
    the first behavior model is a first predefined physics model that is driven by the change in the first input parameter; and
    the second behavior model is a second predefined physics model, wherein the second predefined physics model is different from the first predefined physics model

656 In response to detecting the first input:
 updating the presentation of the user interface includes progressing a first animation between a first state and a second state based on the changes in the output property that occur based on the first behavior model; and
 in response to detecting the change to the user input:
 updating the presentation of the user interface includes progressing a second animation between the second state and a third state based on the changes in the output property that occur based on the second behavior model

---

658 Changing the output property over time based on the first behavior model prior to detecting the change to the user input and starting changing the output property over time based on the second behavior model in response to detecting the change to the user input satisfy second-order parametric continuity of the output property

---

660 The electronic device includes memory, the output property is stored in the memory, and changing the output property includes updating the stored output property

---

662 The electronic device includes memory;
 the value of the output property that was determined based on the first behavior model and the first derivative of the value of the output property, with respect to time, that was determined based on the first behavior model are stored in the memory;
 changing the output property over time based on the second behavior model uses the stored value of the output property and the stored first derivative of the value of the output property with respect to time

---

664 Updating the presentation of the user interface based on the changes in the output property that occur based on a respective behavior model includes updating the presentation of the user interface in accordance with a transformation applied to values of the output property

---

666 Detecting the user input includes detecting a touch input and changes to one or more of a plurality of input parameters that describe the touch input; and,
 while detecting the touch input, the output property is changed over time directly in response to the changes to the one or more of the plurality of input parameters that describe the touch input

668 The user input includes a touch input and changes to one or more of a plurality of input parameters that describe the touch input; and,
  while detecting the touch input, the output property is changed over time using one or more behavior models that are driven by changes to the one or more of the plurality of input parameters that describe the touch input and modifies the output property in accordance with a predefined relationship 670 The output property is a first output property;
  the user interface includes a second output property that represents a second type of output corresponding to the user interface; and
  the method includes, in response to detecting the first input:
    changing the second output property over time based on the first behavior model; and
    updating presentation of the user interface via the one or more output devices based on the changes in the second output property that occur based on the first behavior model 672 The change to the user input is detected while updating the presentation of the user interface via the one or more output devices based on the changes in the second output property that occur based on the first behavior model, and the method includes:
  in response to detecting the change to the user input:
    changing the second output property over time based on the second behavior model, including starting changing the second output property over time based on:
      a value of the second output property that was determined based on the first behavior model; and
      a first derivative of the value of the second output property with respect to time, wherein the first derivative of the value of the second output property was determined based on the first behavior model; and
    updating the presentation of the user interface via the one or more output devices based on the changes in the second output property that occur based on the second behavior model 674 Changing the first output property over time based on a respective behavior model of the first and second behavior models includes changing the first output property by a first amount over a first period of time; and
  changing the second output property over time based on the first behavior model includes changing the second output property by a second amount over the first period of time, wherein the second amount is different from the first amount

Figure 6F

706 Modify one or more output properties of the first user interface element in accordance with changes in the plurality of input parameters, including modifying a first output property of the first user interface element based at least in part on the change in the first input parameter and the change in the second input parameter > 714 Modifying the one or more output properties of the first user interface element in accordance with detecting changes in the plurality of input parameters includes:
>     modifying a second output property of the first user interface element based at least in part on the change in the first input parameter; and
>     modifying a third output property of the first user interface element based at least in part on the change in the first input parameter > 716 Detecting the user input includes detecting a change in a third input parameter of the plurality of input parameters; and
>     modifying the one or more output properties of the first user interface element in accordance with detecting changes in the plurality of input parameters includes:
>         modifying a second output property of the first user interface element based at least in part on the change in the third input parameter; and
>         modifying a third output property of the first user interface element based at least in part on the change in the third input parameter > 718 The first input parameter is a characteristic intensity of the user input, the second input parameter is a y-position of the user input, and the first output property is a scale of the first user interface element > 720 The first input parameter is a characteristic intensity of the user input, the second input parameter is a y-position of the user input, and the first output property is a degree of blurring in the user interface 722 Update the user interface in accordance with the modified first output property of the first user interface element

Figure 7B

724 A second user interface element of the plurality of user interface elements is associated with a second plurality of output properties, and the method includes:
    modifying one or more output properties of the second user interface element in accordance with detecting changes in the second plurality of input parameters, including modifying a first output property of the second user interface element based at least in part on the change in the first input parameter and the change in the second input parameter; and
    updating the user interface in accordance with the modified first output property of the second user interface element 726 Modifying the first output property of the first user interface element based at least in part on the change in the first input parameter and the change in the second input parameter includes modifying the first output property over time based on a first behavior model that is driven by the first input parameter and the second input parameter; and the method includes:
    detecting a change in the user input, including detecting further changes in the first input parameter and the second input parameter;
    modifying the first output property over time based on a second behavior model that is driven by the first input parameter and the second input parameter, wherein the second behavior model is different from the first behavior model, including starting changing the first output property over time based on:
        a value of the first output property that was determined based on the first behavior model; and
        a first derivative of the value of the first output property with respect to time, wherein the first derivative of the value was determined based on the first behavior model

Figure 7C

838 Determine a respective operation to perform in the user interface in accordance with a velocity of the first user interface element 840 Determine a respective operation to perform in the user interface in accordance with a position of the first user interface element 842 Determine a respective operation to perform in the user interface in accordance with a size of the first user interface element 844 Determine a respective operation to perform in the user interface in accordance with the first output property value and a second output property value of the first user interface element 846 Determine a respective operation to perform in the user interface in accordance with a respective first output property value of the first user interface element and a respective second output property value of a second user interface element distinct from the first user interface element

Figure 8D

DEVICES, METHODS, AND GRAPHICAL USER INTERFACES FOR SEAMLESS TRANSITION OF USER INTERFACE BEHAVIORS

RELATED APPLICATION

This application claims the benefit of, and priority to, U.S. Provisional Application No. 62/507,184, filed May 16, 2017, which is incorporated by reference herein in its entirety.

TECHNICAL FIELD

This relates generally to electronic devices with touch-sensitive surfaces, including but not limited to electronic devices with touch-sensitive surfaces that display seamlessly transitioning user interface behaviors, such as transitions between operations performed in the user interface.

BACKGROUND

The use of touch-sensitive surfaces as input devices for computers and other electronic computing devices has increased significantly in recent years. Example touch-sensitive surfaces include touchpads and touch-screen displays. Such surfaces are widely used to manipulate user interfaces and objects therein on a display. Example user interface objects include digital images, video, text, icons, and control elements such as buttons and other graphics.

Example manipulations include adjusting outputs of a device such as position and/or size of one or more user interface objects, in response to changes in user inputs to the device, and determining operations to perform in the user interface based on representations of the outputs. Example user interface objects include digital images, video, text, icons, control elements such as buttons and other graphics, and application user interfaces. A user will, in some circumstances, need to perform such manipulations on user interface objects in a file management program (e.g., Finder from Apple Inc. of Cupertino, Calif.), an image management application (e.g., Aperture, iPhoto, Photos from Apple Inc. of Cupertino, Calif.), a digital content (e.g., videos and music) management application (e.g., iTunes from Apple Inc. of Cupertino, Calif.), a drawing application, a presentation application (e.g., Keynote from Apple Inc. of Cupertino, Calif.), a word processing application (e.g., Pages from Apple Inc. of Cupertino, Calif.), or a spreadsheet application (e.g., Numbers from Apple Inc. of Cupertino, Calif.).

But methods for performing these manipulations can produce abrupt changes in the user interface due to discontinuities in user interface behaviors across transitions between user inputs, or changes in user inputs, and between different operations being performed. For example, progressing a user interface animation in response to a first user input, or corresponding to a first user interface operation, and abruptly switching to progressing a different user interface animation in response to a change in the user input, or corresponding to a second, different user interface operation, causes drastic changes in the user interface that can be distracting for users. Distracted users may take longer to perform intended operations, thereby wasting energy. This latter consideration is particularly important in battery-operated devices.

SUMMARY

Accordingly, there is a need for electronic devices with faster, more efficient methods and interfaces for seamlessly transitioning user interface behaviors, such as transitions between operations performed in the user interface. Such methods and interfaces optionally complement or replace conventional methods for changing user interfaces. Such methods and interfaces reduce the number, extent, and/or nature of the inputs from a user and produce a more efficient human-machine interface. For battery-operated devices, such methods and interfaces conserve power and increase the time between battery charges.

The above deficiencies and other problems associated with user interfaces for electronic devices with touch-sensitive surfaces are reduced or eliminated by the disclosed devices. In some embodiments, the device is a desktop computer. In some embodiments, the device is portable (e.g., a notebook computer, tablet computer, or handheld device). In some embodiments, the device is a personal electronic device (e.g., a wearable electronic device, such as a watch). In some embodiments, the device has a touchpad. In some embodiments, the device has a touch-sensitive display (also known as a "touch screen" or "touch-screen display"). In some embodiments, the device has a graphical user interface (GUI), one or more processors, memory and one or more modules, programs or sets of instructions stored in the memory for performing multiple functions. In some embodiments, the user interacts with the GUI primarily through stylus and/or finger contacts and gestures on the touch-sensitive surface. In some embodiments, the functions optionally include image editing, drawing, presenting, word processing, spreadsheet making, game playing, telephoning, video conferencing, e-mailing, instant messaging, workout support, digital photographing, digital videoing, web browsing, digital music playing, note taking, and/or digital video playing. Executable instructions for performing these functions are, optionally, included in a non-transitory computer readable storage medium or other computer program product configured for execution by one or more processors.

In accordance with some embodiments, a method is performed at an electronic device with one or more output devices and one or more input devices. The method includes presenting a user interface via the one or more output devices outputting information about a user interface. The user interface includes an output property that represents a first type of output corresponding to the user interface. The method also includes detecting, via the one or more input devices, a user input including a first input that is associated with modifying the first type of output via a first behavior model; and, in response to detecting the first input: changing the output property over time based on the first behavior model; and updating the presentation of the user interface via the one or more output devices based on the changes in the output property that occur based on the first behavior model. The method further includes, while updating the presentation of the user interface via the one or more output devices based on the changes in the output property that occur based on the first behavior model, detecting a change to the user input; and, in response to detecting the change to the user input: changing the output property over time based on a second behavior model that is different from the first behavior model, including starting changing the output property over time based on: a value of the output property that was determined based on the first behavior model; and a first derivative of the value of the output property with respect to time. The method includes updating the presentation of the user interface via the one or more output devices based on the changes in the output property that occur based on the second behavior model.

In accordance with some embodiments, a method is performed at an electronic device with a display and a touch-sensitive surface. The method includes displaying a user interface that includes a plurality of user interface elements. A first user interface element of the plurality of user interface elements is associated with a plurality of output properties. The method also includes detecting a user input corresponding to a first user interface element, including detecting a change in a first input parameter of a plurality of input parameters that describe the user input and a change in a second input parameter of the plurality of input parameters; modifying one or more output properties of the first user interface element in accordance with changes in the plurality of input parameters, including modifying a first output property of the first user interface element based at least in part on the change in the first input parameter and the change in the second input parameter; and updating the user interface in accordance with the modified first output property of the first user interface element.

In accordance with some embodiments, a method of determining operations to be performed in a user interface is performed at an electronic device with a display and a touch-sensitive surface. The method includes displaying, on the display, a user interface that includes a plurality of user interface elements that are displayed in accordance with values of an associated plurality of output properties that define output attributes of respective user interface elements in the plurality of user interface elements; and detecting a user input on the touch-sensitive surface, including detecting changes to one or more of a plurality of input parameters that describe the user input. The user input is directed to a first user interface element in the plurality of user interface elements. The method also includes, in response to detecting the user input: modifying a first output property value of the first user interface element based on one or more behavior models that are driven by one or more input parameters of the user input; in accordance with a determination that the user interface meets first operation criteria, performing a first operation in the user interface; and, in accordance with a determination that the user interface meets second operation criteria, performing a second operation in the user interface that is different from the first operation. The first operation criteria include a criterion that is met when the first output property value of the first user interface element is above a first threshold. The second operation criteria include a criterion that is met when the first output property value of the first user interface element is below the first threshold.

In accordance with some embodiments, an electronic device includes a display, a touch-sensitive surface, optionally one or more sensors to detect intensities of contacts with the touch-sensitive surface, optionally one or more tactile output generators, one or more processors, and memory storing one or more programs; the one or more programs are configured to be executed by the one or more processors and the one or more programs include instructions for performing or causing performance of the operations of any of the methods described herein. In accordance with some embodiments, a computer readable storage medium has stored therein instructions, which, when executed by an electronic device with a display, a touch-sensitive surface, optionally one or more sensors to detect intensities of contacts with the touch-sensitive surface, and optionally one or more tactile output generators, cause the device to perform or cause performance of the operations of any of the methods described herein. In accordance with some embodiments, a graphical user interface on an electronic device with a display, a touch-sensitive surface, optionally one or more sensors to detect intensities of contacts with the touch-sensitive surface, optionally one or more tactile output generators, a memory, and one or more processors to execute one or more programs stored in the memory includes one or more of the elements displayed in any of the methods described herein, which are updated in response to inputs, as described in any of the methods described herein. In accordance with some embodiments, an electronic device includes: a display, a touch-sensitive surface, optionally one or more sensors to detect intensities of contacts with the touch-sensitive surface, and optionally one or more tactile output generators; and means for performing or causing performance of the operations of any of the methods described herein. In accordance with some embodiments, an information processing apparatus, for use in an electronic device with a display, a touch-sensitive surface, optionally one or more sensors to detect intensities of contacts with the touch-sensitive surface, and optionally one or more tactile output generators, includes means for performing or causing performance of the operations of any of the methods described herein.

Thus, electronic devices with displays, touch-sensitive surfaces, optionally one or more sensors to detect intensities of contacts with the touch-sensitive surface, optionally one or more tactile output generators, optionally one or more device orientation sensors, and optionally an audio system, are provided with improved methods and interfaces for seamlessly transitioning user interface behaviors, thereby increasing the effectiveness, efficiency, and user satisfaction with such devices. Such methods and interfaces may complement or replace conventional methods for changing user interfaces.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 6A-6F are flow diagrams of a process for seamlessly transitioning user interface behaviors in accordance with some embodiments.

FIGS. 7A-7C are flow diagrams of a process for updating output properties of user interfaces in response to inputs in accordance with some embodiments.

FIGS. 8A-8D are flow diagrams of a process for determining operations to perform in user interfaces in response to user inputs in accordance with some embodiments.

DESCRIPTION OF EMBODIMENTS

Many electronic devices display user interfaces that change over time in response to changing user inputs and/or in response to performing different operations in the user interface. Some methods for changing user interfaces produce abrupt changes in the user interface when a user input changes, or when the user interface switches from performing a first operation to performing a second operation. Abrupt user interface changes can be distracting to the user. In addition, some devices require multiple, distinct user inputs for performing different operations in the user interface. In the embodiments described below, improved methods are described for seamlessly transitioning user interface behaviors based on changes in user inputs, and for improved heuristics that provide additional options for operations to perform in the user interface based on properties of a single input. These methods improve the user experience by reducing user distraction and reducing the number of user inputs required for performing user interface operations.

Figure 7A:
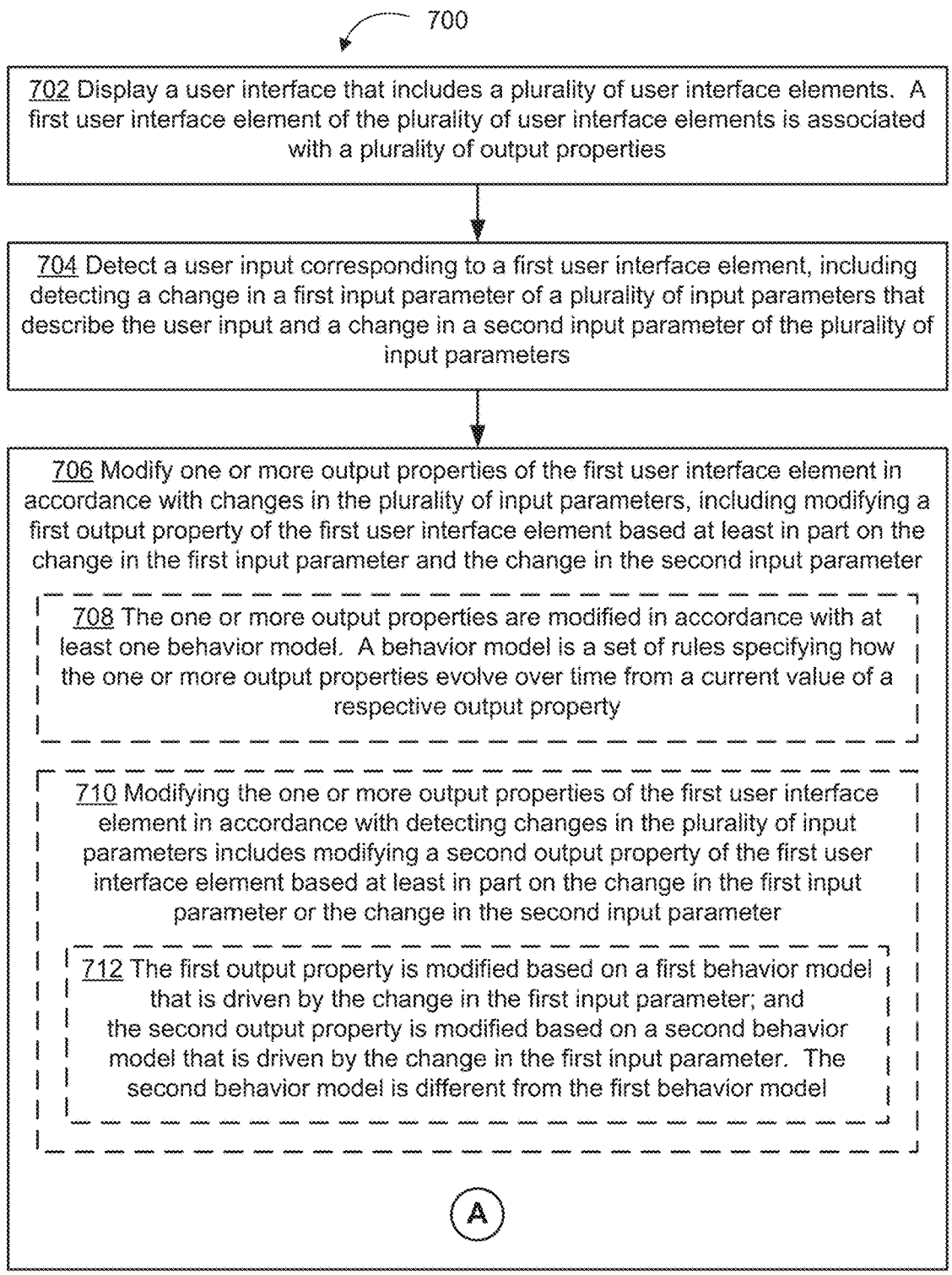
Figure 8A:
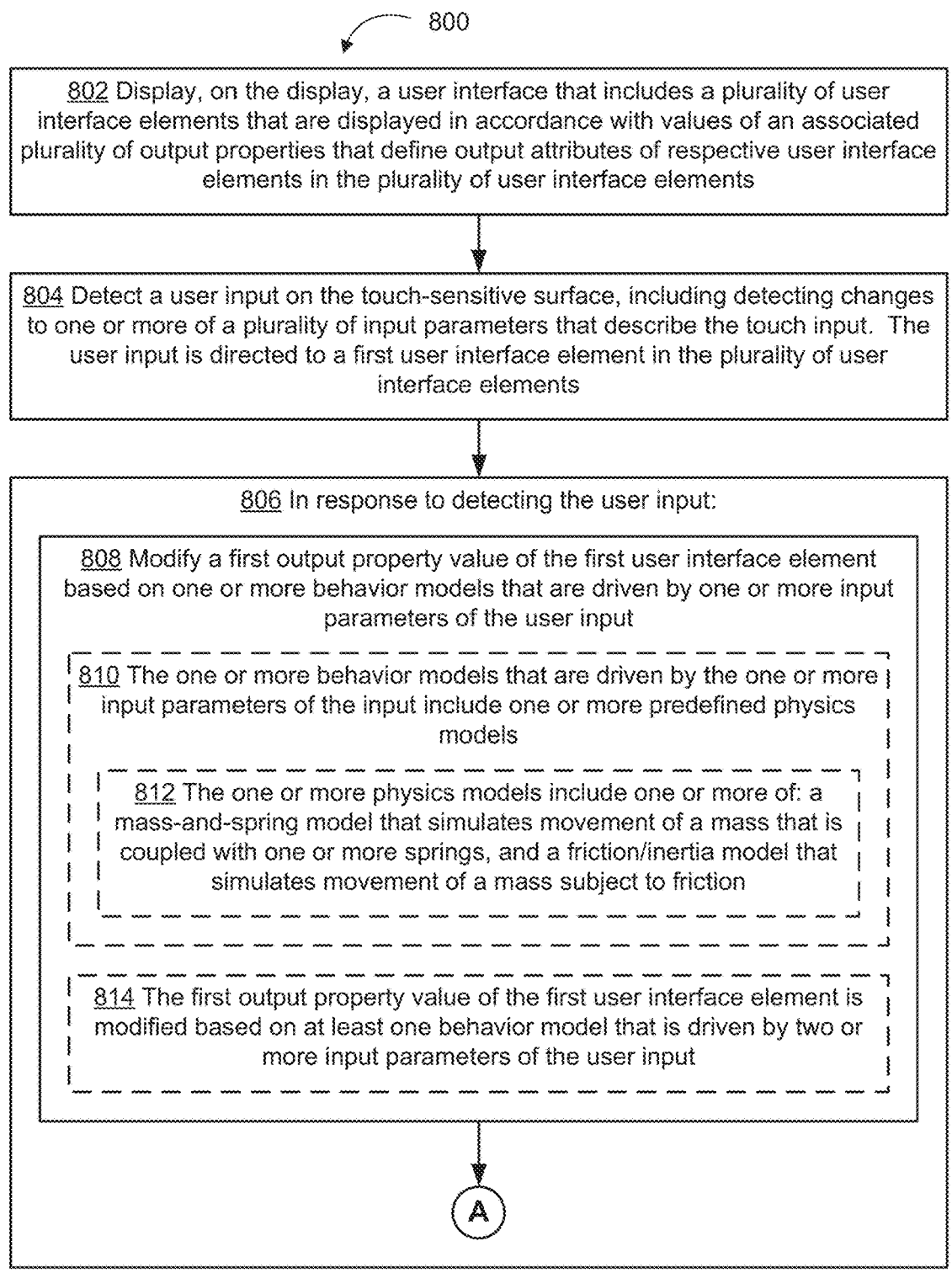
Figure 8B:
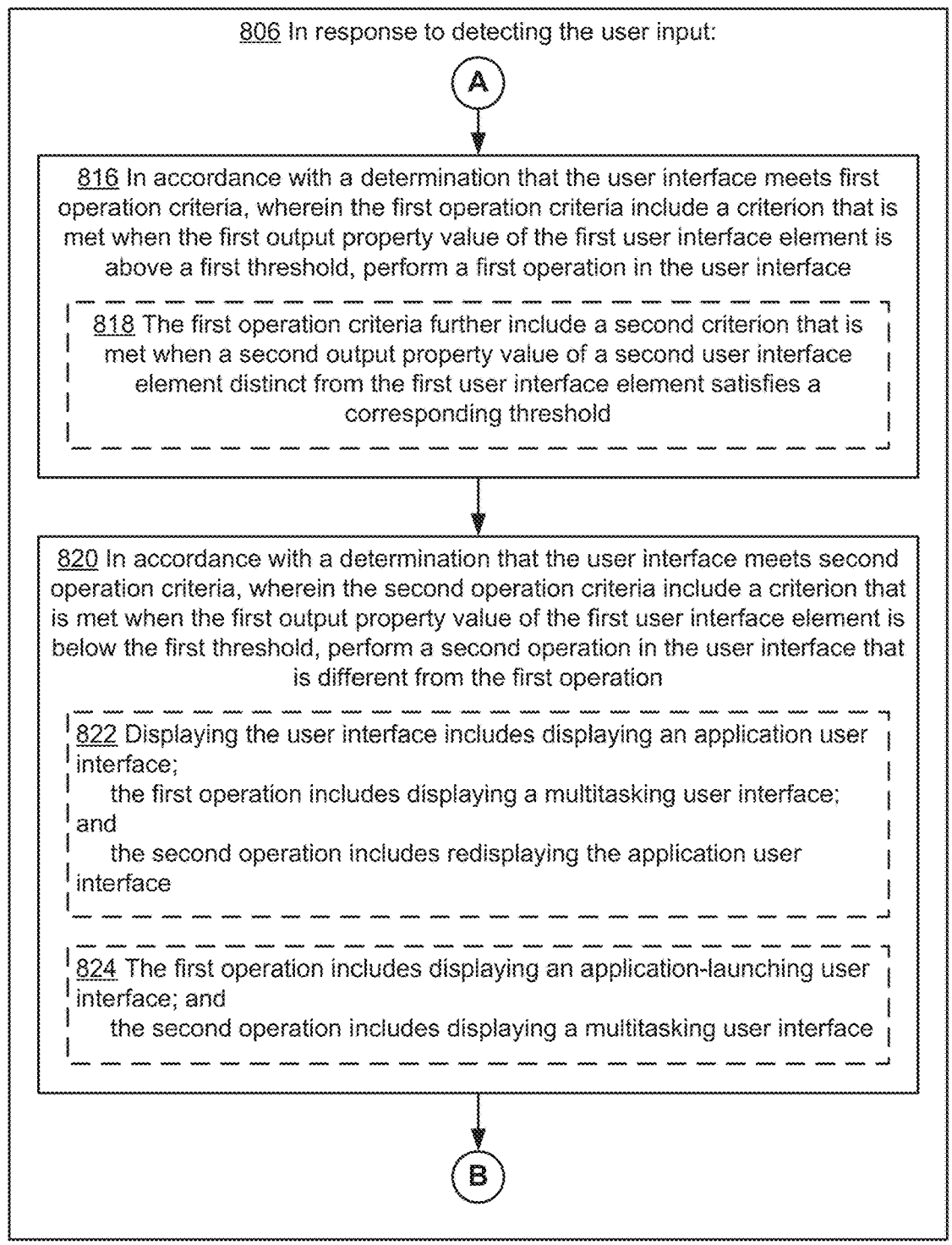
Figure 8C:
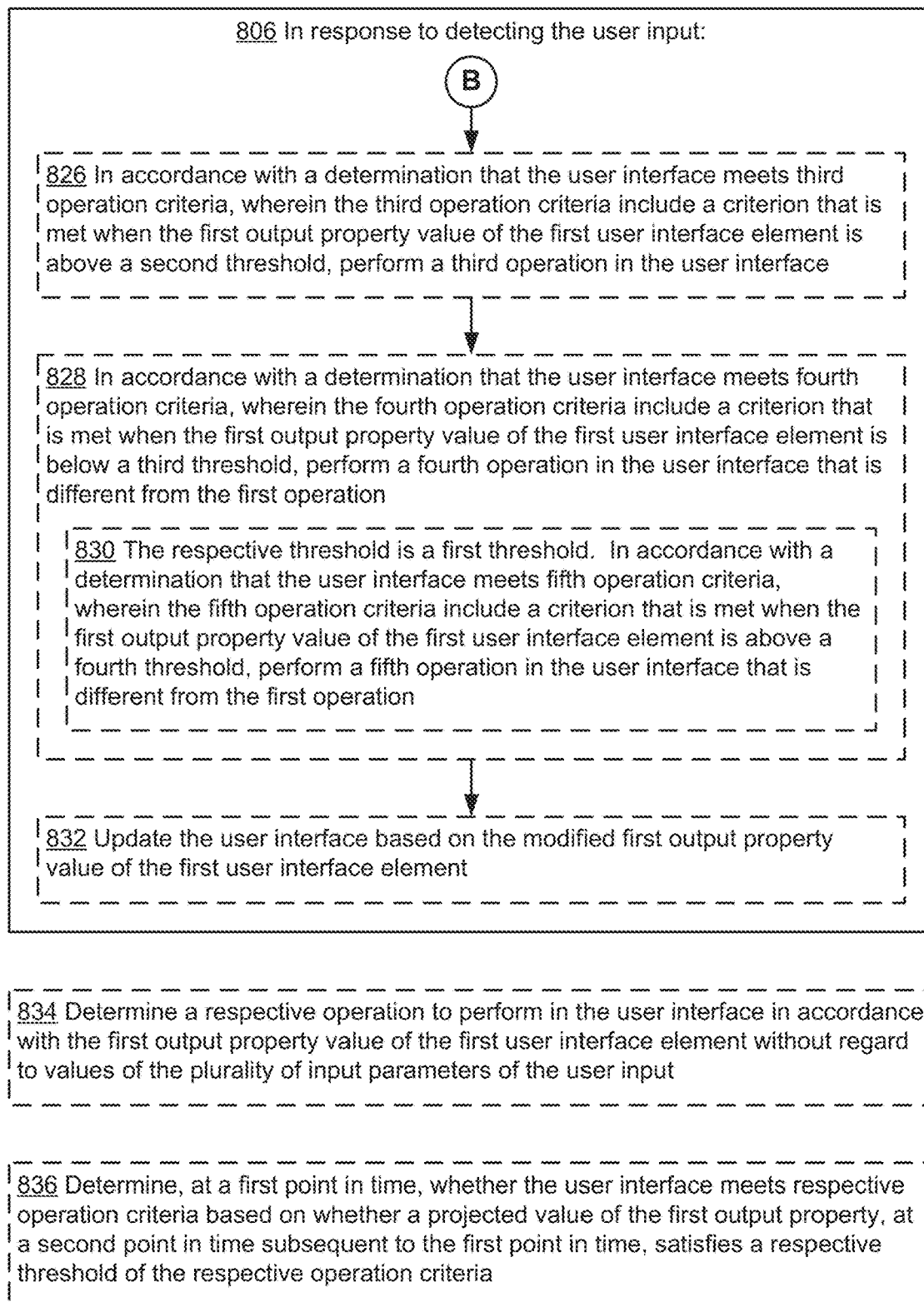

Below, FIGS. 1A-1D, 2, and 3 provide a description of example devices. FIGS. 4A-4B and 5A-5BA illustrate example user interfaces for providing seamless user interface transitions, including transitions between operations performed in the user interface. FIGS. 6A-6F illustrate a flow diagram of a method of seamlessly transitioning user interface behaviors. FIGS. 7A-7C illustrate a flow diagram of a method of updating output properties of user interfaces in response to inputs. FIGS. 8A-8D illustrate a flow diagram of a method of determining operations to perform in user interfaces in response to user inputs. The user interfaces in FIGS. 5A-5BA are used to illustrate the processes in FIGS. 6A-6F, 7A-7C, and 8A-8D.

Example Devices

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless the context clearly indicates otherwise.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Example embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch-screen displays and/or touchpads), are, optionally, used. It should also be understood that, in some embodiments, the device is not a portable communications device, but is a desktop computer with a touch-sensitive surface (e.g., a touch-screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The device typically supports a variety of applications, such as one or more of the following: a note taking application, a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
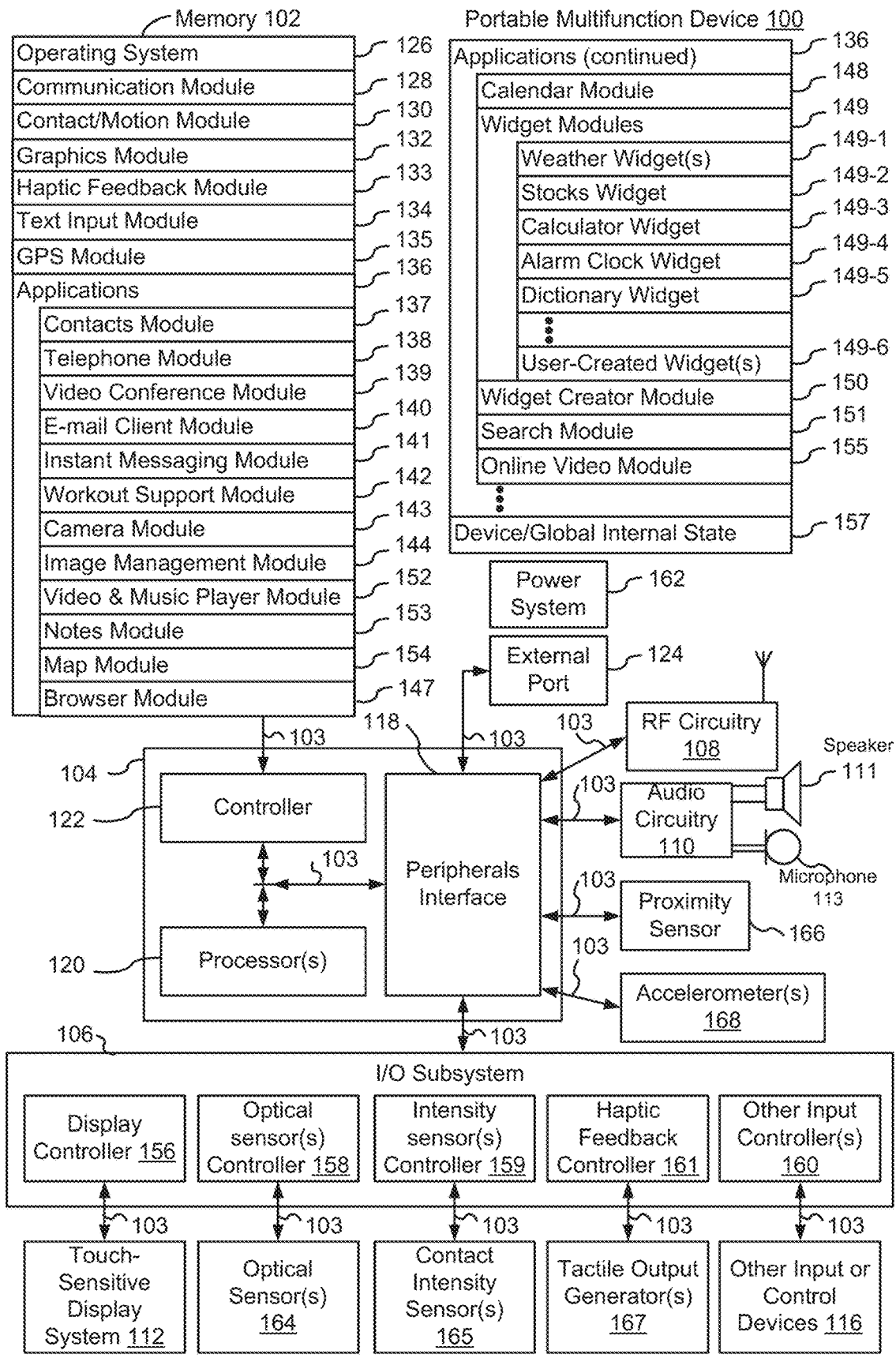
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display system 112 is sometimes called a "touch screen" for convenience, and is sometimes simply called a touch-sensitive display. Device 100 includes memory 102 (which optionally includes one or more computer readable storage mediums), memory controller 122, one or more processing units (CPUs) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensities of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user. Using tactile outputs to provide haptic feedback to a user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, a tactile output pattern specifies characteristics of a tactile output, such as the amplitude of the tactile output, the shape of a movement waveform of the tactile output, the frequency of the tactile output, and/or the duration of the tactile output.

When tactile outputs with different tactile output patterns are generated by a device (e.g., via one or more tactile output generators that move a moveable mass to generate tactile outputs), the tactile outputs may invoke different haptic sensations in a user holding or touching the device. While the sensation of the user is based on the user's perception of the tactile output, most users will be able to identify changes in waveform, frequency, and amplitude of tactile outputs generated by the device. Thus, the waveform, frequency and amplitude can be adjusted to indicate to the user that different operations have been performed. As such, tactile outputs with tactile output patterns that are designed, selected, and/or engineered to simulate characteristics (e.g., size, material, weight, stiffness, smoothness, etc.); behaviors (e.g., oscillation, displacement, acceleration, rotation, expansion, etc.); and/or interactions (e.g., collision, adhesion, repulsion, attraction, friction, etc.) of objects in a given environment (e.g., a user interface that includes graphical features and objects, a simulated physical environment with virtual boundaries and virtual objects, a real physical environment with physical boundaries and physical objects, and/or a combination of any of the above) will, in some circumstances, provide helpful feedback to users that reduces input errors and increases the efficiency of the user's operation of the device. Additionally, tactile outputs are, optionally, generated to correspond to feedback that is unrelated to a simulated physical characteristic, such as an input threshold or a selection of an object. Such tactile outputs will, in some circumstances, provide helpful feedback to users that reduces input errors and increases the efficiency of the user's operation of the device.

In some embodiments, a tactile output with a suitable tactile output pattern serves as a cue for the occurrence of an event of interest in a user interface or behind the scenes in a device. Examples of the events of interest include activation of an affordance (e.g., a real or virtual button, or toggle switch) provided on the device or in a user interface, success or failure of a requested operation, reaching or crossing a boundary in a user interface, entry into a new state, switching of input focus between objects, activation of a new mode, reaching or crossing an input threshold, detection or recognition of a type of input or gesture, etc. In some embodiments, tactile outputs are provided to serve as a warning or an alert for an impending event or outcome that would occur unless a redirection or interruption input is timely detected. Tactile outputs are also used in other contexts to enrich the user experience, improve the accessibility of the device to users with visual or motor difficulties or other accessibility needs, and/or improve efficiency and functionality of the user interface and/or the device. Tactile outputs are optionally accompanied with audio outputs and/or visible user interface changes, which further enhance a user's experience when the user interacts with a user interface and/or the device, and facilitate better conveyance of information regarding the state of the user interface and/or the device, and which reduce input errors and increase the efficiency of the user's operation of the device.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, firmware, or a combination thereof, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU(s) 120 and the peripherals interface 118, is, optionally, controlled by memory controller 122.

Peripherals interface 118 can be used to couple input and output peripherals of the device to CPU(s) 120 and memory 102. The one or more processors 120 run or execute various software programs and/or sets of instructions stored in memory 102 to perform various functions for device 100 and to process data.

In some embodiments, peripherals interface 118, CPU(s) 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch-sensitive display system 112 and other input or control devices 116, with peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input or control devices 116. The other input or control devices 116 optionally include physical buttons (e.g., push buttons, rocker buttons, etc.), dials, slider switches, joysticks, click wheels, and so forth. In some alternate embodiments, input controller(s) 160 are, optionally, coupled with any (or none) of the following: a keyboard, infrared port, USB port, stylus, and/or a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

Touch-sensitive display system 112 provides an input interface and an output interface between the device and a user. Display controller 156 receives and/or sends electrical signals from/to touch-sensitive display system 112. Touch-sensitive display system 112 displays visual output to the user. The visual output optionally includes graphics, text, icons, video, and any combination thereof (collectively termed "graphics"). In some embodiments, some or all of the visual output corresponds to user interface objects. As used herein, the term "affordance" refers to a user-interactive graphical user interface object (e.g., a graphical user interface object that is configured to respond to inputs directed toward the graphical user interface object). Examples of user-interactive graphical user interface objects include, without limitation, a button, slider, icon, selectable menu item, switch, hyperlink, or other user interface control.

Touch-sensitive display system 112 has a touch-sensitive surface, sensor or set of sensors that accepts input from the user based on haptic and/or tactile contact. Touch-sensitive display system 112 and display controller 156 (along with any associated modules and/or sets of instructions in memory 102) detect contact (and any movement or breaking of the contact) on touch-sensitive display system 112 and converts the detected contact into interaction with user-interface objects (e.g., one or more soft keys, icons, web pages or images) that are displayed on touch-sensitive display system 112. In some embodiments, a point of contact between touch-sensitive display system 112 and the user corresponds to a finger of the user or a stylus.

Touch-sensitive display system 112 optionally uses LCD (liquid crystal display) technology, LPD (light emitting polymer display) technology, or LED (light emitting diode) technology, although other display technologies are used in other embodiments. Touch-sensitive display system 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch-sensitive display system 112. In some embodiments, projected mutual capacitance sensing technology is used, such as that found in the iPhone®, iPod Touch®, and iPad® from Apple Inc. of Cupertino, Calif.

Touch-sensitive display system 112 optionally has a video resolution in excess of 100 dpi. In some embodiments, the touch screen video resolution is in excess of 400 dpi (e.g., 500 dpi, 800 dpi, or greater). The user optionally makes contact with touch-sensitive display system 112 using any suitable object or appendage, such as a stylus, a finger, and so forth. In some embodiments, the user interface is designed to work with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch-sensitive display system 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled with optical sensor controller 158 in I/O subsystem 106. Optical sensor(s) 164 optionally include charge-coupled device (CCD) or complementary metal-oxide semiconductor (CMOS) phototransistors. Optical sensor(s) 164 receive light from the environment, projected through one or more lens, and converts the light to data representing an image. In conjunction with imaging module 143 (also called a camera module), optical sensor(s) 164 optionally capture still images and/or video. In some embodiments, an optical sensor is located on the back of device 100, opposite touch-sensitive display system 112 on the front of the device, so that the touch screen is enabled for use as a viewfinder for still and/or video image acquisition. In some embodiments, another optical sensor is located on the front of the device so that the user's image is obtained (e.g., for selfies, for videoconferencing while the user views the other video conference participants on the touch screen, etc.).

Device 100 optionally also includes one or more contact intensity sensors 165. FIG. 1A shows a contact intensity sensor coupled with intensity sensor controller 159 in I/O subsystem 106. Contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor(s) 165 receive contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch-screen display system 112 which is located on the front of device 100.

Device 100 optionally also includes one or more proximity sensors 166. FIG. 1A shows proximity sensor 166 coupled with peripherals interface 118. Alternately, proximity sensor 166 is coupled with input controller 160 in I/O subsystem 106. In some embodiments, the proximity sensor turns off and disables touch-sensitive display system 112 when the multifunction device is placed near the user's ear (e.g., when the user is making a phone call).

Device 100 optionally also includes one or more tactile output generators 167. FIG. 1A shows a tactile output generator coupled with haptic feedback controller 161 in I/O subsystem 106. In some embodiments, tactile output generator(s) 167 include one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Tactile output generator(s) 167 receive tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch-sensitive display system 112, which is located on the front of device 100.

Device 100 optionally also includes one or more accelerometers 168. FIG. 1A shows accelerometer 168 coupled with peripherals interface 118. Alternately, accelerometer 168 is, optionally, coupled with an input controller 160 in I/O subsystem 106. In some embodiments, information is displayed on the touch-screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
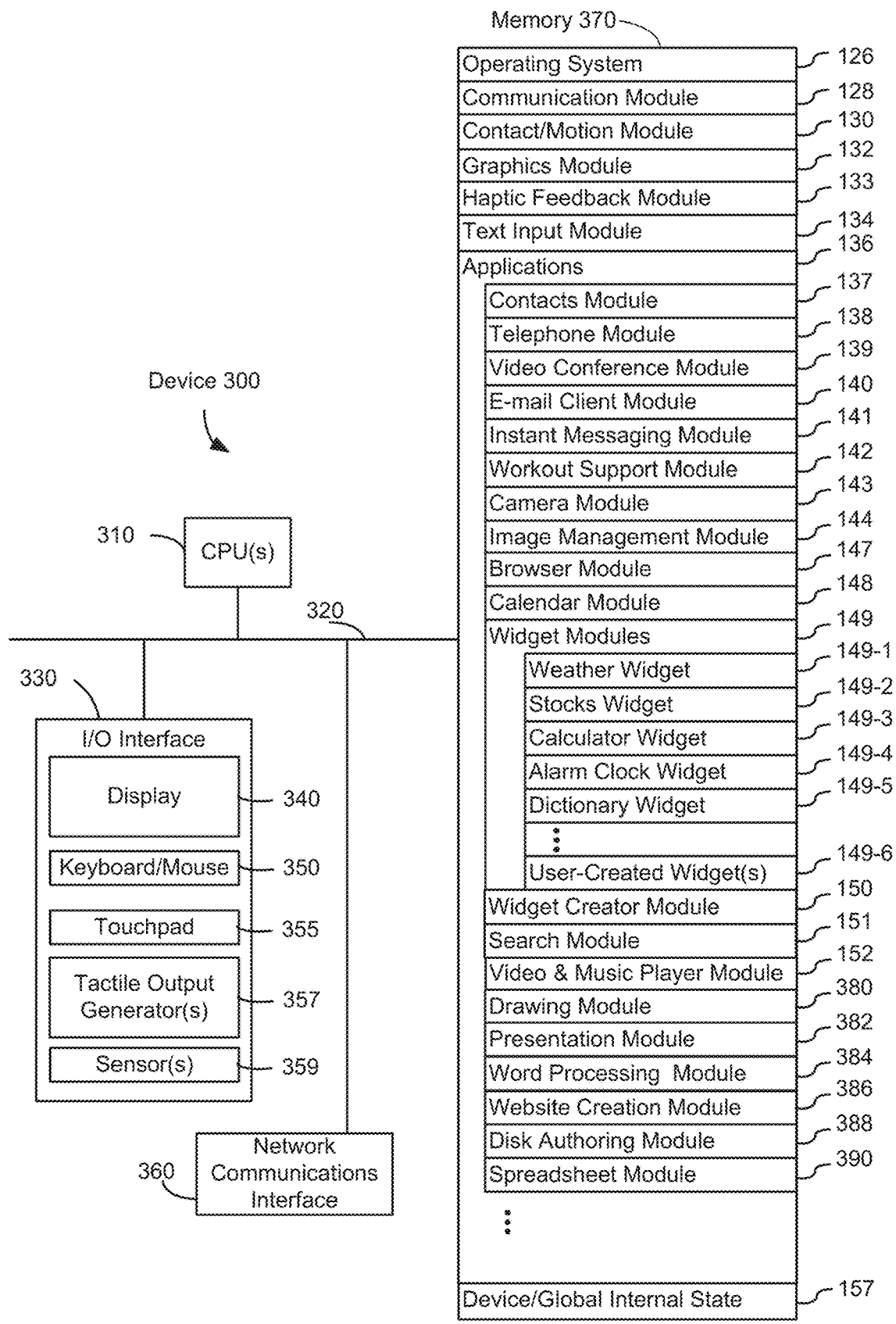
FIG. 3 is a block diagram of an example multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, haptic feedback module (or set of instructions) 133, text input module (or set of instructions) 134, Global Positioning System (GPS) module (or set of instructions) 135, and applications (or sets of instructions) 136. Furthermore, in some embodiments, memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch-sensitive display system 112; sensor state, including information obtained from the device's various sensors and other input or control devices 116; and location and/or positional information concerning the device's location and/or attitude.

Operating system 126 (e.g., iOS, Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used in some iPhone®, iPod Touch®, and iPad® devices from Apple Inc. of Cupertino, Calif. In some embodiments, the external port is a Lightning connector that is the same as, or similar to and/or compatible with the Lightning connector used in some iPhone®, iPod Touch®, and iPad® devices from Apple Inc. of Cupertino, Calif.

Contact/motion module 130 optionally detects contact with touch-sensitive display system 112 (in conjunction with display controller 156) and other touch-sensitive devices (e.g., a touchpad or physical click wheel). Contact/motion module 130 includes various software components for performing various operations related to detection of contact (e.g., by a finger or by a stylus), such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts or stylus contacts) or to multiple simultaneous contacts (e.g., "multitouch"/multiple finger contacts). In some embodiments, contact/motion module 130 and display controller 156 detect contact on a touchpad.

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event. Similarly, tap, swipe, drag, and other gestures are optionally detected for a stylus by detecting a particular contact pattern for the stylus.

In some embodiments, detecting a finger tap gesture depends on the length of time between detecting the finger-down event and the finger-up event, but is independent of the intensity of the finger contact between detecting the finger-down event and the finger-up event. In some embodiments, a tap gesture is detected in accordance with a determination that the length of time between the finger-down event and the finger-up event is less than a predetermined value (e.g., less than 0.1, 0.2, 0.3, 0.4 or 0.5 seconds), independent of whether the intensity of the finger contact during the tap meets a given intensity threshold (greater than a nominal contact-detection intensity threshold), such as a light press or deep press intensity threshold. Thus, a finger tap gesture can satisfy particular input criteria that do not require that the characteristic intensity of a contact satisfy a given intensity threshold in order for the particular input criteria to be met. For clarity, the finger contact in a tap gesture typically needs to satisfy a nominal contact-detection intensity threshold, below which the contact is not detected, in order for the finger-down event to be detected. A similar analysis applies to detecting a tap gesture by a stylus or other contact. In cases where the device is capable of detecting a finger or stylus contact hovering over a touch sensitive surface, the nominal contact-detection intensity threshold optionally does not correspond to physical contact between the finger or stylus and the touch sensitive surface.

The same concepts apply in an analogous manner to other types of gestures. For example, a swipe gesture, a pinch gesture, a depinch gesture, and/or a long press gesture are optionally detected based on the satisfaction of criteria that are either independent of intensities of contacts included in the gesture, or do not require that contact(s) that perform the gesture reach intensity thresholds in order to be recognized. For example, a swipe gesture is detected based on an amount of movement of one or more contacts; a pinch gesture is detected based on movement of two or more contacts towards each other; a depinch gesture is detected based on movement of two or more contacts away from each other; and a long press gesture is detected based on a duration of the contact on the touch-sensitive surface with less than a threshold amount of movement. As such, the statement that particular gesture recognition criteria do not require that the intensity of the contact(s) meet a respective intensity threshold in order for the particular gesture recognition criteria to be met means that the particular gesture recognition criteria are capable of being satisfied if the contact(s) in the gesture do not reach the respective intensity threshold, and are also capable of being satisfied in circumstances where one or more of the contacts in the gesture do reach or exceed the respective intensity threshold. In some embodiments, a tap gesture is detected based on a determination that the finger-down and finger-up event are detected within a predefined time period, without regard to whether the contact is above or below the respective intensity threshold during the predefined time period, and a swipe gesture is detected based on a determination that the contact movement is greater than a predefined magnitude, even if the contact is above the respective intensity threshold at the end of the contact movement. Even in implementations where detection of a gesture is influenced by the intensity of contacts performing the gesture (e.g., the device detects a long press more quickly when the intensity of the contact is above an intensity threshold or delays detection of a tap input when the intensity of the contact is higher), the detection of those gestures does not require that the contacts reach a particular intensity threshold so long as the criteria for recognizing the gesture can be met in circumstances where the contact does not reach the particular intensity threshold (e.g., even if the amount of time that it takes to recognize the gesture changes).

Contact intensity thresholds, duration thresholds, and movement thresholds are, in some circumstances, combined in a variety of different combinations in order to create heuristics for distinguishing two or more different gestures directed to the same input element or region so that multiple different interactions with the same input element are enabled to provide a richer set of user interactions and responses. The statement that a particular set of gesture recognition criteria do not require that the intensity of the contact(s) meet a respective intensity threshold in order for the particular gesture recognition criteria to be met does not preclude the concurrent evaluation of other intensity-dependent gesture recognition criteria to identify other gestures that do have a criteria that is met when a gesture includes a contact with an intensity above the respective intensity threshold. For example, in some circumstances, first gesture recognition criteria for a first gesture—which do not require that the intensity of the contact(s) meet a respective intensity threshold in order for the first gesture recognition criteria to be met—are in competition with second gesture recognition criteria for a second gesture—which are dependent on the contact(s) reaching the respective intensity threshold. In such competitions, the gesture is, optionally, not recognized as meeting the first gesture recognition criteria for the first gesture if the second gesture recognition criteria for the second gesture are met first. For example, if a contact reaches the respective intensity threshold before the contact moves by a predefined amount of movement, a deep press gesture is detected rather than a swipe gesture. Conversely, if the contact moves by the predefined amount of movement before the contact reaches the respective intensity threshold, a swipe gesture is detected rather than a deep press gesture. Even in such circumstances, the first gesture recognition criteria for the first gesture still do not require that the intensity of the contact(s) meet a respective intensity threshold in order for the first gesture recognition criteria to be met because if the contact stayed below the respective intensity threshold until an end of the gesture (e.g., a swipe gesture with a contact that does not increase to an intensity above the respective intensity threshold), the gesture would have been recognized by the first gesture recognition criteria as a swipe gesture. As such, particular gesture recognition criteria that do not require that the intensity of the contact(s) meet a respective intensity threshold in order for the particular gesture recognition criteria to be met will (A) in some circumstances ignore the intensity of the contact with respect to the intensity threshold (e.g. for a tap gesture) and/or (B) in some circumstances still be dependent on the intensity of the contact with respect to the intensity threshold in the sense that the particular gesture recognition criteria (e.g., for a long press gesture) will fail if a competing set of intensity-dependent gesture recognition criteria (e.g., for a deep press gesture) recognize an input as corresponding to an intensity-dependent gesture before the particular gesture recognition criteria recognize a gesture corresponding to the input (e.g., for a long press gesture that is competing with a deep press gesture for recognition).

Graphics module 132 includes various known software components for rendering and displaying graphics on touch-sensitive display system 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions (e.g., instructions used by haptic feedback controller 161) to produce tactile outputs using tactile output generator(s) 167 at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof:
  contacts module 137 (sometimes called an address book or contact list);
  telephone module 138;
  video conferencing module 139;
  e-mail client module 140;
  instant messaging (IM) module 141;
  workout support module 142;
  camera module 143 for still and/or video images;
  image management module 144;
  browser module 147;
  calendar module 148;
  widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;

widget creator module 150 for making user-created widgets 149-6;

search module 151;

video and music player module 152, which is, optionally, made up of a video player module and a music player module;

notes module 153;

map module 154; and/or online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch-sensitive display system 112, display controller 156, contact module 130, graphics module 132, and text input module 134, contacts module 137 includes executable instructions to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers and/or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch-sensitive display system 112, display controller 156, contact module 130, graphics module 132, and text input module 134, telephone module 138 includes executable instructions to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch-sensitive display system 112, display controller 156, optical sensor(s) 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch-sensitive display system 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch-sensitive display system 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, Apple Push Notification Service (APNs) or IMPS for Internet-based instant messages), to receive instant messages, and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, APNs, or IMPS).

In conjunction with RF circuitry 108, touch-sensitive display system 112, display controller 156, contact module 130, graphics module 132, text input module 134, GPS module 135, map module 154, and video and music player module 152, workout support module 142 includes executable instructions to create workouts (e.g., with time, distance, and/or calorie burning goals); communicate with workout sensors (in sports devices and smart watches); receive workout sensor data; calibrate sensors used to monitor a workout; select and play music for a workout; and display, store and transmit workout data.

In conjunction with touch-sensitive display system 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, and/or delete a still image or video from memory 102.

In conjunction with touch-sensitive display system 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch-sensitive display system 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch-sensitive display system 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch-sensitive display system 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch-sensitive display system 112, display system controller 156, contact module 130, graphics module 132, text input module 134, and browser module 147, the widget creator module 150 includes executable instructions to create widgets (e.g., turning a user-specified portion of a web page into a widget).

In conjunction with touch-sensitive display system 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch-sensitive display system 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch-sensitive display system 112, or on an external display connected wirelessly or via external port 124). In some embodiments, device 100 optionally includes the functionality of an MP3 player, such as an iPod (trademark of Apple Inc.).

In conjunction with touch-sensitive display system 112, display controller 156, contact module 130, graphics module 132, and text input module 134, notes module 153 includes executable instructions to create and manage notes, to do lists, and the like in accordance with user instructions.

In conjunction with RF circuitry 108, touch-sensitive display system 112, display system controller 156, contact module 130, graphics module 132, text input module 134, GPS module 135, and browser module 147, map module 154 includes executable instructions to receive, display, modify, and store maps and data associated with maps (e.g., driving directions; data on stores and other points of interest at or near a particular location; and other location-based data) in accordance with user instructions.

In conjunction with touch-sensitive display system 112, display system controller 156, contact module 130, graphics module 132, audio circuitry 110, speaker 111, RF circuitry 108, text input module 134, e-mail client module 140, and browser module 147, online video module 155 includes executable instructions that allow the user to access, browse, receive (e.g., by streaming and/or download), play back (e.g., on the touch screen 112, or on an external display connected wirelessly or via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
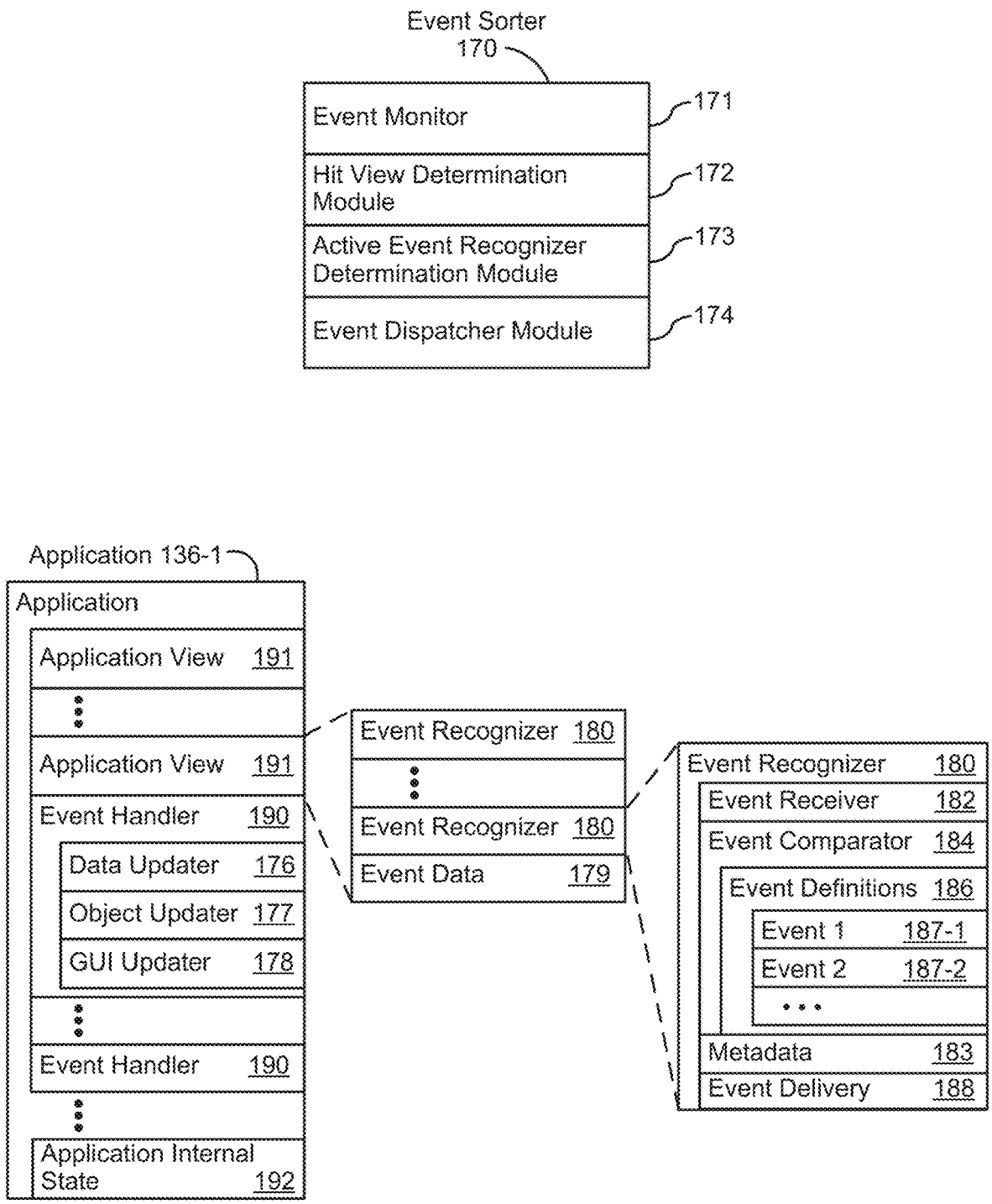
FIG. 1B is a block diagram illustrating example components for event handling in accordance with some embodiments.

FIG. 1B is a block diagram illustrating example components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 136, 137-155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display system 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display system 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display system 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch-sensitive display system 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display system 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display system 112, when a touch is detected on touch-sensitive display system 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video and music player module 152. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

Figure 1C:
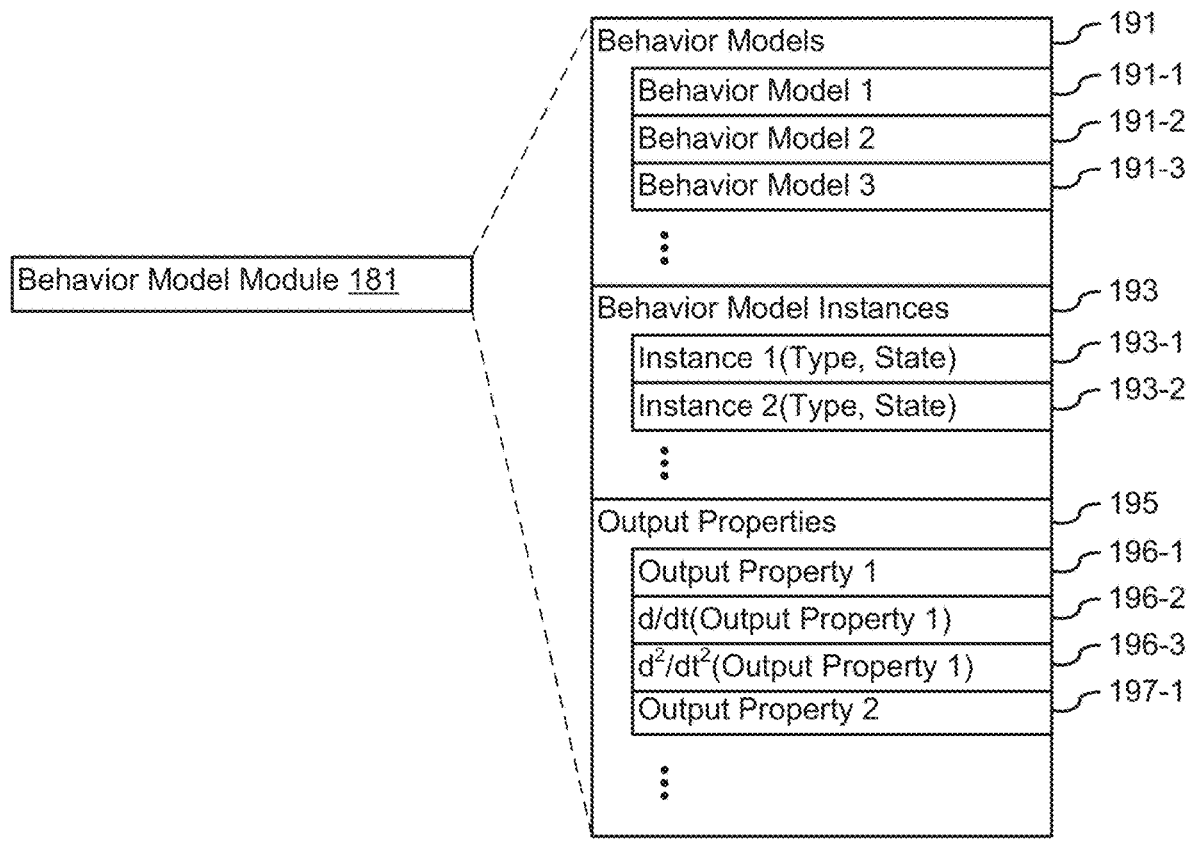
FIG. 1C is a block diagram illustrating example components for modifying a user interface using behavior models, in accordance with some embodiments.

FIG. 1C is a block diagram illustrating example components for modifying a user interface using behavior models, in accordance with some embodiments. In some embodiments, memory 102 (in FIG. 1A) or 370 (FIG. 3) includes behavior model module 181 (e.g., in operating system 126).

Behavior model module 181 includes one or more behavior models 189 that are used for modifying one or more output properties 195 of a user interface. In some embodiments, behavior models 189 include different behavior models, such as behavior model 1 (191-1), behavior model 2 (191-2), and behavior model 3 (191-3). In some embodiments, an instance of a respective behavior model is created for modifying an output property using the respective behavior model. Behavior model instances 193 stores one or more instances of behavior models, such as instance 1 (193-1) and instance 2 (193-2). In some embodiments, the instance of the behavior model includes information specifying the type of behavior model (e.g., indicating a particular behavior model of behavior models 191 to which the respective behavior model instance corresponds). In some embodiments, the instance of the behavior model includes information specifying a state of the behavior model (e.g., one or more parameters of the behavior model). Behavior models 191 (or behavior model instances 193) are used to modify respective output properties 195. Output properties 195 stores output properties of the user interface, such as output property 1 (196-1) and output property 2 (197-1). In some embodiments, output properties 195 stores derivatives of the output properties of the user interface with respect to time, such as a first derivative of a respective output property with respect to time, d/dt(output property 1) (196-2), and a second derivative of the respective output property with respect to time, $d^2/dt^2$(output property 1) (196-3). In some embodiments, the first and second derivatives of output properties with respect to time are used to produce more seamless (e.g., smoother) user interface behaviors with less drastic changes.

Figure 1D:
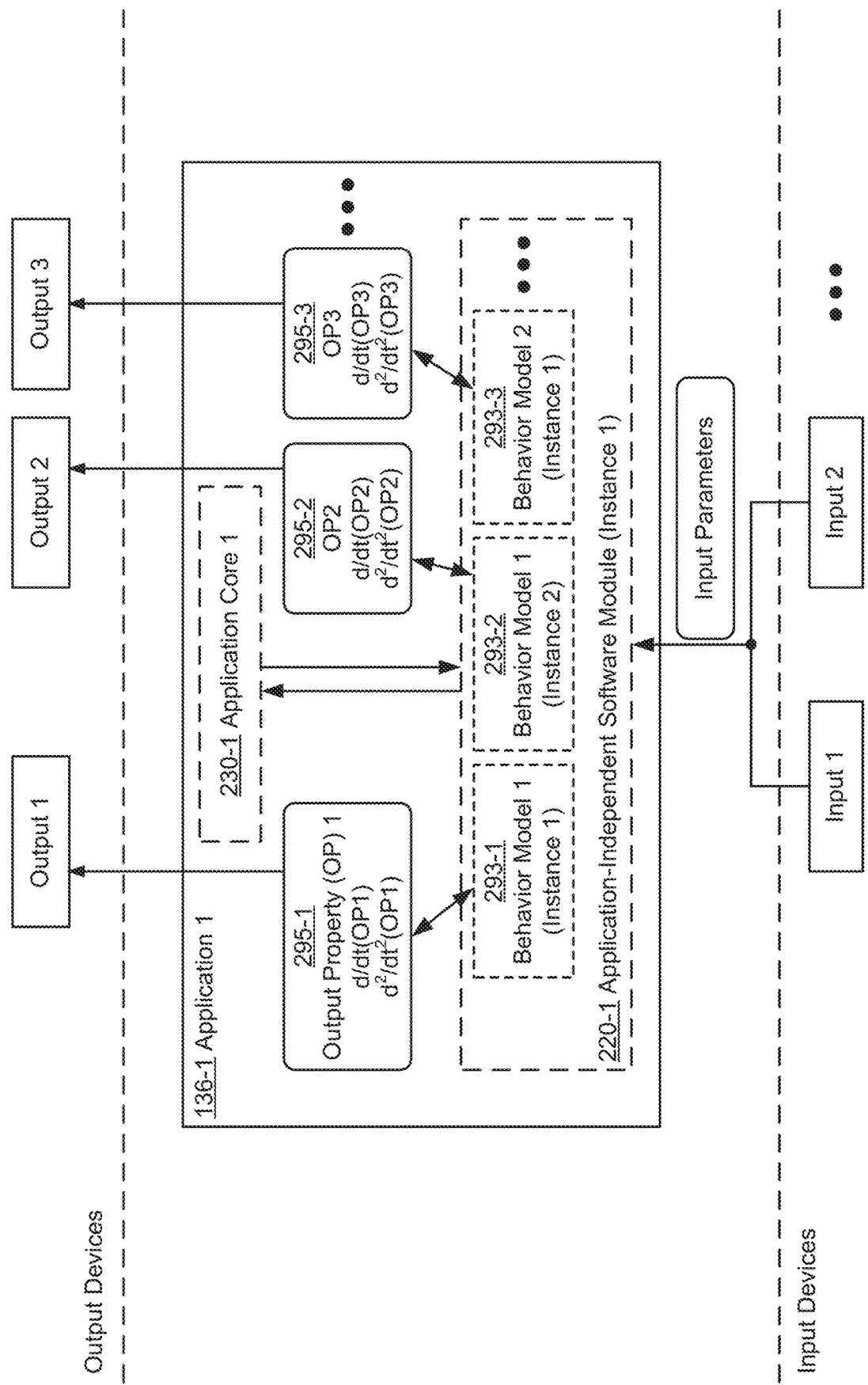
FIG. 1D is a block diagram illustrating an example application-independent software module used for modifying a user interface using behavior models, in accordance with some embodiments.

FIG. 1D is a block diagram illustrating an example application-independent software module used for modifying a user interface using behavior models, in accordance with some embodiments. Electronic device 100 uses the application-independent software module to process input parameters.

FIG. 1D illustrates that one or more input devices (e.g., touch-sensitive display system 112 (FIG. 1A), other input or control devices 116 (FIG. 1A), keyboard/mouse 350 (FIG. 3), and/or touchpad 355 (FIG. 3)) of device 100 receive user inputs corresponding to user interactions with device 100, such as input 1 and input 2. In response to receiving the user inputs, the input devices generate and send input parameters, describing the user inputs, to one or more applications (e.g., application 1 (136-1)). In some embodiments, the application (e.g., application 1 (136-1)) includes an instance of an application-independent software module (e.g., application-independent software module 220-1 (Instance 1)). In addition, the application includes an application core that is specific to the application (e.g., application 1 (136-1) includes application core 1 (230-1)). For example, application core 1 (230-1) includes instructions for performing operations specific to application 1 (136-1). In some embodiments, the input parameters are sent to the application-independent software module instance (e.g., application-independent software module 220-1 (Instance 1)) within the application. In some embodiments, application-independent software module 220 is distinct and separate from applications, and optionally distinct and separate from an operating system (e.g., operating system 126, FIGS. 1A and 3) of device 100. In some embodiments, the application (e.g., application 1 (136-1)) accesses and/or includes one or more portions of a behavior model module (e.g., behavior model module 181, FIG. 1C), such as stored output properties (e.g., output properties 295-1, 295-2, and 295-3) and instances of stored behavior models (e.g., behavior model instances 293-1, 293-2, and 293-3).

In some embodiments, the application-independent software module includes instances of behavior models (e.g., a first instance of behavior model 1 (293-1), a second instance of behavior model 1 (293-2), and a first instance of behavior model 2 (293-3)). In some embodiments, a respective behavior model is used to modify an output property that represents a type of output in the application user interface, where the output is used for providing user interface behaviors (e.g., displaying and/or updating a user interface, generating audio outputs, generating tactile outputs, etc.) with one or more output devices (e.g., touch-sensitive display system 112 (FIG. 1A), speaker 111 (FIG. 1A), tactile output generator(s) 167 (FIG. 1A) and 357 (FIG. 3), and/or display 340 (FIG. 3)). In some embodiments, a respective behavior model uses (e.g., is driven by) one or more of the input parameters sent to the application-independent software module. In some embodiments, the respective behavior model is used to modify a first derivative of the output property with respect to time, and/or a second derivative of the output property with respect to time. For example, behavior model 1 (instance 1) (293-1) is used to modify values 295-1 of output property (OP) 1, d/dt(OP1), and $d^2/dt^2$(OP1); behavior model 1 (instance 2) (293-2) is used to modify values 295-2 of output property (OP) 2, d/dt(OP2), and $d^2/dt^2$(OP2); and behavior model 2 (instance 1) (293-3) is used to modify values 295-3 of output property (OP) 3, d/dt(OP3), and $d^2/dt^2$(OP3). In some embodiments, previous values of output properties are sent (e.g., returned) to the behavior models and used to determine updated values of the output properties.

Figure 2:
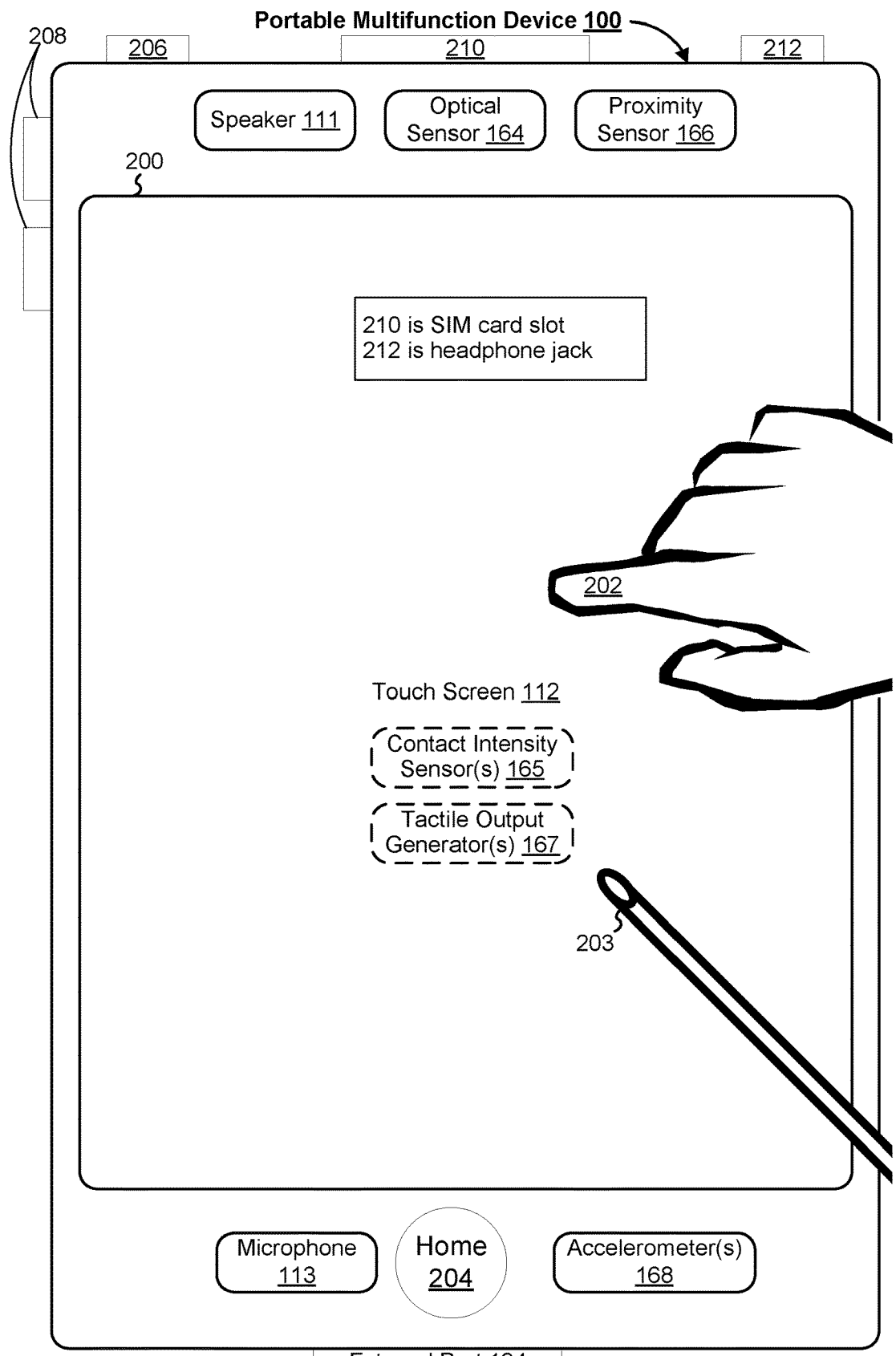
FIG. 2 illustrates a portable multifunction device having a touch screen in accordance with some embodiments.

FIG. 2 illustrates a portable multifunction device 100 having a touch screen (e.g., touch-sensitive display system 112, FIG. 1A) in accordance with some embodiments. The touch screen optionally displays one or more graphics within user interface (UI) 200. In these embodiments, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally executed on device 100. Alternatively, in some embodiments, the menu button is implemented as a soft key in a GUI displayed on the touch-screen display.

In some embodiments, device 100 includes the touch-screen display, menu button 204 (sometimes called home button 204), push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In some embodiments, device 100 also accepts verbal input for activation or deactivation of some functions through microphone 113. Device 100 also, optionally, includes one or more contact intensity sensors 165 for detecting intensities of contacts on touch-sensitive display system 112 and/or one or more tactile output generators 167 for generating tactile outputs for a user of device 100.

FIG. 3 is a block diagram of an example multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch-screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Attention is now directed towards embodiments of user interfaces ("UI") that are, optionally, implemented on portable multifunction device 100.

Figure 4A:
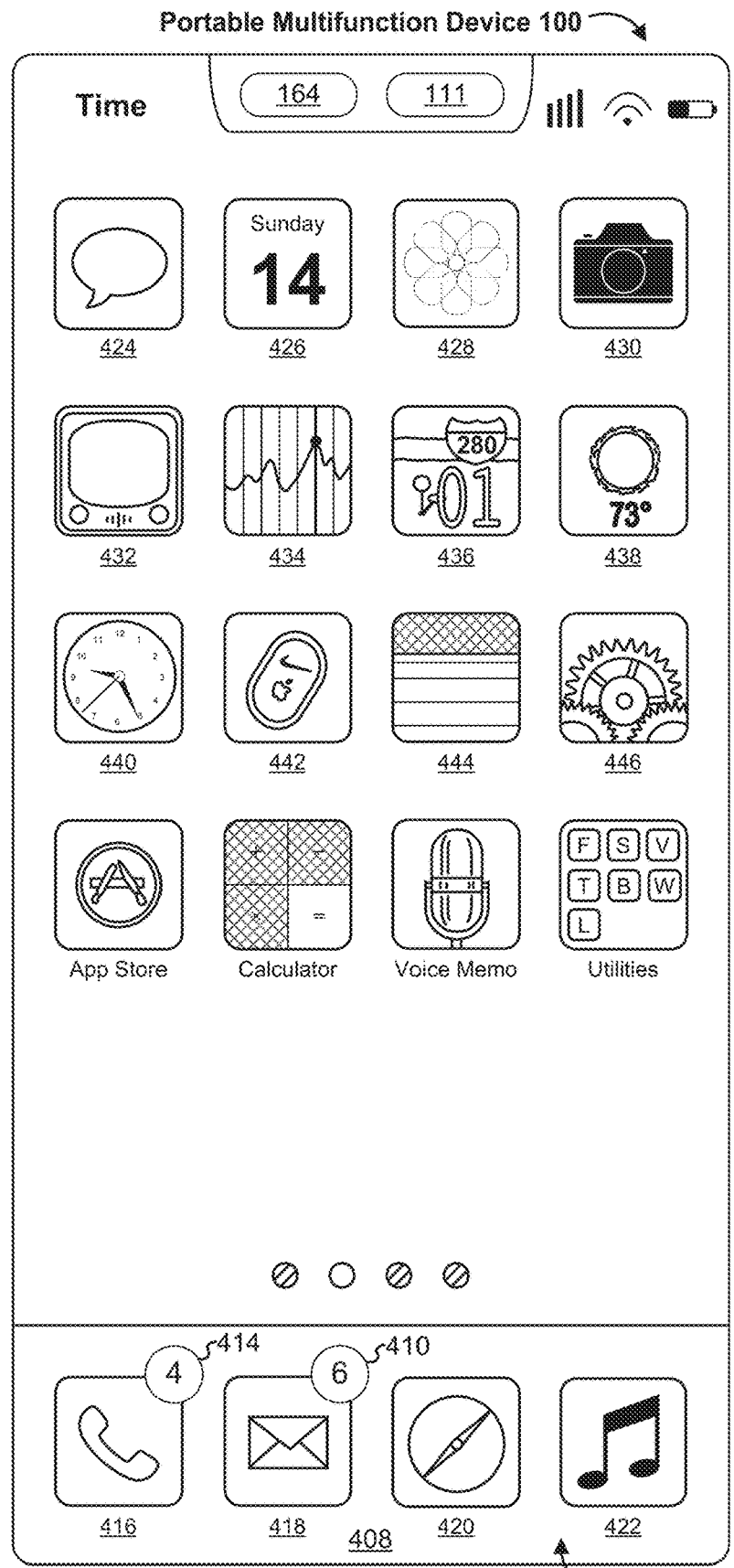
FIG. 4A illustrates an example user interface for a menu of applications on a portable multifunction device in accordance with some embodiments.

FIG. 4A illustrates an example user interface for a menu of applications on portable multifunction device 100 in accordance with some embodiments. Similar user interfaces are, optionally, implemented on device 300. In some embodiments, user interface 400 includes the following elements, or a subset or superset thereof:
  Signal strength indicator(s) for wireless communication (s), such as cellular and Wi-Fi signals;
  Time;
  a Bluetooth indicator;
  a Battery status indicator;
  Tray 408 with icons for frequently used applications, such as:
    Icon 416 for telephone module 138, labeled "Phone," which optionally includes an indicator 414 of the number of missed calls or voicemail messages;
    Icon 418 for e-mail client module 140, labeled "Mail," which optionally includes an indicator 410 of the number of unread e-mails;
    Icon 420 for browser module 147, labeled "Browser;" and
    Icon 422 for video and music player module 152, labeled "Music;" and
  Icons for other applications, such as:
    Icon 424 for IM module 141, labeled "Messages;"
    Icon 426 for calendar module 148, labeled "Calendar;"
    Icon 428 for image management module 144, labeled "Photos;"
    Icon 430 for camera module 143, labeled "Camera;"
    Icon 432 for online video module 155, labeled "Online Video;"
    Icon 434 for stocks widget 149-2, labeled "Stocks;"
    Icon 436 for map module 154, labeled "Maps;"
    Icon 438 for weather widget 149-1, labeled "Weather;"
    Icon 440 for alarm clock widget 149-4, labeled "Clock;"
    Icon 442 for workout support module 142, labeled "Workout Support;"
    Icon 444 for notes module 153, labeled "Notes;" and
    Icon 446 for a settings application or module, which provides access to settings for device 100 and its various applications 136.

It should be noted that the icon labels illustrated in FIG. 4A are merely examples. For example, other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
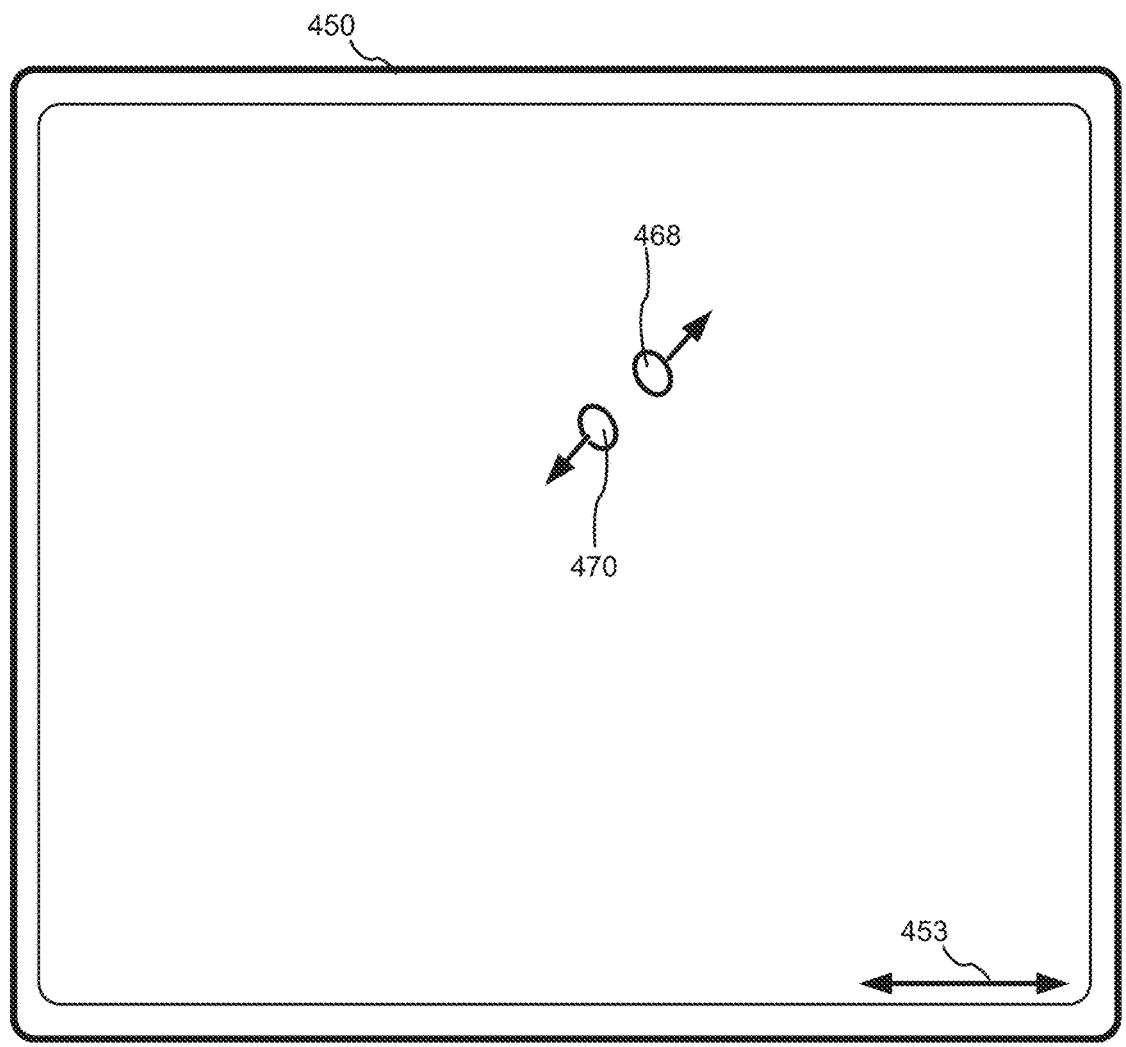
FIG. 4B illustrates an example user interface for a multifunction device with a touch-sensitive surface that is separate from the display in accordance with some embodiments.
Figure 4B:
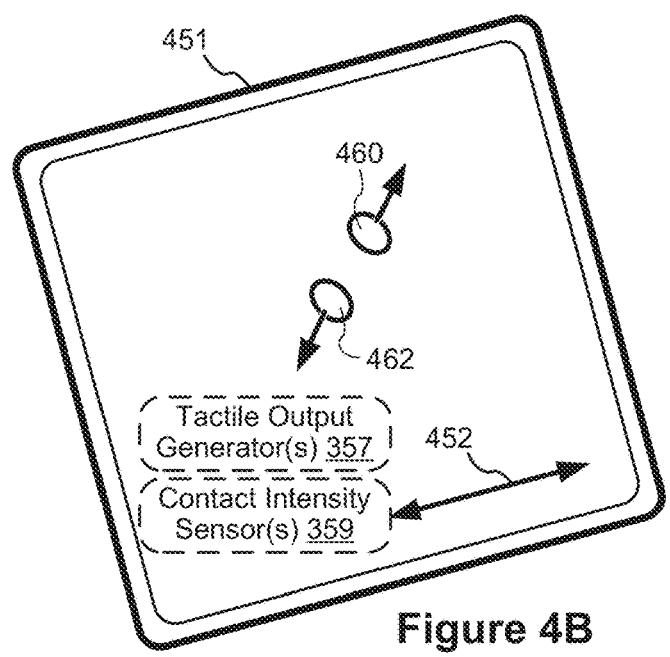

FIG. 4B illustrates an example user interface on a device (e.g., device 300, FIG. 3) with a touch-sensitive surface 451 (e.g., a tablet or touchpad 355, FIG. 3) that is separate from the display 450. Although many of the examples that follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures, etc.), it should be understood that, in some embodiments, one or more of the finger inputs are replaced with input from another input device (e.g., a mouse based input or a stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously. In some embodiments, a user uses a first input device to provide an input, and switches to a second input device to continue to provide the input. In some embodiments, changes in the user interface are smoothly varied across the transition from the first input device to the second input device to provide a more seamless user experience.

As used in the specification and claims, the term "intensity" of a contact on a touch-sensitive surface refers to the force or pressure (force per unit area) of a contact (e.g., a finger contact or a stylus contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average or a sum) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be readily accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch-screen display can be set to any of a large range of predefined thresholds values without changing the trackpad or touch-screen display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, a value produced by low-pass filtering the intensity of the contact over a predefined period or starting at a predefined time, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds may include a first intensity threshold and a second intensity threshold. In this example, a contact with a characteristic intensity that does not exceed the first intensity threshold results in a first operation, a contact with a characteristic intensity that exceeds the first intensity threshold and does not exceed the second intensity threshold results in a second operation, and a contact with a characteristic intensity that exceeds the second intensity threshold results in a third operation. In some embodiments, a comparison between the characteristic intensity and one or more intensity thresholds is used to determine whether or not to perform one or more operations (e.g., whether to perform a respective option or forgo performing the respective operation) rather than being used to determine whether to perform a first operation or a second operation.

In some embodiments, a portion of a gesture is identified for purposes of determining a characteristic intensity. For example, a touch-sensitive surface may receive a continuous swipe contact transitioning from a start location and reaching an end location (e.g., a drag gesture), at which point the intensity of the contact increases. In this example, the characteristic intensity of the contact at the end location may be based on only a portion of the continuous swipe contact, and not the entire swipe contact (e.g., only the portion of the swipe contact at the end location). In some embodiments, a smoothing algorithm may be applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The user interface figures described herein optionally include various intensity diagrams that show the current intensity of the contact on the touch-sensitive surface relative to one or more intensity thresholds (e.g., a contact detection intensity threshold $IT_0$, a light press intensity threshold $IT_L$, a deep press intensity threshold $IT_D$ (e.g., that is at least initially higher than $IT_L$), and/or one or more other intensity thresholds (e.g., an intensity threshold $IT_H$ that is lower than $IT_L$). This intensity diagram is typically not part of the displayed user interface, but is provided to aid in the interpretation of the figures. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold $IT_0$ below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

In some embodiments, the response of the device to inputs detected by the device depends on criteria based on the contact intensity during the input. For example, for some "light press" inputs, the intensity of a contact exceeding a first intensity threshold during the input triggers a first response. In some embodiments, the response of the device to inputs detected by the device depends on criteria that include both the contact intensity during the input and time-based criteria. For example, for some "deep press" inputs, the intensity of a contact exceeding a second intensity threshold during the input, greater than the first intensity threshold for a light press, triggers a second response only if a delay time has elapsed between meeting the first intensity threshold and meeting the second intensity threshold. This delay time is typically less than 200 ms (milliseconds) in duration (e.g., 40, 100, or 120 ms, depending on the magnitude of the second intensity threshold, with the delay time increasing as the second intensity threshold increases). This delay time helps to avoid accidental recognition of deep press inputs. As another example, for some "deep press" inputs, there is a reduced-sensitivity time period that occurs after the time at which the first intensity threshold is met. During the reduced-sensitivity time period, the second intensity threshold is increased. This temporary increase in the second intensity threshold also helps to avoid accidental deep press inputs. For other deep press inputs, the response to detection of a deep press input does not depend on time-based criteria.

In some embodiments, one or more of the input intensity thresholds and/or the corresponding outputs vary based on one or more factors, such as user settings, contact motion, input timing, application running, rate at which the intensity is applied, number of concurrent inputs, user history, environmental factors (e.g., ambient noise), focus selector position, and the like. Example factors are described in U.S. patent application Ser. Nos. 14/399,606 and 14/624,296, which are incorporated by reference herein in their entireties.

Figure 4C:
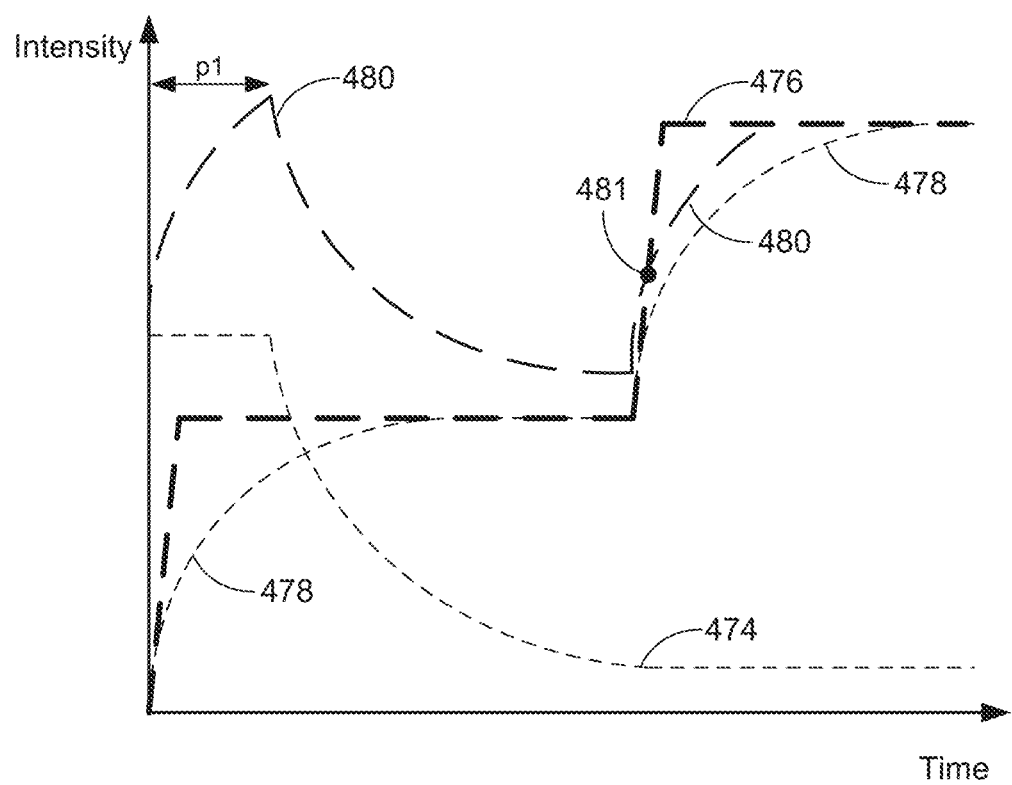
FIGS. 4C-4E illustrate examples of dynamic intensity thresholds in accordance with some embodiments.

For example, FIG. 4C illustrates a dynamic intensity threshold 480 that changes over time based in part on the intensity of touch input 476 over time. Dynamic intensity threshold 480 is a sum of two components, first component 474 that decays over time after a predefined delay time p1 from when touch input 476 is initially detected, and second component 478 that trails the intensity of touch input 476 over time. The initial high intensity threshold of first component 474 reduces accidental triggering of a "deep press" response, while still allowing an immediate "deep press" response if touch input 476 provides sufficient intensity. Second component 478 reduces unintentional triggering of a "deep press" response by gradual intensity fluctuations of in a touch input. In some embodiments, when touch input 476 satisfies dynamic intensity threshold 480 (e.g., at point 481 in FIG. 4C), the "deep press" response is triggered.

Figure 4D:
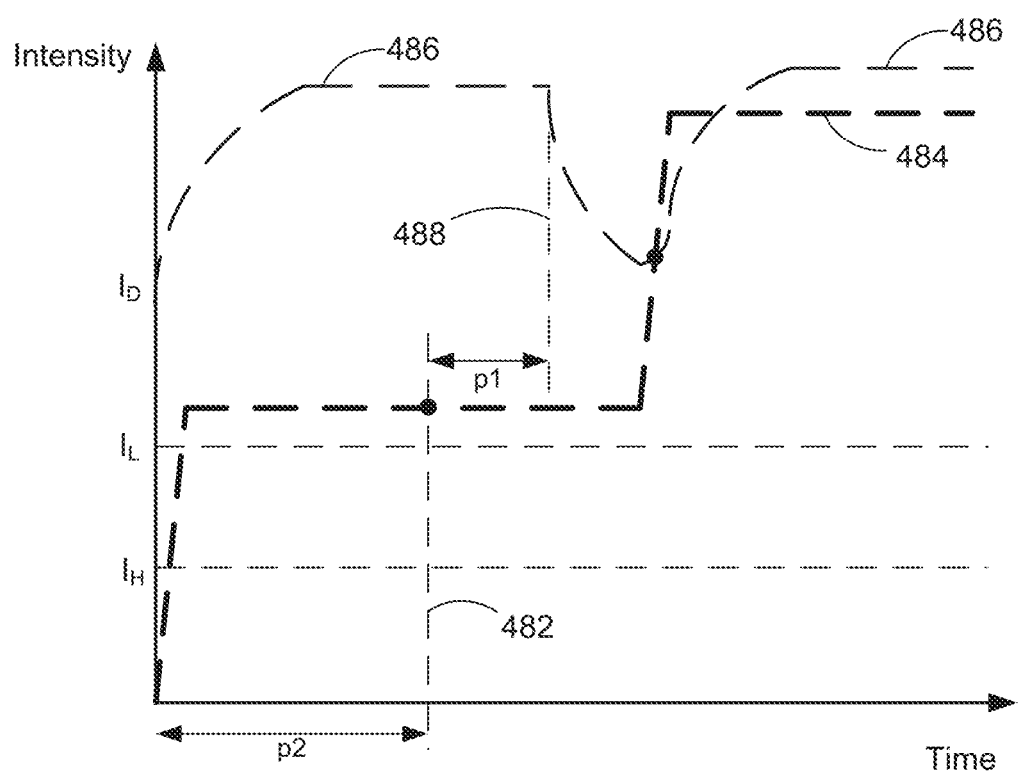

FIG. 4D illustrates another dynamic intensity threshold 486 (e.g., intensity threshold $I_D$). FIG. 4D also illustrates two other intensity thresholds: a first intensity threshold $I_H$ and a second intensity threshold $I_L$. In FIG. 4D, although touch input 484 satisfies the first intensity threshold $I_H$ and the second intensity threshold $I_L$ prior to time p2, no response is provided until delay time p2 has elapsed at time 482. Also in FIG. 4D, dynamic intensity threshold 486 decays over time, with the decay starting at time 488 after a predefined delay time p1 has elapsed from time 482 (when the response associated with the second intensity threshold $I_L$ was triggered). This type of dynamic intensity threshold reduces accidental triggering of a response associated with the dynamic intensity threshold $I_D$ immediately after, or concurrently with, triggering a response associated with a lower intensity threshold, such as the first intensity threshold $I_H$ or the second intensity threshold $I_L$.

Figure 4E:
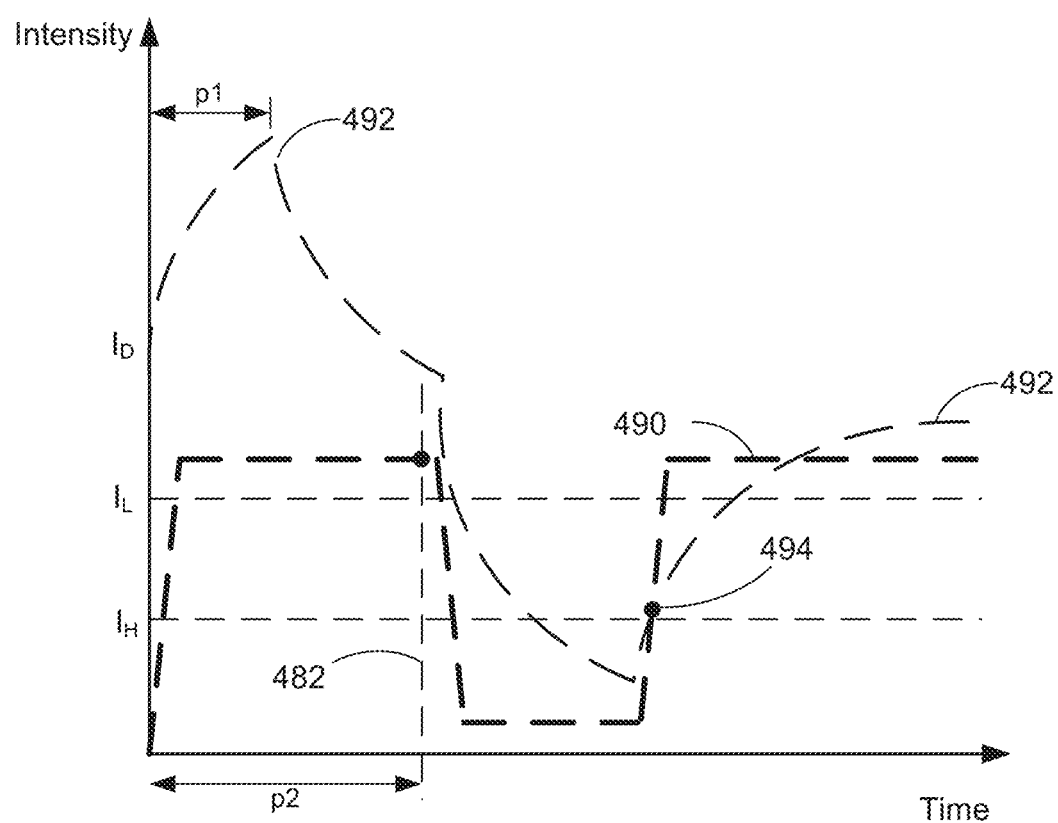

FIG. 4E illustrate yet another dynamic intensity threshold 492 (e.g., intensity threshold $I_D$). In FIG. 4E, a response associated with the intensity threshold $I_L$ is triggered after the delay time p2 has elapsed from when touch input 490 is initially detected. Concurrently, dynamic intensity threshold 492 decays after the predefined delay time p1 has elapsed from when touch input 490 is initially detected. So a decrease in intensity of touch input 490 after triggering the response associated with the intensity threshold $I_L$, followed by an increase in the intensity of touch input 490, without releasing touch input 490, can trigger a response associated with the intensity threshold $I_D$ (e.g., at time 494) even when the intensity of touch input 490 is below another intensity threshold, for example, the intensity threshold $I_L$.

An increase of characteristic intensity of the contact from an intensity below the light press intensity threshold $IT_L$ to an intensity between the light press intensity threshold $IT_L$ and the deep press intensity threshold $IT_D$ is sometimes referred to as a "light press" input. An increase of characteristic intensity of the contact from an intensity below the deep press intensity threshold $IT_D$ to an intensity above the deep press intensity threshold $IT_D$ is sometimes referred to as a "deep press" input. An increase of characteristic intensity of the contact from an intensity below the contact-detection intensity threshold $IT_0$ to an intensity between the contact-detection intensity threshold $IT_0$ and the light press intensity threshold $IT_L$ is sometimes referred to as detecting the contact on the touch-surface. A decrease of characteristic intensity of the contact from an intensity above the contact-detection intensity threshold $IT_0$ to an intensity below the contact-detection intensity threshold $IT_0$ is sometimes referred to as detecting liftoff of the contact from the touch-surface. In some embodiments $IT_0$ is zero. In some embodiments, $IT_0$ is greater than zero. In some illustrations a shaded circle or oval is used to represent intensity of a contact on the touch-sensitive surface. In some illustrations, a circle or oval without shading is used represent a respective contact on the touch-sensitive surface without specifying the intensity of the respective contact.

In some embodiments, described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., the respective operation is performed on a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., the respective operation is performed on an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., the respective operation is performed on an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the description of operations performed in response to a press input associated with a press-input intensity threshold or in response to a gesture including the press input are, optionally, triggered in response to detecting: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold. As described above, in some embodiments, the triggering of these responses also depends on time-based criteria being met (e.g., a delay time has elapsed between a first intensity threshold being met and a second intensity threshold being met).

User Interfaces and Associated Processes

Attention is now directed towards embodiments of user interfaces ("UI") and associated processes that may be implemented on an electronic device, such as portable multifunction device 100 or device 300, with a display, a touch-sensitive surface, (optionally) one or more tactile output generators for generating tactile outputs, and (optionally) one or more sensors to detect intensities of contacts with the touch-sensitive surface.

Figure 5A:
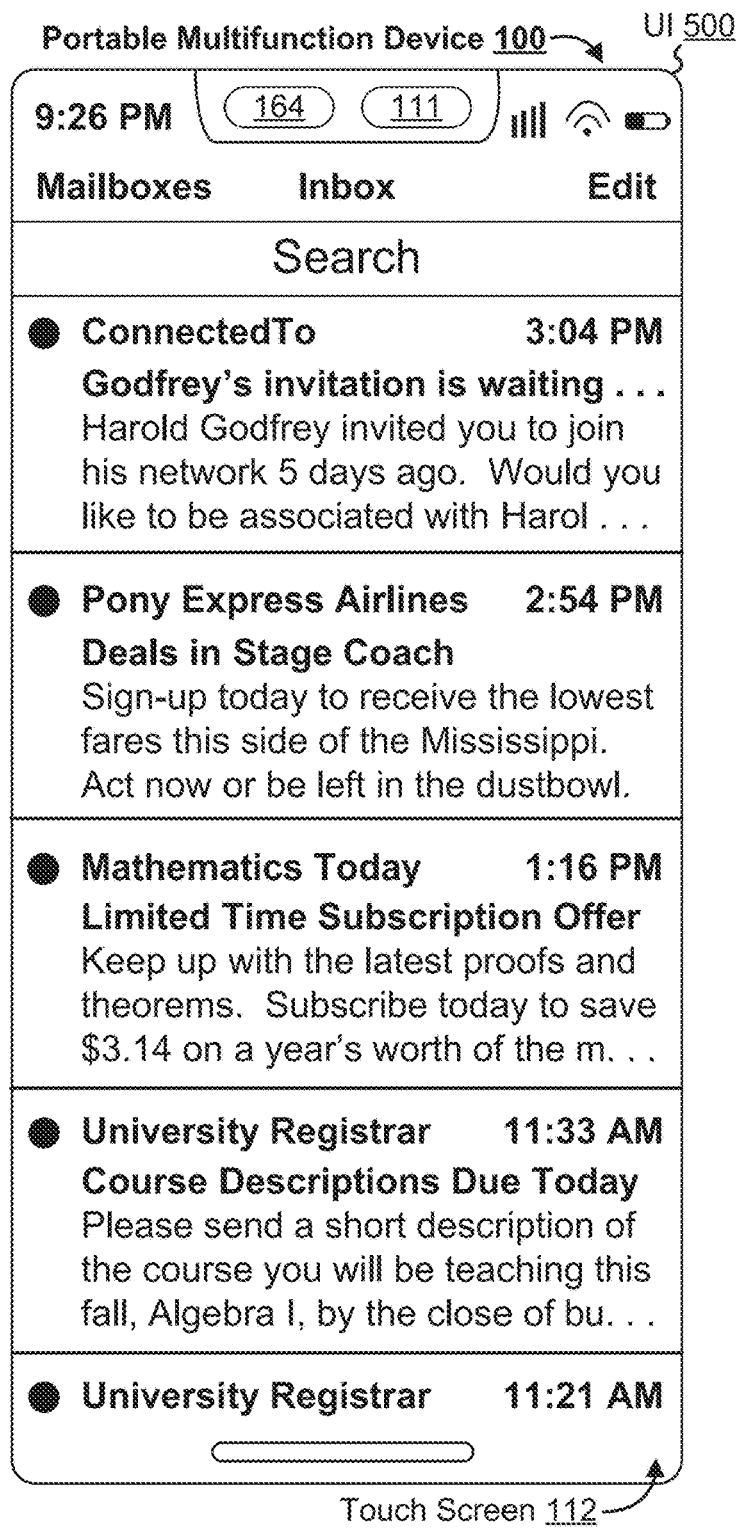
FIGS. 5A-5BA illustrate example user interfaces for providing seamless user interface transitions in response to detected user inputs in accordance with some embodiments.
Figure 5B:
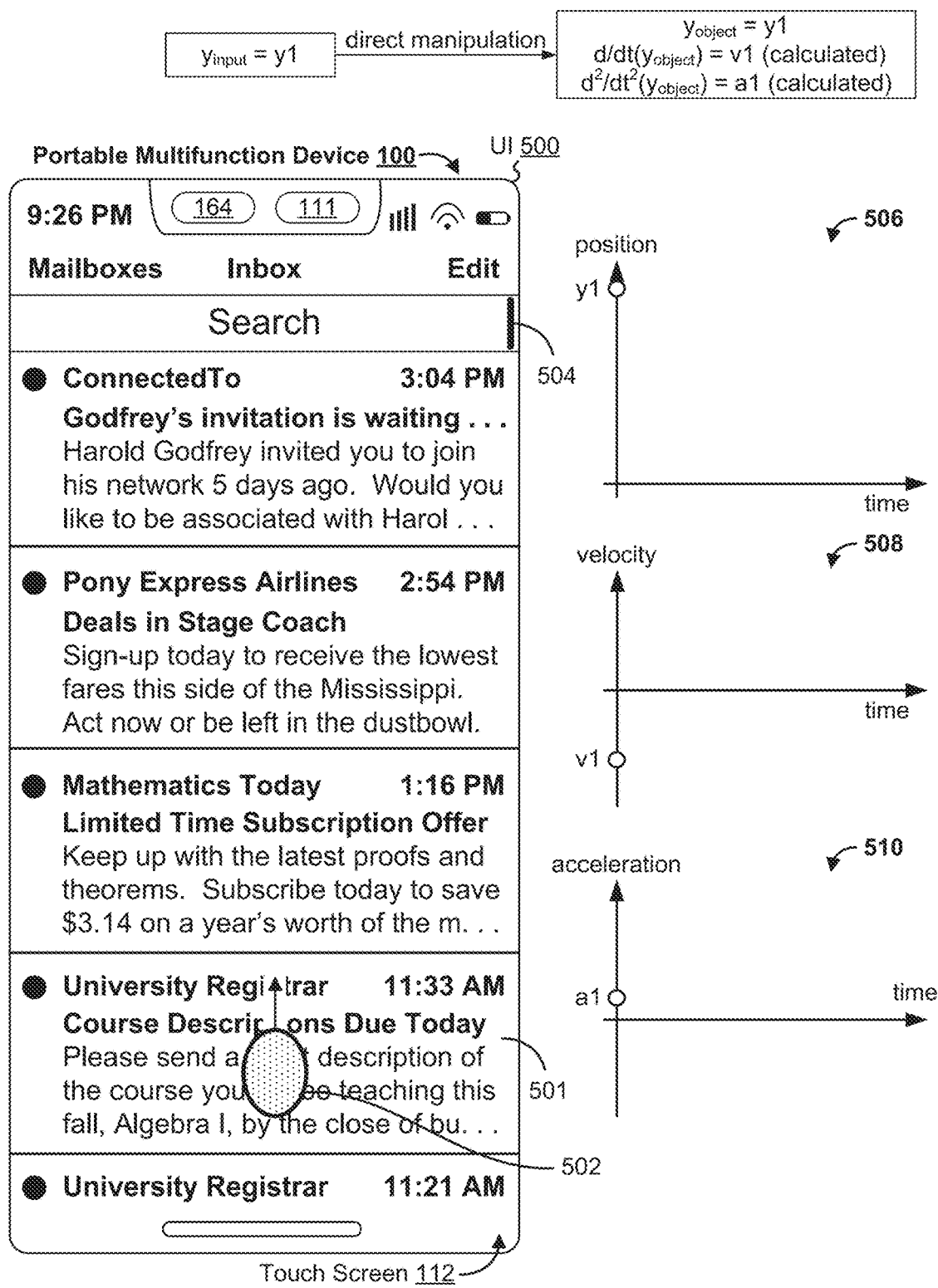

FIGS. 5A-5BA illustrate example user interfaces for providing seamless user interface transitions, including transitions between operations performed in the user interface, in accordance with some embodiments. The user interfaces in these figures are used to illustrate the processes described below, including the processes in FIGS. 6A-6F, 7A-7C, and 8A-8D. For convenience of explanation, some of the embodiments will be discussed with reference to operations performed on a device with a touch-sensitive display system 112. In such embodiments, the focus selector is, optionally: a respective finger or stylus contact, a representative point corresponding to a finger or stylus contact (e.g., a centroid of a respective contact or a point associated with a respective contact), or a centroid of two or more contacts detected on the touch-sensitive display system 112. However, analogous operations are, optionally, performed on a device with a display 450 and a separate touch-sensitive surface 451 in response to detecting the contacts on the touch-sensitive surface 451 while displaying the user interfaces shown in the figures on the display 450, along with a focus selector.

Figure 5C:
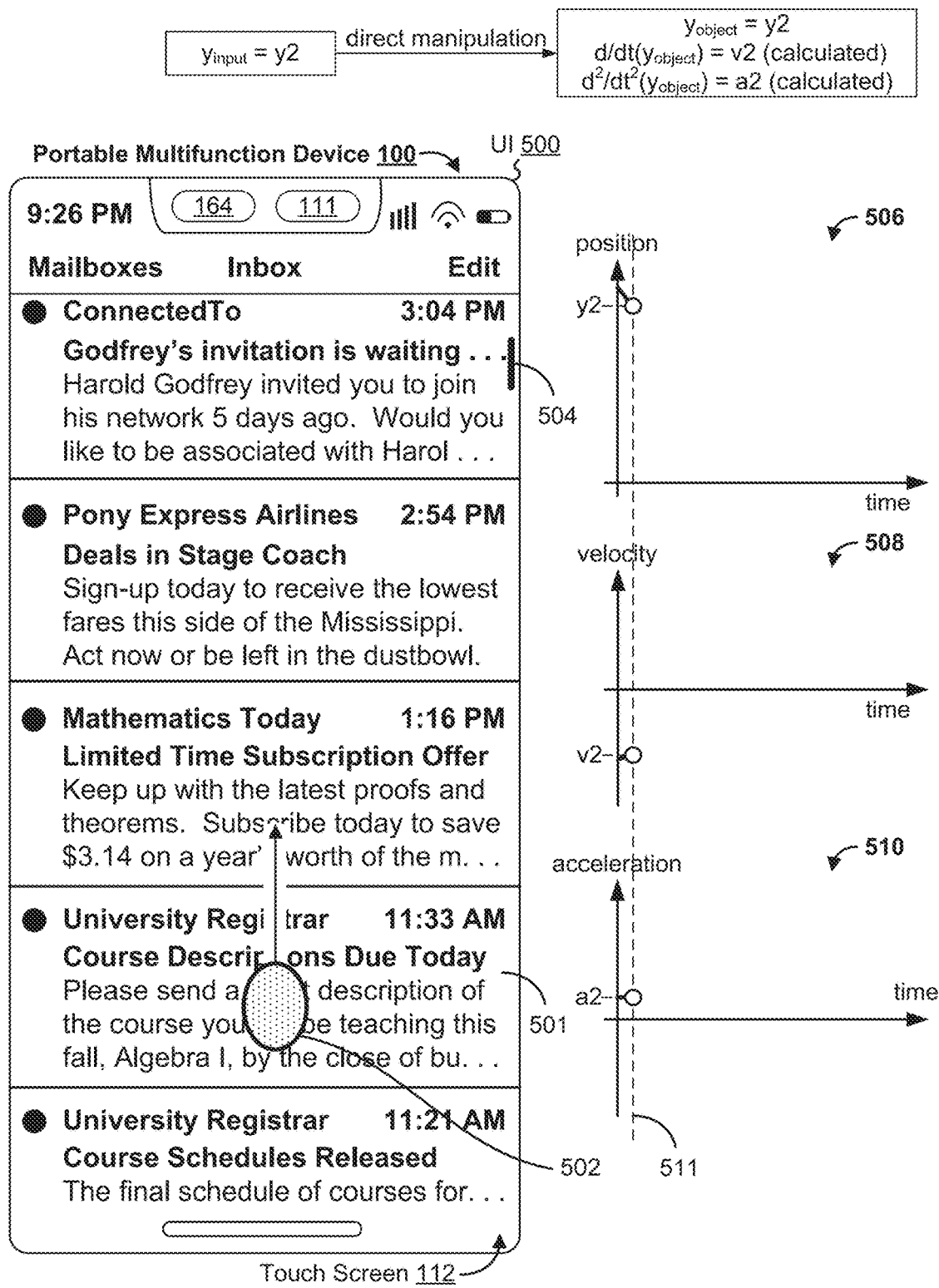
Figure 5D:
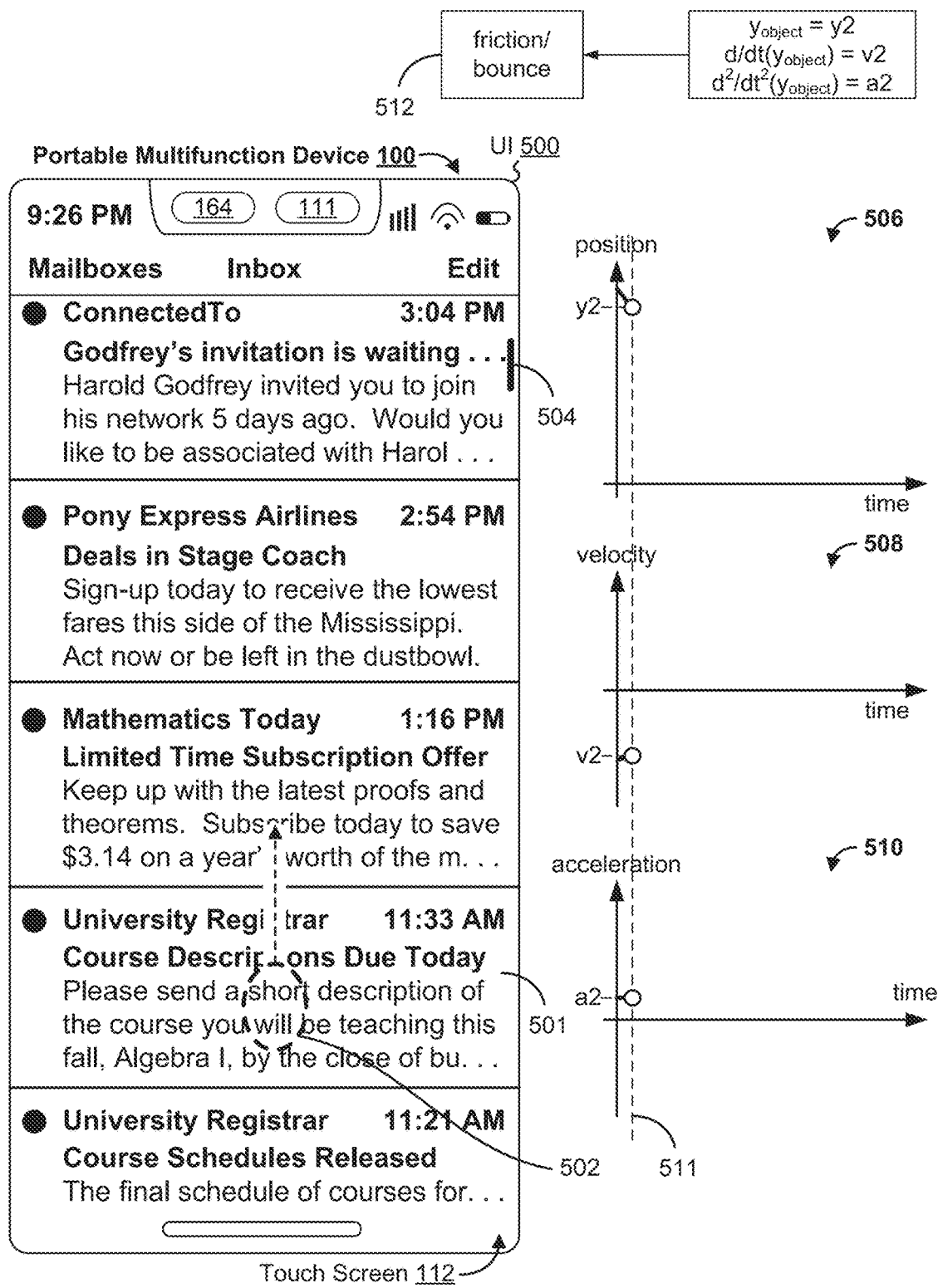
Figure 5E:
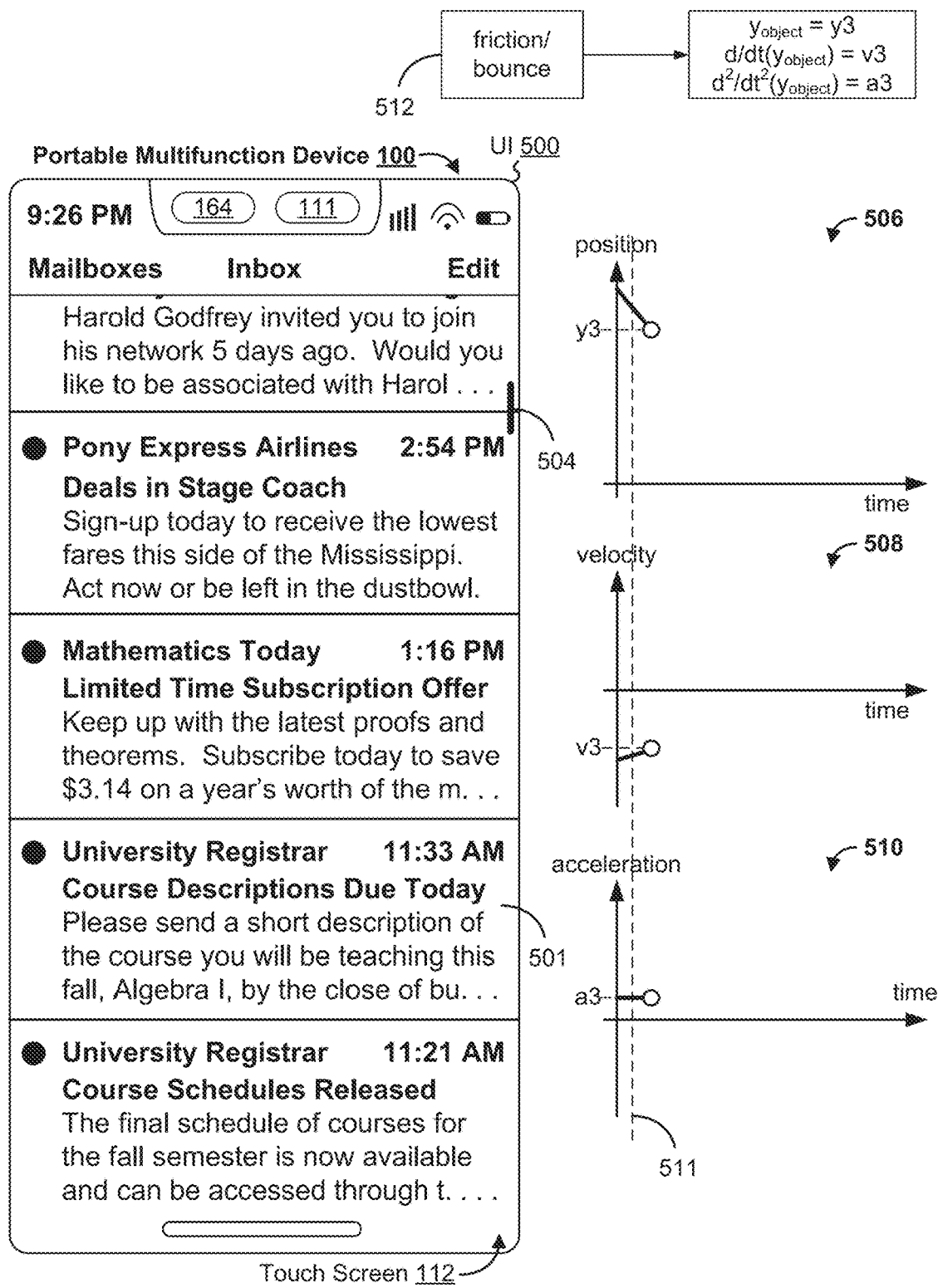
Figure 5F:
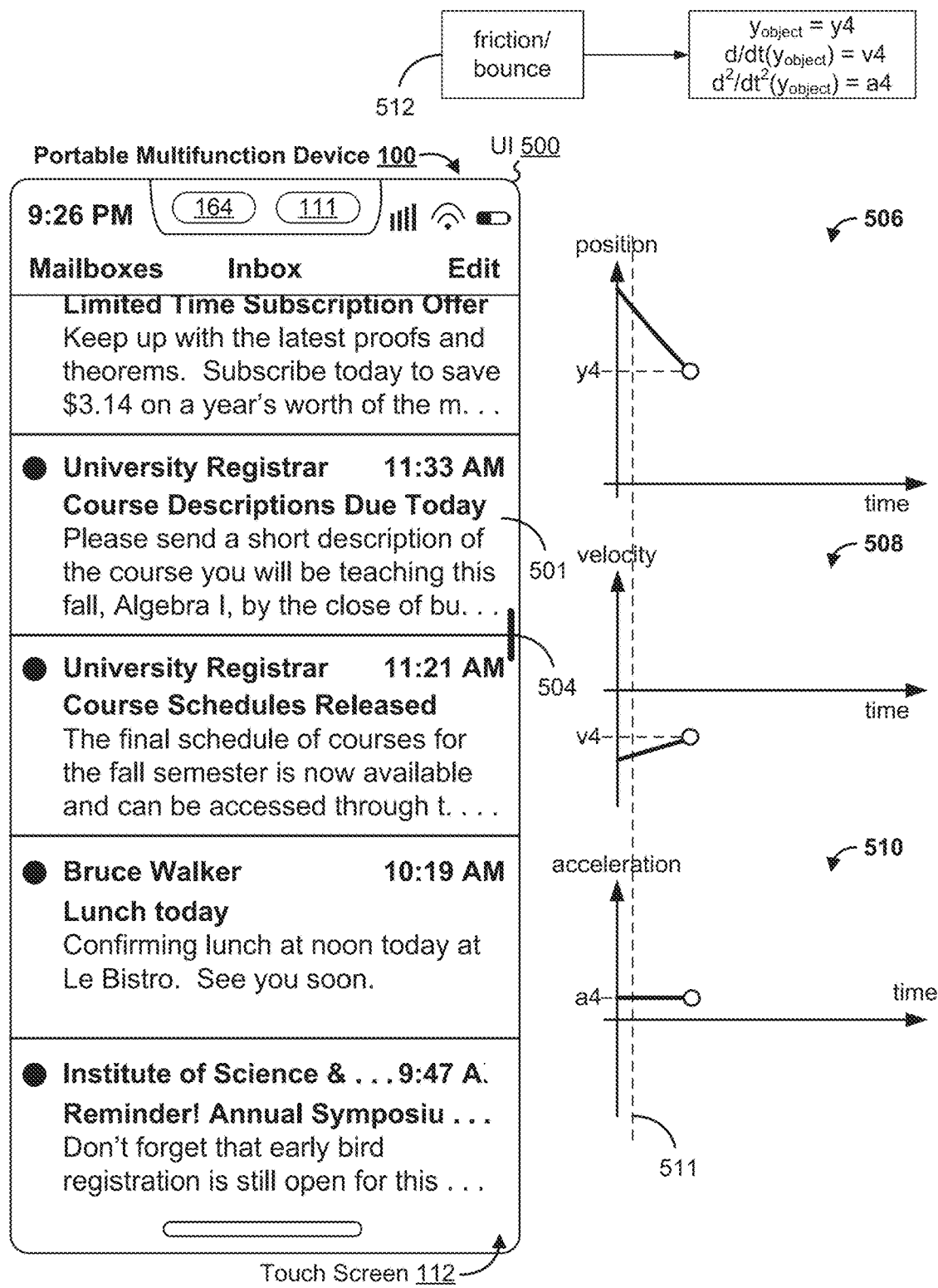
Figure 5G:
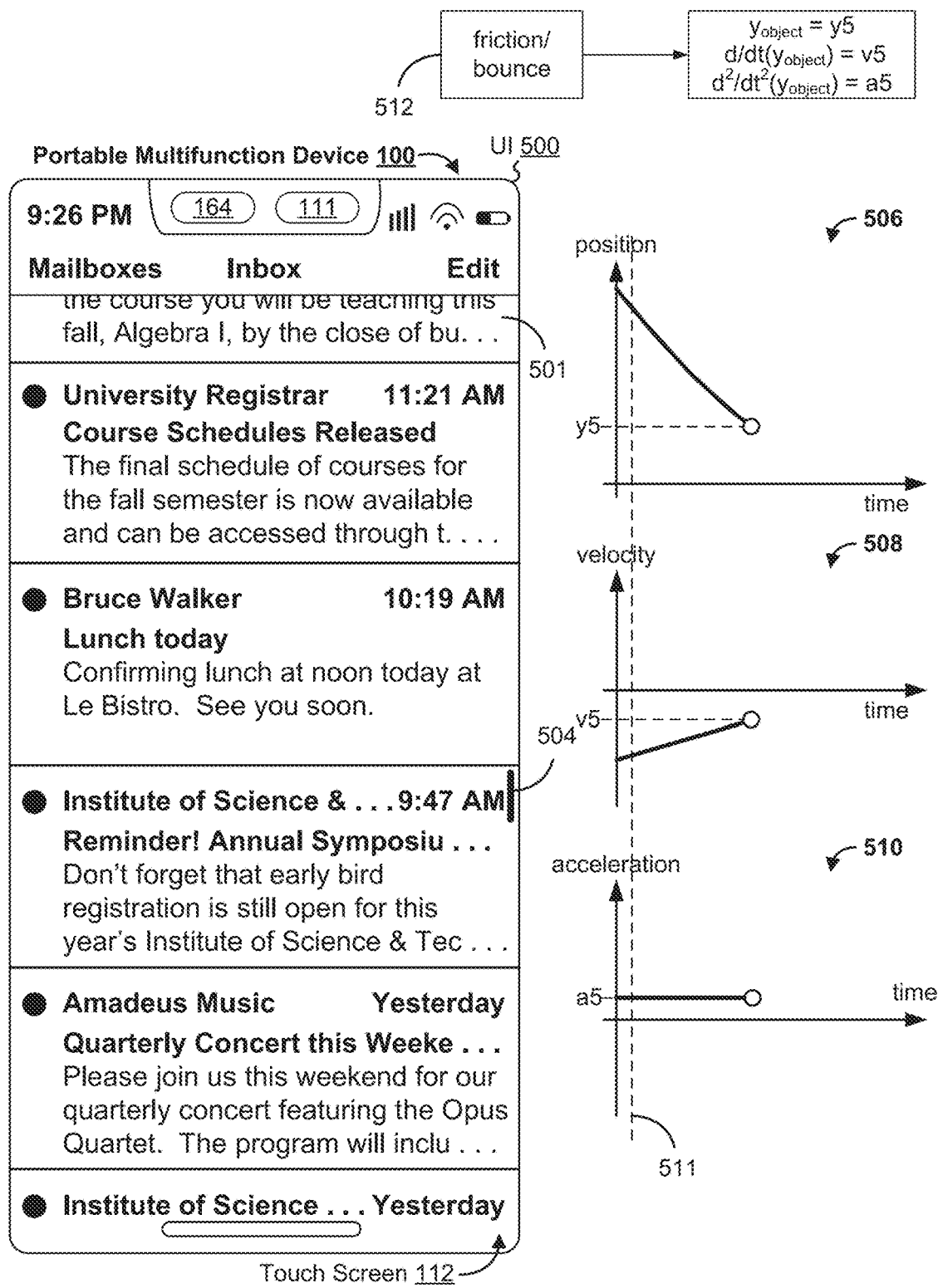
Figure 5H:
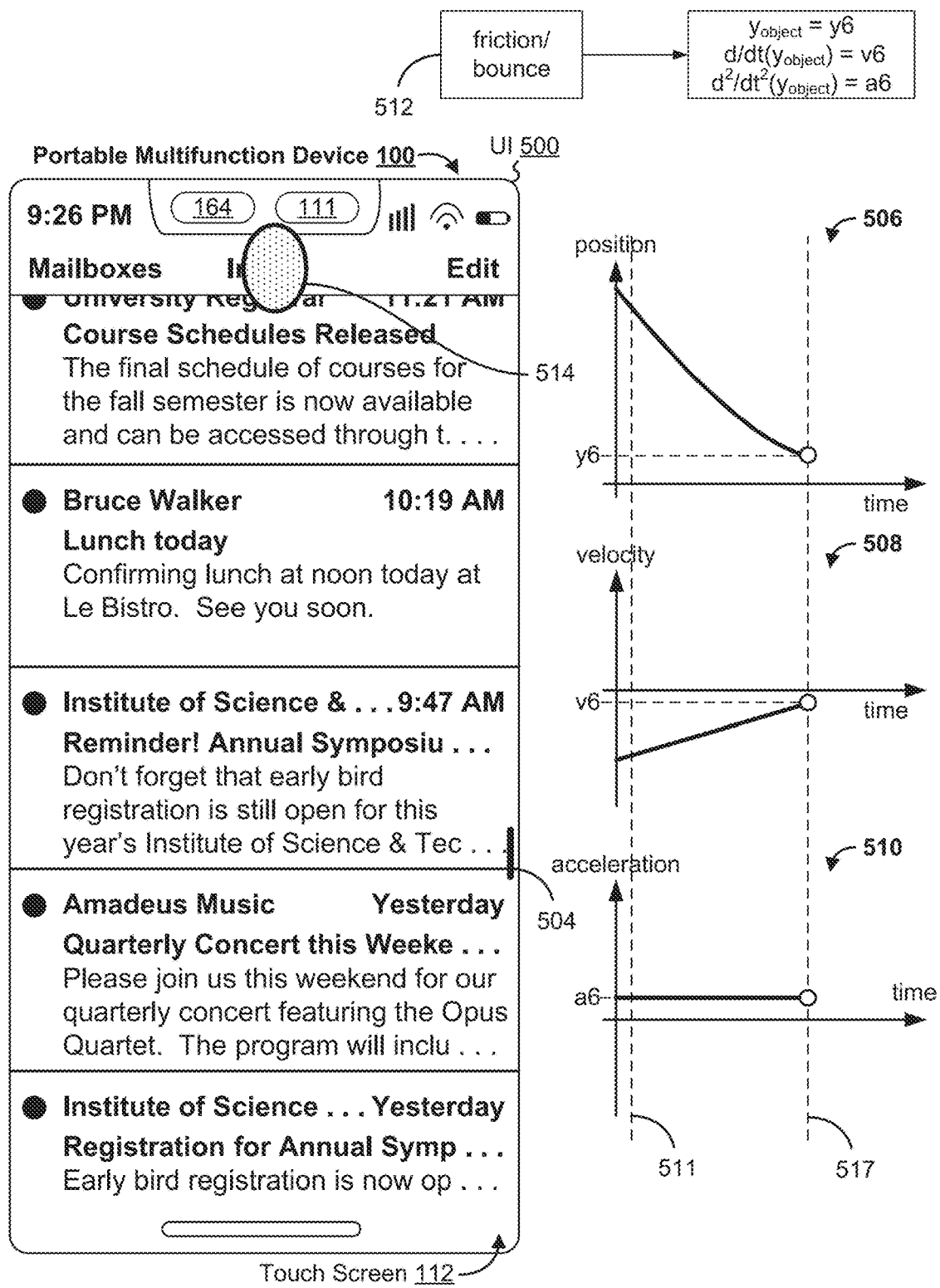
Figure 5I:
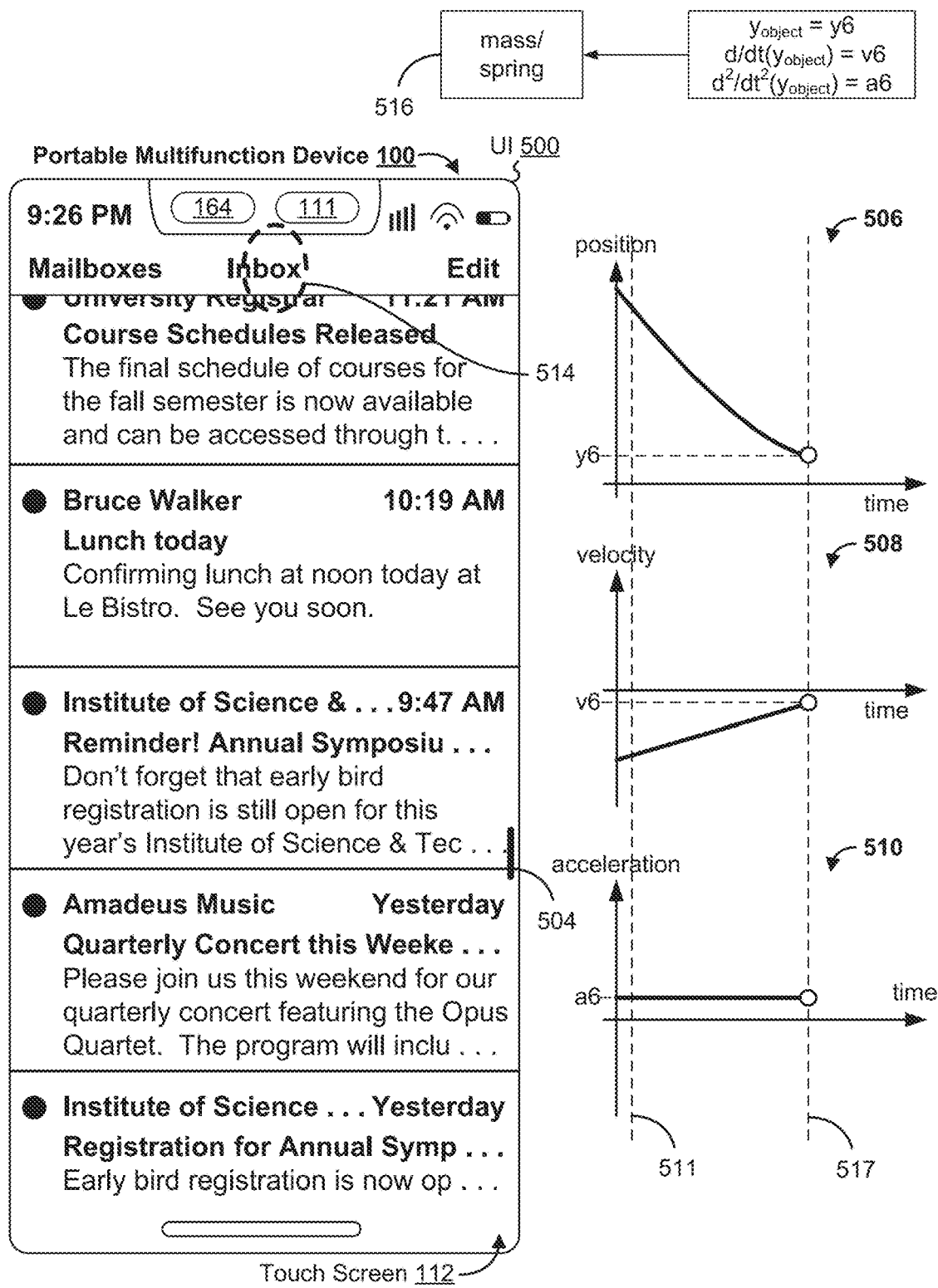
Figure 5J:
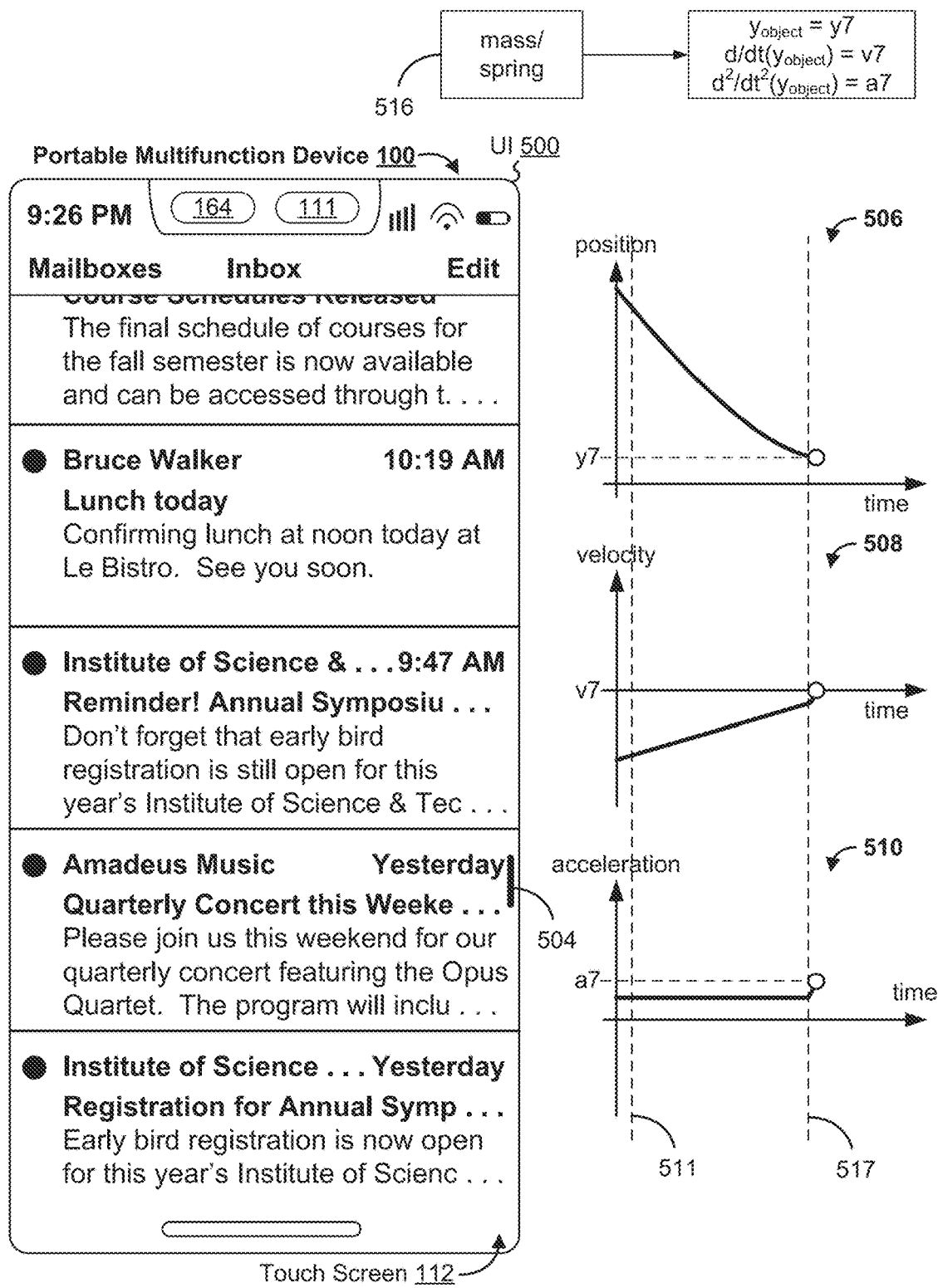
Figure 5K:
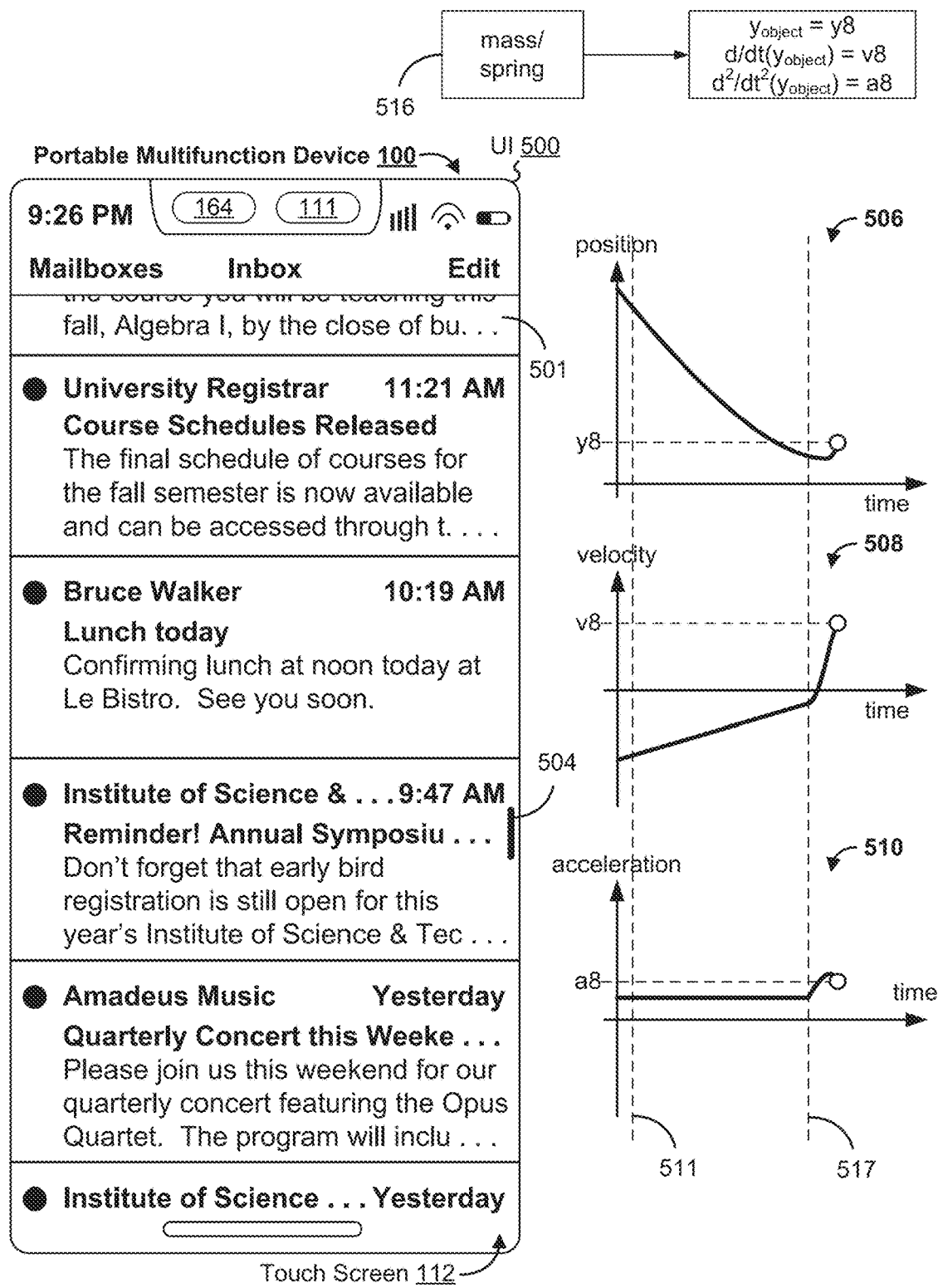
Figure 5L:
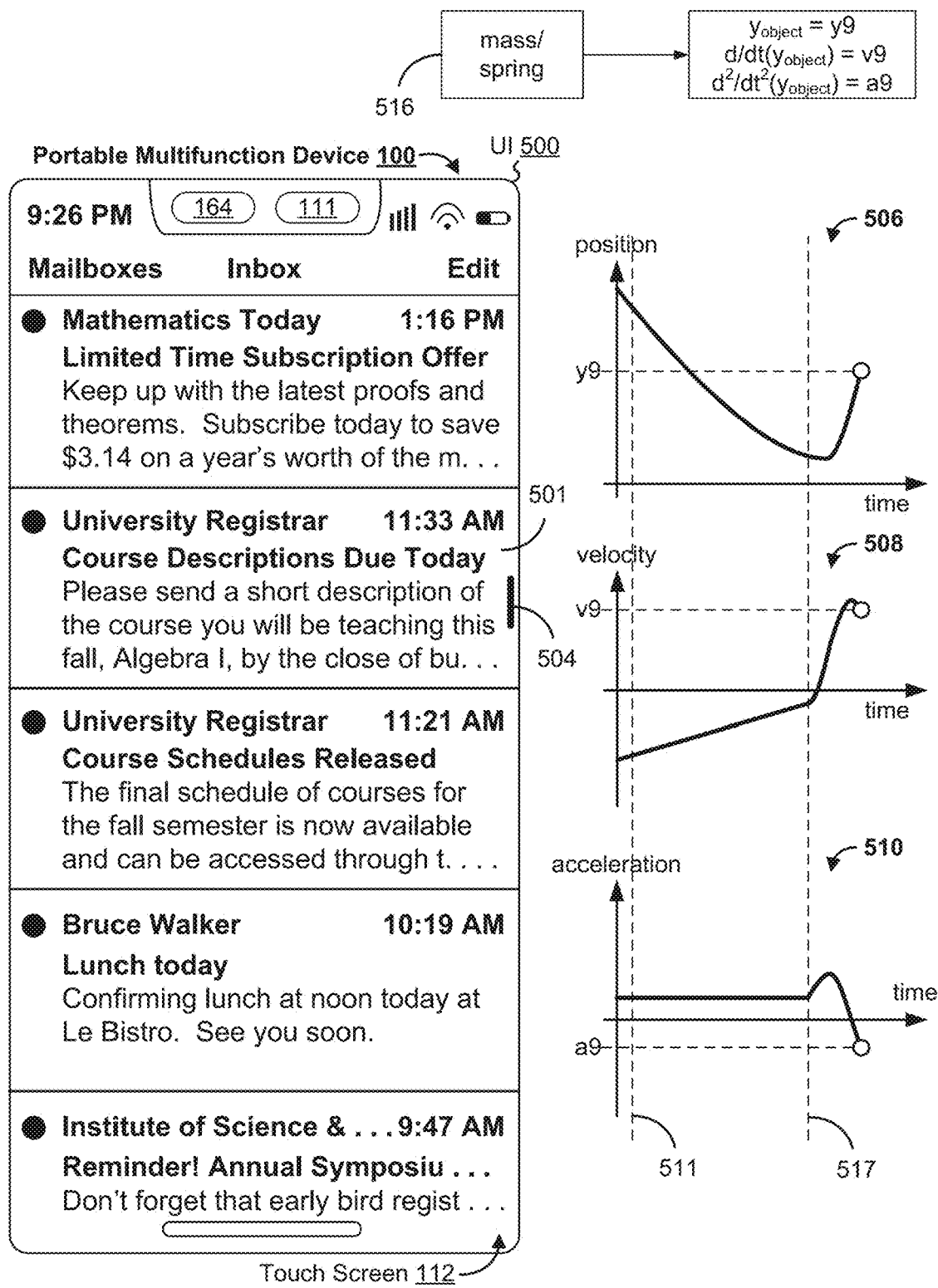
Figure 5M:
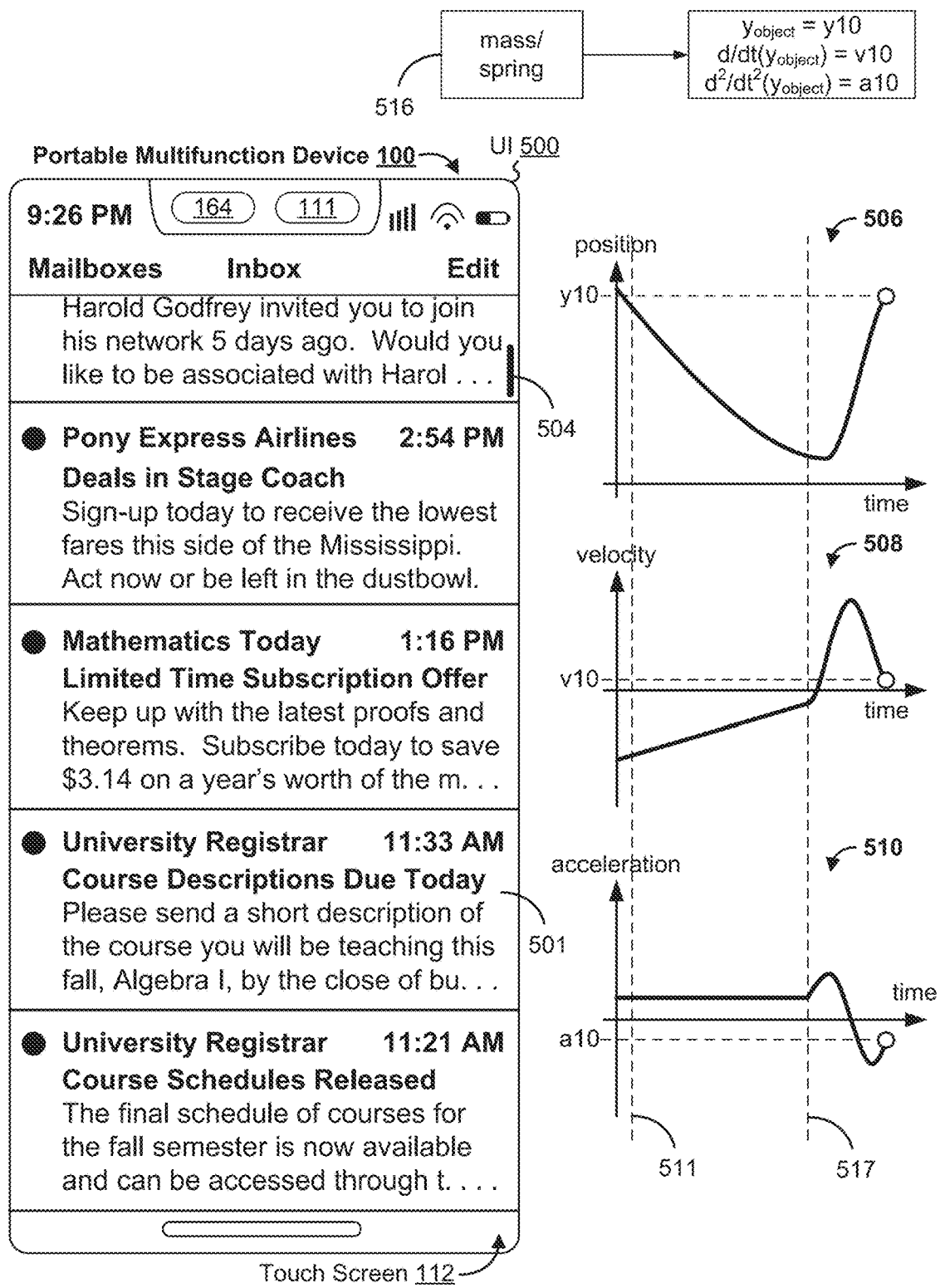
Figure 5N:
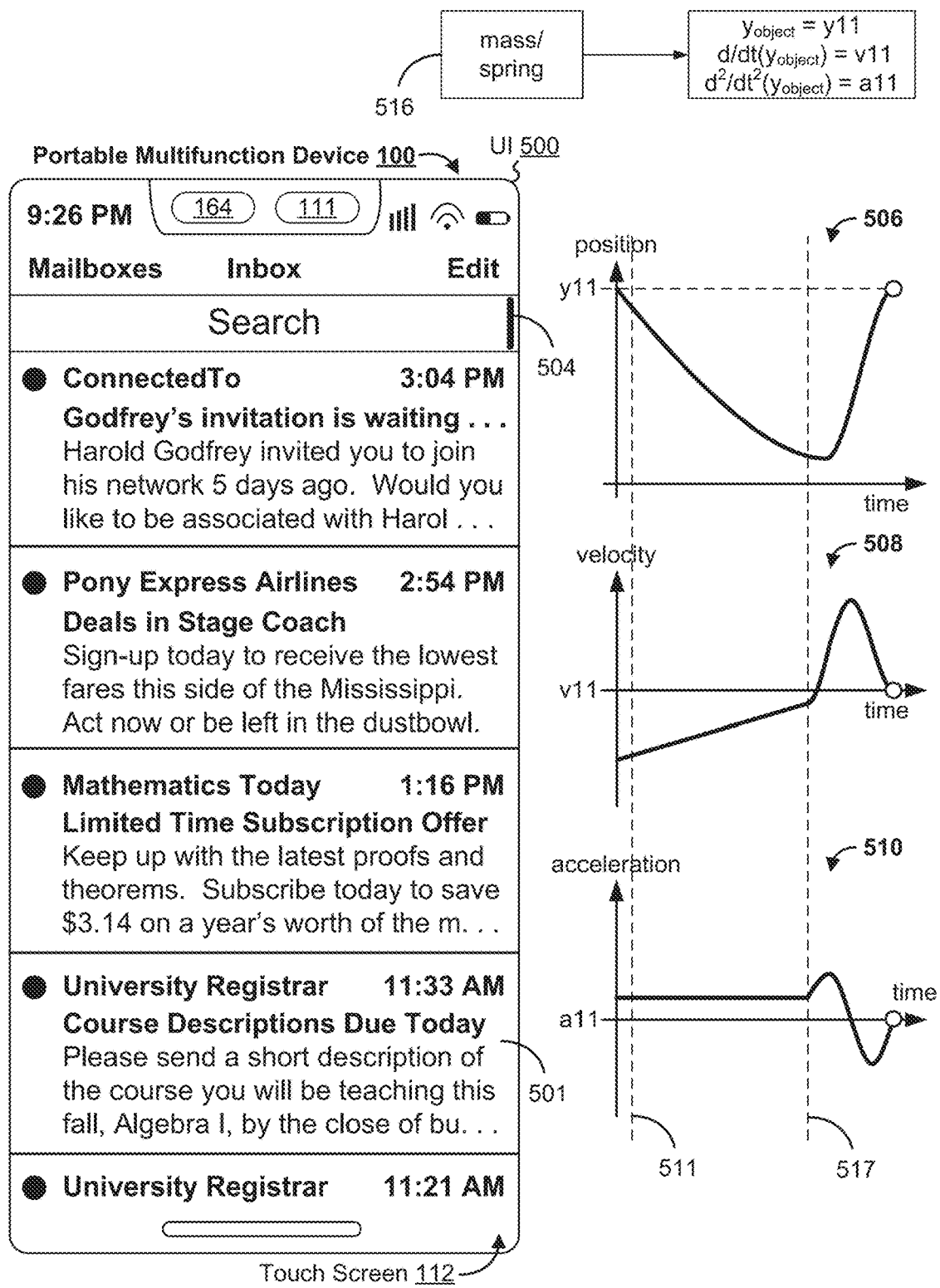

FIGS. 5A-5N illustrate example user interfaces for providing seamless user interface transitions in response to detected user inputs. FIG. 5A illustrates user interface 500 of a mail application (e.g., e-mail client module 140, FIG. 1A). User interface 500 includes a scrollable e-mail list that includes a plurality of e-mails, including e-mail 501.

FIGS. 5B-5N illustrate changes to user interface 500 in response to detecting user inputs and changes in the user inputs. FIGS. 5B-5N include position graph 506 that shows the position (an output property) of the currently displayed portion of the e-mail list with respect to time. FIGS. 5B-5N also include velocity graph 508 that shows the current velocity of the e-mail list (e.g., a scrolling speed) over time. In addition, FIGS. 5B-5N include acceleration graph 510 that shows the current acceleration of the e-mail list (e.g., a rate of change in the scrolling speed) over time.

FIG. 5B illustrates contact 502 detected at a location corresponding to the e-mail list (e.g., a location corresponding to e-mail 501 in the e-mail list). In FIG. 5B, the displayed portion of the e-mail list is the topmost portion of the e-mail list, corresponding to a position within the e-mail list as shown in position graph 506. Accordingly, scroll thumb 504 is displayed at the topmost position in the scroll bar region. The initial velocity of the e-mail list is negative, as shown in velocity graph 508, corresponding to downward scrolling. The initial acceleration of the e-mail list is as shown in acceleration graph 510. While contact 502 is detected, the (vertical) position of the e-mail list, y, is modified directly in accordance with changes in the vertical position of contact 502 (e.g., via direct manipulation by contact 502). In some embodiments, the y-position of e-mail list, $y_{object}$, corresponds to the y-position of contact 502, $y_{input}$. Optionally, the velocity of the e-mail list, dy/dt, is modified directly in accordance with changes in the vertical velocity of contact 502 (e.g., the velocity of the e-mail list is set to match the vertical velocity of contact 502). Alternatively, the velocity v1 of the e-mail list is calculated from the values representing the position of the e-mail list over time, rather than directly matching the measured velocity of contact 502. In some embodiments, the acceleration of the e-mail list, $d^2y/dt^2$, is modified directly in accordance with changes in the acceleration of contact 502 (e.g., the acceleration of the e-mail list is set to match the vertical acceleration of contact 502). Alternatively, the acceleration a1 of the e-mail list is calculated from the values representing the position and/or velocity of the e-mail list over time, rather than directly matching the vertical acceleration of contact 502.

FIG. 5C illustrates movement of contact 502 in an upward direction from its position as shown in FIG. 5B. In accordance with the change in position of contact 502, the position of the e-mail list is changed by a corresponding amount (e.g., contact 502 maintains the same relative position with respect to e-mail 501) from y1 to y2. In accordance with the change in position of the e-mail list, the velocity of the e-mail list is calculated as v2, and the acceleration of the e-mail list is calculated as a2.

FIG. 5D illustrates liftoff of contact 502 while contact 502 is moving across the touch-sensitive surface at a non-zero velocity (e.g., a flick gesture). In response to detecting liftoff of contact 502, the device ceases to modify the position (and optionally the velocity and/or acceleration) of the e-mail list via direct manipulation and begins to modify the position (and optionally the velocity and/or acceleration) of the e-mail list using friction/bounce model 512 (also called herein a friction/inertia behavior model). At the time of liftoff, the device begins to modify the position, velocity, and acceleration of the e-mail list using friction/bounce model 512 based on the last-determined values of the position y2, velocity v2, and acceleration a2 of the e-mail list that were determined based on the direct manipulation by contact 502 immediately prior to liftoff. Thus, the position, velocity, and acceleration of the e-mail list are continuous across the transition, represented by boundary 511, from modification of the values in accordance with direct manipulation by contact 502 to modification of the values using friction/bounce model 512 after liftoff of contact 502. In some cases, updating the user interface to directly match changes in a user input presents sudden, drastic changes to the user interface when the user input changes significantly (e.g., upon liftoff of contact 502). Transferring values of output properties between behavior models when changing behavior models in response to a change in the user input allows gradual and smooth updates to the user interface (e.g., without sudden, drastic changes to the user interface) while exhibiting physically intuitive behaviors.

FIGS. 5E-5G illustrate continued movement of the e-mail list in accordance with modification of the position (y), velocity (dy/dt), and acceleration ($d^2y/dt^2$) of the e-mail list using friction/bounce model 512 (e.g., while no contact is detected on user interface 500). Friction/bounce model 512 modifies the position, velocity, and acceleration of the e-mail list so as to simulate movement of the e-mail list as if the e-mail list were a mass subject to friction (e.g., moving along a surface with a non-zero coefficient of friction). Acceleration graph 510 shows that the acceleration of the e-mail list remains constant in the direction (upward, with positive acceleration) opposite the direction of movement of the e-mail list (scrolling downward, with negative velocity) at values of a3, a4, and a5 (e.g., all equal to a2). Velocity graph 508 shows that the (negative) velocity of the e-mail list increases linearly to v3, v4, then v5 in accordance with the constant opposing (positive) acceleration. Position graph 506 shows that the position of the e-mail list decreases parabolically to y3, y4, then y5 in accordance with the linearly increasing negative velocity.

FIGS. 5H-5I illustrates subsequent contact 514 (FIG. 5H) detected at a location corresponding to the menu bar of user interface 500 and liftoff of contact 514 (FIG. 5I). In the example shown in FIGS. 5H-5I, contact 514 is part of a tap gesture, and corresponds to a request to scroll to the top of the e-mail list. In response to detecting the tap gesture, upon liftoff of contact 514, the device ceases to modify the position, velocity, and acceleration of the e-mail list using friction/bounce model 512, as shown in FIG. 5H, and begins to modify the position, velocity, and acceleration of the e-mail list using mass/spring model 516, as shown in FIG. 5I. At the time of liftoff of contact 514, the device begins modifying the position, velocity, and acceleration of the e-mail list using mass/spring model 516 based on the last-determined values of the position y6, velocity v6, and acceleration a6 of the e-mail list that were determined using friction/bounce model 512 immediately prior to liftoff. Thus, the position, velocity, and acceleration of the e-mail list are continuous across the transition, represented by boundary 517, from modification of the values using friction/bounce model 512 prior to detecting contact 514 to modification of the values using mass/spring model 516 upon detecting contact 514. As explained above with reference to FIG. 5D, in some cases, updating the user interface to directly match changes in a user input presents sudden, drastic changes to the user interface (e.g., a sudden reversal in the direction of movement of the e-mail list) when the user input changes significantly (e.g., upon touch down of subsequent contact 514). Transferring values of output properties between behavior models when changing behavior models in response to a change in the user input allows gradual and smooth updates to the user interface (e.g., without sudden, drastic changes to the user interface) while the user interface remains responsive to changes in the user input, and while exhibiting physically intuitive behaviors.

FIGS. 5J-5N illustrate continued movement of the e-mail list in response to the request to scroll to the top of the e-mail list, and in accordance with modification of the position ($y_{object}$), velocity (d/dt($y_{object}$)), and acceleration ($d^2/dt^2$ ($y_{object}$)) of the e-mail list using mass/spring model 516 (e.g., while no contact is detected in user interface 500). Mass/spring model 516 modifies the position, velocity, and acceleration of the e-mail list so as to simulate movement of the e-mail list as if the e-mail list were a mass coupled with a spring and subject to a damping force. The equilibrium position of the mass-spring system, where the e-mail list would be at rest without any external applied force, corresponds to the topmost position of the e-mail list, as shown in FIG. 5B. At boundary 517 in FIG. 5I, the position of the e-mail list is the position shown in position graph 506, and the e-mail list is subject to an upward (positive) restoring force that is opposite of and proportional to the displacement of the e-mail list from its equilibrium position (e.g., displacement is negative, because the position of e-mail list in FIG. 5I is lower than its equilibrium position) and a damping force such that the position of e-mail list returns to its equilibrium position without oscillating and without overshoot. In this example, the restoring force exerted on the e-mail list by mass/spring model 516 is greater than the force of friction exerted on the e-mail list by friction/bounce model 512. Thus, in FIG. 5J, acceleration graph 510 shows that the acceleration of the e-mail list increases from its value a6 at boundary 517 to a7. In accordance with the increase in acceleration, the velocity of the e-mail list, as shown in velocity graph 508, increases from its negative value v6 at boundary 517 to v7. However, because the velocity of the e-mail list at boundary 517 is negative (FIG. 5I), the e-mail list has downward momentum when contact 514 is lifted off (FIG. 5I). Thus, in FIG. 5J, position graph 506 shows that the position of the e-mail list has continued to decrease slightly from y6 to y7, in accordance with inertia of the e-mail list, due to the negative velocity.

FIGS. 5J-5N show that, in accordance with the restoring (spring) and damping forces in mass/spring model 516, the position, acceleration, and velocity of the e-mail list follow damped sinusoidal curves (or respective portions thereof). The position of the e-mail list changes from y'7 to y8, y9, y10, and then y11. The velocity of the e-mail list changes from v7 to v8, v9, v10, and then v11. The acceleration of the e-mail list changes from a7 to a8, a9, a10, and then a11. In FIG. 5N, the e-mail list has come to rest at its equilibrium position at the topmost position as shown in FIG. 5B (e.g., y11=y1).

It is noted that in FIGS. 5B-5N, the position curve of the e-mail list can be said to exhibit $C^2$ parametric continuity. $C^2$ parametric continuity exists when a curve, its first derivative with respect to time, and its second derivative with respect to time are all continuous. Here, the position is a continuous curve, and both the first derivative of the position with respect to time (e.g., velocity) and the second derivative of position with respect to time (e.g., acceleration) are continuous. Note that the derivative of acceleration with respect to time (the third derivative of position with respect to time) is discontinuous, because the change in acceleration over time prior to boundary 517 (e.g., FIGS. 5B-5I) is zero, whereas the change in acceleration over time after boundary 517 (e.g., FIG. 5J) has jumped to a positive value.

Figure 5O:
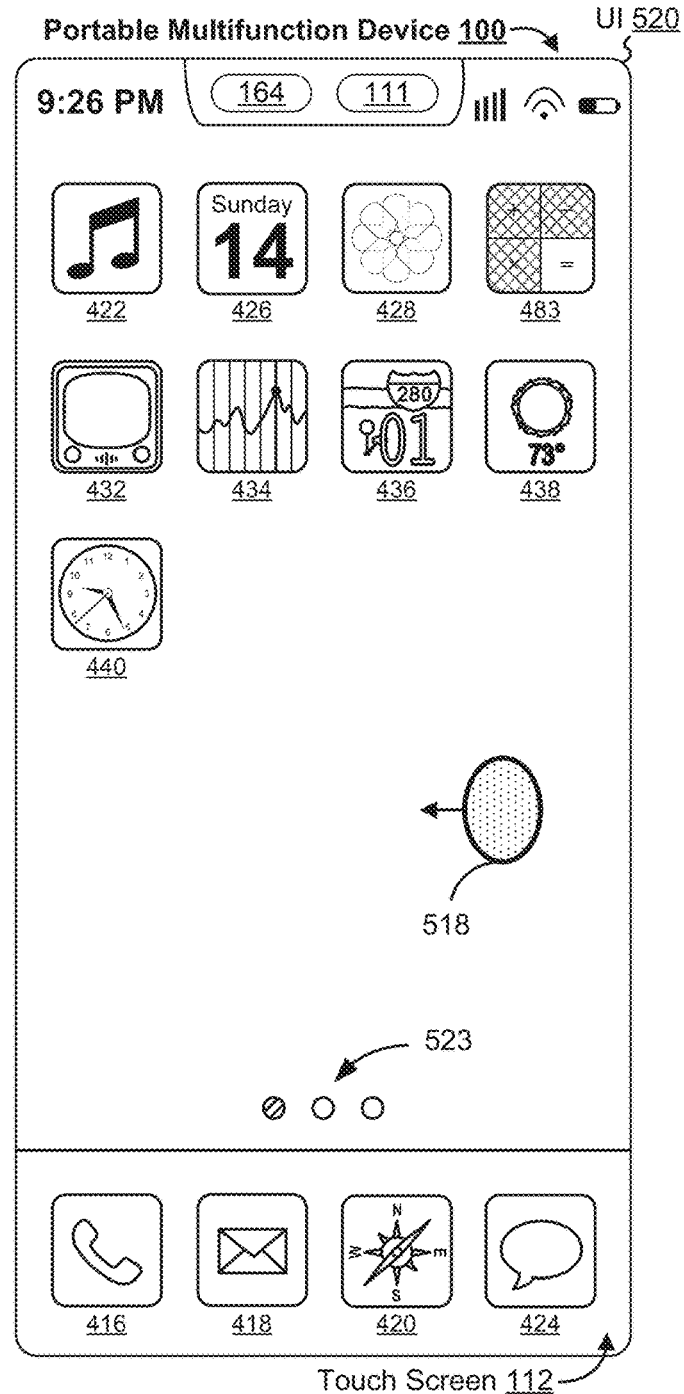

FIGS. 5O-5V illustrate example user interfaces for providing seamless user interface transitions in response to detected user inputs. FIG. 5O illustrates user interface 520 of an application-launching user interface (e.g., a home screen). User interface 520 includes a plurality of application icons. An x-position of user interface 520 is one of a set of predefined x-positions (e.g., predefined pagination positions). Optionally, user interface 520 includes a plurality of pages, each with one or more application icons, and each page having an x-position selected from the set of predefined x-positions. Page indicator 523 indicates that the currently-displayed page of user interface 520 is the first page of user interface 520. FIG. 5O shows contact 518 at a location on touch screen 112 corresponding to user interface 520, and movement of contact 518 along touch screen 112 toward the left. While contact 518 is detected on touch screen 112, the x-position of user interface 520, x, is modified via direct manipulation by the x-position (e.g., a horizontal position) of contact 518. In some embodiments, the x-position of user interface 520, $x_{object}$, corresponds to the x-position of contact 518, $x_{input}$. In FIG. 5O, the initial (horizontal) position of user interface 520 is x1. In addition, an initial velocity of user interface 520 (e.g., a first derivative of the x-position of user interface 520 with respect to time) is v1, and an initial acceleration of user interface 520 (e.g., a second derivative of the x-position of user interface 520 with respect to time) is a1.

Figure 5P:

FIG. 5P illustrates that, while detecting contact 518 (e.g., before liftoff of contact 518), and in response to the change in x-position of contact 518 from its position shown in FIG. 5O to its position shown in FIG. 5P, the x-position of user interface 520 is accordingly changed from x1 to x2. An updated velocity v2 and an updated acceleration a2 of user interface 520 are calculated from the change in x-position of user interface 520. After device 100 ceases to detect contact 518 (e.g., after liftoff of contact 518), device 100 ceases to modify the position, velocity, and acceleration of user interface 520 via direct manipulation by contact 518 and begins to modify the position, velocity, and acceleration of user interface 520 instead using a friction/bounce behavior model. The most-recently determined values x2, v2, and a2 of user interface 520 are provided to the friction/bounce behavior model, and device 100 begins modifying the position, velocity, and acceleration of user interface 520 from its state as shown in FIG. 5P (e.g., starting from values x2, v2, and a2 of user interface 520) using the friction/bounce behavior model.

Figure 5Q:
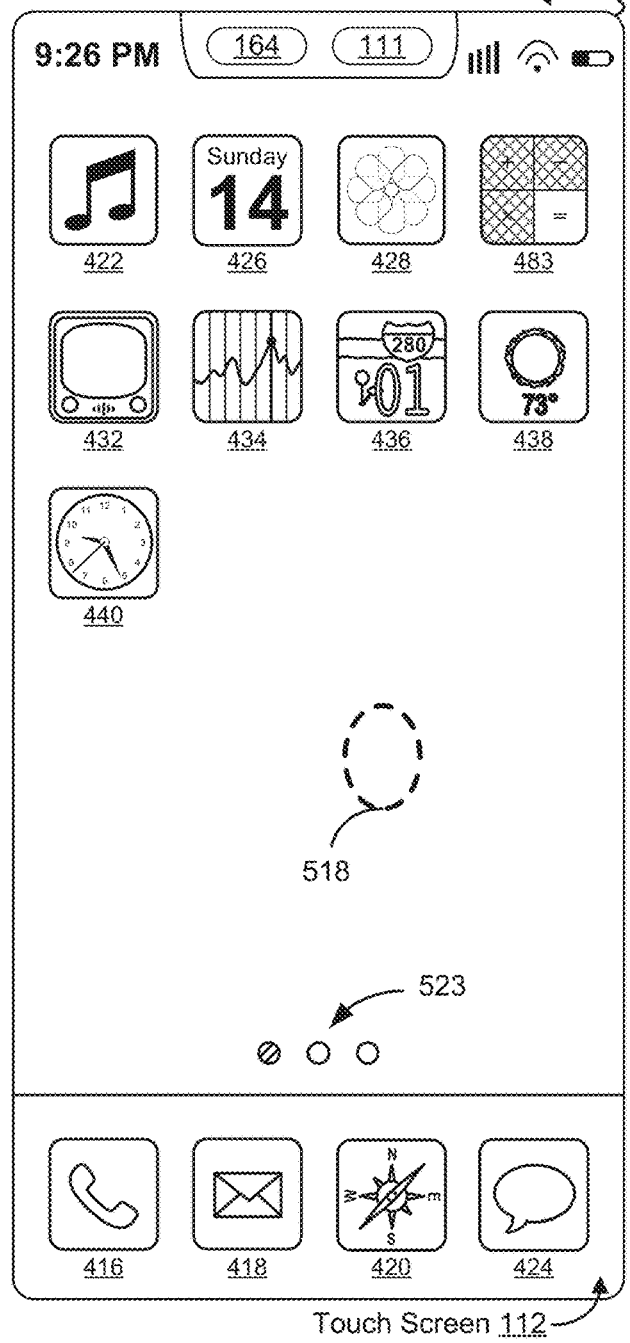

FIG. 5Q illustrates that, in response to detecting liftoff of contact 518, updated values for the x-position and velocity of user interface 520 are determined using the friction/bounce model. A target x-position $x_{target}$ of user interface 520 is determined based in part on an intermediate position $x_{intermediate}$, which is determined based on (e.g., as a function of) the most-recently determined x-position x2 and the most-recently determined velocity v2 of user interface 520. The target x-position $x_{target}$ is determined further in accordance with the set of predefined x-positions (e.g., boundary criteria). In the example shown in FIG. 5Q, the target x-position $x_{target}$ of user interface 520 is determined to be the predefined x-position x1 as shown in FIG. 5O (e.g., because the x-position displacement of user interface 520 from FIG. 5O to FIG. 5P did not exceed a predefined displacement threshold (from the predefined x-position x1 of the first page of user interface 520 in FIG. 5O), and/or because a projected x-position of user interface 520, determined based on the x-position x2 and the velocity v2, was not within a predefined displacement threshold of a predefined x-position for a different page of user interface 520). An updated x-position x3 of user interface 520 is determined based on (e.g., as a function of) the target x-position $x_{target}$ and the most-recently determined velocity v2. An updated velocity v3 of user interface 520 is determined based on (e.g., as a function of) the most-recently determined velocity v2, the most-recently determined velocity a2, and a coefficient of friction μ representing a simulated force of friction acting on user interface 520 as it moves. Accordingly, the x-position of user interface 520 is updated to x3, the velocity of user interface 520 is updated to v3, and the acceleration a3 of user interface 520 is calculated from the x-position x3 and velocity v3. FIG. 5Q illustrates that the updated position x3 of user interface 520 is the same as its position as shown in FIG. 5O (e.g., x3=x1). Accordingly, page indicator 523 indicates that the currently-displayed page of user interface 520 is still the first page.

Figure 5R:
Figure 5R:
Figure 5R:
Figure 5R:
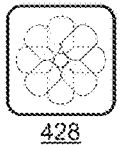
Figure 5R:
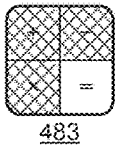
Figure 5R:
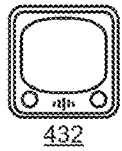
Figure 5R:
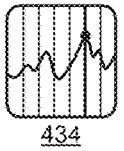
Figure 5R:
Figure 5R:
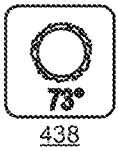
Figure 5R:
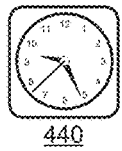
Figure 5R:
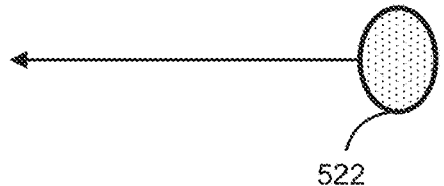
Figure 5R:
Figure 5R:
Figure 5R:
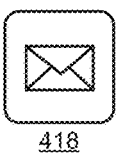
Figure 5R:
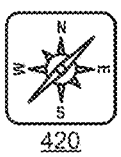
Figure 5R:

FIG. 5R illustrates user interface 520, and user input 522 at a location on touch screen 112 corresponding to user interface 520. User input 522 includes a contact on touch screen 112, right-to-left movement of the contact across the touch-sensitive surface, and liftoff of the contact at a non-zero velocity (e.g., a right-to-left flick gesture). While detecting user input 522 (e.g., before liftoff of the contact of user input 522), and in response to changes in the x-position of user input 522, the x-position of user interface 520 is modified via direct manipulation by the x-position of user input 522. Accordingly, in some embodiments, $x_{object}=x_{input}=x4$. In addition, a velocity v4 and an acceleration a4 of user interface 520 are calculated from changes in the x-position of user interface 520. After device 100 ceases to detect user input 522 (e.g., after liftoff of the contact of user input 522), device 100 ceases to modify the position, velocity, and acceleration of user interface 520 via direct manipulation by user input 522 and begins to modify the position, velocity, and acceleration of user interface 520 instead using the friction/bounce behavior model. The most recently determined values x4, v4, and a4 of user interface 520 are provided to the friction/bounce behavior model, which begins modifying the position, velocity, and acceleration of user interface 520 from its state as shown in FIG. 5R (e.g., starting from values x4, v4, and a4 of user interface 520). Page indicator 523 indicates that the initially-displayed page of user interface 520 in FIG. 5R is the first page of user interface 520.

Figure 5S:
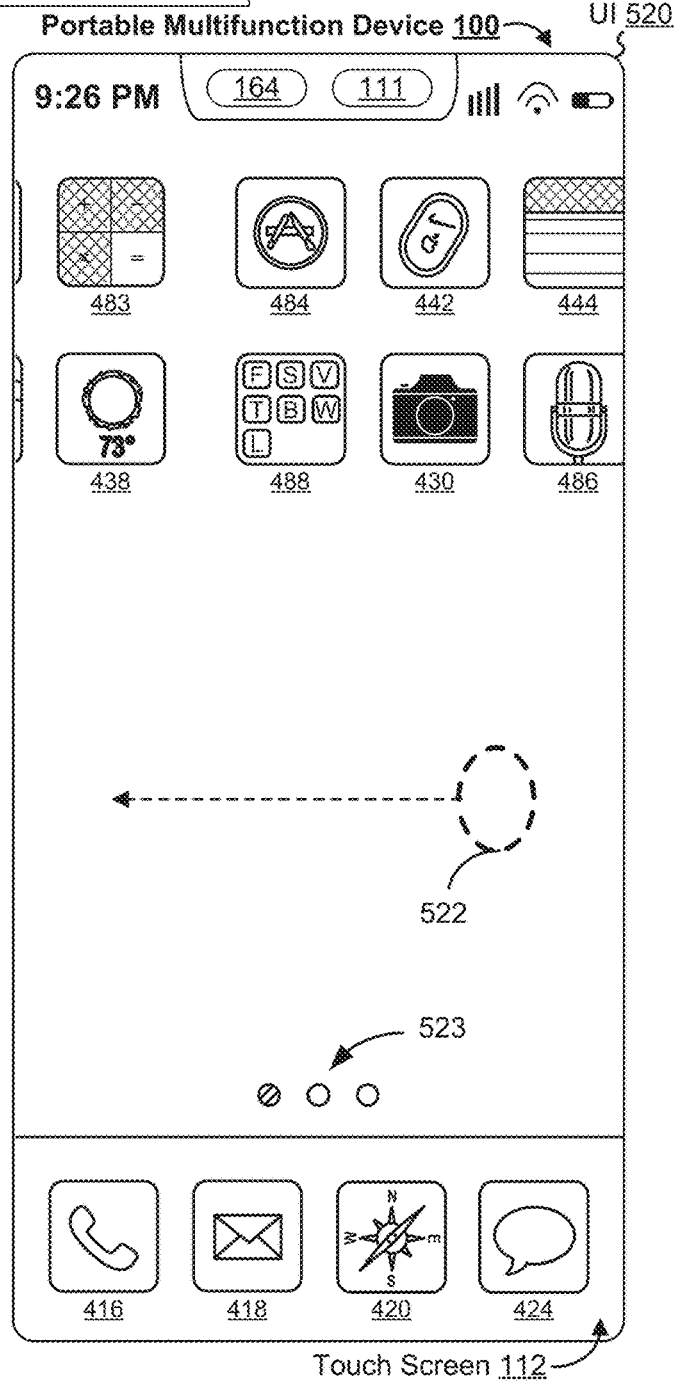

FIG. 5S illustrates that, in response to detecting liftoff of user input 522, updated values for the x-position and velocity of user interface 520 are determined using the friction/bounce model. As described above with reference to FIG. 5Q, in accordance with the friction/bounce model, a target x-position $x_{target}$ of user interface 520 is determined based in part on an intermediate position $x_{intermediate}$, which is determined based on (e.g., as a function of) the most-recently determined x-position x4 and the most-recently determined velocity v4 of user interface 520. The target x-position $x_{target}$ is determined further in accordance with boundary criteria (e.g., the set of predefined x-positions). In the example shown in FIG. 5S, the target x-position of user interface 520 is determined to be the position of a different, subsequent page of user interface 520, such as the second page of user interface 520 (e.g., because a projected x-position of user interface 520, determined based on the x-position x4 and the velocity v4, was within a predefined displacement threshold of a predefined x-position for a different page of user interface 520, or the projected x-position was not within a predefined displacement threshold of its initial predefined x-position as shown in FIG. 5R). An updated x-position x5 of user interface 520 is determined based on the target x-position $x_{target}$ and the most-recently determined velocity v4. An updated velocity v5 of user interface 520 is determined based on the most-recently determined velocity v4, the most-recently determined velocity a4, and the coefficient of friction μ representing the simulated force of friction acting on user interface 520 as it moves. Accordingly, the x-position of user interface 520 is updated to x5, the velocity of user interface 520 is updated to v5, and the acceleration a5 of user interface 520 is calculated based on the x-position x5 and velocity v5. FIG. 5S illustrates that the updated position x5 of user interface 520 is distinct from position x4 as shown in FIG. 5R.

Figure 5T:
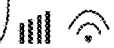
Figure 5T:
Figure 5T:
Figure 5T:
Figure 5T:
Figure 5T:
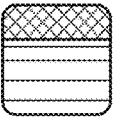
Figure 5T:
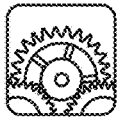
Figure 5T:
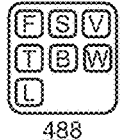
Figure 5T:
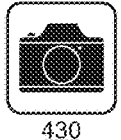
Figure 5T:
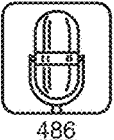
Figure 5T:
Figure 5T:
Figure 5T:
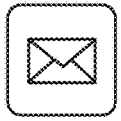
Figure 5T:
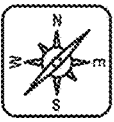
Figure 5T:

FIG. 5T illustrates continued movement of user interface 520 from its position shown in FIG. 5S. Because user interface 520 moves at a non-zero velocity v5 in FIG. 5S, user interface 520 has momentum toward the left. Accordingly, in FIG. 5T, user interface 520 continues to move toward the left. An updated intermediate position $x_{intermediate}$ is determined based on the most-recently determined x-position x5 and the most-recently determined velocity v5 of user interface 520. An updated target position $x_{target}$ is determined based on the intermediate position $x_{intermediate}$ and boundary criteria (e.g., the set of predefined x-positions). An updated x-position x6 of user interface 520 is determined based on the target x-position $x_{target}$ and the most-recently determined velocity v5. An updated velocity v6 of user interface 520 is determined based on the most-recently determined velocity v5, the most-recently determined velocity a5, and the coefficient of friction μ representing the simulated force of friction acting on user interface 520 as it moves. Accordingly, the x-position of user interface 520 is updated to x6, the velocity of user interface 520 is updated to v6, and the acceleration a6 of user interface 520 is calculated based on the x-position x6 and velocity v6. Due to the effect of the simulated force of friction on user interface 520 in a direction opposite to the direction of movement of user interface 520, the updated velocity v6 is less than the previous velocity v5. FIG. 5T illustrates that the updated position x6 of user interface 520 corresponds to a different predefined x-position from its position as shown in FIG. 5R (e.g., the predefined x-position of the second page of user interface 520).

Figure 5U:
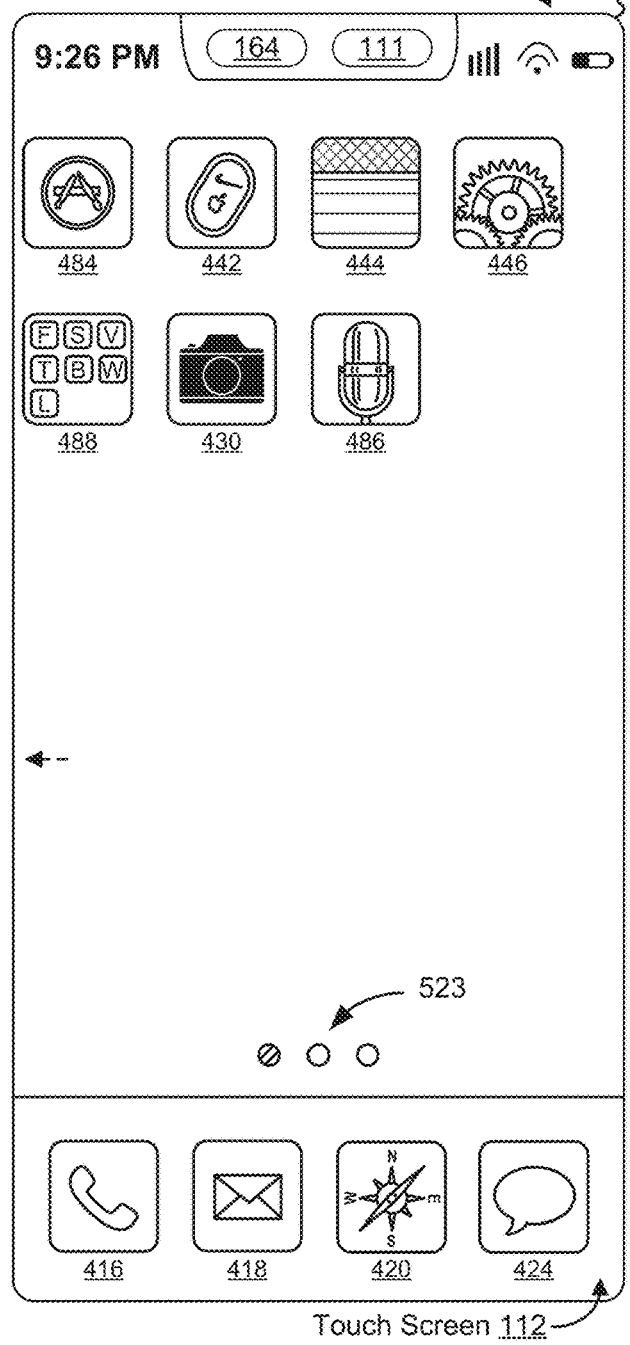

FIG. 5U illustrates continued movement of user interface 520 from its position shown in FIG. 5T. Because user interface 520 moves at a non-zero velocity v6 in FIG. 5T, user interface 520 still has momentum toward the left. Accordingly, in FIG. 5U, user interface 520 continues to move toward the left, past the predefined x-position of the second page of user interface 520. An updated intermediate position $x_{intermediate}$ is determined based on the most-recently determined x-position x6 and the most-recently determined velocity v6 of user interface 520. An updated target position $x_{target}$ is determined based on the intermediate position $x_{intermediate}$ and boundary criteria (e.g., the set of predefined x-positions). An updated x-position x7 of user interface 520 is determined based on the target x-position $x_{target}$ and the most-recently determined velocity v6. An updated velocity v7 of user interface 520 is determined based on the most-recently determined velocity v6, the most-recently determined velocity a6, and the coefficient of friction μ. Accordingly, the x-position of user interface 520 is updated to x7, the velocity of user interface 520 is updated to v7, and the acceleration a7 of user interface 520 is calculated based on the x-position x7 and velocity v7. Due to the effect of the simulated force of friction on user interface 520 in a direction opposite the direction of movement of user interface 520, the updated velocity v7 is less than the previous velocity v6.

Figure 5V:
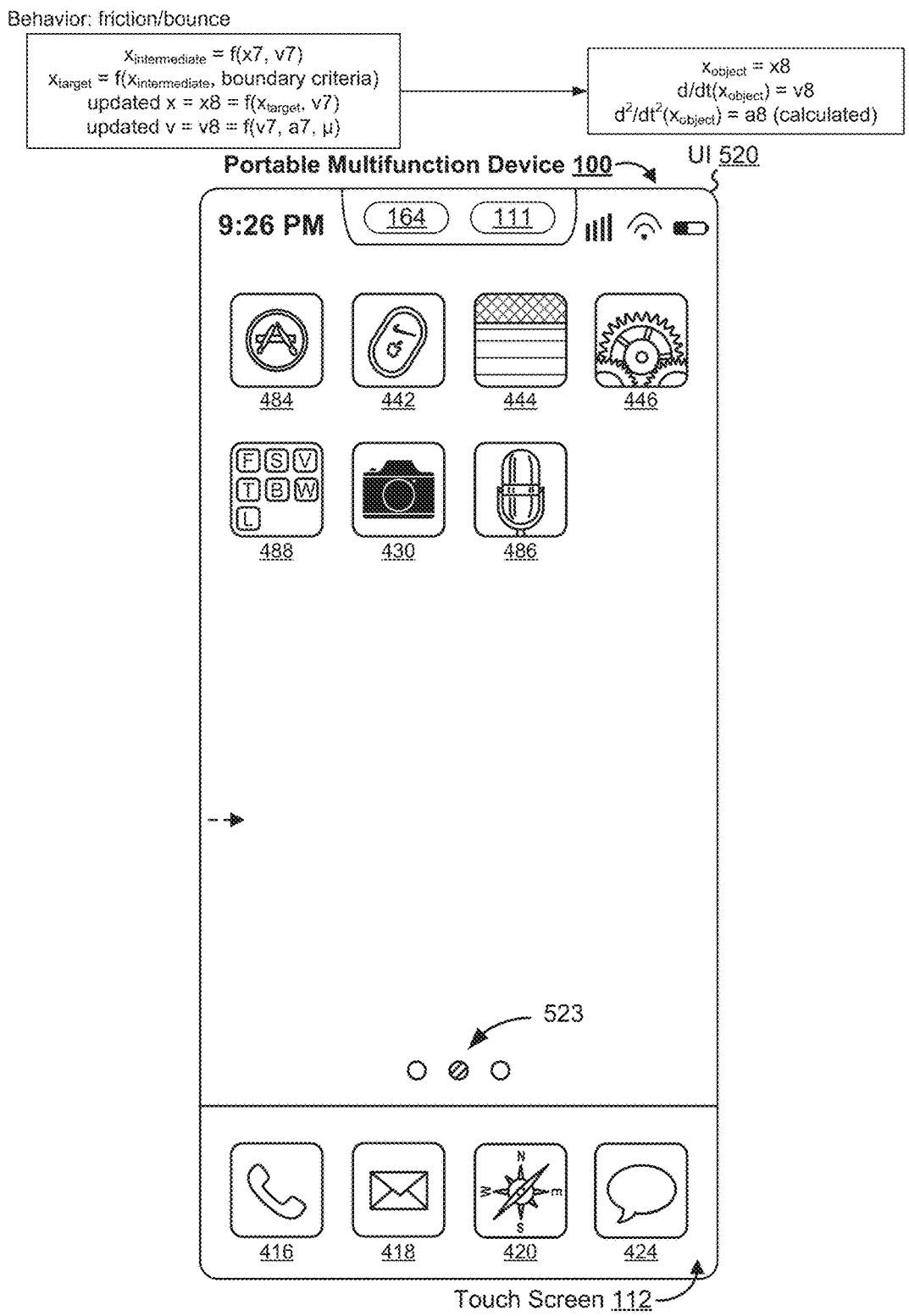

FIG. 5V illustrates continued movement of user interface 520 from its position shown in FIG. 5U. In FIG. 5U, due to momentum of user interface 520 toward the left, user interface 520 moved past the predefined x-position of the second page of user interface 520. An updated intermediate position $x_{intermediate}$ is determined based on the most-recently determined x-position x7 and the most-recently determined velocity v7 of user interface 520. An updated target position $x_{target}$ is determined based on the intermediate position $x_{intermediate}$ and boundary criteria (e.g., the set of predefined x-positions). In the example shown in FIG. 5V, the target-x-position $x_{target}$ of user interface 520 is determined to be the predefined x-position of the second page of user interface 520. In some embodiments, $x_{target}$ is determined to be the predefined x-position of the second page because the x-position displacement of user interface 520, calculated as a difference between its x-position x7 as shown in FIG. 5U, and the predefined x-position of the second page does not exceed a predefined displacement threshold (from the predefined x-position of the second page). In some embodiments, $x_{target}$ is determined to be the predefined x-position of the second page because the projected displacement of user interface 520, calculated as a difference between its projected x-position (determined using the friction/bounce model and position x7, velocity v7, and acceleration a7 in FIG. 5U) and the predefined x-position of the second page would not exceed the predefined displacement threshold from the predefined x-position of the second page. An updated x-position x8 of user interface 520 is determined based on the target x-position $x_{target}$ and the most-recently determined velocity v7. An updated velocity v8 of user interface 520 is determined based on the most-recently determined velocity v7, the most-recently determined velocity a7, and the coefficient of friction μ. Accordingly, the x-position of user interface 520 is updated to x8, the velocity of user interface 520 is updated to v8, and the acceleration a8 of user interface 520 is calculated based on the x-position x8 and velocity v8. In accordance with the updated values, user interface 520 moves in a direction opposite the direction of movement of user interface 520 in FIG. 5U (e.g., after moving past the target x-position, user interface 520 changes direction and returns to the target x-position). FIG. 5V shows that the updated position x8 of user interface 520 is the predefined x-position of the second page of user interface 520. Accordingly, page indicator 523 changes to indicate that the currently-displayed page of user interface 520 is the second page.

Figure 5W:
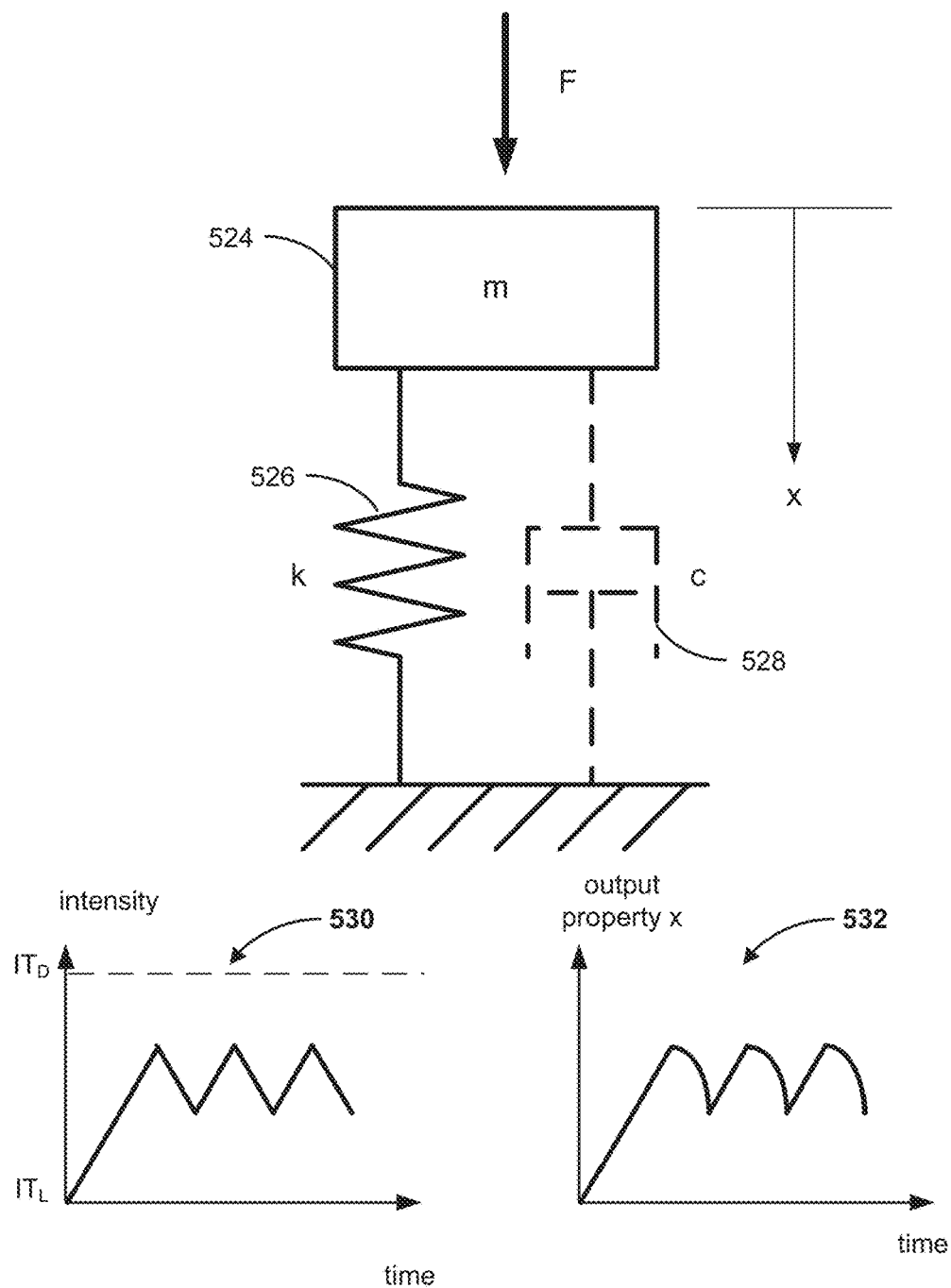
Figure 5X:
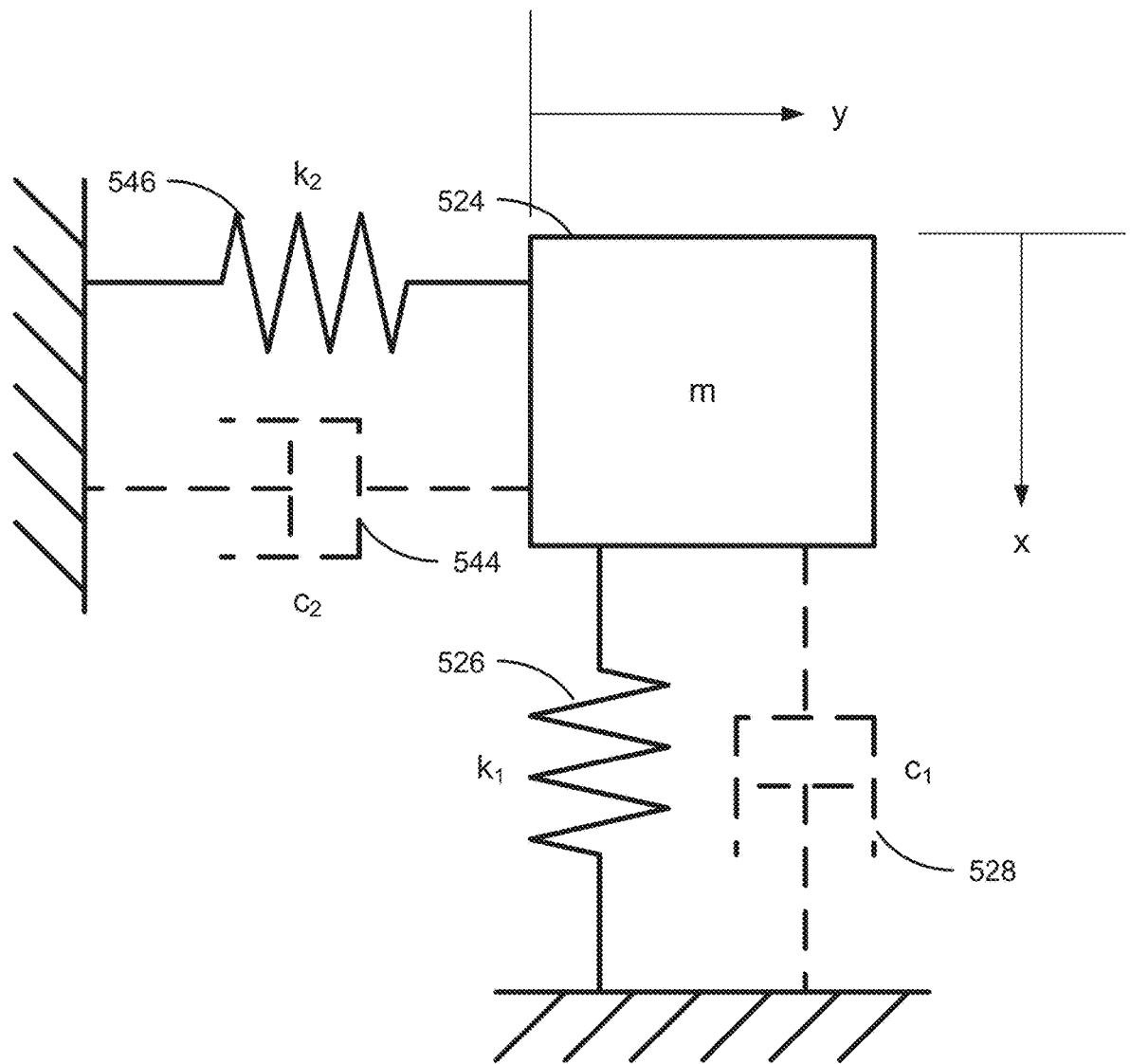
Figure 5Y:
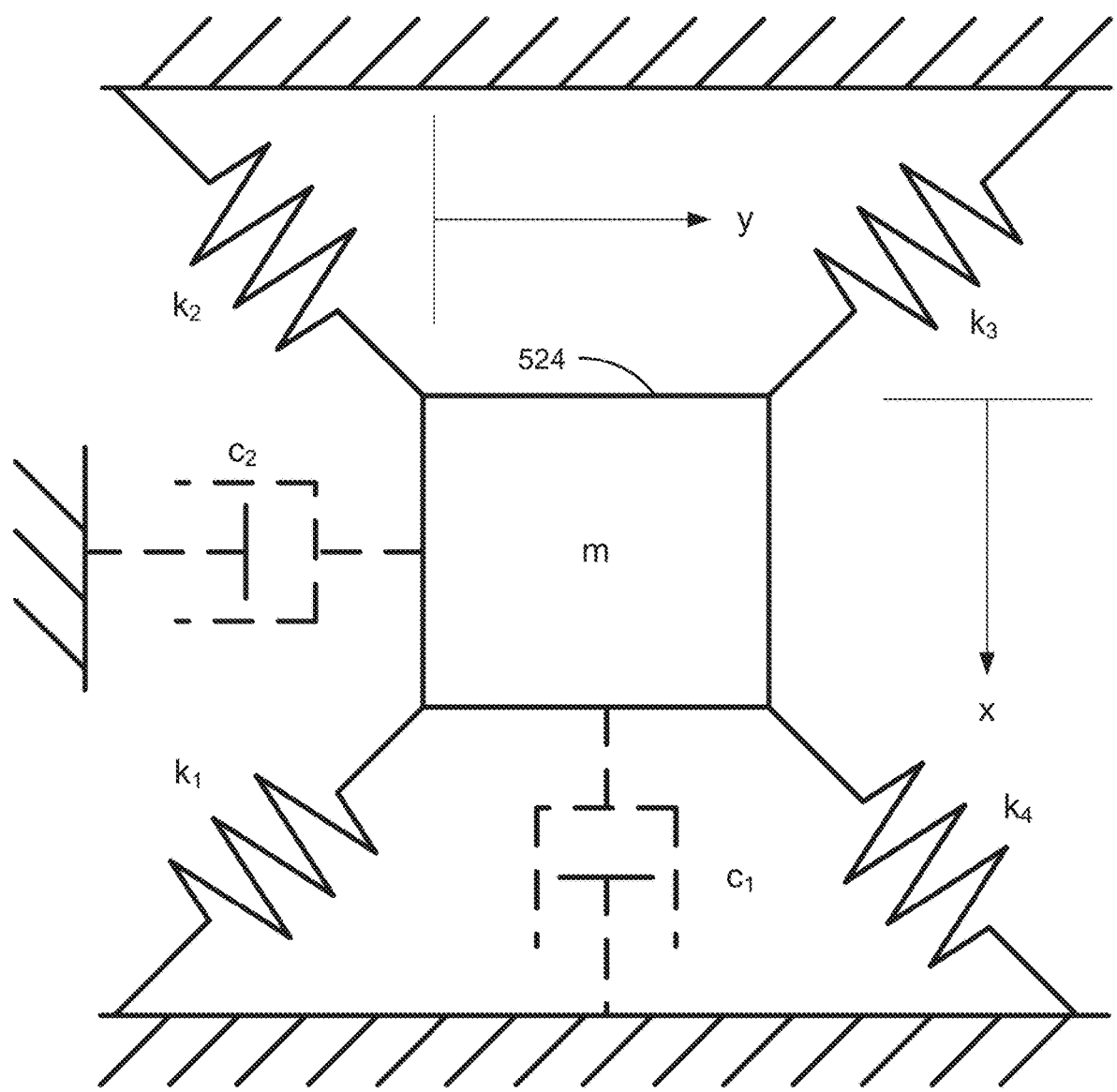

FIGS. 5W-5Y illustrate example physics models in accordance with some embodiments.

FIG. 5W illustrates a physics model that includes mass 524 (e.g., an object with a non-zero weight), spring 526, and optionally damper 528. In FIG. 5W, spring 526 and damper 528 are connected in parallel to mass 524. However, in some embodiments, spring 526 and damper 528 connected in series to mass 524 are used.

In some embodiments, the physics model is used to determine an output property, such as a position, of mass 524 at a particular moment in time (or over a series of points in time). In some cases, the position of mass 524 is measured (or determined) relative to a reference position (e.g., an initial position of mass 524 or a reference object, such as a (simulated) ground). The distance of mass 524 from the reference position is called herein a displacement (of mass 524).

In some embodiments, intensity of a touch input is provided to the physics model as an input. For example, the intensity of a touch input is used to determine a simulated force (F) applied to mass 524 in the physics model, and the movement (or the displacement) of mass 524 is simulated. Spring 526 provides a simulated force to mass 524 that allows mass 524 to return to the reference position (or a neutral position, where the simulated force applied by spring 526 on mass 524, when mass 524 is static, is zero). Damper 528 provides resistance so that the movement of mass 524 slows down over time.

Alternatively, in some embodiments, intensity of the touch input is provided to the physics model as a conditional movement of mass 524. For example, the intensity of a touch input is treated like a forced movement of mass 524 in a single direction (and thus, the decrease in the intensity of the touch input does not pull mass 524 in the opposite direction) in the physics model.

Due to the inertia of mass 524, elasticity of spring 526, and the resistance provided by damper 528, the displacement of mass 524 does not change linearly with the changes to the intensity of the user input, as shown in graph 530.

In some embodiments, the physics model, or an instance of the physics model (optionally with one or more different parameters such as spring constant k or damping coefficient c) is used to determine additional output properties (e.g., visual display parameters such as a blurring radius, a scaling factor, a color change value, etc.), which are used for updating the user interface and/or providing an animated transition from one user interface to another user interface. In some embodiments, updates in the user interface are proportional to changes in one or more output properties. In some embodiments, updates in the user interface are determined based on a transformation (e.g., a range limit, or an interpolation function) applied to one or more output properties.

For example, the output property is used for updating the user interface when a change in a user input is detected (e.g., as shown in FIGS. 5C-5D and 5H-5I). In some cases, updating the user interface linearly in response to changes in a user input presents sudden, drastic changes to the user interface when the user input changes significantly (e.g., when touch down of a subsequent user input would cause a sudden reversal in a direction of movement of a user interface element, such as in FIG. 5H-5I). Such drastic changes to the user interface can be distracting for users. Filtering changes in the user input through a behavior model, such as a physics model, reduces the drastic changes to the user interface, but introduces a lag in updating the user interface. As a result, the user interface is updated with a user-observable delay after changes in the user input, which reduces the user experience (because the user interface does not change when the user expects it to change). By utilizing an output property (e.g., position of a mass in a mass-and-spring system), the user interface is updated gradually (e.g., without sudden, drastic changes to the user interface) while the user interface remains responsive to any changes in the user input (e.g., the delay between changes to the user input and the updates to the user interface is reduced or eliminated) while exhibiting physically intuitive behaviors such as inertia, damping, friction, and oscillation.

As explained above, FIG. 5W illustrates a one-dimensional mass-and-spring system. In some other embodiments, a mass-and-spring system of a higher dimension is used. For example, FIG. 5X illustrates a two-dimensional mass-and-spring system (e.g., including a second spring 546 and optionally a second damper 544). Such systems may be used for modifying two or more output properties (e.g., one output property corresponds to visual display parameters and a second output property corresponds to movement of a user interface object across the display, or one output property is an x-position of a user interface object and a second output property is a y-position of a user interface object). Alternatively, two separate one-dimensional mass-and-spring systems are used to modify two output properties. While the examples above are given with reference to a one spring system and a two spring system, other arrangements of masses and springs are contemplated. For example, a three or four spring system (e.g., the four spring system illustrated in FIG. 5Y) where springs are arranged on opposite sides of the mass can provide beneficial damping and stabilization features that create a more intuitive physical system that responds within a narrow range of predictable values. In principle, any number of springs and masses can be used, however additional springs and/or masses included in a physics model increase the computational cost (e.g., time and energy to calculate updates to the system) and can reduce the responsiveness of a user interface relying on the physics model. Thus, the use of behavior models for updating the user interface require balancing between a stabilized system with a large number of springs and an efficient system with fewer springs.

Figure 5Z:
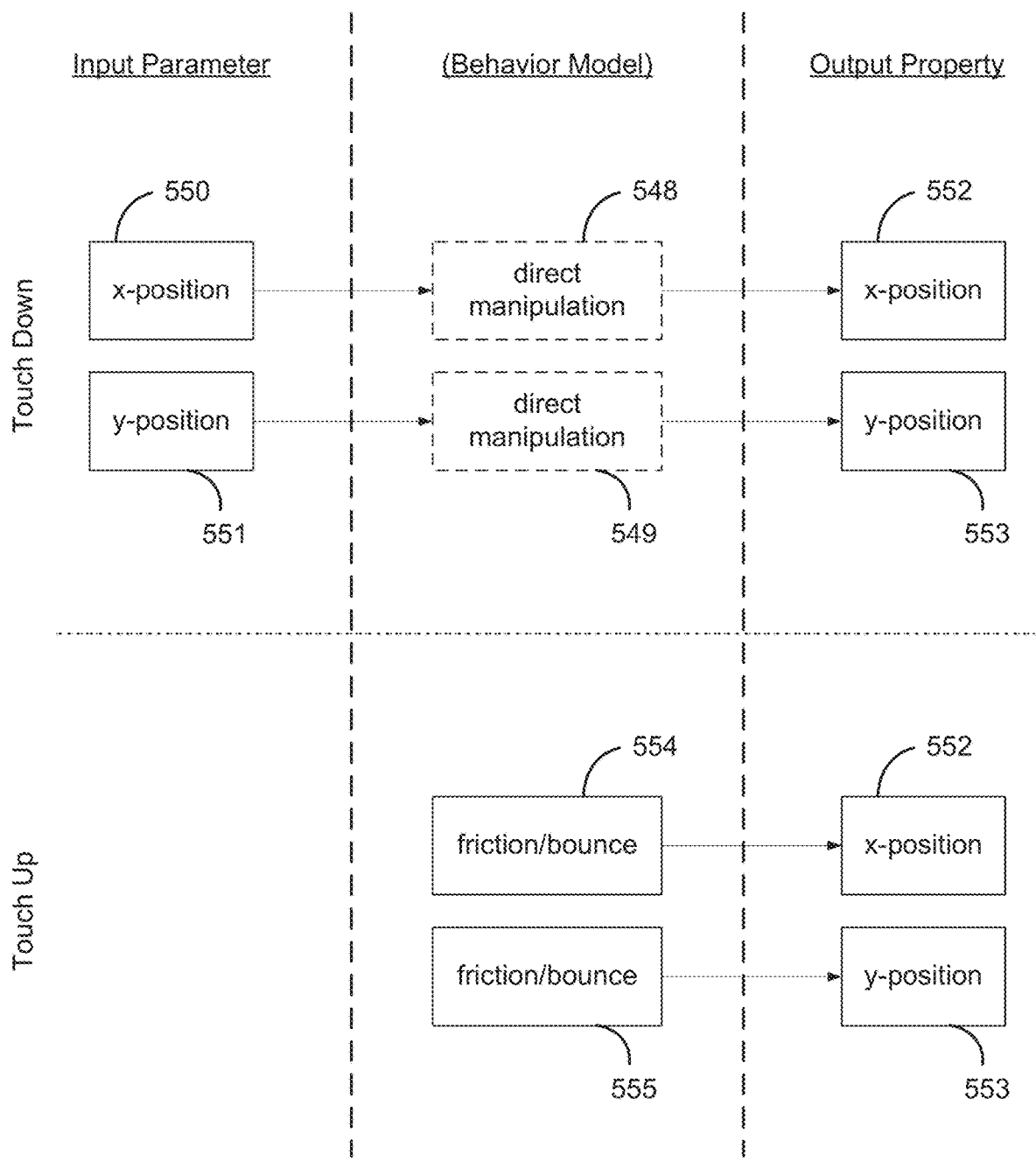
Figure 5A:
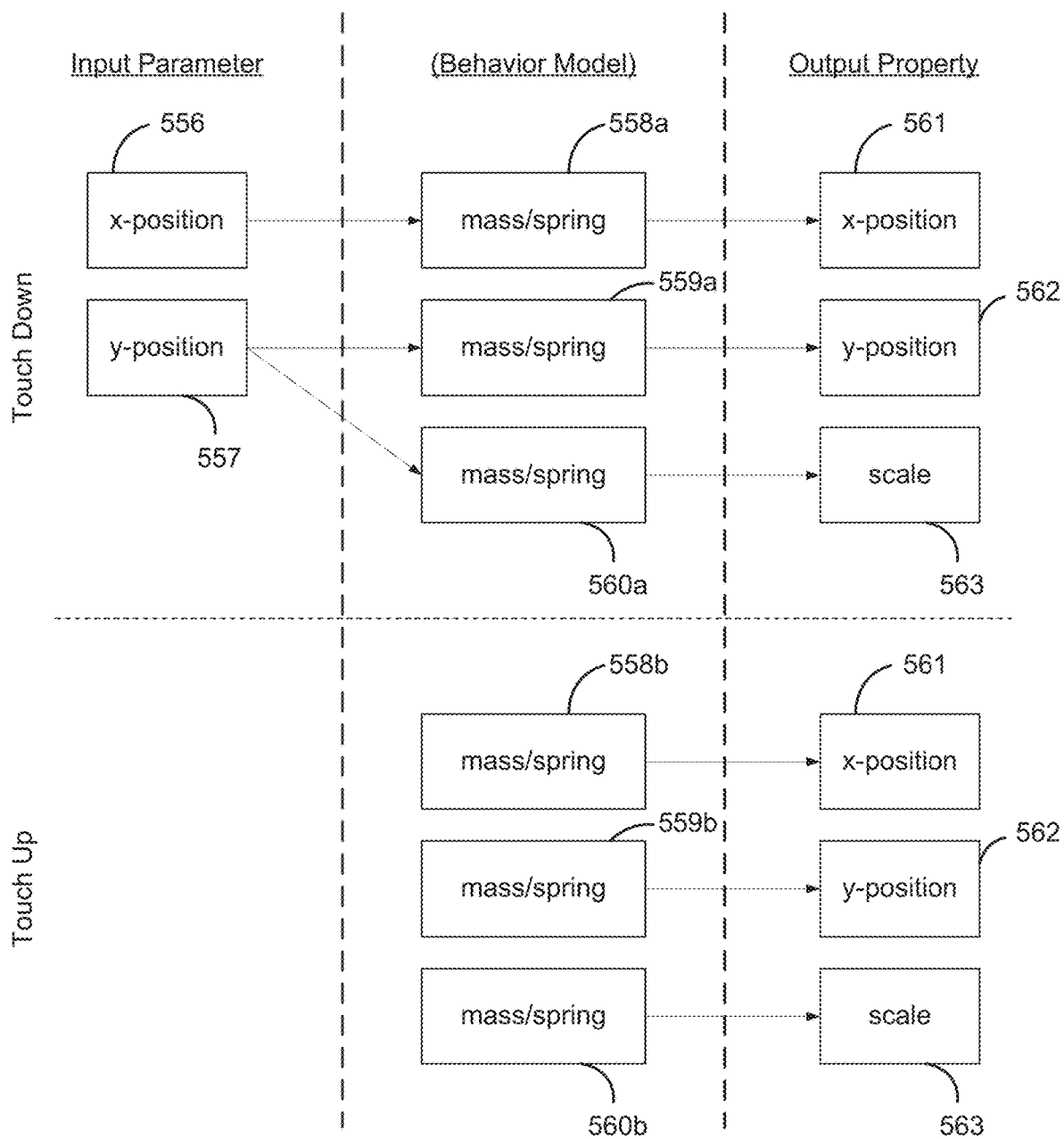
Figure 5A:
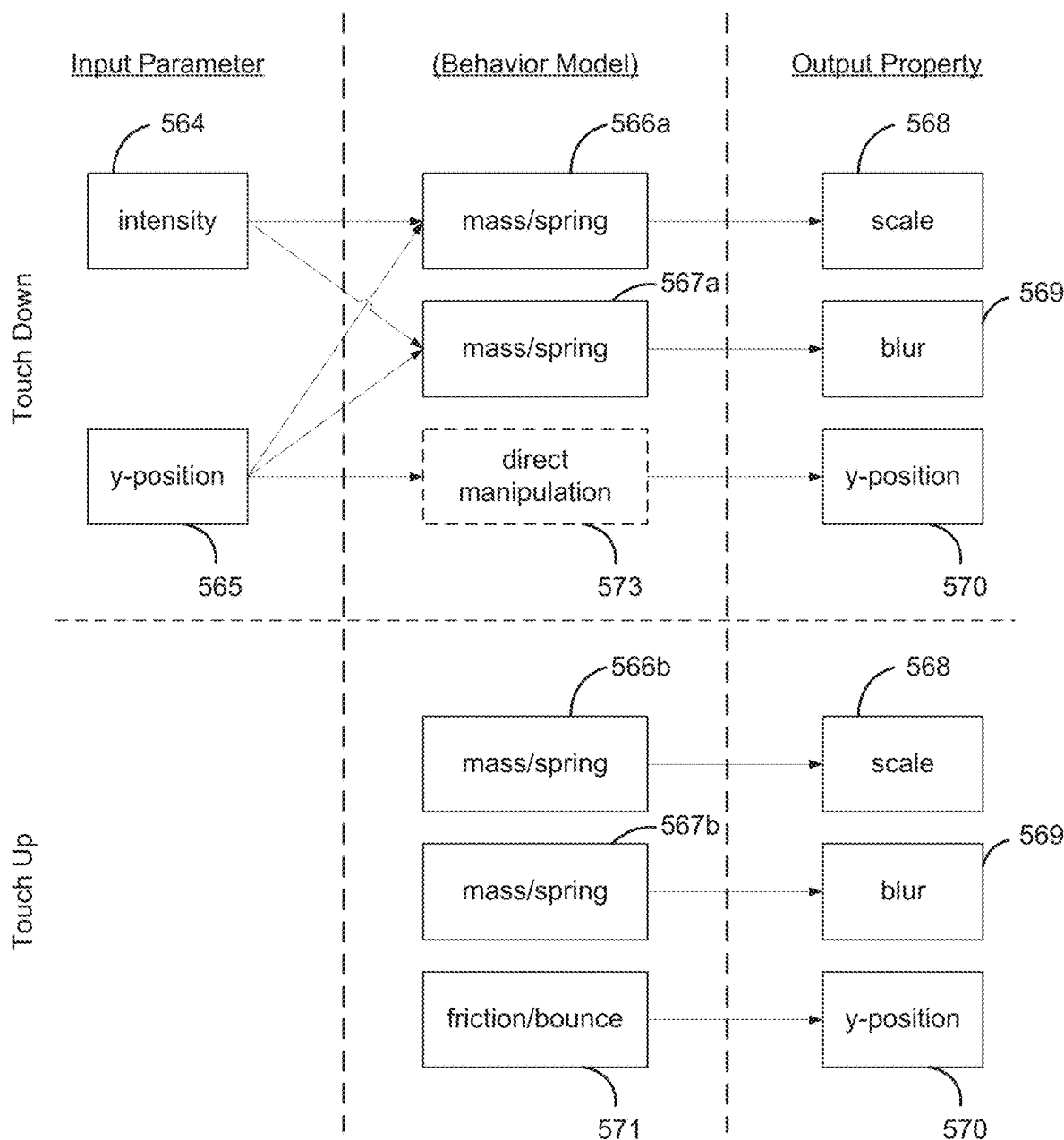
Figure 5A:
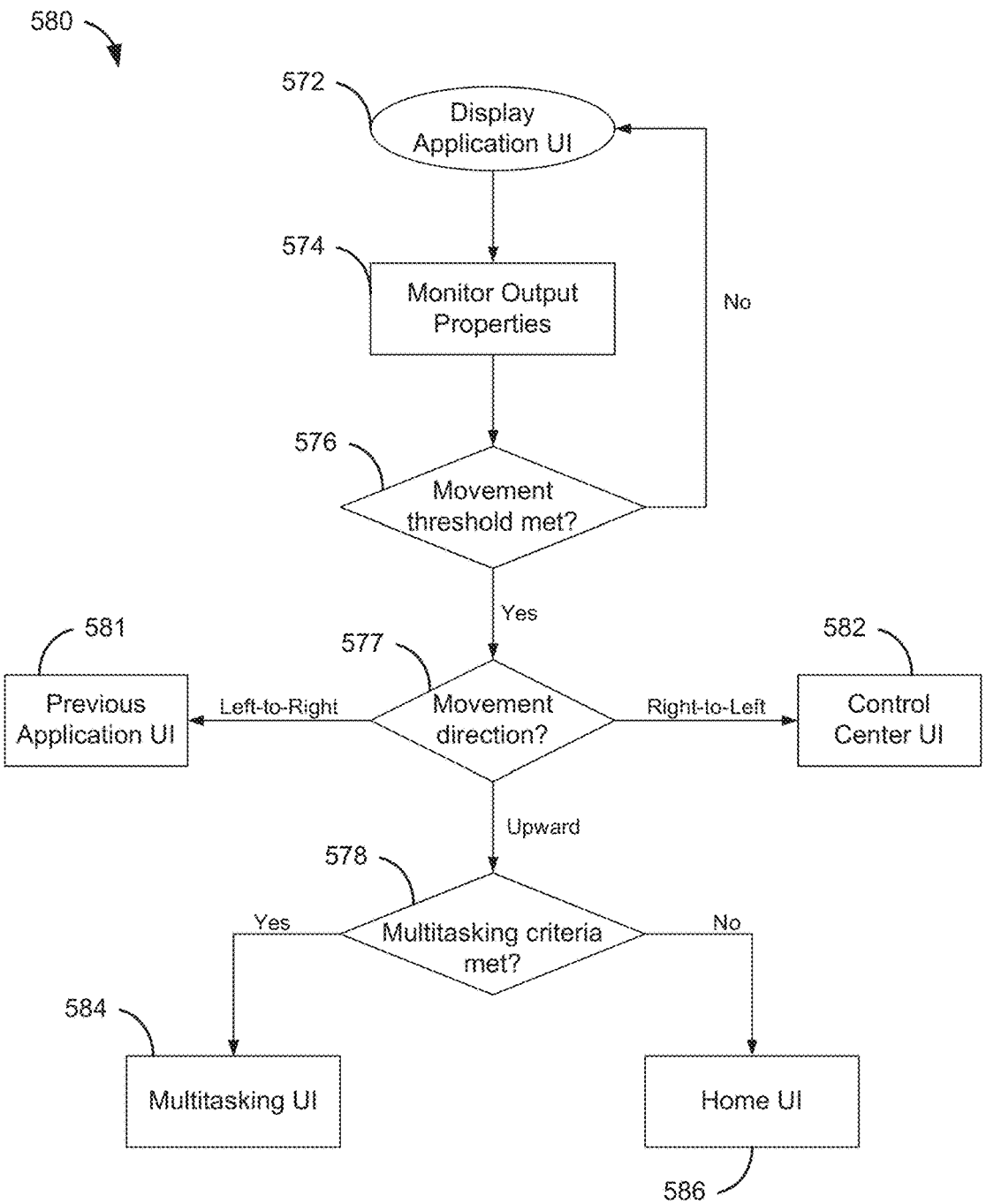
Figure 5A:
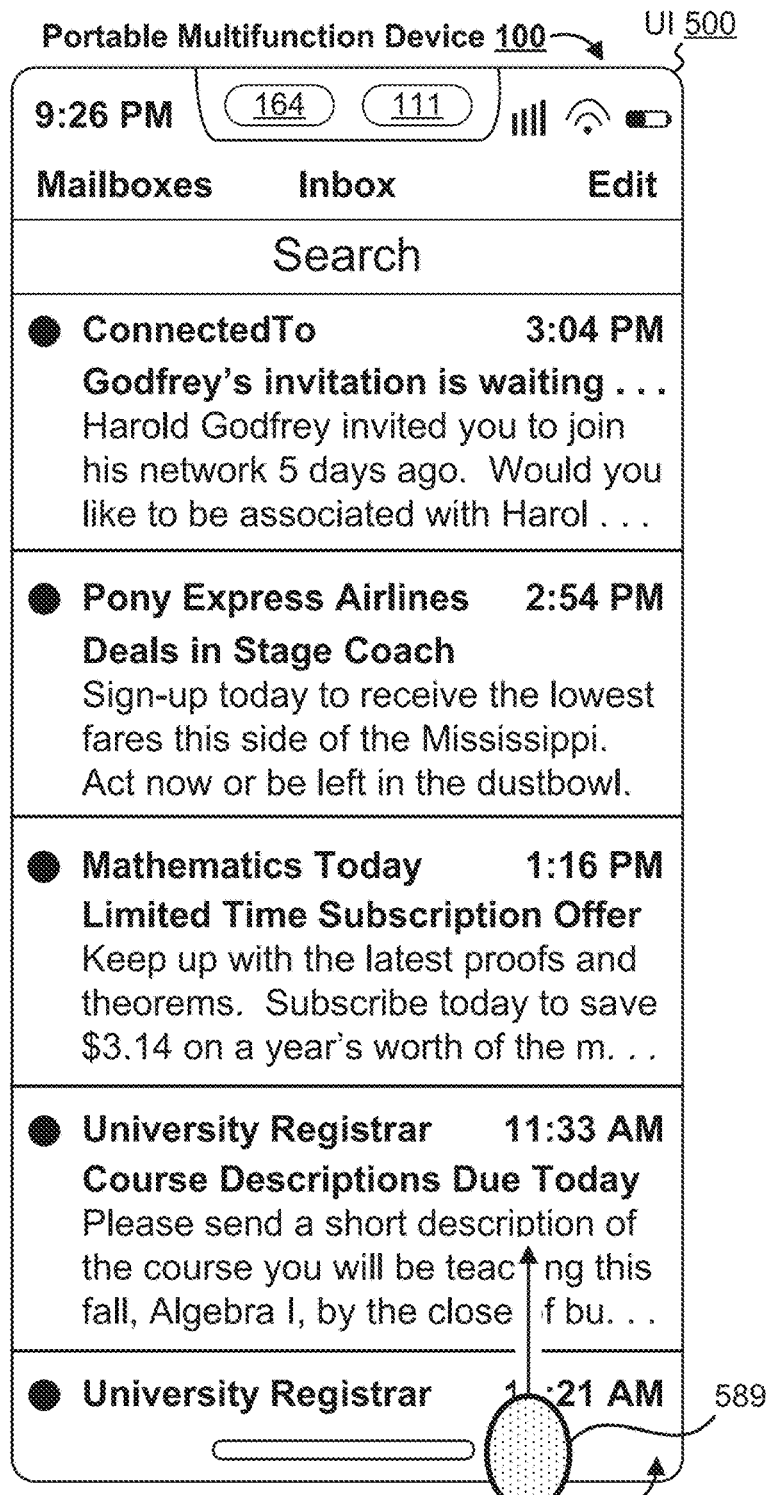
Figure 5A:
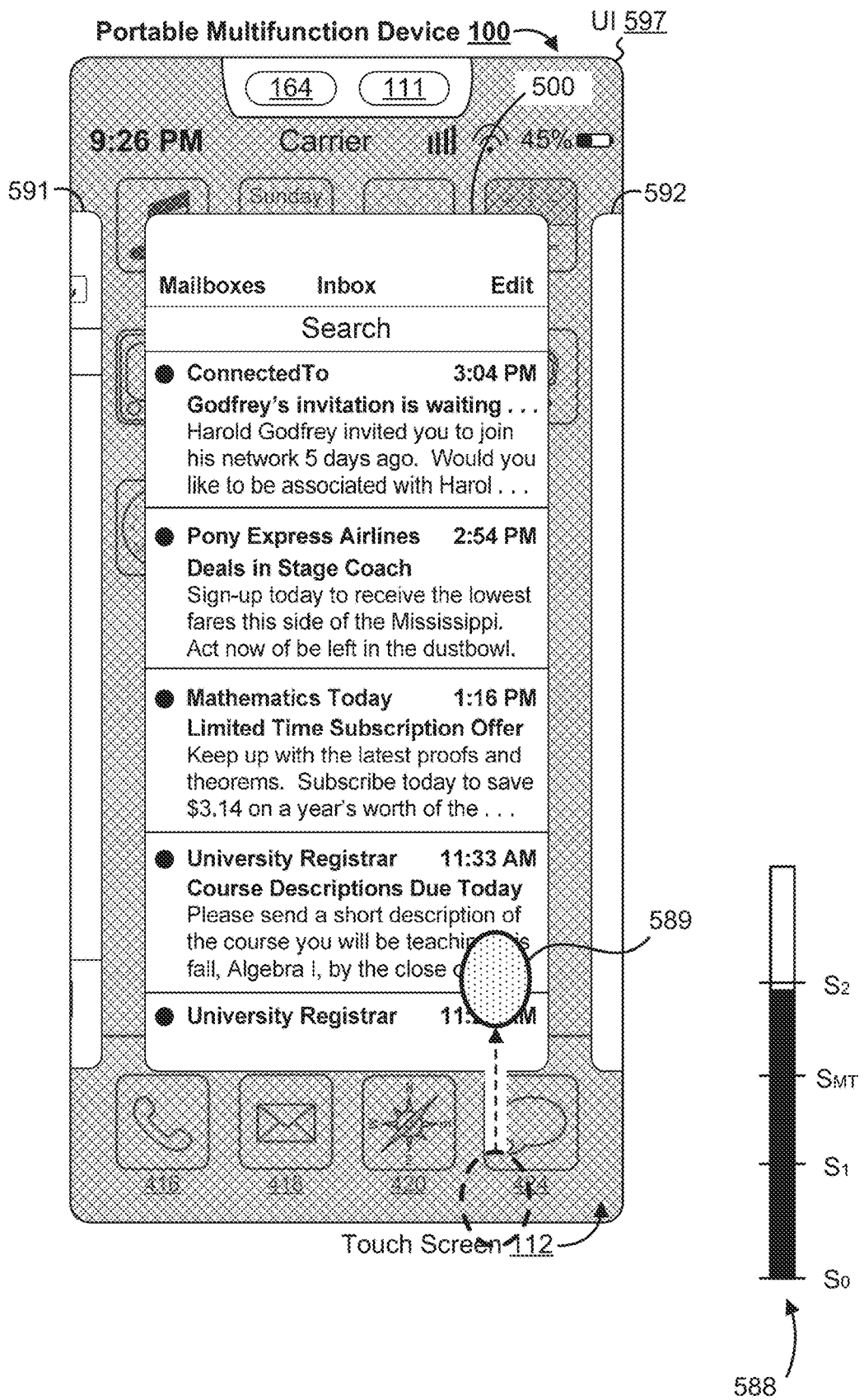
Figure 5A:
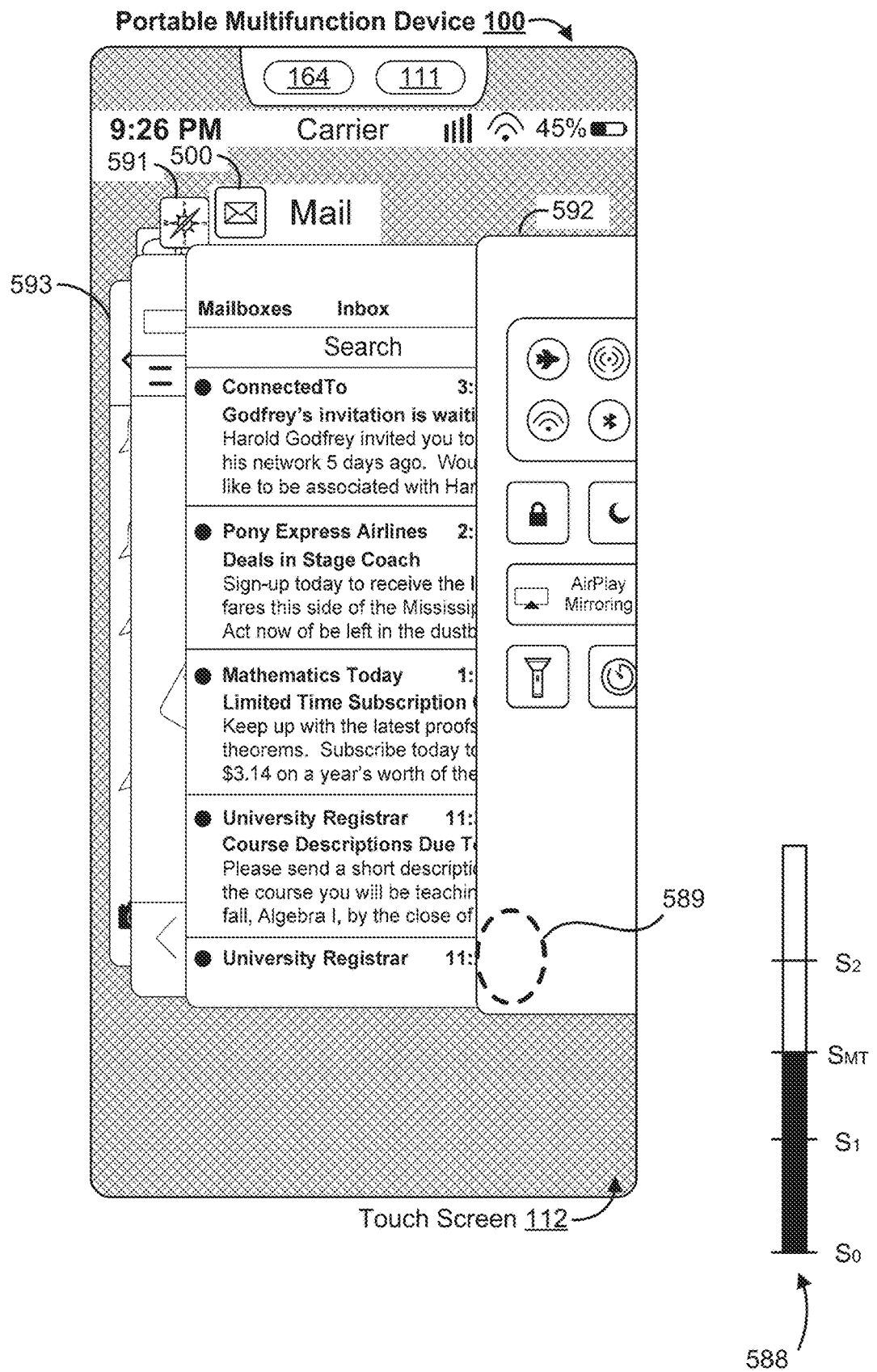
Figure 5A:
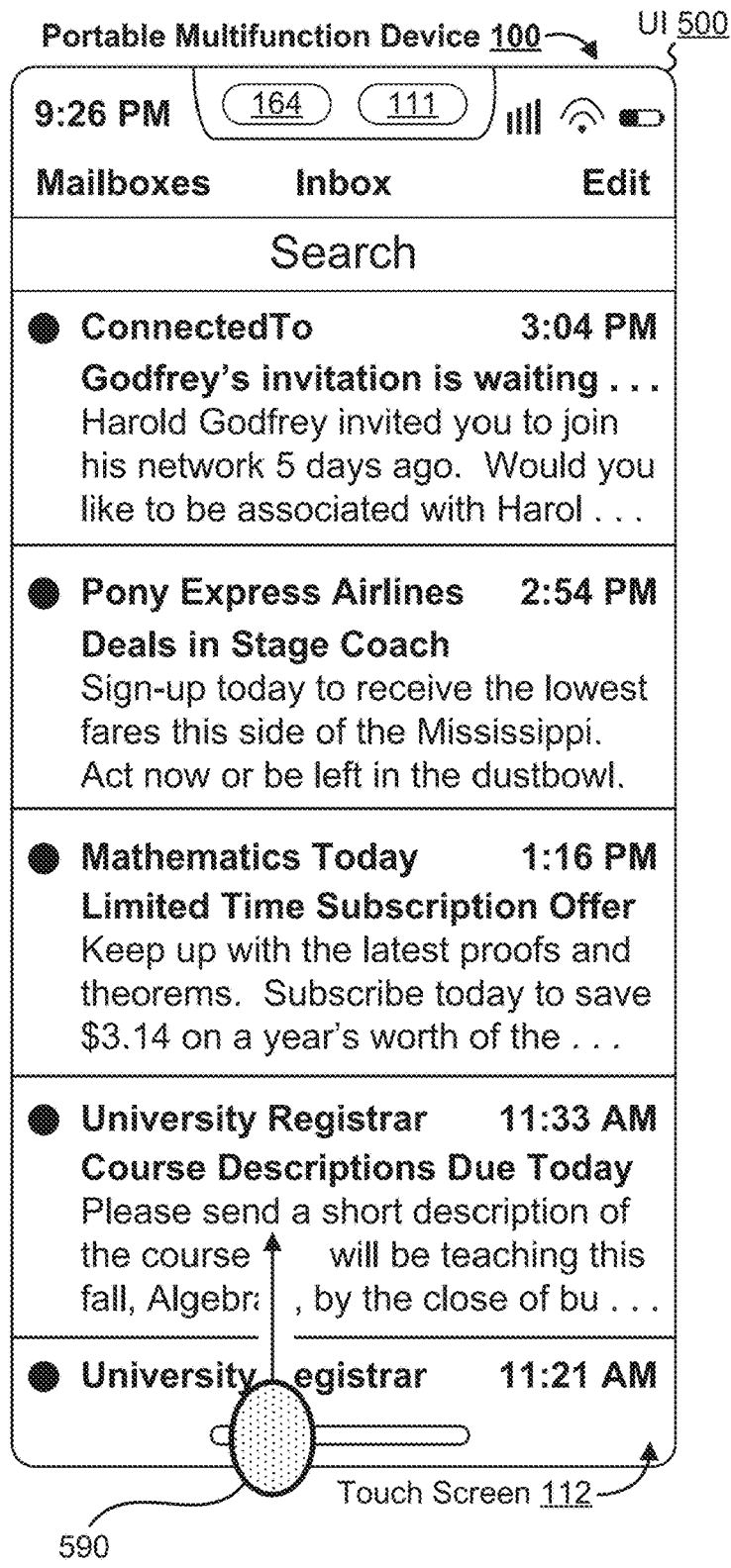
Figure 5A:
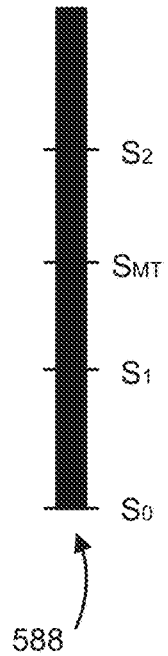
Figure 5A:
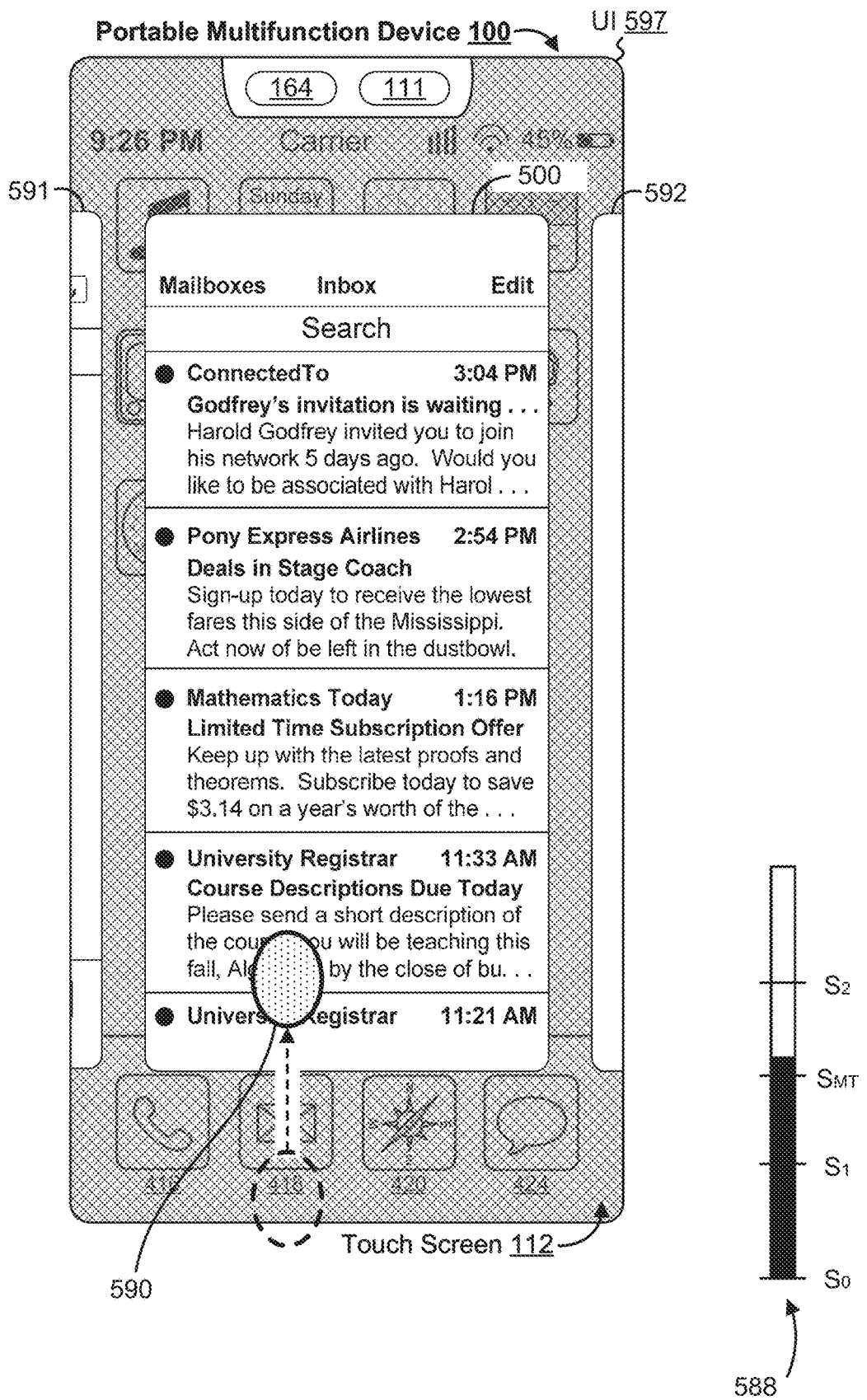
Figure 5A:
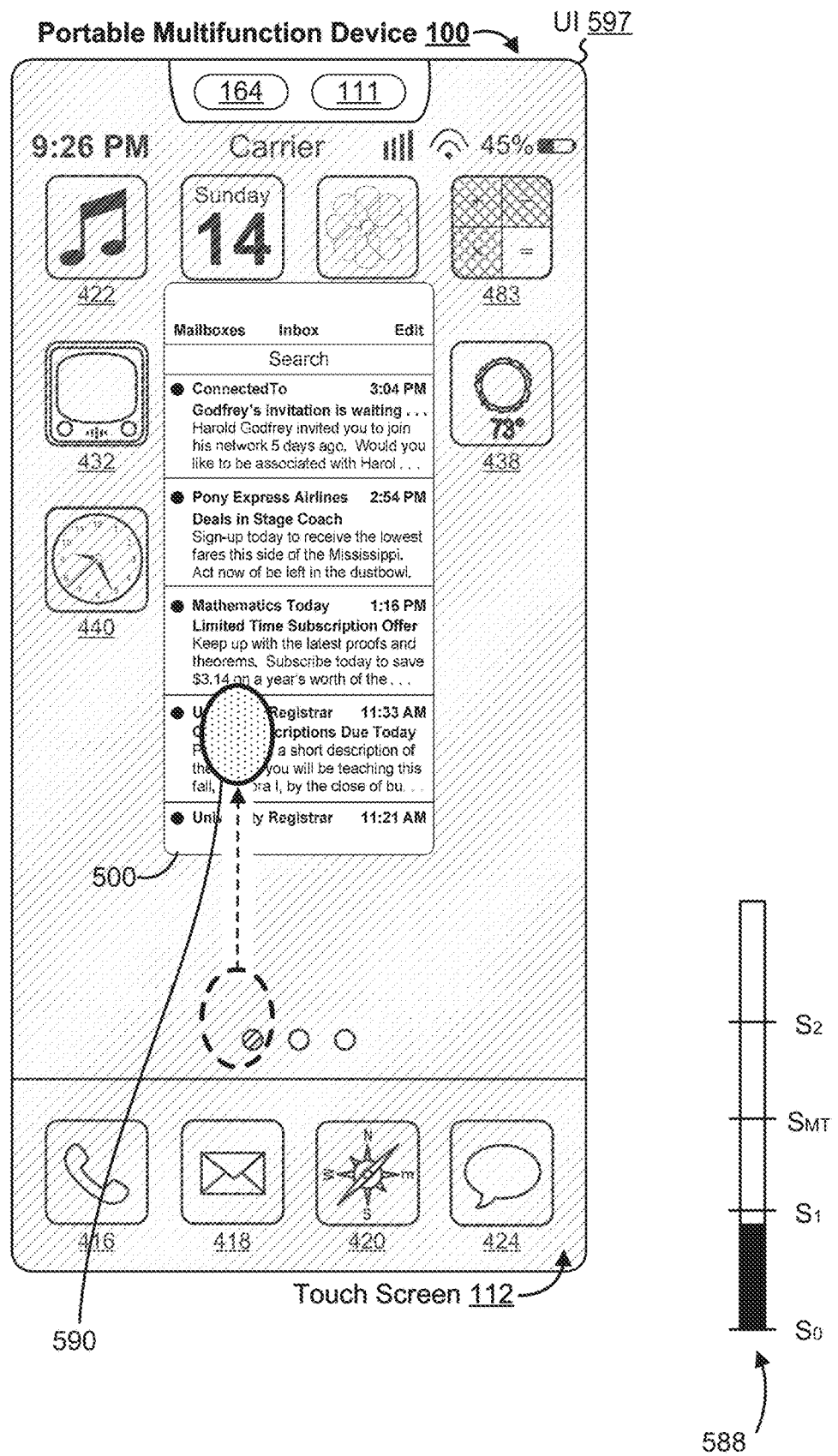
Figure 5A:
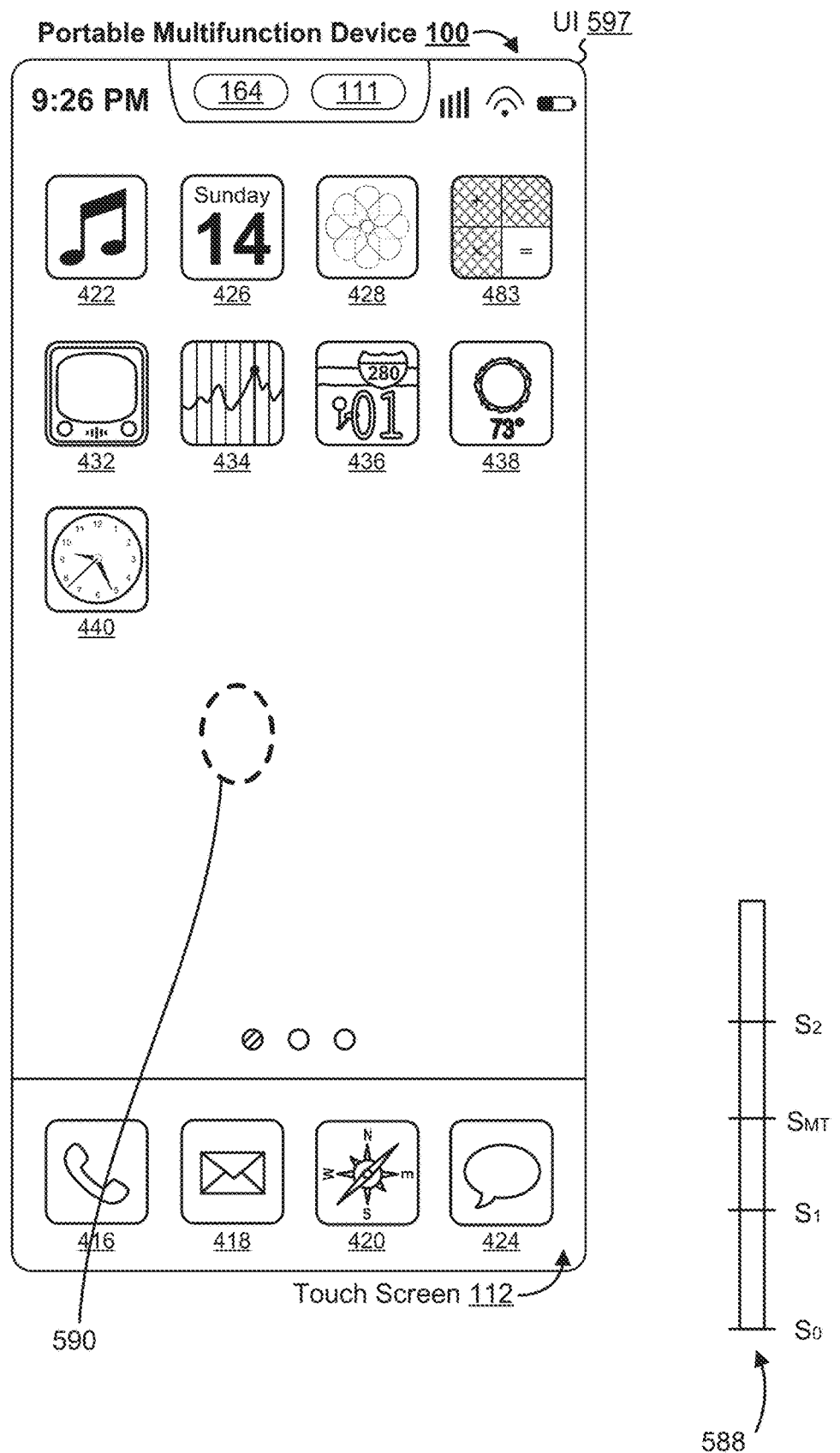
Figure 5A:
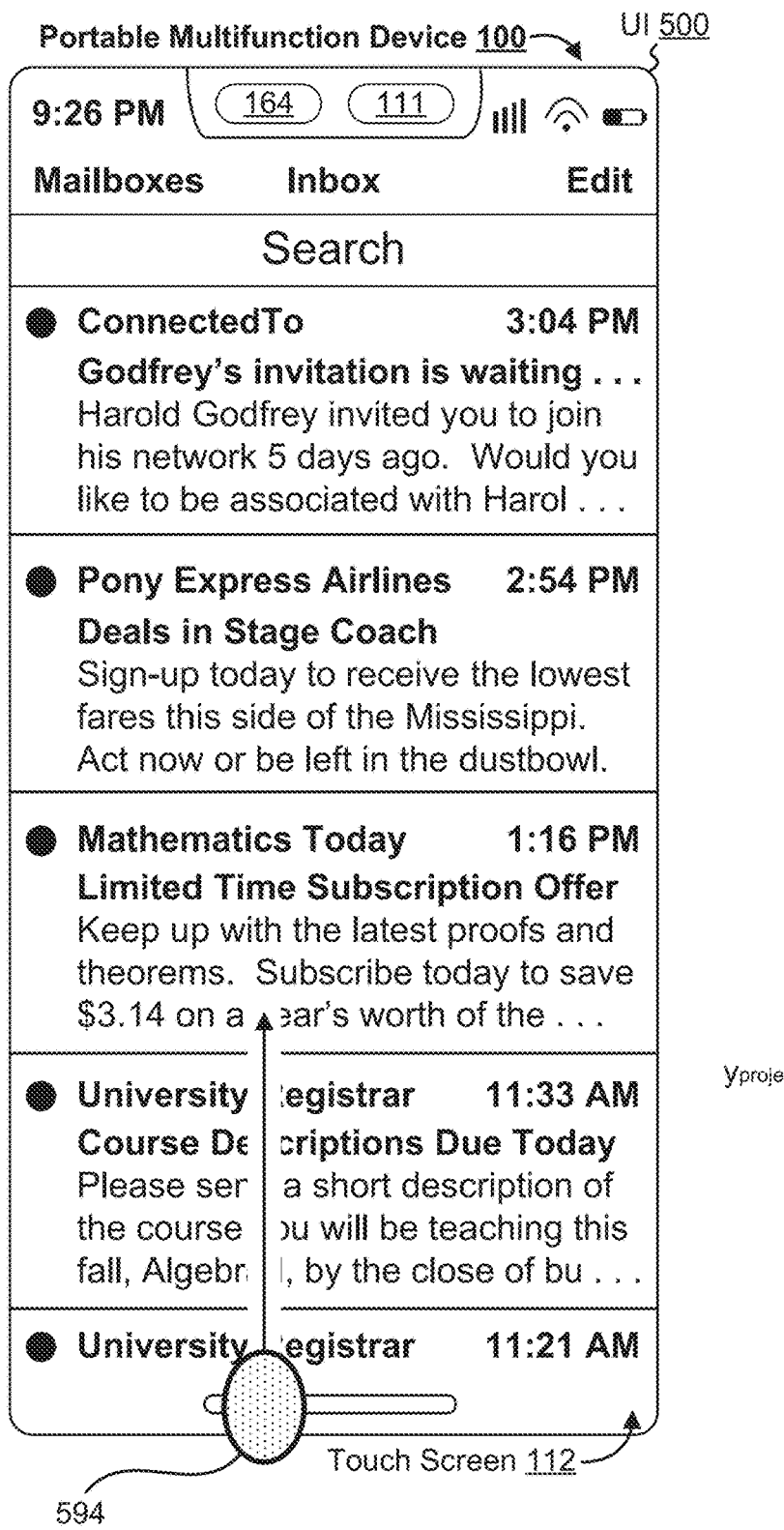
Figure 5A:
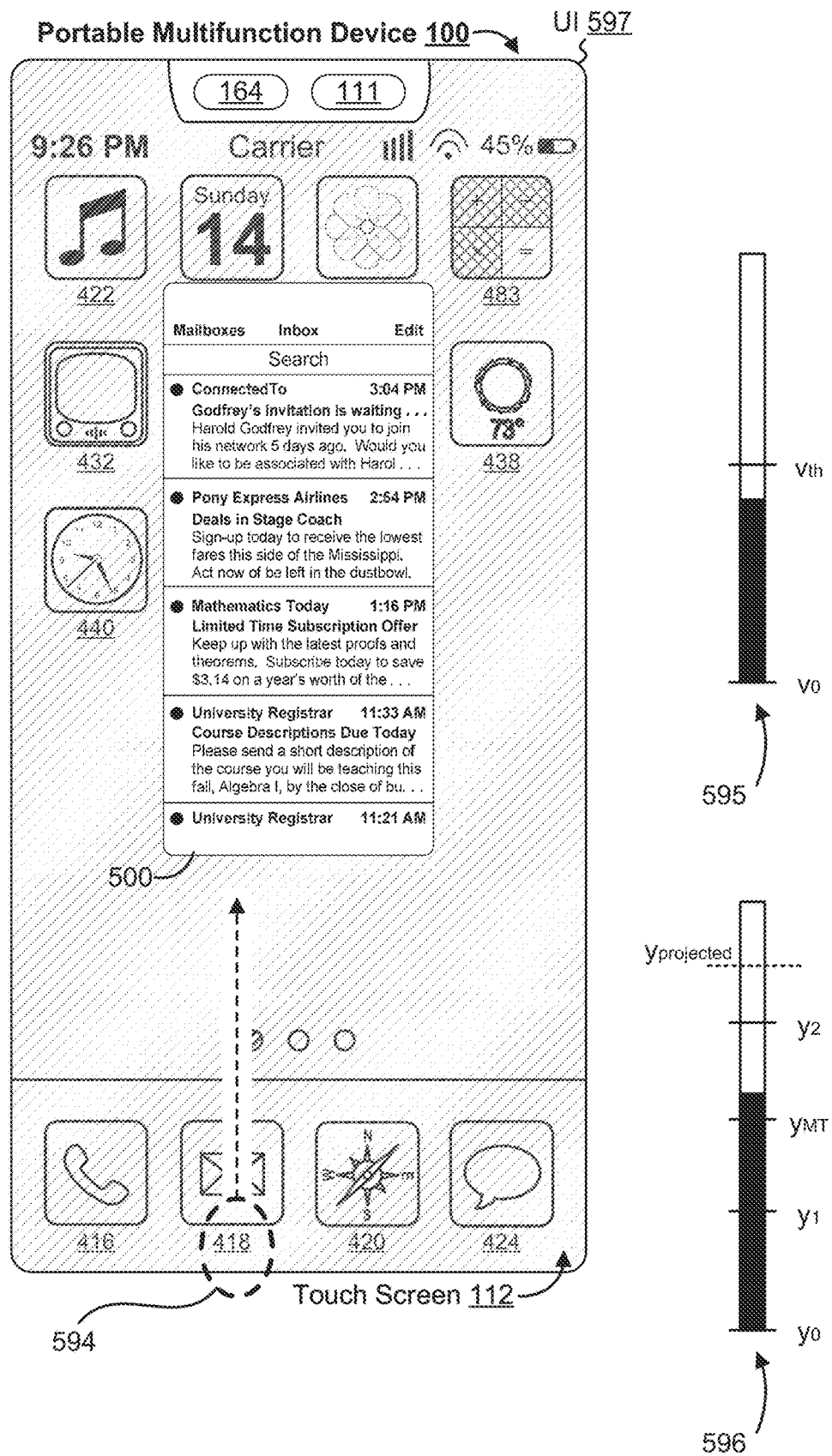
Figure 5A:
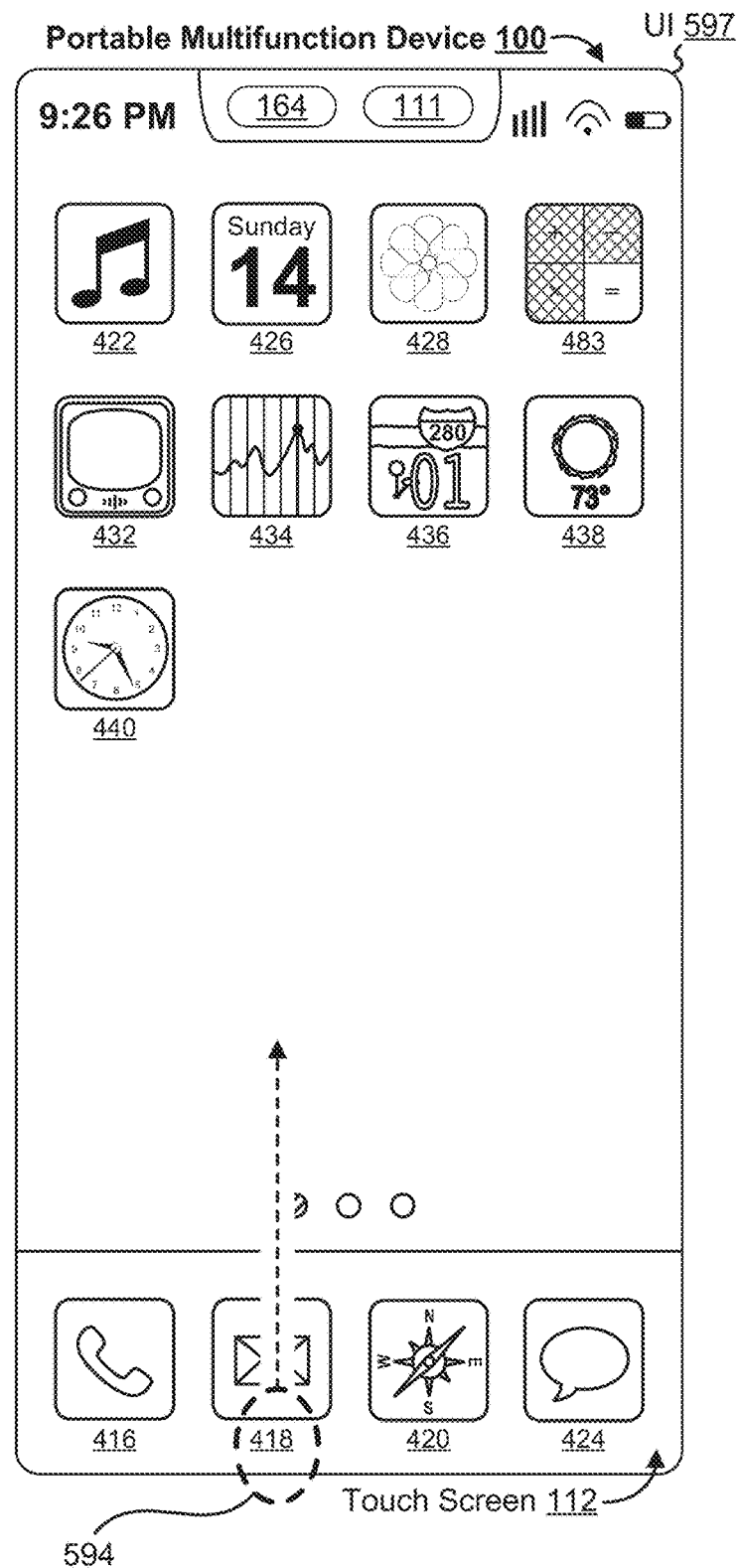
Figure 5A:
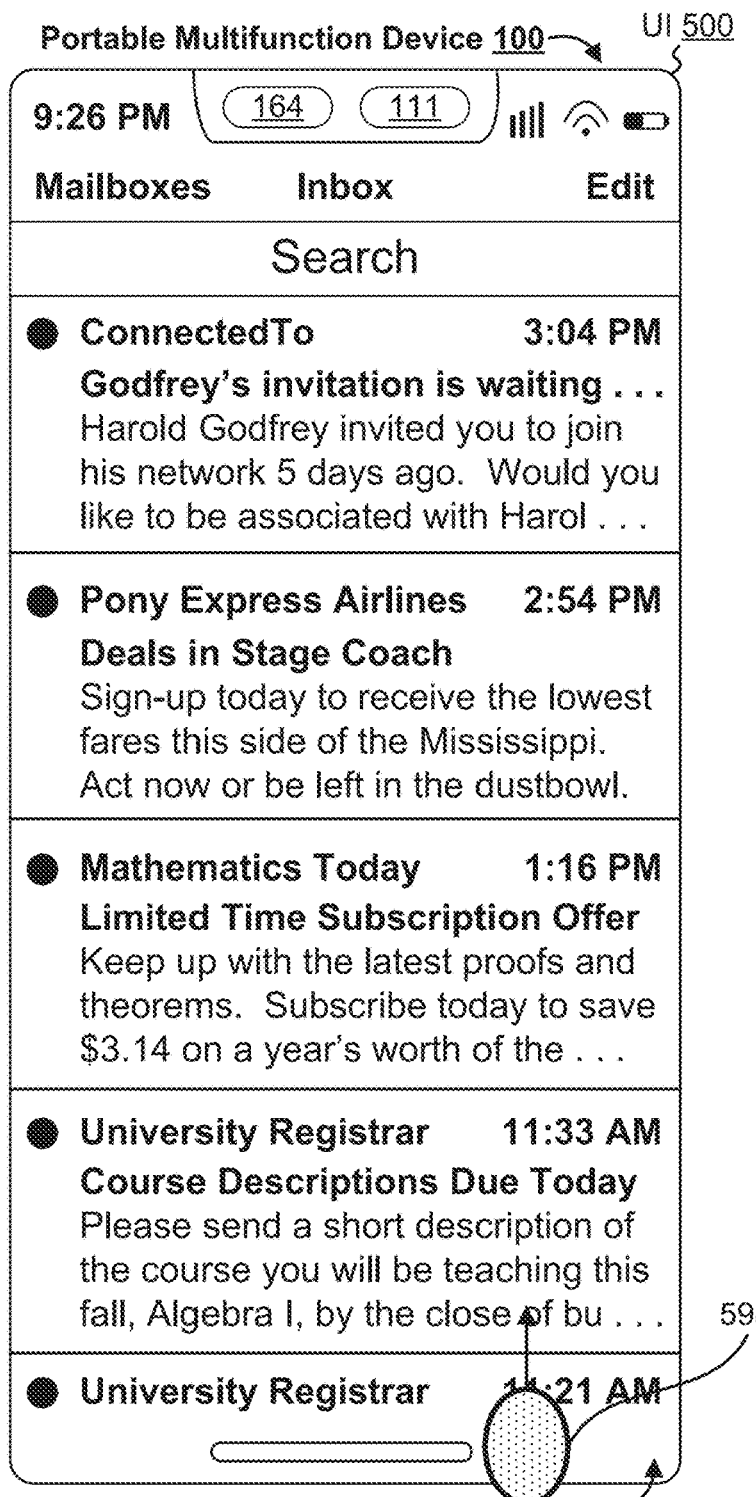
Figure 5A:
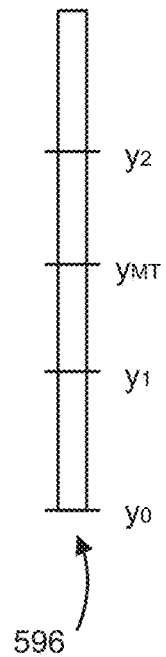
Figure 5A:
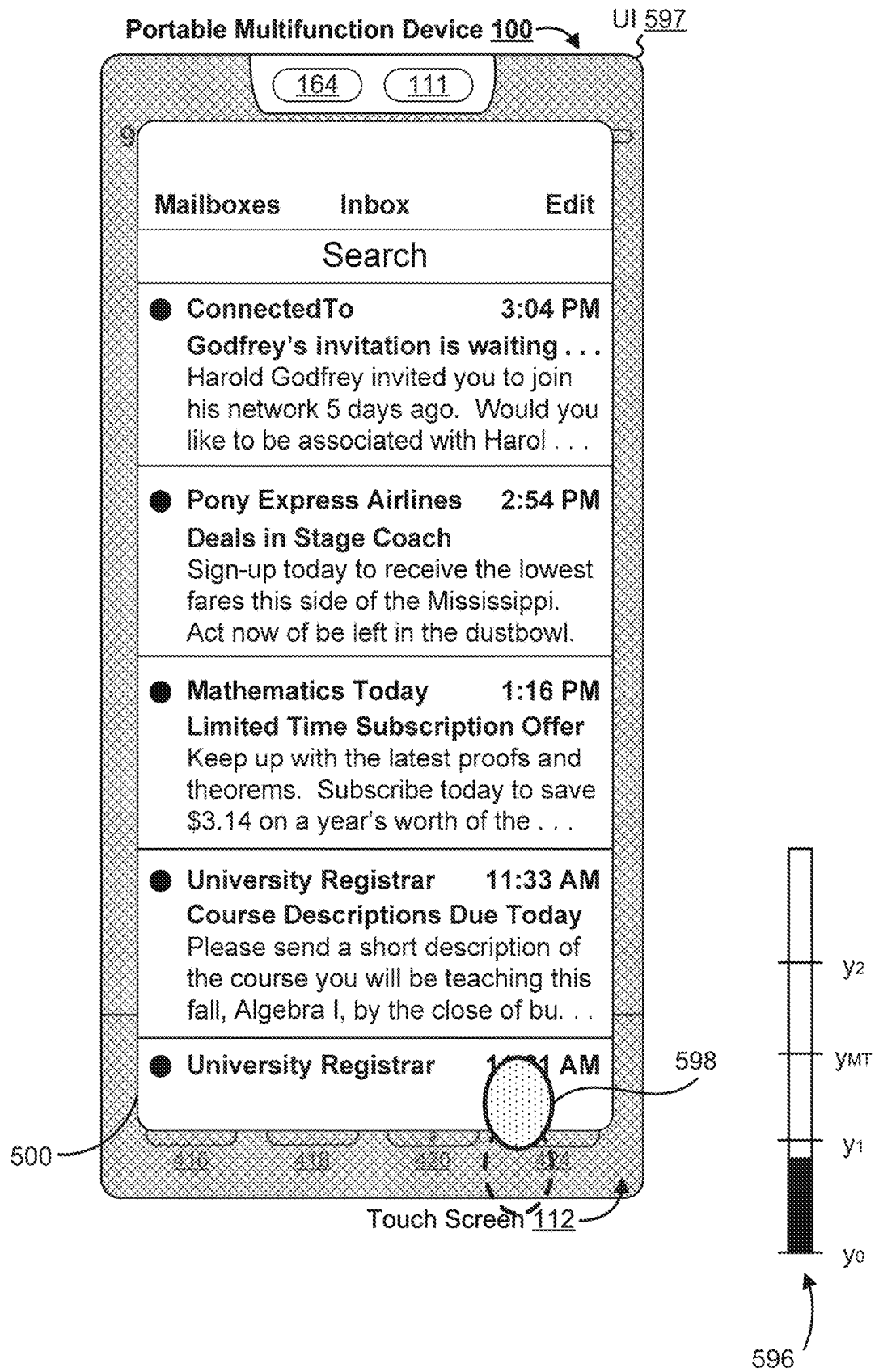
Figure 5A:
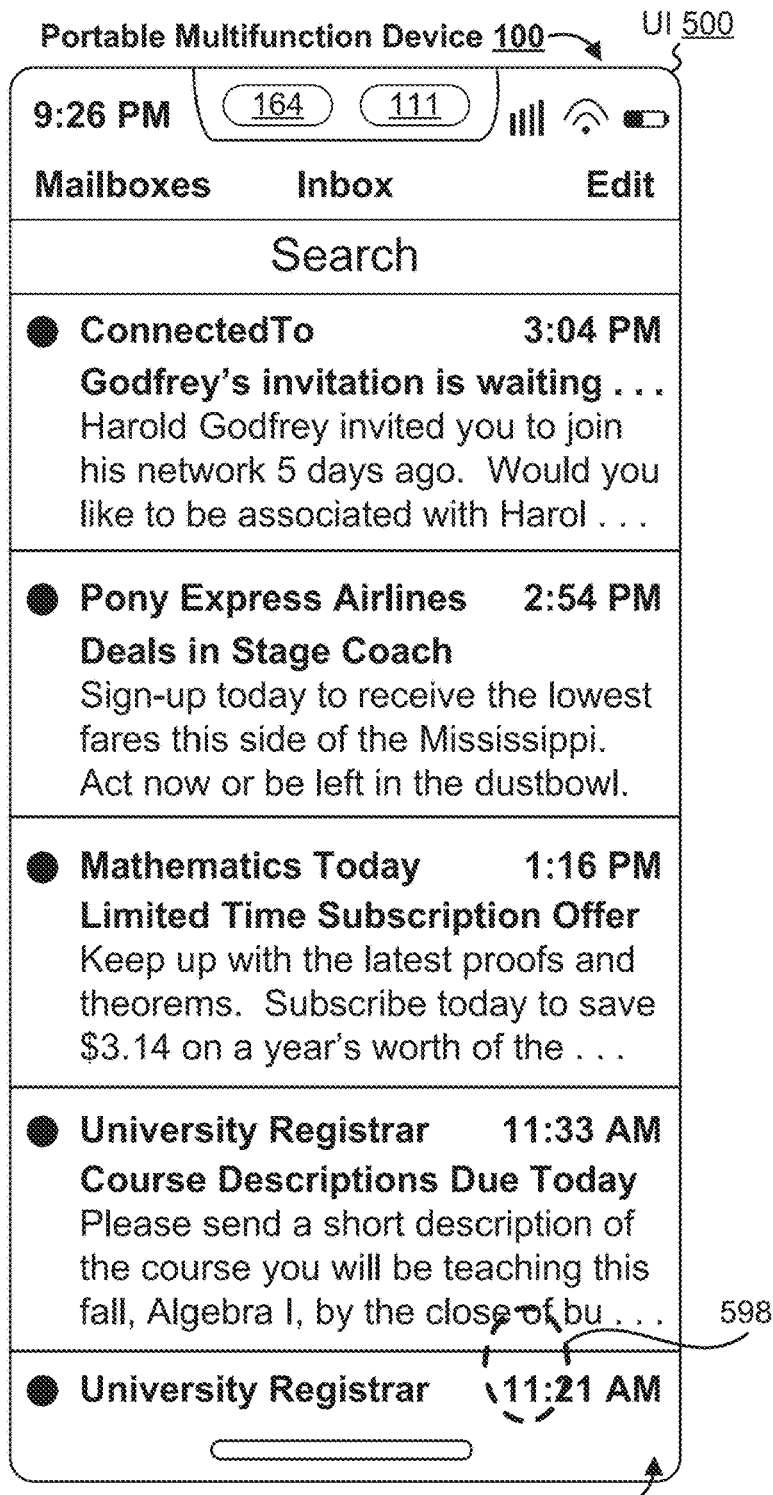
Figure 5A:
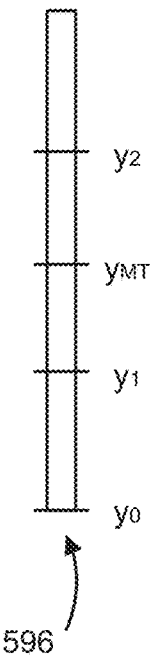
Figure 5A:
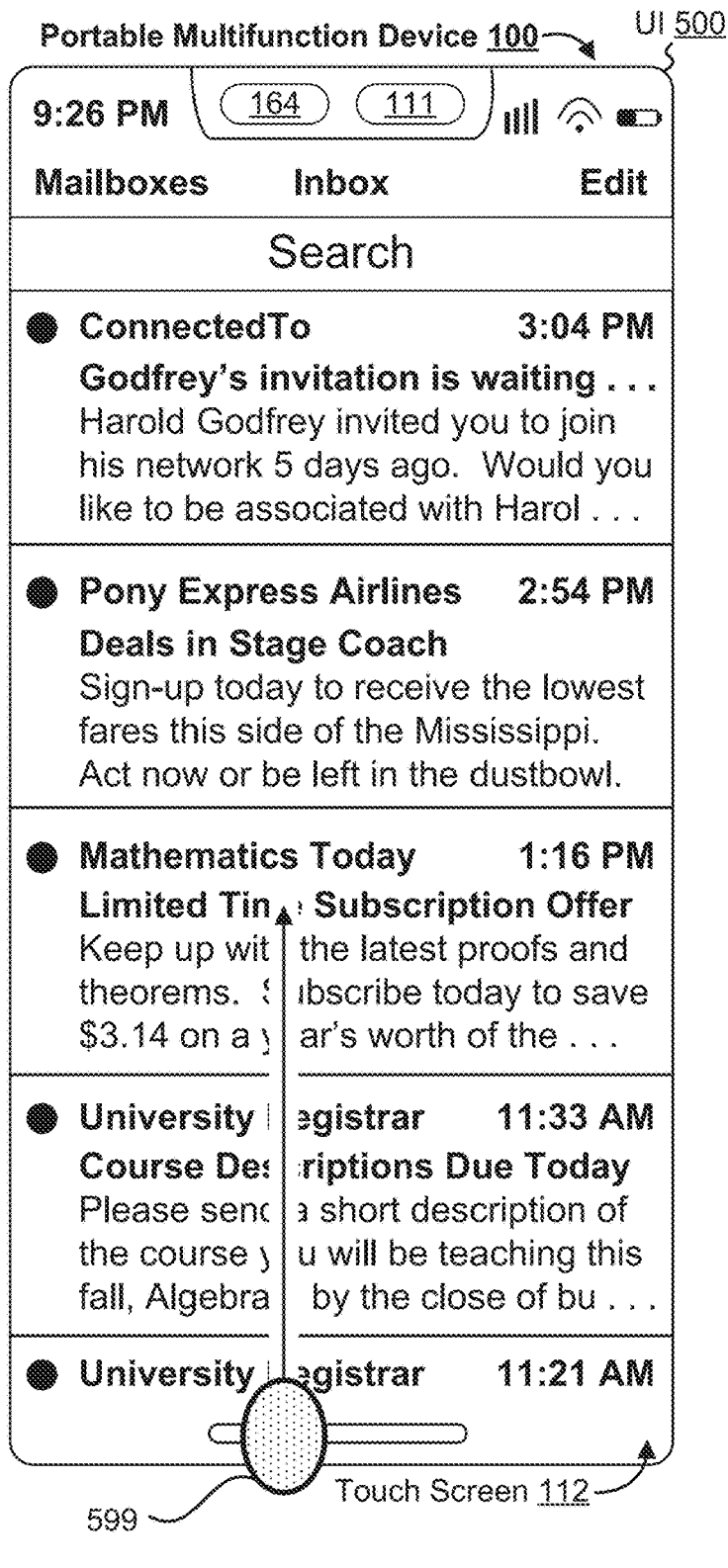
Figure 5A:
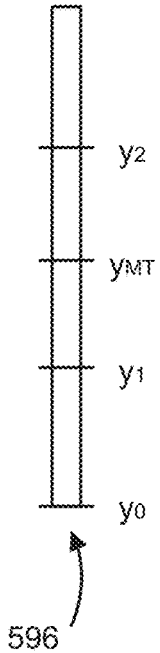
Figure 5A:
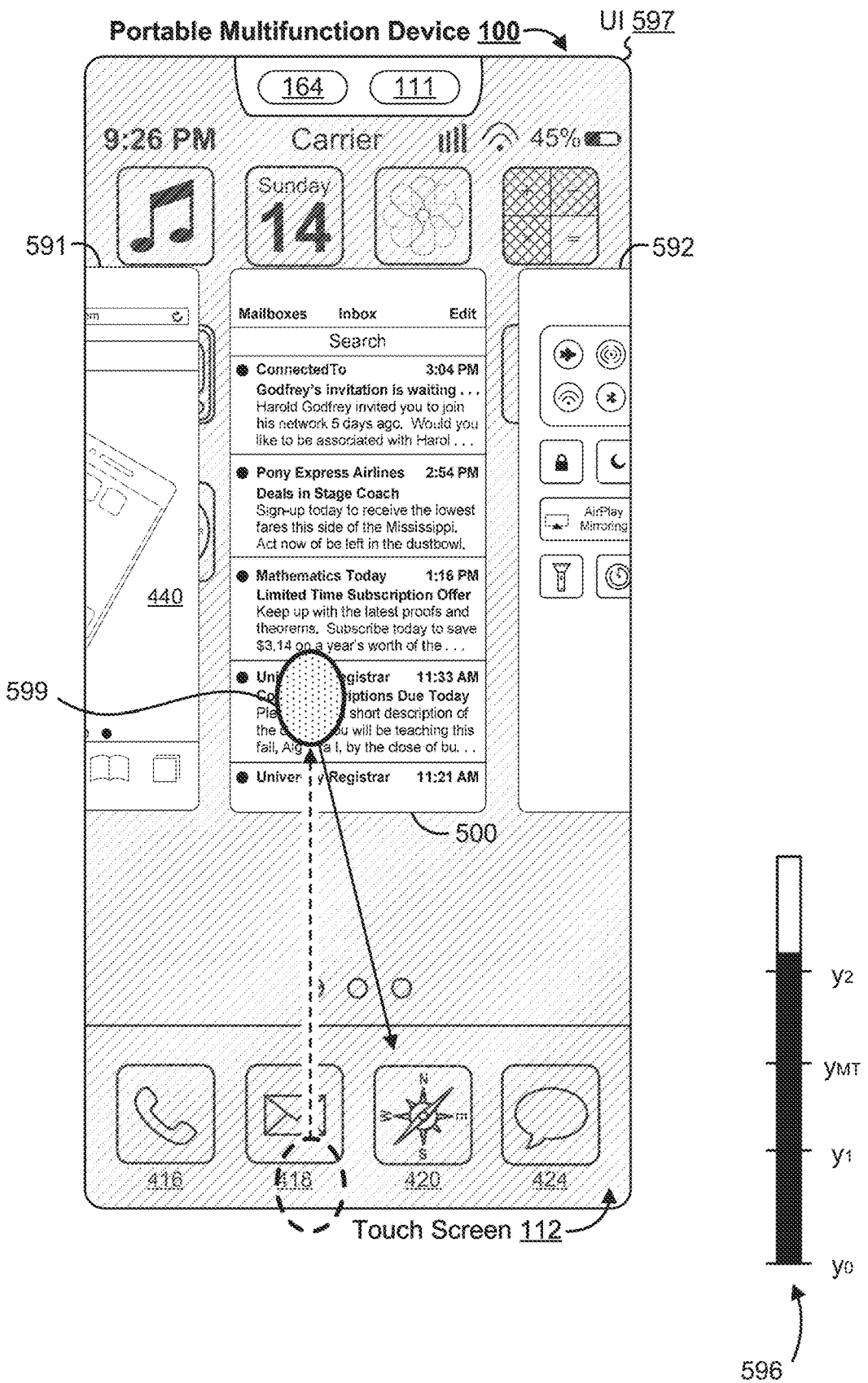
Figure 5A:
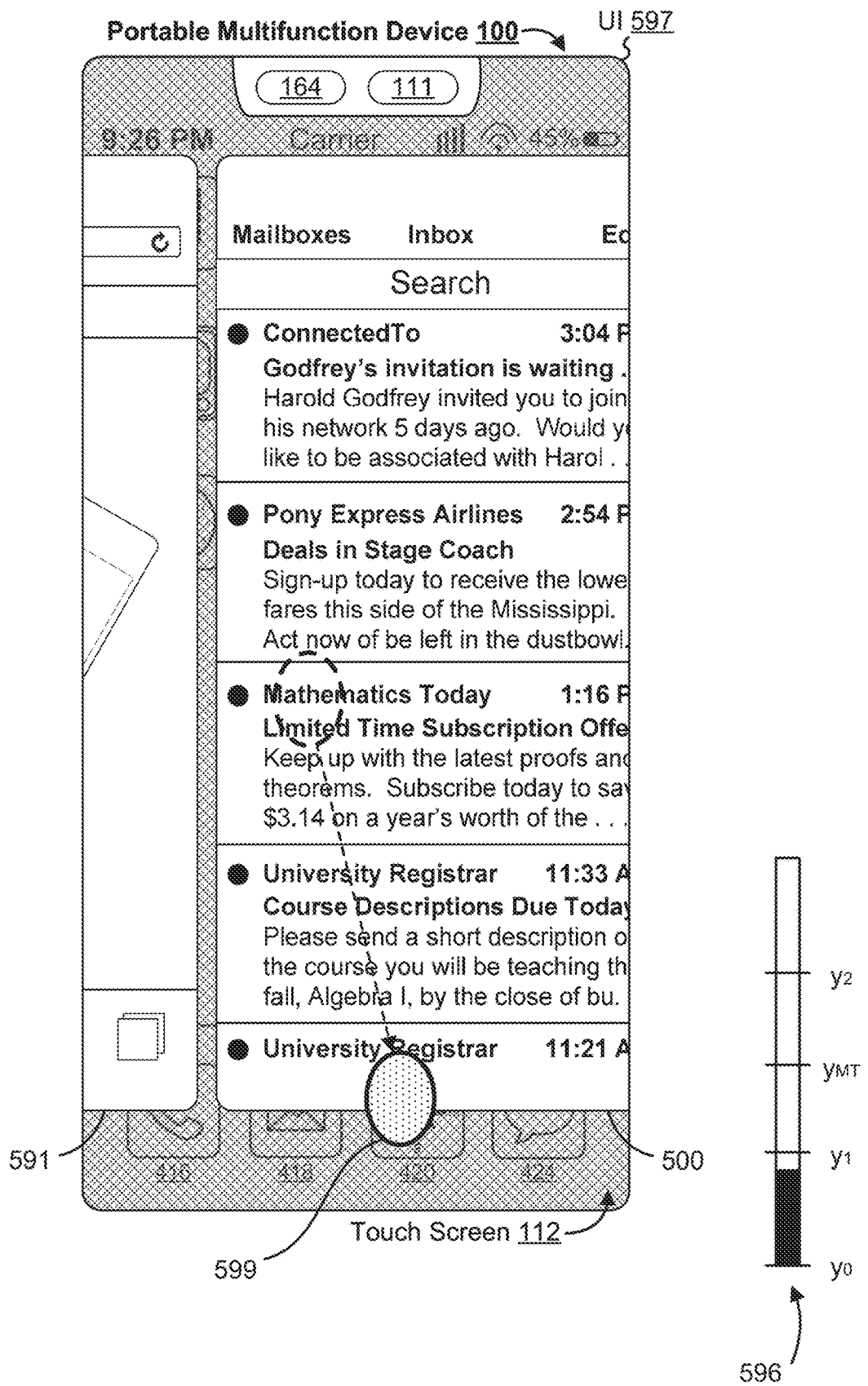
Figure 5A:
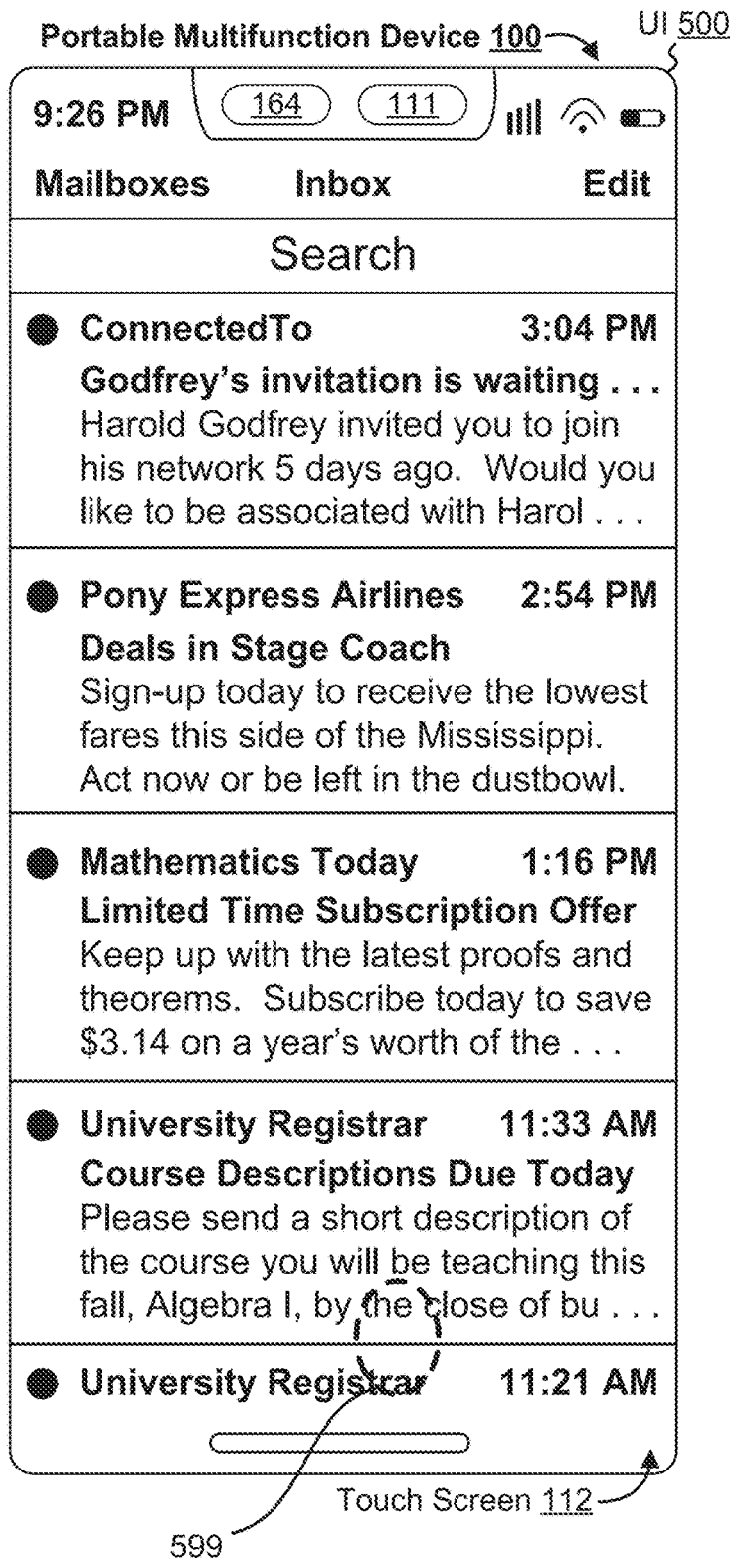
Figure 5A:
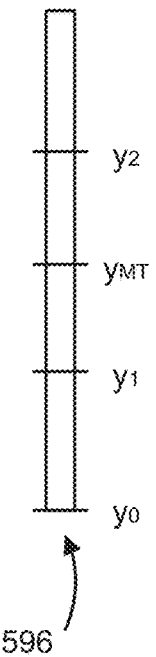
Figure 5A:
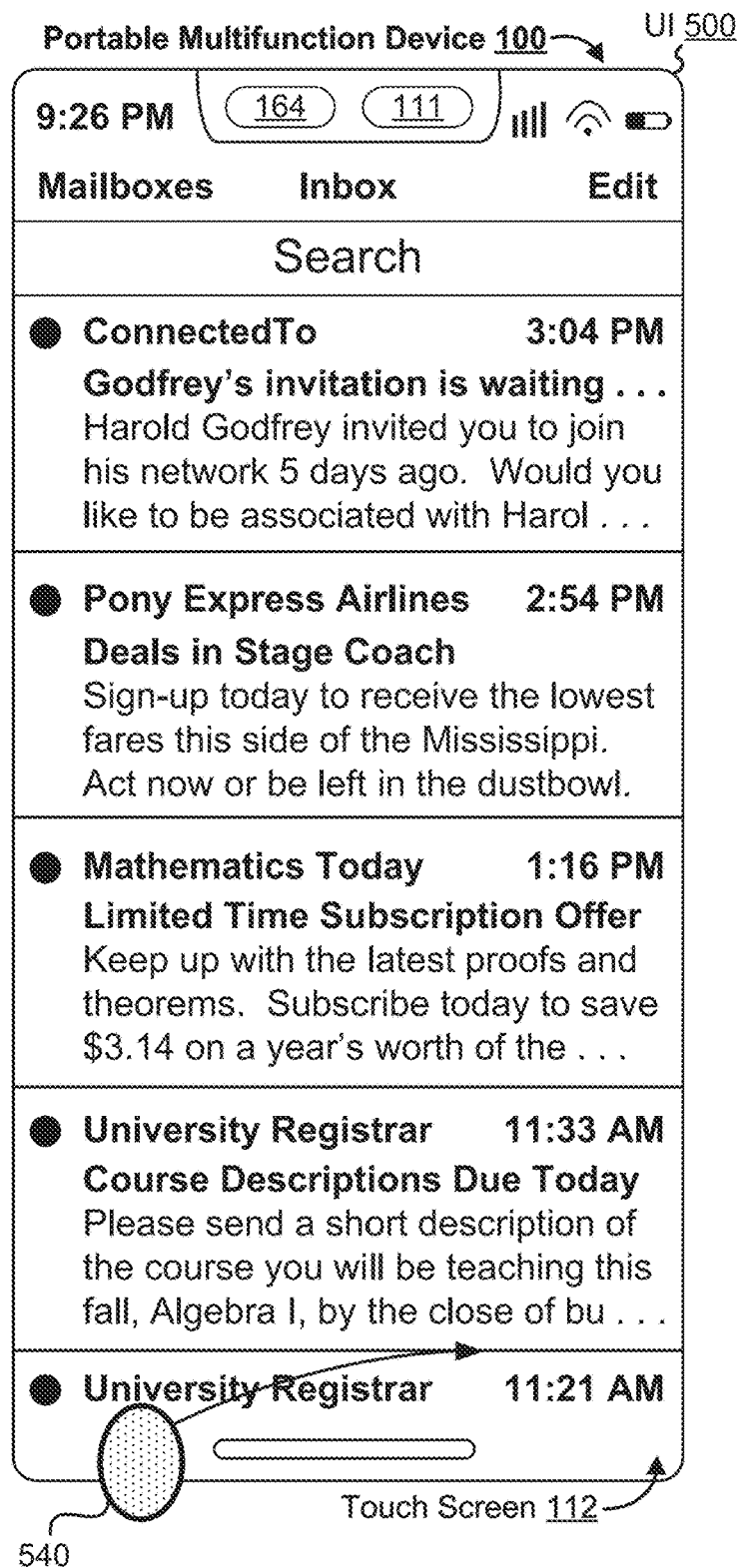
Figure 5A:
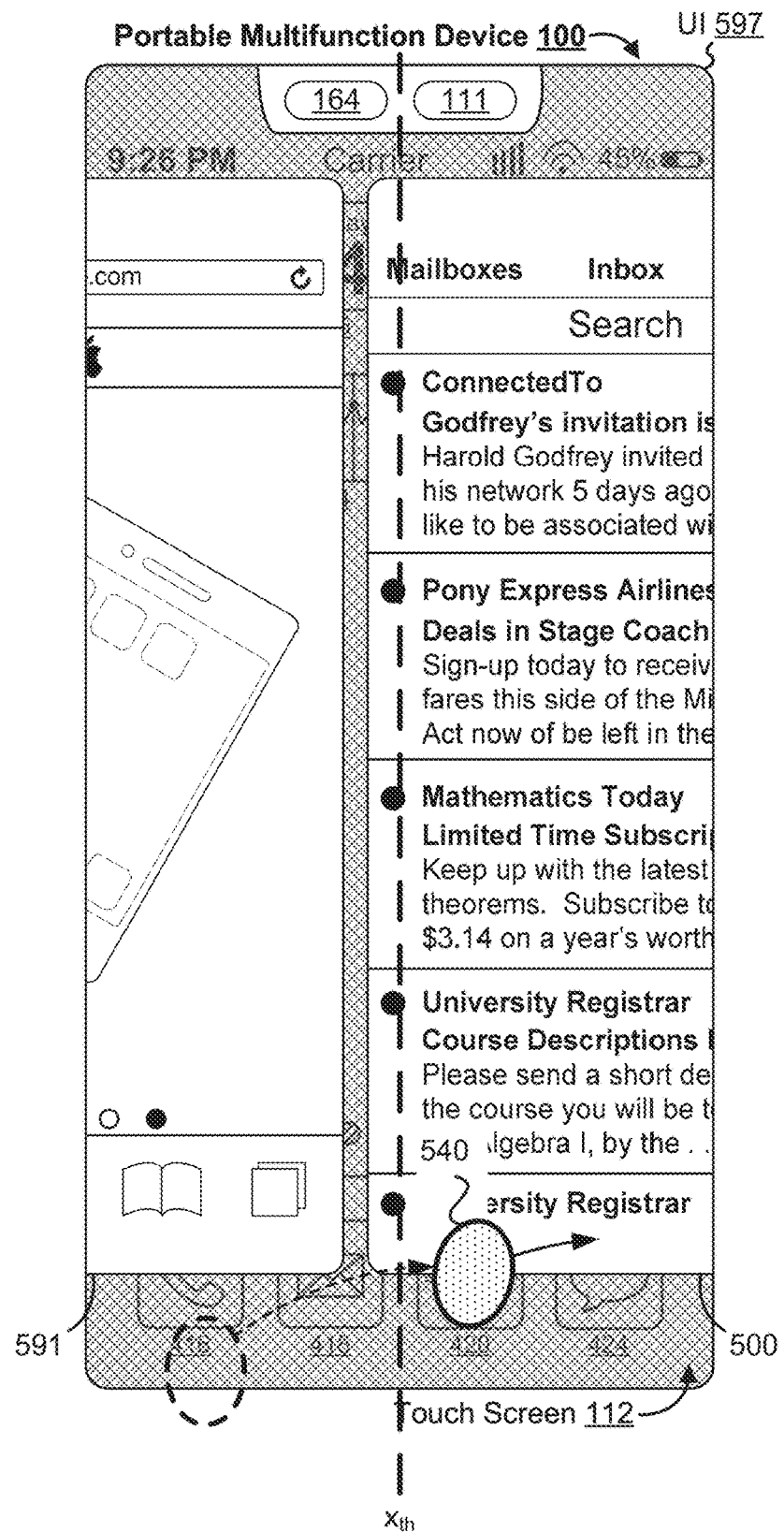
Figure 5A:
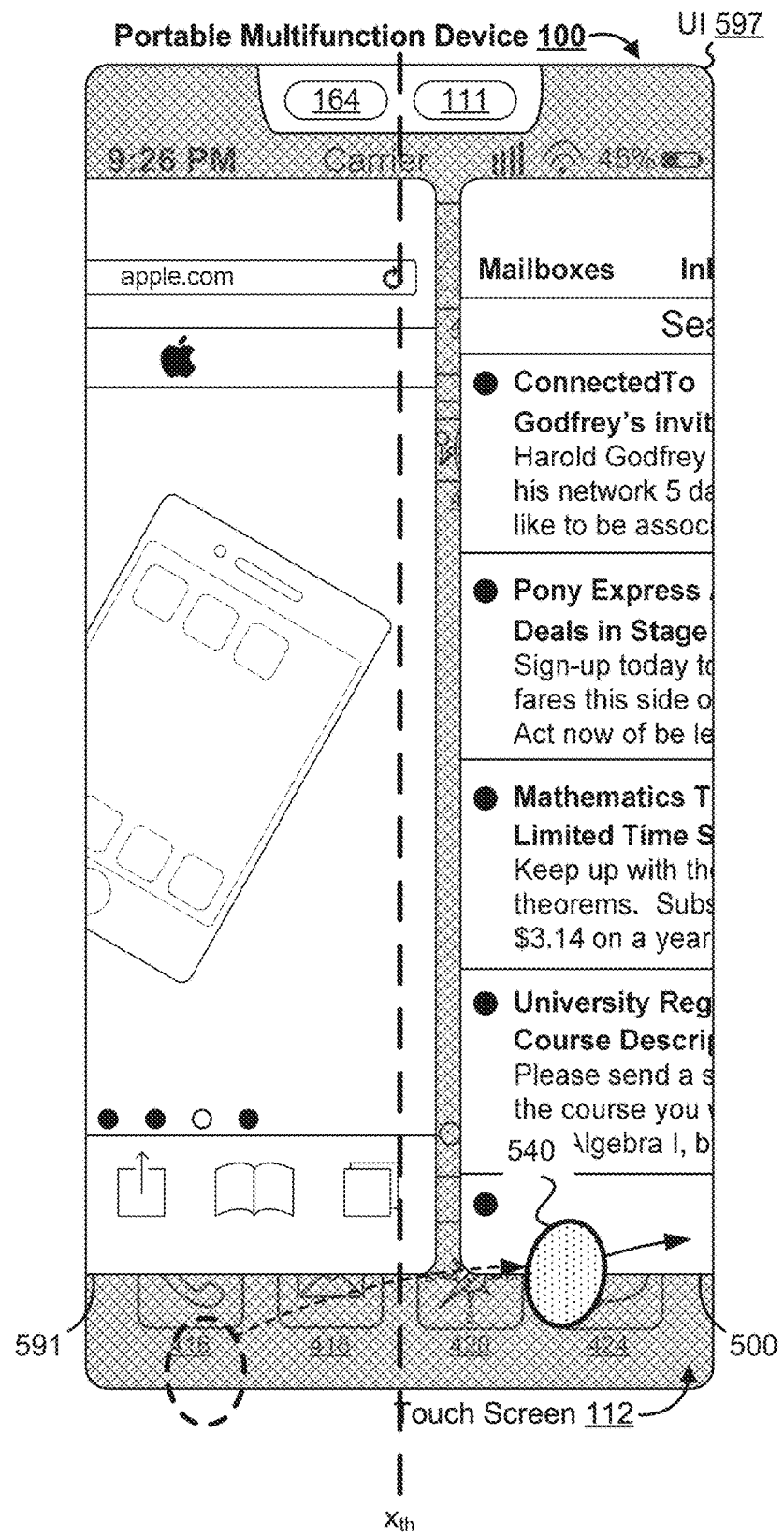
Figure 5A:
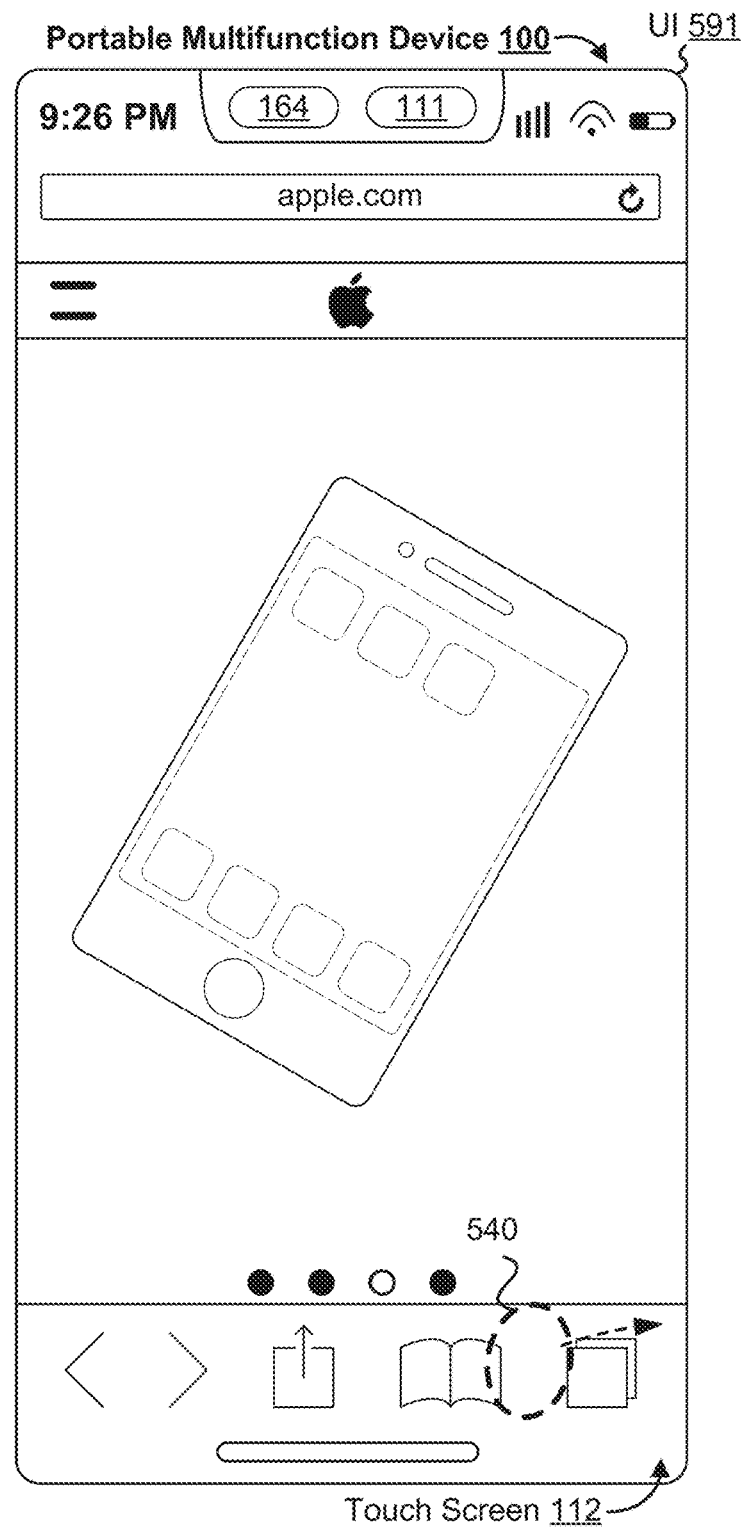
Figure 5A:
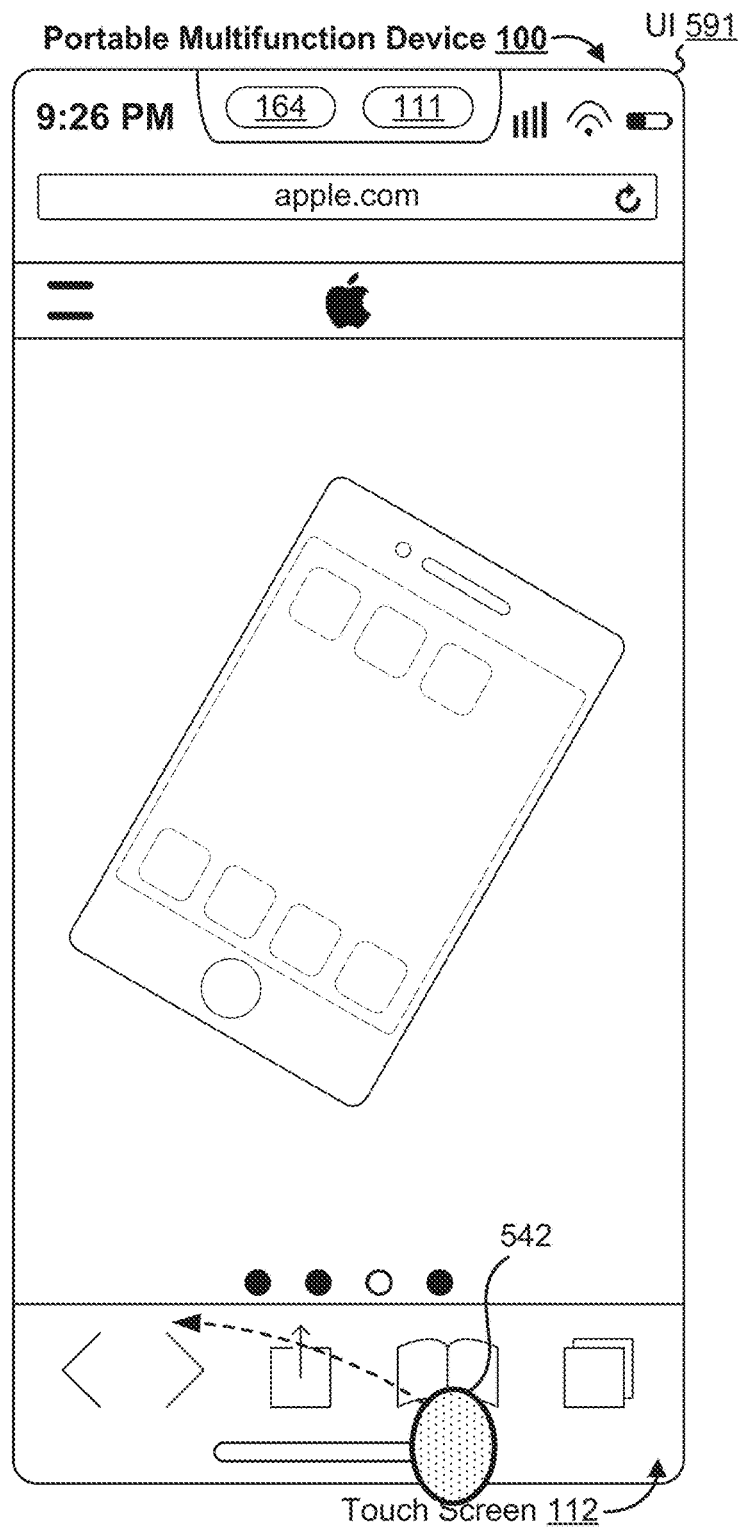
Figure 5A:
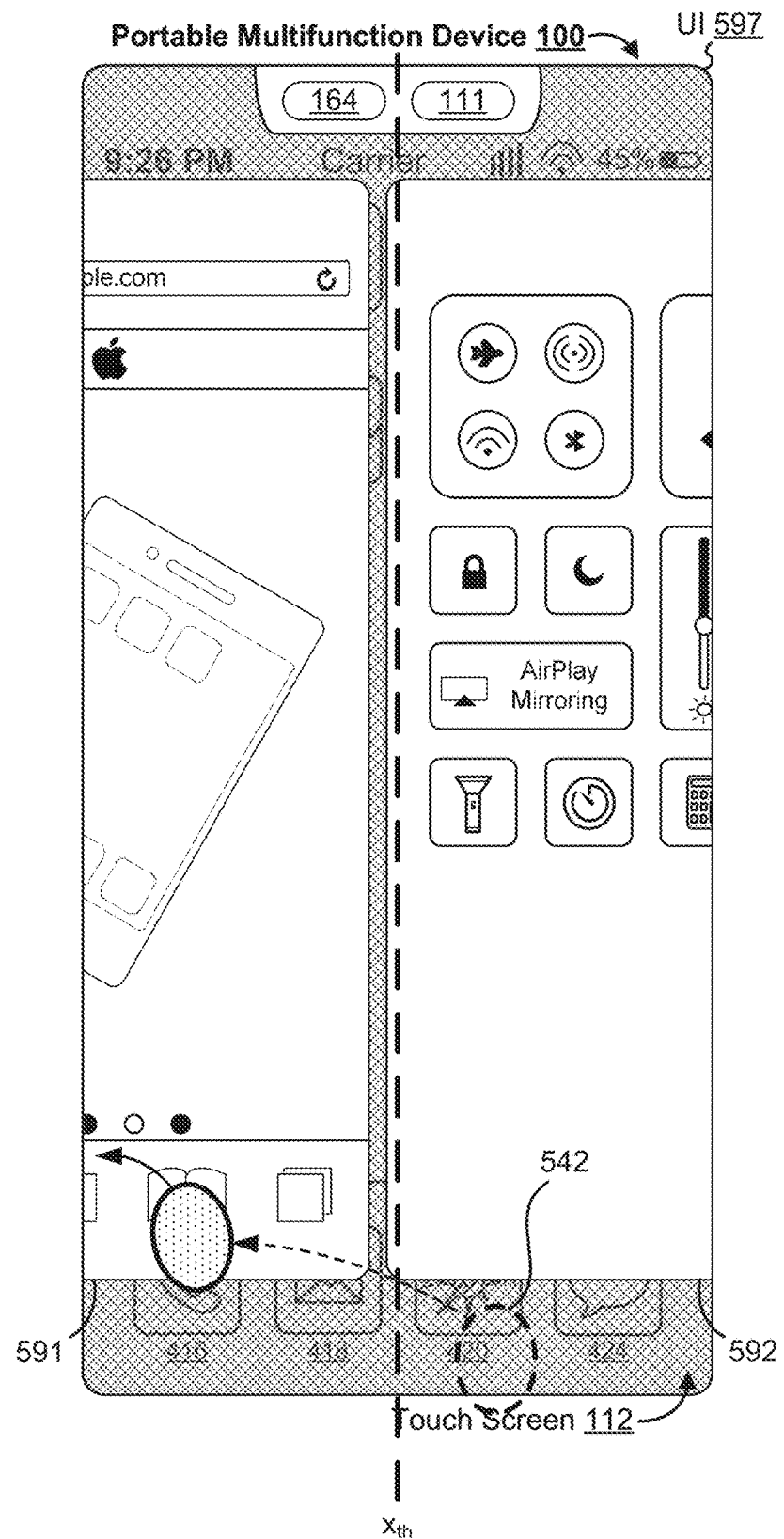
Figure 5B:
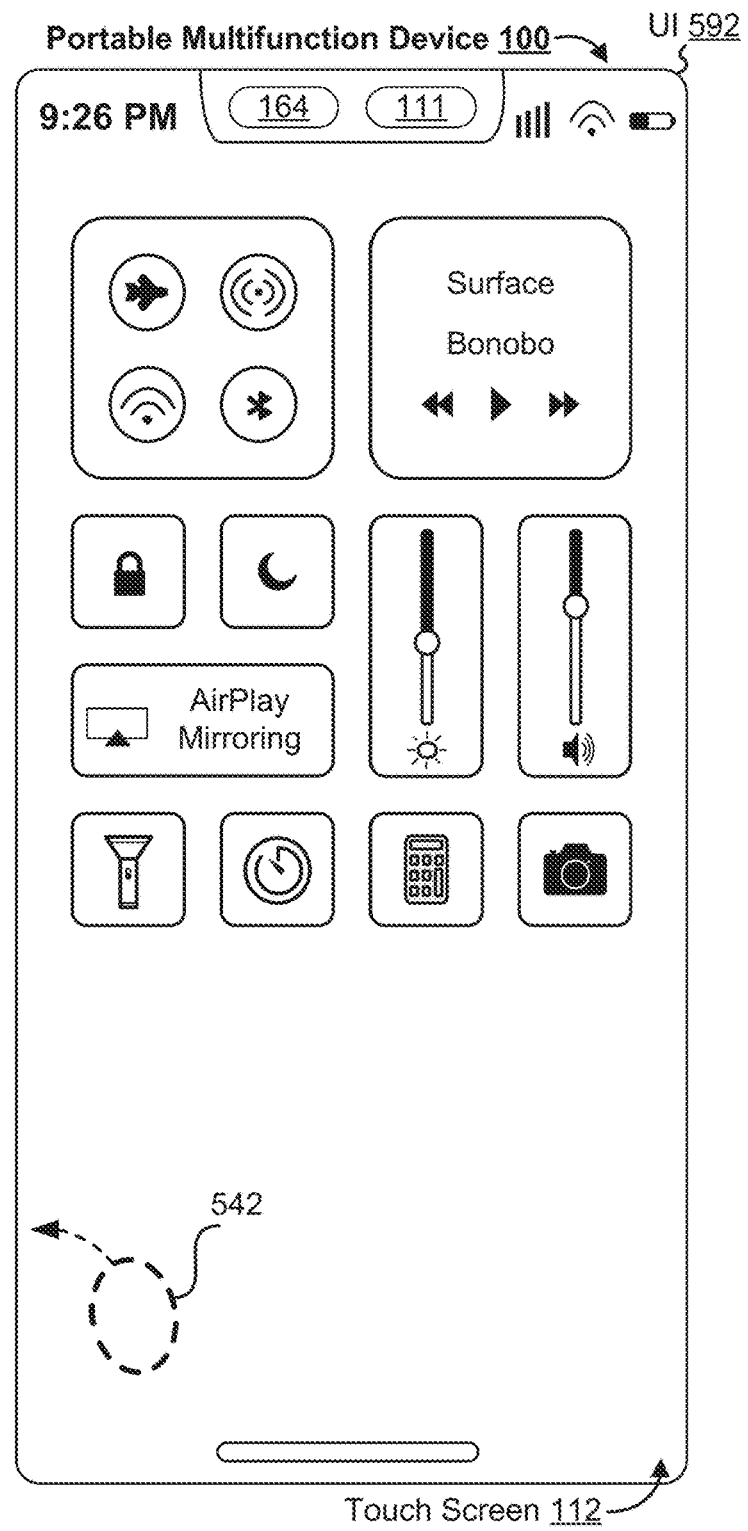
Figure 6A:
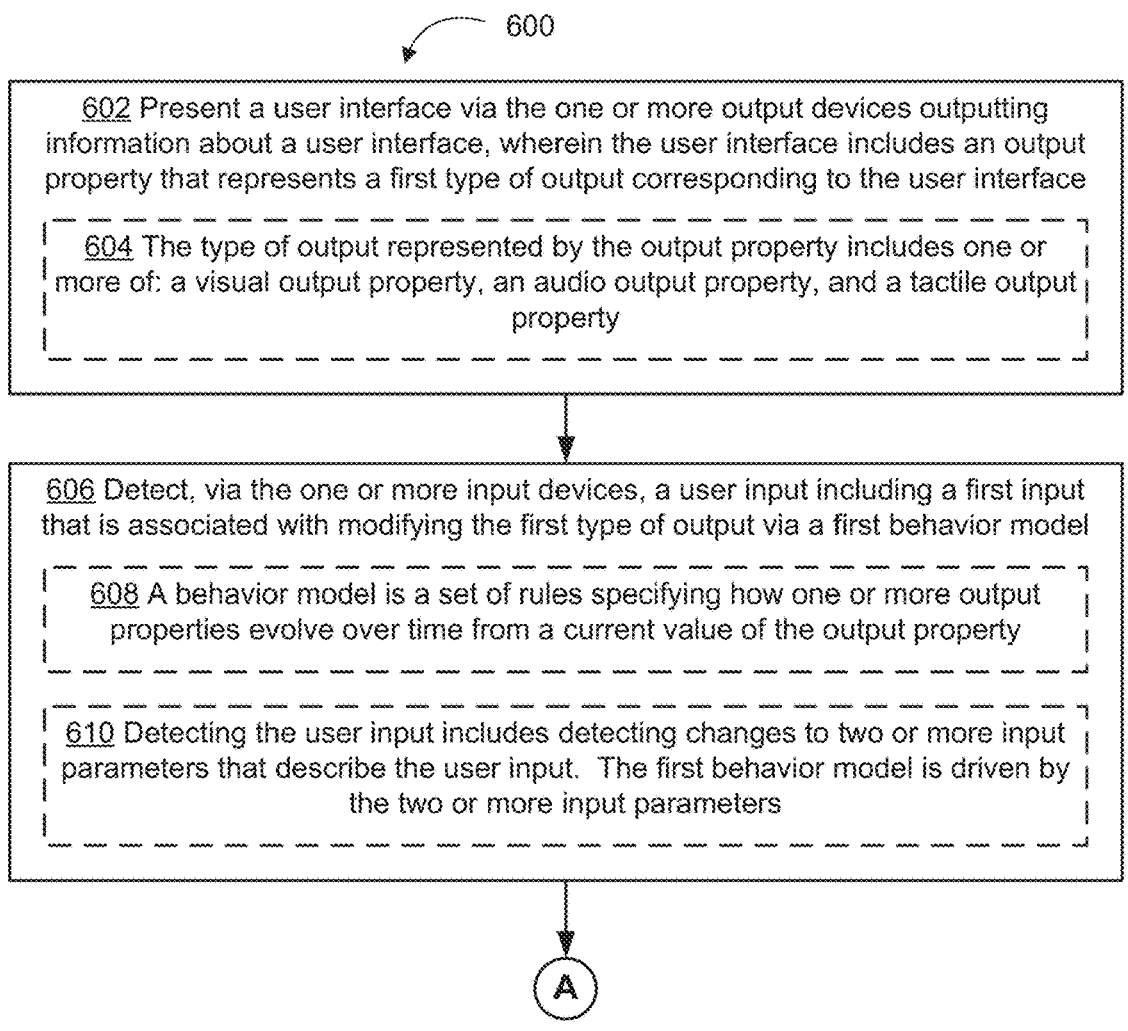
Figure 6B:
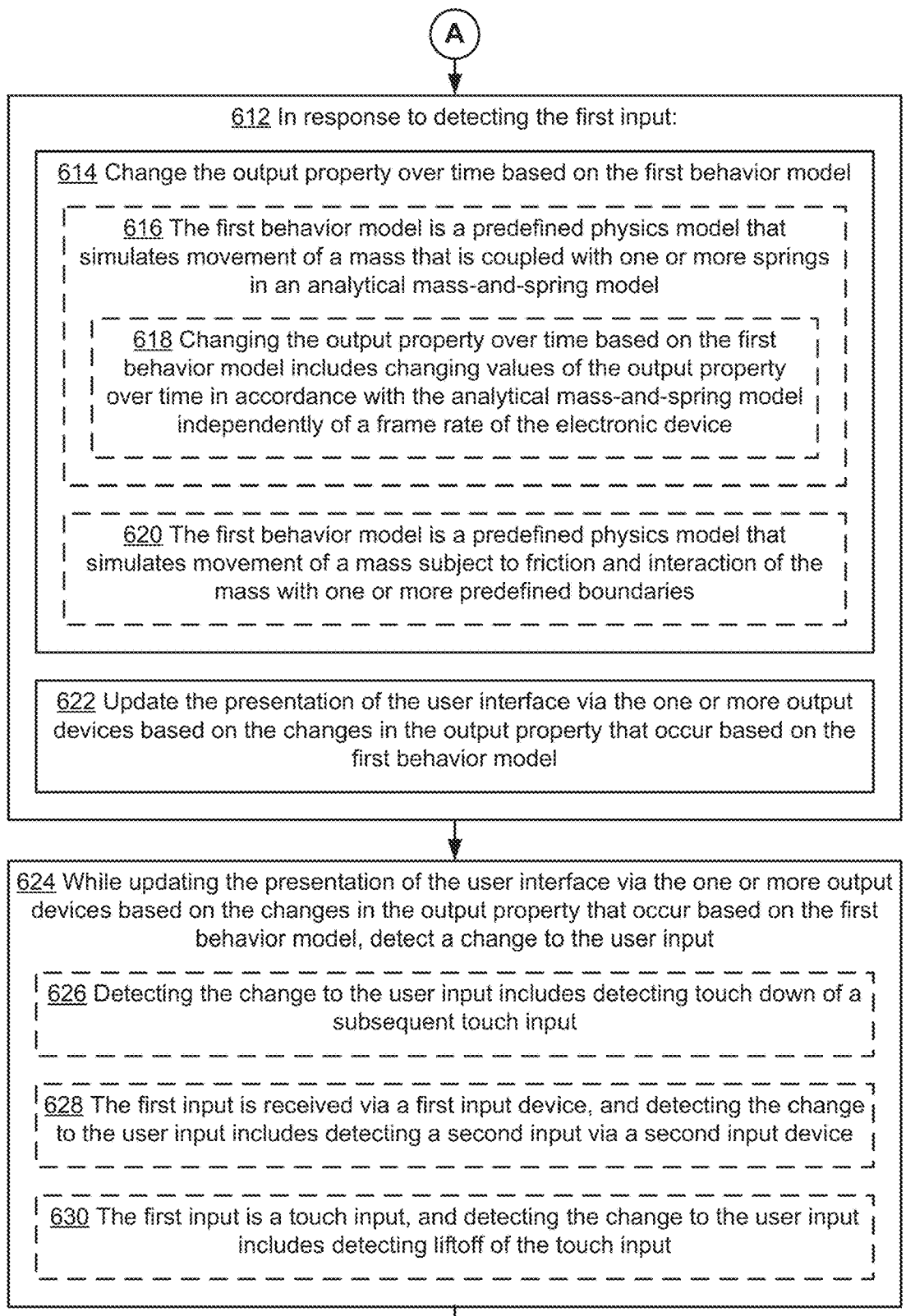

FIGS. 5Z-5AB are block diagrams illustrating modification of output properties of a user interface using behavior models in accordance with some embodiments. While a user input is detected (during touch down of the user input), the behavior models that are used to modify the output properties are driven by input parameters that describe the user input. After device 100 ceases to detect the user input (after touch up, also called liftoff, of the user input), device 100 modifies the output properties using the behavior models based on previously-determined information of the output properties (e.g., as described above with reference to FIGS. 5A-5V).

FIG. 5Z illustrates modification of x-position and y-position of a user interface element (e.g., scrolling a list of objects in the user interface, as described above with reference to FIGS. 5A-5N, or panning a user interface, such as a webpage in a web browser). In FIG. 5Z, in response to a contact at a location corresponding to a user interface element, during touch down of the contact, x-position 552 of the user interface element is modified via direct manipulation (e.g., using direct manipulation behavior model 548) by x-position 550 of the contact, and y-position 553 of the user interface element is modified via direct manipulation (e.g., using direct manipulation behavior model 549) by y-position 551 of the contact.

After touch up of the contact, x-position 552 and y-position 553 of the user interface element are no longer modified via direct manipulation by the contact (e.g., because the contact has been removed). Instead, x-position 552 of the user interface element is modified based on friction/bounce model 554 (e.g., a first instance of a friction/bounce model), and y-position 553 of the user interface element is modified based on friction/bounce model 555 (e.g., a second instance of the friction/bounce model, optionally with one or more different parameters such as coefficient of friction). The operation of friction/bounce models is described in more detail herein, for example with reference to FIGS. 5D-5H and 5AC, and methods 600 and 800.

FIG. 5AA illustrates modification of x-position, y-position, and scale of a user interface element (e.g., moving a user interface card, as described below with reference to FIGS. 5AD-5AZ). In FIG. 5AA, in response to a contact at a location corresponding to a user interface element, during touch down of the contact, x-position 561 of the user interface element is modified using mass/spring model 558a, which is driven by x-position 556 of the contact. Y-position 562 of the user interface element is modified using mass/spring model 559a, which is driven by y-position 557 of the contact. Scale 563 of the user interface element is modified using mass/spring model 560a, which also driven by y-position 557 of the contact. As shown in FIG. 5AA, a respective input parameter (e.g., y-position 557) can drive multiple behavior models (e.g., mass/spring model 559a and mass/spring model 560a). In some embodiments, mass/spring models 558a, 559a, and 560a share one or more parameters (e.g., spring constants and/or damping coefficients). In some embodiments, mass/spring models 558a, 559a, and 560a have one or more different parameters (e.g., different spring constants and/or different damping coefficients). In some embodiments, one or more of mass/spring model 558a, 559a, and 560a are instances of a same mass/spring behavior model. In some embodiments, different instances of a given mass/spring behavior model have different parameters (e.g., different spring constants and/or different damping coefficients).

After touch up of the contact, the behavior models modifying x-position 561, y-position 562, and scale 563 of the user interface element are no longer driven by the x-position and y-position of the contact (e.g., because the contact has been removed). Instead, x-position 561, y-position 562, and scale 563 of the user interface element are modified based on mass/spring models 558b, 559b, and 560b, respectively. In some embodiments, x-position 561, y-position 562, and scale 563 continue to be modified based on mass/spring models 558a, 559a, and 560a, respectively, after touch up of the contact. For example, in some embodiments, mass/spring model 558b is the same model as mass/spring model 558a (e.g., x-position 561 continues to be driven by mass/spring model 558a after touch up of the contact, although mass/spring model 558a is no longer driven by an input parameter of the contact). In some embodiments, one or more of mass/spring models 558b, 559b, and 560b have one or more different parameters (e.g., different spring constants and/or different damping coefficients) as corresponding mass/spring models 558a, 559a, and 560a, respectively. For example, in some embodiments, mass/spring model 558b is different from mass/spring model 558a (e.g., mass/spring model 558b uses a different spring constant for modeling behavior than mass/spring model 558a). In some embodiments, one or more of mass/spring model 558b, 559b, and 560b are instances of a same mass/spring behavior model, optionally with one or more different parameters (e.g., different spring constants and/or different damping coefficients). The operation of mass/spring models is described in more detail herein, for example with reference to FIGS. 5I-5N and 5AB-AC, and methods 600 and 800.

FIG. 5AB illustrates modification of scale, blurring (e.g., a degree of blurring, or a blur radius), and y-position of a user interface element (e.g., moving a user interface element in a scrolling list in response to a user input, where the element responds to changes in intensity of the user input, such as scrolling an e-mail in an e-mail list, where the user input is directed to the e-mail, and the appearance of the e-mail changes in response to changes in intensity and displacement of the input). In FIG. 5AB, in response to a contact at a location corresponding to a user interface element, during touch down of the contact, scale 568 of the user interface element is modified using mass/spring model 566a, which is driven both by intensity 564 of the contact and by y-position 565 of the contact. Blurring 569 of the user interface element is modified using mass/spring model 567a, which is also driven both by intensity 564 of the contact and by y-position 565 of the contact. Y-position 570 of the user interface element is modified via direct manipulation (e.g., using direct manipulation behavior model 573) by y-position 565 of the contact. As shown in FIG. 5AB, a respective input parameter (e.g., intensity 564, and y-position 565) can drive multiple behavior models (e.g., intensity 564 drives both mass/spring model 566a and mass/spring model 567a; and y-position 565 drives all three models: mass/spring model 566a, mass/spring model 567a, and direct manipulation behavior model 573). In some embodiments, a respective behavior model (e.g., mass/spring model 566a and mass/spring model 567a) is driven by multiple input parameters (e.g., mass/spring model 566a is driven by both intensity 564 and y-position 565 of the contact, and mass/spring model 567a is driven by both intensity 564 and y-position 565 of the contact). As explained above with reference to mass/spring models 558, 559, and 560, mass/spring models may share one or more parameters (e.g., spring constants and/or damping coefficients) and/or may have one or more different parameters (e.g., different spring constants and/or different damping coefficients). In some embodiments, one or more mass/spring models are instances of a same mass/spring behavior model, optionally with different parameters.

After touch up of the contact, the behavior models modifying scale 568, blurring 569, and y-position 570 of the user interface element are no longer driven by the intensity and y-position of the contact (e.g., because the contact has been removed). Instead, scale 568 and blurring 569 are modified based on mass/spring models 566b and 567b, respectively. As explained above with reference to mass/spring models 558, 559, and 560, mass/spring models 566*b* and 567*b* may be the same or different from mass/spring models 566*a* and 567*b*, respectively. In addition, the behavior model used to modify y-position 570 changes from direct manipulation behavior model 573 to friction/bounce model 571.

FIG. 5AC illustrates a conceptual flowchart representation of method 580 of determining an operation to perform in a user interface in accordance with criteria based on one or more output properties of a user interface element. In some embodiments, method 580 is performed by an application-independent module (e.g., behavior model module 181, FIG. 1C, or application-independent software module 220-1, FIG. 1D) of an electronic device (e.g., portable multifunction device 100, FIG. 1A).

The method begins, in some embodiments, with the device displaying a user interface that includes an application user interface (e.g., mail application user interface 500, FIG. 5AD).

The device (e.g., application-independent software module 220-1, FIG. 1D) monitors (574) one or more output properties of the user interface, and/or one or more derivatives of a respective output property with respect to time. In some embodiments, the device monitors the output properties while detecting a user input directed to the user interface. In some embodiments, the device monitors modification of the output properties by one or more behavior models driven by the user input.

Next, the device determines (576) whether a movement threshold is met in the user interface (e.g., whether a change in a respective output property of the user interface satisfies a movement threshold). In some embodiments, the device determines whether the movement threshold is met in response to detecting liftoff of the user input (e.g., without regard to values of output properties while detecting the user input, as described herein with reference to FIGS. 5AQ-5AT). In some embodiments, whether the movement threshold is satisfied is determined based on a current value (e.g., x-position and/or y-position) of an output property of a user interface element. In some embodiments, whether the movement threshold is satisfied is determined based on a projected value (e.g., a projected x-position and/or a projected y-position) of the output property at a subsequent point in time. In some embodiments, for an output property changing with a non-zero first derivative with respect to time (e.g., moving at a non-zero velocity) and/or a non-zero second derivative with respect to time (e.g., moving with a non-zero acceleration), a projected value of the output property at a future point in time is determined based on an initial value of the first derivative with respect to time and an initial value of the second derivative with respect to time at a current point in time, optionally subject to one or more parameters of a behavior model (e.g., a force of friction in a friction/bounce model, or a restoring (spring) force and/or a damping force in a mass/spring model). For example, the projected position of a user interface element whose movement within the user interface is based on a friction/bounce model is the position at which the user interface element would come to rest subject to a force of friction exerted on the user interface element by the user interface (e.g., as described herein with reference to FIGS. 5AK-5AM). In another example, the projected position of a user interface element whose movement within the user interface is based on a mass/spring model is the position at which the user interface element would come to rest subject to a restoring force exerted on the user interface element by a spring and a damping force exerted on the user interface element.

In accordance with a determination that the movement threshold is not met (576—No) the device redisplays the application user interface (e.g., as described herein with reference to FIGS. 5AN-5AT and FIG. 5AV).

In accordance with a determination that the movement threshold is met (576—Yes), the device determines (577) a direction of movement of the user interface element.

In accordance with a determination that the movement direction is left-to-right (e.g., toward a right edge of the display), the device displays a user interface of a previously-displayed application (e.g., the most-recently displayed application prior to displaying the current application) (e.g., as described herein with reference to FIGS. 5AU-5AX). In some embodiments, the most-recent prior application user interface is displayed if the movement direction of a user interface element is left-to-right, and if the movement of the user interface element satisfies an x-position movement threshold (e.g., as described above with reference to step 576).

In accordance with a determination that the movement direction is right-to-left (e.g., toward a left edge of the display), the device displays a control center user interface (e.g., as described herein with reference to FIGS. 5AY-5BA). In some embodiments, the control center user interface is displayed if the movement direction of a user interface element is right-to-left, and if the movement of the user interface element satisfies an x-position movement threshold (e.g., as described above with reference to step 576).

In accordance with a determination that the movement direction is upward (e.g., away from a bottom edge of the display, and toward a top edge of the display), the device determines (578) whether multitasking criteria (e.g., criteria for displaying a multitasking user interface) are met. In some embodiments, the multitasking criteria include a criterion that is met when an output property (e.g., y-position or scale) of the user interface element is within a predefined range of values. For example, the predefined range of values includes values of the output property above a first threshold value and below a second threshold value, and the criterion of the multitasking criteria is satisfied when the output property of the user interface element is above the first threshold value and below the second threshold value.

In accordance with a determination that the multitasking criteria are met (e.g., the y-position of the user interface element is within a predefined range of y-positions that satisfy the multitasking criteria, or the scale of the user interface element is within a predefined range of scales that satisfy the multitasking criteria), the device displays (584) a multitasking user interface (e.g., as described herein with reference to FIGS. 5AD-5AF).

In accordance with a determination that the multitasking criteria are not met (e.g., the y-position or projected y-position of the user interface element is beyond (e.g., above) a predefined range of y-positions that satisfy the multitasking criteria, or the scale or projected scale of the user interface element is beyond (e.g., below) a predefined range of scales that satisfy the multitasking criteria), the device displays (586) an application-launching user interface (e.g., a home screen user interface) (e.g., as described herein with reference to FIGS. 5AG-5AM).

FIGS. 5AD-5BA illustrate example user interfaces for determining an operation to perform in a user interface in accordance with criteria based on one or more output properties of a user interface element.

FIGS. 5AD-5AF illustrate an example of a transition from an application user interface to a multitasking user interface.

In particular, FIGS. 5AD-5AF illustrate a transition from an application user interface to a multitasking user interface in accordance with a change in scale of the application user interface. FIG. 5AD illustrates mail application user interface 500 (e.g., of e-mail client module 140, FIG. 1A). Scale meter 588 indicates a current scale of mail application user interface 500. Scale meter 588 also includes scale value thresholds $S_1$ and $S_2$ that define the range of scale values corresponding to a multitasking user interface (e.g., scale values above $S_2$ correspond to a home screen user interface, and scale values below $S_1$ correspond to a displayed application user interface). As shown in FIG. 5AD, mail application user interface 500 is displayed at full scale. FIG. 5AD shows contact 589 detected at the bottom edge of touch screen 112, and upward movement of contact 589.

FIG. 5AE illustrates that, in accordance with the upward movement of contact 589 from its position as shown in FIG. 5AD, mail application user interface 500 decreases in scale and is displayed as a user interface card moving upward within the user interface. Portions of additional user interface cards 591 and 592 are displayed to the left and right, respectively, of mail card 500. Scale meter 588 indicates that the current scale of mail card 500 in FIG. 5AE is below scale value threshold $S_2$ corresponding to the upper limit of the range of scale values corresponding to the multitasking user interface, and above scale value threshold $S_1$ corresponding to the lower limit. In addition, home screen user interface 597 is displayed in the background with a high degree of blurring (e.g., a large blur radius) and reduced scale.

FIG. 5AF illustrates a multitasking user interface with a plurality of user interface cards including mail card 500, browser card 591, control center card 592, and messaging card 593, in response to detecting liftoff of contact 589 from its position as shown in FIG. 5AE. Mail card 500 is displayed at an initial scale $S_{MT}$ (e.g., prior to navigating through the plurality of user interface cards) and an initial position upon transitioning to the multitasking user interface, and home screen user interface 597 ceases to be displayed in the background. In some embodiments, the transition to the multitasking user interface is in accordance with a determination that the scale of mail card 500 changed (e.g., decreased) by at least a threshold amount (e.g., mail card 500 satisfied a movement threshold as described above with reference to step 576 of method 580, FIG. 5AC). In some embodiments, the transition to the multitasking interface is in accordance with a determination that the movement of contact 589 was in an upward direction. In some embodiments, the transition to the multitasking interface is in accordance with a determination that the scale of mail card 500 was between $S_1$ and $S_2$ at the time of liftoff of contact 589. In some embodiments, the transition to the multitasking interface is in accordance with a combination of two or more of the aforementioned criteria.

FIGS. 5AG-5AJ illustrate an example transition from an application user interface to a home screen user interface. In particular, FIGS. 5AG-5AJ illustrate a transition from an application user interface to a home screen user interface in accordance with a change in scale of the application user interface. FIG. 5AG shows mail application user interface 500 displayed at full scale as indicated by scale meter 588. In addition, FIG. 5AG shows contact 590 detected at the bottom edge of touch screen 112, and upward movement of contact 590.

FIG. 5AH illustrates that, in accordance with the upward movement of contact 590 from its position as shown in FIG. 5AG, mail application user interface 500 decreases in scale and is displayed as a user interface card moving within the user interface. Portions of additional user interface cards 591 and 592 are displayed to the left and right, respectively, of mail card 500. Scale meter 588 indicates that the current scale of mail card in FIG. 5AH is below scale value threshold $S_2$ corresponding to the upper limit of the range of scale values corresponding to the multitasking user interface, and above scale value threshold $S_1$ corresponding to the lower limit. In addition, home screen user interface 597 is displayed in the background with a high degree of blurring (e.g., a large blur radius) and reduced scale.

FIG. 5AI illustrates that, in accordance with continued upward movement of contact 590 from its position as shown in FIG. 5AH, mail card 500 further decreases in scale to a scale below scale value threshold $S_1$. Accordingly, additional user interface cards 591 and 592 cease to be displayed. In addition, the degree of blurring (e.g., the blur radius) of home screen user interface 597 displayed in the background is reduced, and the scale of home screen user interface 597 is increased.

FIG. 5AJ illustrates display of home screen user interface 597 in response to detecting liftoff of contact 590 from its position as shown in FIG. 5AI. Mail card 500 ceases to be displayed (e.g., the scale of mail card 500 decreases to zero). Home screen user interface 597 is displayed without blurring (e.g., zero blur radius) and at full scale. In some embodiments, the transition to home screen user interface 597 is in accordance with a determination that the scale of mail card 500 changed by at least a threshold amount (e.g., mail card 500 satisfied a movement threshold as described above with reference to step 576 of method 580, FIG. 5AC). In some embodiments, the transition to home screen user interface 597 is in accordance with a determination that the movement of contact 590 was in an upward direction. In some embodiments, the transition to home screen user interface 597 is in accordance with a determination that the scale of mail card 500 was below scale value threshold $S_1$ (e.g., multitasking criteria that required that the scale of mail card 500 be between $S_1$ and $S_2$ were not met) at the time of liftoff of contact 590. In some embodiments, the transition to home screen user interface 597 is in accordance with a combination of two or more of the aforementioned criteria.

FIGS. 5AK-5AM illustrate another example transition from an application user interface to a home screen user interface. In particular, FIGS. 5AK-5AM illustrate a transition from an application user interface to a home screen user interface in accordance with a velocity and/or projected position of the application user interface. FIG. 5AK shows mail application user interface 500 displayed at a y-position of zero as indicated by y-position meter 596. In addition, FIG. 5AG shows user input 594 including a contact detected at the bottom edge of touch screen 112, and upward movement of the contact (e.g., a flick gesture). In accordance with the upward movement of contact 594, mail application user interface 500 begins to move upward (e.g., via a direct manipulation behavior model driven by contact 594) at an initial velocity above velocity threshold $v_{th}$ as indicated by velocity meter 595. Projected y-position $y_{projected}$ of mail application user interface 500 (e.g., as determined based on a friction/bounce behavior model, described herein with reference to step 576 of FIG. 5AC) is above y-position threshold $y_2$ as indicated by y-position meter 596.

FIG. 5AL illustrates that, after ceasing to detect user input 594, and in response to detecting user input 594, mail application user interface 500 decreases in scale and is displayed as a user interface card moving within the user interface at a velocity below velocity threshold $v_{th}$ as indicated by velocity meter 595. In some embodiments, the velocity of mail card 500 decreases over time from its initial velocity as shown in FIG. 5AK in accordance with a friction/bounce behavior model that modifies the position of mail card 500 in accordance with a simulated force of friction (e.g., as described herein with reference to FIGS. 5D-5H). Home screen user interface 597 is displayed in the background of mail card 500 with a low degree of blurring (e.g., a small blur radius) and at a slightly reduced scale. In some embodiments, the degree of blurring of home screen user interface 597 decreases from a maximum degree of blurring to a zero degree of blurring as mail card 500 moves upward along the display. In addition, in some embodiments, the scale of home screen user interface 597 increases from a minimum scale to full scale as mail card 500 moves upward along the display.

FIG. 5AM illustrates home screen user interface 597 displayed at full scale and without blurring (e.g., mail card 500 is no longer displayed). In some embodiments, for example upon ceasing to detect user input 594, mail application user interface 500 (FIG. 5AK) transitions to home screen user interface 597 in accordance with a determination that the initial velocity of mail application user interface satisfied (e.g., was above) a velocity threshold (e.g., velocity threshold $v_{th}$, FIG. 5AK). Alternatively, or in addition, in some embodiments, mail application user interface 500 (FIG. 5AK) transitions to home screen user interface 597 in accordance with a determination that the projected y-position (e.g., $y_{projected}$, FIG. 5AK) of mail application user interface 500 satisfied (e.g., was above) a y-position threshold (e.g., y-position threshold $y_2$, FIG. 5AK). For example, the difference between the current y-position of mail application user interface 500 in FIG. 5AK and the projected y-position satisfies the movement threshold (e.g., step 576, FIG. 5AC), and the projected y-position of mail application user interface 500 does not satisfy multitasking criteria (e.g., step 578, FIG. 5AC) (e.g., the projected y-position is not within the range of values defined by $y_1$ and $y_2$, FIG. 5AK).

FIGS. 5AN-5AT illustrate redisplaying an application user interface in accordance with failing to meet a movement threshold (e.g., step 576, FIG. 5AC). In particular, FIGS. 5AN-5AP illustrate redisplaying an application in accordance with a y-position of the application user interface failing to satisfy a y-position threshold, in response to insufficient movement of a user input. FIGS. 5AQ-5AT illustrate redisplaying an application in accordance with the final y-position of the application user interface, at the time of liftoff of a user input, failing to satisfy the y-position threshold, even though the y-position of the application user interface satisfies the y-position threshold during detection of the user input.

FIG. 5AN illustrates mail application user interface 500 displayed at a y-position of zero as indicated by y-position meter 596. In addition, FIG. 5AN shows contact 598 detected at the bottom edge of touch screen 112, and upward movement of contact 598.

FIG. 5AO illustrates that, in accordance with the upward movement of contact 598 from its position as shown in FIG. 5AN, mail application user interface 500 is displayed as a user interface card with a scale reduced from the scale of mail application user interface 500 in FIG. 5AN. In addition, the y-position of mail card 500 increases to a value above zero and below y-position threshold $y_1$ (e.g., a lower limit of a range of position values corresponding to the multitasking user interface). Home screen user interface 597 is displayed in the background with a high degree of blurring (e.g., a large blur radius) and reduced scale.

FIG. 5AP illustrates that, in response to detecting liftoff of contact 598 from its position as shown in FIG. 5AO, mail application user interface 500 is redisplayed (e.g., as displayed in FIG. 5AN). In some embodiments, mail application user interface 500 is redisplayed in accordance with a determination that the change in y-position of mail card 500 at the time of liftoff of contact 598 did not satisfy a movement threshold. In some embodiments, mail application user interface 500 is redisplayed in accordance with a determination that the y-position of mail card 500 at the time of liftoff of contact 598 did not satisfy multitasking criteria (e.g., was outside of the range of values between $y_1$ and $y_2$).

FIG. 5AQ illustrates mail application user interface 500 displayed at a y-position of zero as indicated by y-position meter 596. In addition, FIG. 5AQ shows contact 599 detected at the bottom edge of touch screen 112, and upward movement of contact 599.

FIG. 5AR illustrates that, in accordance with the upward movement of contact 599 from its position as shown in FIG. 5AQ, mail application user interface 500 is displayed as a user interface card with a scale reduced from the scale of mail application user interface 500 in FIG. 5AQ. In addition, the y-position of mail card 500 increases to a value above y-position threshold $y_2$ (e.g., above an upper limit of a range of position values corresponding to the multitasking user interface, at a value that corresponds to the home screen interface, as described above with reference with reference to FIG. 5AK). Home screen user interface 597 is displayed in the background with a low degree of blurring (e.g., a small blur radius) and reduced scale. FIG. 5AR also illustrates continued movement of contact 599 downward and to the right.

FIG. 5AS illustrates that, in accordance with the movement of contact 599 downward from and to the right of its position as shown in FIG. 5AR, the scale of mail card 500 is increased and the y-position of mail card 500 decreases to a value below y-position threshold $y_1$ (e.g., a lower limit of a range of position values corresponding to the multitasking user interface). Home screen user interface 597 is displayed in the background with a high degree of blurring (e.g., a large blur radius) and reduced scale.

FIG. 5AT illustrates that, in response to detecting liftoff of contact 599 from its position as shown in FIG. 5AS, mail application user interface 500 is redisplayed (e.g., as displayed in FIG. 5AQ). In some embodiments, mail application user interface 500 is redisplayed based on the y-position of mail card 500 at the time of liftoff, irrespective of prior values of the y-position of mail card 500 while detecting contact 599). In some embodiments, mail application user interface 500 is redisplayed in accordance with a determination that the change in y-position of mail card 500 at the time of liftoff of contact 599 did not satisfy a movement threshold. In some embodiments, mail application user interface 500 is redisplayed in accordance with a determination that the y-position of mail card 500 at the time of liftoff of contact 599 did not satisfy multitasking criteria (e.g., was outside of the range of values between $y_1$ and $y_2$).

FIGS. 5AU-5AX illustrate an example transition from an application user interface to a previously-displayed application user interface (e.g., the most-recently displayed application prior to displaying the current application). FIG. 5AU illustrates mail application user interface 500. In addition, FIG. 5AU shows contact 540 detected at the bottom edge of touch screen 112, and movement of contact 540 upward and to the right.

FIG. 5AV illustrates that, in accordance with the movement of contact 540 upward from and to the right of its position as shown in FIG. 5AU, mail application user interface 540 is displayed as a user interface card with a scale reduced from the scale of mail application user interface 500 in FIG. 5AU. In addition, mail card 500 moves upward and to the right. The left edge of mail card 500 is to the left of x-position threshold $x_{th}$. In some embodiments, in accordance with detecting liftoff of contact 540 from its position shown in FIG. 5AU, mail application user interface 500 would be redisplayed, because mail card 500 would not have satisfied the movement threshold (e.g., the left edge of mail card 500 would not have passed x-position threshold $x_{th}$).

FIG. 5AW illustrates that, in accordance with continued movement of contact 540 to the right of its position as shown in FIG. 5AV, mail card 500 continues to move to the right. The left edge of mail card 500 is to the right of x-position threshold $x_{th}$.

FIG. 5AX illustrates that, in response to detecting liftoff of contact 540 from its position as shown in FIG. 5AW, browser application user interface 591 is displayed. In some embodiments, browser application user interface 591 is displayed in accordance with a determination that mail card 500 satisfied a movement threshold (e.g., an edge, such as the left edge, of mail card 500 passed x-position threshold $x_{th}$) (e.g., step 576, FIG. 5AC) and in accordance with a determination that the direction of movement was left-to-right (e.g., step 577, FIG. 5AC).

FIGS. 5AY-5BA illustrate an example transition from an application user interface to a control center user interface with a plurality of user interface elements for controlling various functions of the device. FIG. 5AY illustrates mail application user interface 500. In addition, FIG. 5AY shows contact 542 detected at the bottom edge of touch screen 112, and movement of contact 542 upward and to the left.

FIG. 5AZ illustrates that, in accordance with the movement of contact 542 upward from and to the left of its position as shown in FIG. 5AY, mail application user interface 500 is displayed as a user interface card with a scale reduced from the scale of mail application user interface 500 in FIG. 5AY. In addition, mail card 500 moves upward and to the left. The right edge of mail card 500 is to the left of x-position threshold $x_{th}$.

FIG. 5BA illustrates that, in response to detecting liftoff of contact 542 from its position as shown in FIG. 5AZ, control center user interface 592 is displayed. In some embodiments, control center user interface 592 is displayed in accordance with a determination that mail card 500 satisfied a movement threshold (e.g., an edge, such as the right edge, of mail card 500 passed x-position threshold $x_{th}$) (e.g., step 576, FIG. 5AC) and in accordance with a determination that the direction of movement was right-to-left (e.g., step 577, FIG. 5AC).

FIGS. 6A-6F are flow diagrams illustrating method 600 of seamlessly transitioning user interface behaviors in accordance with some embodiments. Method 600 is performed at an electronic device (e.g., device 300, FIG. 3, or portable multifunction device 100, FIG. 1A) with a display, a touch-sensitive surface, and one or more sensors to detect intensity of contacts with the touch-sensitive surface. In some embodiments, the display is a touch-screen display and the touch-sensitive surface is on or integrated with the display. In some embodiments, the display is separate from the touch-sensitive surface. Some operations in method 600 are, optionally, combined and/or the order of some operations is, optionally, changed.

As described below, method 600 provides an intuitive way to seamlessly vary user interface transitions across different types of behaviors in the user interface. Changing a user interface using values representing user interface properties and one or more derivatives of the values with respect to time by transferring the values and derivatives between different behavior models provides seamless user interface behaviors and transitions, reduces abrupt and/or drastic changes to the user interface that are distracting to the user, and provides the user with a more intuitive user experience. Providing improved user experience enhances the operability of the device and makes the user-device interface more efficient (e.g., by reducing user distraction, frustration, and mistakes when operating/interacting with the device), which, additionally, reduces power usage and improves battery life of the device by enabling the user to use the device more quickly and efficiently.

The device presents (602) a user interface (e.g., mail application user interface 500, FIG. 5A) via the one or more output devices outputting information about a user interface. The user interface includes an output property (e.g., y-position $y_{object}$, FIG. 5B) that represents a first type of output corresponding to the user interface.

In some embodiments, the type of output represented by the output property includes (604) one or more of: a visual output property (e.g., size, x position, y position, color, opacity, blur radius, saturation, z-height), an audio output property (e.g., volume, frequency, tone, balance), and a tactile output property (e.g., frequency, amplitude, duration, or location). Changing multiple types of outputs corresponding to a user interface provides the user with a more physically intuitive and more complete user experience. Providing improved user experience enhances the operability of the device and makes the user-device interface more efficient (e.g., by reducing user distraction, frustration, and mistakes when operating/interacting with the device), which, additionally, reduces power usage and improves battery life of the device by enabling the user to use the device more quickly and efficiently.

Next, the device detects (606), via the one or more input devices, a user input including a first input that is associated with modifying the first type of output via a first behavior model (e.g., the first behavior model is driven by the first input, such as by one or more input parameters of the first input). For example, user input 502 modifies y-position $y_{object}$ via a direct manipulation behavior model (FIG. 5B).

In some embodiments, a behavior model is (608) a set of rules specifying how one or more output properties evolve over time from a current value of the output property. In some embodiments, the rules specify a target value or how a target value is selected. In some embodiments, the rules specify how detected inputs affect the target value and/or the output value of the output property. In some embodiments, the rules are rules that simulate a physics model. In some embodiments, the rules specify how the one or more output properties and one or more derivatives of the output properties with respect to time evolve over time from corresponding values or derivatives with respect to time of those output values. Changing the user interface using rules that specify how output properties of the user interface evolve over time provides consistency and continuity in user interface transitions, and provides visual feedback to the user as to changes in the user interface. Providing improved visual feedback to the user enhances the user experience and the operability of the device, and makes the user-device interface more efficient (e.g., by reducing user frustration and mistakes when operating/interacting with the device), which, additionally, reduces power usage and improves battery life of the device by enabling the user to use the device more quickly and efficiently.

In some embodiments, detecting the user input includes (610) detecting changes to two or more input parameters (e.g., y-position and intensity of the user input) that describe the user input, and the first behavior model is driven by the two or more input parameters (e.g., the output property is changed based on the two or more input parameters driving the first behavior model). For example, a scale of a user interface element is changed based on (1) a y-position of a user input and (2) an intensity of the user input. Modifying output properties of user interface elements based on behavior models driven by multiple input parameters provides smoother user interface behaviors by taking multiple aspects of the user input into account when updating the user interface, and provides the user with a more intuitive user experience. Providing improved user experience enhances the operability of the device and makes the user-device interface more efficient (e.g., by reducing user distraction, frustration, and mistakes when operating/interacting with the device), which, additionally, reduces power usage and improves battery life of the device by enabling the user to use the device more quickly and efficiently.

Next, in response to detecting the first input (612), the device performs at least operations 614 and 622, described herein:

The device changes (614) the output property (e.g., position, size, blur, color, sound) over time based on the first behavior model (e.g., y-position $y_{object}$ is changed using direct manipulation, FIGS. 5B-5C).

In some embodiments, the first behavior model is (616) a predefined physics model that simulates movement of a mass that is coupled with one or more springs (and optionally one or more dampers) in response to external forces applied to the mass by changes in user inputs, in an analytical mass-and-spring model (sometimes called a mass/spring model, e.g., as described above with reference to FIGS. 5W-5Y). Changing the user interface using rules that simulate movement in a mass-and-spring model provides seamless user interface transitions that are more closely aligned with behaviors of real-world objects, and provides the user with a more intuitive user experience. Providing improved user experience enhances the operability of the device and makes the user-device interface more efficient (e.g., by reducing user distraction, frustration, and mistakes when operating/interacting with the device), which, additionally, reduces power usage and improves battery life of the device by enabling the user to use the device more quickly and efficiently.

In some embodiments, changing the output property over time based on the first behavior model includes (618) changing values of the output property over time in accordance with the analytical mass-and-spring model independently of a frame rate of the electronic device (e.g., so that the behavior of the mass-and-spring model is consistent across devices even when device hardware changes or when devices use different frame rates). Changing the user interface independently of a frame rate of the device provides consistency in user interface transitions across devices, and across hardware components of devices, that process information using different frame rates, and provides the user with a more intuitive user experience. Providing improved user experience enhances the operability of the device and makes the user-device interface more efficient (e.g., by reducing user distraction, frustration, and mistakes when operating/interacting with the device), which, additionally, reduces power usage and improves battery life of the device by enabling the user to use the device more quickly and efficiently.

In some embodiments, the first behavior model is (620) a predefined physics model (e.g., a friction/bounce model, described above with reference to FIGS. 5D-5H and 5P-5V) that simulates movement of a mass (e.g., a user interface element, such as the e-mail list, FIG. 5D, or user interface 520, FIG. 5P) subject to friction (e.g., simulating movement of a user interface element along the display as if the display were a surface with a non-zero coefficient of friction) and interaction of the mass with one or more predefined boundaries (e.g., the edges of the display). In some embodiments, the friction/bounce physics model includes a coefficient of friction. In some embodiments, for a mass in motion, deceleration of motion of the mass (e.g., deceleration of the e-mail list, FIGS. 5D-5H) is determined in accordance with the coefficient of friction. In some embodiments, for a mass in motion, a target position of the mass is determined in accordance with the coefficient of friction. In some embodiments, for the mass in motion, the target position of the mass is determined in accordance with the coefficient of friction and one or more predefined target positions (e.g., the position of a respective page in a set of pages with predefined pagination positions, as described above with reference to FIGS. 5P-5V). In some embodiments, the one or more predefined boundaries specify a range of values between a first predefined value (e.g., a lower bound, or minimum value) and a second predefined value (e.g., an upper bound, or maximum value (e.g., the top of the e-mail list, FIG. 5B)). In some embodiments, the one or more predefined boundaries specify a range of values for a position of a user interface element (e.g., a first predefined boundary corresponds to a bottom edge of a display or of a scrolling list, a second predefined boundary corresponds to a top edge of the display or scrolling list, a third predefined boundary corresponds to a left edge of the display or scrolling list, and/or a fourth predefined boundary corresponds to a right edge of the display or scrolling list). In some embodiments, a respective predefined boundary is the target value of the output property (e.g., an edge of the display or scrolling list is a target position for a user interface object). In some embodiments, a bounce rate parameter determines changes in the value of the output property over time when a value or projected value of the output property exceeds a limit value; the output property, such as the position of a scrolled list, exhibits a bounce behavior, which smoothly transitions to a terminal value in accordance with the bounce rate. Changing the user interface using rules that simulate movement of a mass subject to friction and interacting with boundaries of a region provides seamless user interface transitions that are more closely aligned with behaviors of real-world objects, and provides the user with a more intuitive user experience. Providing improved user experience enhances the operability of the device and makes the user-device interface more efficient (e.g., by reducing user distraction, frustration, and mistakes when operating/interacting with the device), which, additionally, reduces power usage and improves battery life of the device by enabling the user to use the device more quickly and efficiently.

The device updates (622) the presentation of the user interface via the one or more output devices based on the changes in the output property that occur based on the first behavior model (e.g., the e-mail list is scrolled based on changes in the y-position output property, FIGS. 5B-5C).

While updating the presentation of the user interface via the one or more output devices based on the changes in the output property that occur based on the first behavior model, the device detects (624) a change to the user input. In some embodiments, detecting the change to the user input includes ceasing to detect the user input (e.g., detecting liftoff of a touch input, such as liftoff of user input 502, FIG. 5D). In some embodiments, detecting the change to the user input includes detecting a second input subsequent to the first input (e.g., detecting touch down of a subsequent touch input, such as touch down of user input 514, FIG. 5H).

In some embodiments, detecting the change to the user input includes (626) detecting touch down of a subsequent touch input (e.g., user input 514, FIG. 5H). In some embodiments, the first input includes liftoff of a first touch input (e.g., liftoff of user input 502, FIG. 5D), and detecting the change to the user input includes detecting touch down of a second touch input (e.g., a touch input or swipe gesture that changes a target of the animation, such as user input 514, FIG. 5H). Changing a user interface seamlessly in response to subsequent touch inputs provides the user with a more intuitive user experience. Providing improved user experience enhances the operability of the device and makes the user-device interface more efficient (e.g., by reducing user distraction, frustration, and mistakes when operating/interacting with the device), which, additionally, reduces power usage and improves battery life of the device by enabling the user to use the device more quickly and efficiently.

In some embodiments, the first input is (628) received via a first input device (e.g., touch screen 112, FIG. 5B), and detecting the change to the user input includes detecting a second input via a second input device (e.g., different from the first input device) (e.g., touch-sensitive surface 451, FIG. 4B). In some embodiments, the first input device is one of: a touch-sensitive display (sometimes called a touchscreen), a touch-sensitive surface (such as a trackpad), a digital crown (e.g., of a watch), a mouse wheel, and navigation keys, and the second input device is a different one of the aforementioned input devices. Changing a user interface seamlessly in response to inputs from different input devices provides the user with additional control options for interacting with the device. Providing flexibility in controlling the device enhances the operability of the device and makes the user-device interface more efficient (e.g., by enabling the user to more quickly provide inputs to achieve intended operations and reducing user mistakes when operating/interacting with the device), which, additionally, reduces power usage and improves battery life of the device by enabling the user to use the device more quickly and efficiently.

In some embodiments, the first input is (630) a touch input (e.g., user input 502, FIG. 5B), and detecting the change to the user input includes detecting liftoff of the touch input (e.g., ceasing to detect the touch input, such as ceasing to detect user input 502, FIG. 5D). For example, while the touch input is detected, a spring behavior model is used to move an object or the user interface, and when the touch input is lifted off the object, the user interface is moved in accordance with an inertial behavior model (e.g., a friction/bounce model). Changing a user interface seamlessly in response to a touch input being removed provides the user with a more intuitive user experience. Providing improved user experience enhances the operability of the device and makes the user-device interface more efficient (e.g., by reducing user distraction, frustration, and mistakes when operating/interacting with the device), which, additionally, reduces power usage and improves battery life of the device by enabling the user to use the device more quickly and efficiently.

In response to detecting the change to the user input (632), the device performs at least operations 634, 636, 640, and 646, described herein.

The device changes (634) the output property over time based on a second behavior model that is different from the first behavior model, including starting changing the output property over time based on (636) a value of the output property that was determined based on the first behavior model. For example, the y-position of the e-mail list is changed based on friction/bounce model 512 after liftoff of contact 502 instead of a direct manipulation model, which includes starting changing the y-position starting from value y2, which was determined using the direct manipulation model. In some embodiments, the value of the output property that was determined based on the first behavior model is a nonzero value.

In some embodiments, the value of the output property is (638) limited to a range of values between a first predefined value (e.g., a lower bound) and a second predefined value (e.g., an upper bound). Limiting output property values to be within a predefined range of values that are more easily perceived by the user provides the user with a more intuitive user experience, and in some cases protects device hardware by avoiding generating outputs that exceed hardware limits. Providing improved user experience enhances the operability of the device and makes the user-device interface more efficient (e.g., by reducing user distraction, frustration, and mistakes when operating/interacting with the device), which, additionally, reduces power usage and improves battery life of the device by enabling the user to use the device more quickly and efficiently.

Changing the output property over time based on the second behavior model includes starting changing the output property based on (640) a first derivative of the value of the output property with respect to time. The first derivative of the value was determined based on the first behavior model. For example, the velocity of the e-mail list is changed based on a friction/bounce model after liftoff of contact 502 instead of a direct manipulation model, which includes starting changing the velocity starting from value v2, which was determined using the direct manipulation model. In some embodiments, the first derivative of the value is a nonzero value. In some embodiments, the value and the first derivative of the value both correspond to the same point in time that is proximate to a time at which the device switched from using the first behavior model to using the second behavior model (e.g., boundary 511, FIG. 5D).

In some embodiments, changing the output property over time based on the second behavior model includes starting changing the output property over time based on (642) a second derivative of the value of the output property with respect to time. The second derivative of the value of the output property with respect to time was determined based on the first behavior model. For example, the acceleration of the e-mail list is changed based on a friction/bounce model after liftoff of contact 502 instead of a direct manipulation model, which includes starting changing the output property from value a2, which was determined using the direct manipulation model. In some embodiments, the second derivative of the value of the output property with respect to time is a nonzero value. In some embodiments, the value, the first derivative of the value with respect to time and the second derivative of the value with respect to time all correspond to the same point in time (e.g., boundary 511, FIG. 5D). Ensuring that the value, the first derivative of the value with respect to time and the second derivative of the value with respect to time are maintained as continuous when transitioning from the first behavior model to the second behavior model ensures that the animation has $C^2$ continuity even when switching between behavior models, providing a more intuitive user interface that responds to user inputs in a predictable manner, and improving the efficiency of the man-machine interface. Changing a user interface by transferring a value of an output property, and its first and second derivatives with respect to time between different behavior models, provides seamless user interface transitions that are more closely aligned with behaviors of real-world objects, reduces abrupt and/or drastic changes to the user interface that are distracting to the user, and provides the user with a more intuitive user experience. Providing improved user experience enhances the operability of the device and makes the user-device interface more efficient (e.g., by reducing user distraction, frustration, and mistakes when operating/interacting with the device), which, additionally, reduces power usage and improves battery life of the device by enabling the user to use the device more quickly and efficiently.

In some embodiments, the first derivative of the value of the output property with respect to time corresponds (644) to values of a first continuous function with respect to time (e.g., values that would result from digital sampling of a continuous function, for example if values of the continuous function were measured at discrete time intervals), and the second derivative of the value of the output property with respect to time corresponds to values of a second continuous function (e.g., continuous velocity and acceleration curves shown in velocity graph 508 and acceleration graph 510, respectively, FIGS. 5B-5N). Having the derivatives, with respect to time, of the values of the output property correspond to values of continuous functions provides seamless user interface transitions even if the derivative values are updated periodically, at time intervals determined by the processing speed of the device, and provides the user with a more intuitive user experience. Providing improved user experience enhances the operability of the device and makes the user-device interface more efficient (e.g., by reducing user distraction, frustration, and mistakes when operating/interacting with the device), which, additionally, reduces power usage and improves battery life of the device by enabling the user to use the device more quickly and efficiently.

The device updates (646) the presentation of the user interface via the one or more output devices based on the changes in the output property that occur based on the second behavior model (e.g., the y-position of the e-mail list is modified, FIGS. 5D-5H).

In some embodiments, while updating the presentation of the user interface via the one or more output devices based on the changes in the output property that occur based on the second behavior model, the device detects (648) a second change to the user input (e.g., touch down of subsequent user input 514, FIG. 5H). In response to detecting the second change to the user input, the device changes the output property over time based on a third behavior model (e.g., mass/spring model 516, FIG. 5I) that is different from the second behavior model (e.g., friction/bounce model 512, FIG. 5H) (and optionally also different from the first behavior model, e.g., direct manipulation model, FIG. 5C), including starting changing the output property over time based on a value of the output property that was determined based on the second behavior model (e.g., a nonzero value), and a first derivative of the value of the output property with respect to time. The first derivative of the value was determined based on the second behavior model. In some embodiments, the first derivative of the value is a nonzero value. In some embodiments, the value and the first derivative of the value both correspond to the same point in time that is proximate to a time at which the device switched from using the second behavior model to using the third behavior model. For example, in FIG. 5I-5N, the y-position of the e-mail list is changed based on mass/spring model 516 after detecting contact 514 instead of friction/bounce model 512, which includes starting changing the y-position, velocity, and acceleration of the e-mail list from values y6, v6, and a6, respectively, which were determined using friction/bounce model 512. The device updates the presentation of the user interface via the one or more output devices based on the changes in the output property that occur based on the second behavior model. Changing a user interface using a value, and the derivative of the value with respect to time, of a user interface property provides seamless user interface transitions, reduces abrupt and/or drastic changes to the user interface that are distracting to the user, and provides the user with a more intuitive user experience. Providing improved user experience enhances the operability of the device and makes the user-device interface more efficient (e.g., by reducing user distraction, frustration, and mistakes when operating/interacting with the device), which, additionally, reduces power usage and improves battery life of the device by enabling the user to use the device more quickly and efficiently.

In some embodiments, the user input includes (650) a touch input, and detecting the user input includes detecting changes to a first input parameter in a plurality of input parameters that describe the touch input. In response to detecting the touch input, a target value of the output property at a respective point in time is determined based on the first input parameter via the first behavior model (e.g., as described above with reference to FIGS. 5O-5V). Detecting the change to the user input includes detecting liftoff of the touch input (e.g., ceasing to detect the touch input). In response to detecting liftoff of the touch input, the target value of the output property is a respective predetermined value in a set of predetermined values, determined based on the changes in the output property that occur based on the second behavior model (e.g., a pagination position of user interface 520, FIG. 5O, is used in determining target positions of the user interface). For example, in some embodiments, while detecting a touch input, a respective user interface object (a "mass") is coupled via a "spring" to the position of the touch input (e.g., the zero-displacement position of the spring corresponds to the position of the touch input), where the displacement/movement of the spring and the mass over time are determined with respect to the position and movement of the touch input over time. In some embodiments, after liftoff of the touch input, the displacement/movement of the spring and the mass are determined with respect to a fixed, predefined position (e.g., the zero-displacement position of the spring corresponds to the predefined position). In some embodiments, the predefined position is a respective predefined position in a set of predefined positions (e.g., the position of a respective page in a set of pages, for example as indicated by pagination dots). Changing a user interface by updating target values of output properties to predefined values in response to touch inputs being removed while transferring values of output properties between different behavior models provides seamless user interface transitions that are more closely aligned with behaviors of real-world objects, reduces abrupt and/or drastic changes to the user interface that are distracting to the user, and provides the user with a more intuitive user experience. Providing improved user experience enhances the operability of the device and makes the user-device interface more efficient (e.g., by reducing user distraction, frustration, and mistakes when operating/interacting with the device), which, additionally, reduces power usage and improves battery life of the device by enabling the user to use the device more quickly and efficiently.

In some embodiments, a target value of the output property is (652) limited to a range of values between a first predefined value (e.g., a lower bound) and a second predefined value (e.g., an upper bound). In some embodiments, a value of the output property is not limited to the range of value for the target value (e.g., the output property is allowed to exceed the range of target values, but the behavior model causes the output property to eventually reach a target value within the range of values). Limiting target output property values to predefined ranges of values provides user interface behaviors that are more closely aligned with behaviors of real-world objects and limits the output properties to values that are more easily perceived by the user, providing the user with a more intuitive user experience. Providing improved user experience enhances the operability of the device and makes the user-device interface more efficient (e.g., by reducing user distraction, frustration, and mistakes when operating/interacting with the device), which, additionally, reduces power usage and improves battery life of the device by enabling the user to use the device more quickly and efficiently.

In some embodiments, the user input includes (654) a touch input. Detecting the user input includes detecting changes to a first input parameter in a plurality of input parameters that describe the touch input, and detecting the change to the user input includes detecting liftoff of the touch input (e.g., ceasing to detect the touch input). The first behavior model is a first predefined physics model that is driven by the change in the first input parameter, and the second behavior model is a second predefined physics model, wherein the second predefined physics model is different from the first predefined physics model. In some embodiments, the first and second predefined physics models are mass-and-spring physics models that include respective first and second spring parameters (e.g., spring constants), and the first spring parameter is different from the second spring parameter. For example, a blur radius (degree of blurring) in the user interface is modified based on a first mass-and-spring physics model with a first spring constant, and a change in size of the user interface is modified based on a second mass-and-spring physics model with a second spring constant, where both the first and second behavior models are driven at least in part by a change in a characteristic intensity of the user input, and where the first spring constant is different from the second spring constant. Changing a user interface using different physics-based behavior models provides alternative options for controlling responsiveness of output properties to changes in user inputs, so that user interface transitions are more closely aligned with behaviors of real-world objects, and provides the user with a more intuitive user experience. Providing improved user experience enhances the operability of the device and makes the user-device interface more efficient (e.g., by reducing user distraction, frustration, and mistakes when operating/interacting with the device), which, additionally, reduces power usage and improves battery life of the device by enabling the user to use the device more quickly and efficiently.

In some embodiments, in response to detecting the first input, updating the presentation of the user interface includes (656) progressing a first animation between a first state and a second state based on the changes in the output property that occur based on the first behavior model (e.g., scrolling the e-mail list, FIGS. 5B-5C). In response to detecting the change to the user input, updating the presentation of the user interface includes progressing a second animation between the second state and a third state based on the changes in the output property that occur based on the second behavior model (e.g., scrolling the e-mail list, FIGS. 5D-5H). Changing a user interface smoothly by progressing the user interface through fluid animations in response to detecting changes in user inputs provides seamless user interface transitions that are more closely aligned with behaviors of real-world objects, reduces abrupt and/or drastic changes to the user interface that are distracting to the user, and provides the user with a more intuitive user experience. Providing improved user experience enhances the operability of the device and makes the user-device interface more efficient (e.g., by reducing user distraction, frustration, and mistakes when operating/interacting with the device), which, additionally, reduces power usage and improves battery life of the device by enabling the user to use the device more quickly and efficiently.

In some embodiments, changing the output property over time based on the first behavior model prior to detecting the change to the user input and starting changing the output property over time based on the second behavior model in response to detecting the change to the user input satisfy (658) second-order parametric continuity of the output property (e.g., progressing the first animation to the second state based on the first behavior model and progressing the second animation from the second state based on the second behavior model exhibits $C^2$ continuity across the handoff between the first and second behavior models, as illustrated with continuous acceleration curve in acceleration graph 510, FIG. 5N, across both handoff boundaries 511 and 517). Changing a user interface seamlessly in accordance with second-order parametric continuity provides seamless user interface transitions, reduces abrupt and/or drastic changes to the user interface that are distracting to the user, and provides the user with a more intuitive user experience. Providing improved user experience enhances the operability of the device and makes the user-device interface more efficient (e.g., by reducing user distraction, frustration, and mistakes when operating/interacting with the device), which, additionally, reduces power usage and improves battery life of the device by enabling the user to use the device more quickly and efficiently.

In some embodiments, the electronic device includes (660) memory (e.g., memory 102, FIG. 1A), the output property is stored in the memory, and changing the output property includes updating the stored output property. Storing values of output properties of a user interface enables the output properties to be transferred between behavior models used for updating the output property values in response to changes in user inputs, provides consistency and continuity in user interface transitions, and provides the user with a more intuitive user experience. Providing consistency and continuity in user interface transitions and improved user experience enhances the operability of the device and makes the user-device interface more efficient (e.g., by reducing user distraction, frustration, and mistakes when operating/interacting with the device), which, additionally, reduces power usage and improves battery life of the device by enabling the user to use the device more quickly and efficiently.

In some embodiments, the electronic device includes (662) memory (e.g., memory 102, FIG. 1A). The value of the output property that was determined based on the first behavior model and the first derivative of the value of the output property, with respect to time, that was determined based on the first behavior model are stored in the memory. Changing the output property over time based on the second behavior model uses the stored value of the output property and the stored first derivative of the value of the output property with respect to time. Storing values of output properties and values of derivatives of output properties with respect to time enables the values to be transferred between behavior models used for updating the values in response to changes in user inputs, provides consistency and continuity in user interface transitions, and provides the user with a more intuitive user experience. Providing consistency and continuity in user interface transitions and improved user experience enhances the operability of the device and makes the user-device interface more efficient (e.g., by reducing user distraction, frustration, and mistakes when operating/interacting with the device), which, additionally, reduces power usage and improves battery life of the device by enabling the user to use the device more quickly and efficiently.

In some embodiments, updating the presentation of the user interface based on the changes in the output property that occur based on a respective behavior model includes (664) updating the presentation of the user interface in accordance with a transformation (e.g., a linear or nonlinear interpolation) applied to values of the output property. In some embodiments, the user interface is updated (e.g., an animation is progressed) based on a linear interpolation of values of the output property (e.g., based on a linear interpolation of values of a user interface element's position, such as in FIGS. 5B-5N). In some embodiments, the user interface is updated (e.g., an animation is progressed) based on a nonlinear interpolation of values of the output property (e.g., based on a logarithmic interpolation of values of a user interface element's scale). In some embodiments, the transformation is predefined. In some embodiments, the transformation is selected by the application (e.g., even though the behavior model is provided by an application-independent software module). Applying transformations to values of output properties that represent types of outputs in the user interface provides user interface behaviors that are more physically intuitive and more easily perceived by the user (e.g., if the human eye perceives changes in an output property logarithmically, changing the user interface based on a logarithmic interpolation of the output property enables the user to more easily and intuitively perceive the changes), and provides the user with a more intuitive user experience. Providing improved user experience enhances the operability of the device and makes the user-device interface more efficient (e.g., by reducing user distraction, frustration, and mistakes when operating/interacting with the device), which, additionally, reduces power usage and improves battery life of the device by enabling the user to use the device more quickly and efficiently.

In some embodiments, detecting the user input includes (666) detecting a touch input (e.g., on a touch-sensitive surface, such as touch screen 112, FIG. 4A) and changes to one or more of a plurality of input parameters that describe the touch input (e.g., input parameters 550 and 551, FIG. 5Z). While detecting the touch input, the output property is changed over time directly in response to the changes to the one or more of the plurality of input parameters that describe the touch input. In some embodiments, the touch input directly modifies values of the output property (e.g., as shown in FIGS. 5B-5C and 5O-5P, for example using direct manipulation models 548 and 549, FIG. 5Z). In some embodiments, output properties represent properties of the user interface, or properties of elements in the user interface (e.g., output properties are tied to, and define, the user interface), whereas input parameters represent properties of inputs (e.g., input parameters are tied to, and are defined by, inputs). Changing a user interface directly in response to changes in user input parameters describing a touch input provides responsive user interface transitions that occur when the user expects the transitions to occur, and provides the user with a more intuitive user experience. Providing improved user experience enhances the operability of the device and makes the user-device interface more efficient (e.g., by reducing user distraction, frustration, and mistakes when operating/interacting with the device), which, additionally, reduces power usage and improves battery life of the device by enabling the user to use the device more quickly and efficiently.

In some embodiments, the user input includes (668) a touch input (e.g., on a touch-sensitive surface, such as touch screen 112, FIG. 4A) and changes to one or more of a plurality of input parameters that describe the touch input (e.g., input parameters 556 and 557, FIG. 5AA). While detecting the touch input, the output property is changed over time using one or more behavior models (e.g., behavior models 558a, 559a, and 560a, FIG. 5AA) that are driven by changes to the one or more of the plurality of input parameters that describe the touch input, and that modify the output property in accordance with a predefined relationship. Changing a user interface by changing output properties over time using behavior models driven by changes in input parameters provides seamless transitions of user interface behaviors, reduces abrupt and/or drastic changes to the user interface that are distracting to the user, and provides the user with a more physically intuitive user experience. Providing improved user experience enhances the operability of the device and makes the user-device interface more efficient (e.g., by reducing user distraction, frustration, and mistakes when operating/interacting with the device), which, additionally, reduces power usage and improves battery life of the device by enabling the user to use the device more quickly and efficiently.

In some embodiments, the output property is (670) a first output property (e.g., scale of a user interface element, such as scale 568, FIG. 5AB), and the user interface includes a second output property that represents a second type of output corresponding to the user interface (e.g., a degree of blurring in the user interface, such as blur 569, FIG. 5AB). In response to detecting the first input, the device changes the second output property over time based on the first behavior model, and updates presentation of the user interface via the one or more output devices based on the changes in the second output property that occur based on the first behavior model. For example, a scale of a user interface element, and a degree of blurring in the user interface, are both driven by a y-position of the user input. Optionally, while changes to both the first and second output properties are based on the first behavior model, different offsets and/or scaling are applied to the values produced by the first behavior model so as to determine the first and second output properties. For example, the offset and scaling factors can be used to map the output of the first behavior model into a range appropriate to each of the first and second output properties. In some embodiments, the device changes the second output property over time based on a respective behavior model of a set of behavior models that includes the first behavior model and the second behavior model. In some embodiments, the respective behavior model is the same as the first behavior model (e.g., having a same spring constant and optionally one or more other same physics model parameters), except for an offset and/or scaling factor, while in other embodiments, the respective behavior model is distinct from the first and second behavior models. Modifying multiple output properties of user interface elements based on a same respective input parameter provides consistency in changes to objects in the user interface and seamless user interface transitions in response to the same user input, and provides the user with a more intuitive user experience. Providing improved user experience enhances the operability of the device and makes the user-device interface more efficient (e.g., by reducing user distraction, frustration, and mistakes when operating/interacting with the device), which, additionally, reduces power usage and improves battery life of the device by enabling the user to use the device more quickly and efficiently.

In some embodiments, the change to the user input is (672) detected while updating the presentation of the user interface via the one or more output devices based on the changes in the second output property that occur based on the first behavior model. In response to detecting the change to the user input, the device changes the second output property over time based on the second behavior model (or a respective behavior model of a set of behavior models that includes the first behavior model and the second behavior model), including starting changing the second output property over time based on: a value of the second output property that was determined based on the first behavior model (or a different respective behavior model of a set of behavior models that includes the first behavior model and the second behavior model), and a first derivative of the value of the second output property with respect to time. The first derivative of the value of the second output property was determined based on the first behavior model. In response to detecting the change to the user input, the device updates the presentation of the user interface via the one or more output devices based on the changes in the second output property that occur based on the second behavior model. For example, after detecting liftoff of the user input, both the first output property (e.g., a scale of a user interface element) and the second output property (e.g., a degree of blurring in the user interface) are updated based on the second behavior model, such that the values for scale and blurring, and the first derivative of those values with respect to time, are all maintained as continuous when transitioning from the first behavior model to the second behavior model. Changing a user interface smoothly based on multiple output properties provides the user with a more physically intuitive and more complete user experience. Providing improved user experience enhances the operability of the device and makes the user-device interface more efficient (e.g., by reducing user distraction, frustration, and mistakes when operating/interacting with the device), which, additionally, reduces power usage and improves battery life of the device by enabling the user to use the device more quickly and efficiently.

In some embodiments, changing the first output property over time based on a respective behavior model of the first and second behavior models includes (674) changing the first output property by a first amount over a first period of time. Changing the second output property over time based on the first behavior model includes changing the second output property by a second amount over the first period of time. The second amount is different from the first amount. In some embodiments, a respective behavior model modifies a value of a first output property (e.g., a scale of a user interface element) to a greater (or, alternatively, lesser) extent than it modifies a value of a second output property (e.g., a degree of blurring in the user interface). Modifying multiple output properties using behavior models with different parameters provides alternative options for controlling responsiveness of output properties to changes in user inputs, so that user interface transitions are more closely aligned with behaviors of real-world objects, and provides the user with a more intuitive and responsive user experience. Providing improved user experience enhances the operability of the device and makes the user-device interface more efficient (e.g., by reducing user distraction, frustration, and mistakes when operating/interacting with the device), which, additionally, reduces power usage and improves battery life of the device by enabling the user to use the device more quickly and efficiently.

It should be understood that the particular order in which the operations in FIGS. 6A-6F have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700 and 800) are also applicable in an analogous manner to method 600 described above with respect to FIGS. 6A-6F. For example, the user interface changes, behavior models, and output properties described above with reference to method 600 optionally have one or more of the characteristics of the user interface changes, behavior models, and output properties described herein with reference to other methods described herein (e.g., methods 700 and 800). For brevity, these details are not repeated here.

FIGS. 7A-7C are flow diagrams illustrating method 700 of updating output properties of user interfaces in response to inputs in accordance with some embodiments. Method 700 is performed at an electronic device (e.g., device 300, FIG. 3, or portable multifunction device 100, FIG. 1A) with a display, a touch-sensitive surface, and one or more sensors to detect intensity of contacts with the touch-sensitive surface. In some embodiments, the display is a touch-screen display and the touch-sensitive surface is on or integrated with the display. In some embodiments, the display is separate from the touch-sensitive surface. Some operations in method 700 are, optionally, combined and/or the order of some operations is, optionally, changed.

As described below, method 700 provides an intuitive way to update output properties of user interfaces based on multiple input parameters that describe user inputs. Modifying output properties of user interface elements based on multiple input parameters provides smoother user interface behaviors by taking multiple aspects of the user input into account when updating the user interface, and provides the user with a more intuitive user experience. Providing improved user experience enhances the operability of the device and makes the user-device interface more efficient (e.g., by reducing user frustration and mistakes when operating/interacting with the device), which, additionally, reduces power usage and improves battery life of the device by enabling the user to use the device more quickly and efficiently.

The device displays (702) a user interface that includes a plurality of user interface elements (e.g., affordances, or views). A first user interface element of the plurality of user interface elements is associated with a plurality of output properties (e.g., size, location, opacity, blur, etc.).

The device detects (704) a user input corresponding to (e.g., on, or directed to) a first user interface element (or on the touch-sensitive surface), including detecting a change in a first input parameter of a plurality of input parameters that describe the user input and a change in a second input parameter of the plurality of input parameters (e.g., input intensity 564 and y-position 565, FIG. 5AB). In some embodiments, detecting the user input includes detecting changes to one or more of a plurality of input parameters that describe the user input. In some embodiments, one or more output properties of the first user interface element are modified in accordance with detecting respective changes in one or more of the plurality of input parameters. Examples of input parameters include: x-position of the input, or x-displacement of the input relative to a particular position (e.g., relative to an initial contact position of a touch input, relative to an edge of the display, or relative to a position of another concurrent contact, such as during a pinch gesture), y-position, or y-displacement relative to a particular position (e.g., relative to an initial contact position of a touch input, relative to an edge of the display, or relative to a position of another concurrent contact, such as during a pinch gesture), detected intensity of the input, velocity of the input, and a duration of the input (e.g., an amount of time since the input was detected, such as an amount of time since touch down of a touch input while the input is maintained on the touch-sensitive surface).

The device modifies (706) (e.g., in response to detecting the user input) one or more output properties of the first user interface element in accordance with changes in the plurality of input parameters, including modifying a first output property of the first user interface element based at least in part on the change in the first input parameter and the change in the second input parameter. For example, in some embodiments, a scale of a respective user interface element (e.g., scale 568, FIG. 5AB) is modified in accordance with changes in a detected intensity (e.g., pressure applied to the touch-sensitive surface) of the input (e.g., intensity 564, FIG. 5AB) and a y-position of the input (e.g., y-position 565, FIG. 5AB). As another example, in some embodiments, blurring (e.g., a blur radius, such as blur 569, FIG. 5AB) of a respective user interface element is modified in accordance with changes in a detected intensity of the input (e.g., intensity 564, FIG. 5AB) and a y-position of the input (e.g., y-position 565, FIG. 5AB). In some embodiments, the electronic device includes one or more sensors for detecting intensities of contacts with the touch-sensitive surface (e.g., contact intensity sensor(s) 165, FIG. 1A).

In some embodiments, the one or more output properties are modified (708) in accordance with at least one behavior model. A behavior model is a set of rules specifying how the one or more output properties evolve over time from a current value of a respective output property. In some embodiments, the rules specify a target value or how a target value is selected. In some embodiments, the rules specify how detected inputs affect the target value and/or the output value of the output property. For example, a direct manipulation model (e.g., direct manipulation model 573, FIG. 5AB), specifies that output properties (e.g., y-position 570, FIG. 5AB) are modified directly in response to changes in input parameters (e.g., y-position 565, FIG. 5AB). In some embodiments, the rules are rules that simulate a physics model (e.g., mass/spring model 566a or 567a, FIG. 5AB). In some embodiments, the rules specify how the one or more output properties and one or more derivatives of the output properties with respect to time evolve over time from corresponding values or derivatives with respect to time of those output values. Changing the user interface using rules that specify how output properties of the user interface evolve over time provides consistency and continuity in user interface transitions, and provides visual feedback to the user as to changes in the user interface. Providing improved visual feedback to the user enhances the user experience and the operability of the device, and makes the user-device interface more efficient (e.g., by reducing user frustration and mistakes when operating/interacting with the device), which, additionally, reduces power usage and improves battery life of the device by enabling the user to use the device more quickly and efficiently.

In some embodiments, modifying the one or more output properties of the first user interface element in accordance with detecting changes in the plurality of input parameters includes (710) modifying a second output property of the first user interface element based at least in part on the change in the first input parameter or the change in the second input parameter (e.g., in FIG. 5AB, blur 569 of a user interface element is also modified based on change in intensity 564 of a touch input (and based on change in y-position 565 of the touch input)). Modifying multiple output properties of user interface elements based on a same respective input parameter provides consistency in changes to objects in the user interface and seamless user interface transitions, and provides the user with a more intuitive user experience. Providing improved user experience enhances the operability of the device and makes the user-device interface more efficient (e.g., by reducing user frustration and mistakes when operating/interacting with the device), which, additionally, reduces power usage and improves battery life of the device by enabling the user to use the device more quickly and efficiently.

In some embodiments, the first output property is modified (712) based on a first behavior model that is driven by the change in the first input parameter. The second output property is modified based on a second behavior model that is driven by the change in the first input parameter. The second behavior model is different from the first behavior model. In some embodiments, the first and second predefined physics models are mass-and-spring physics models that include respective first and second spring parameters (e.g., spring constants), and the first spring parameter is different from the second spring parameter. For example, a blur radius (degree of blurring) (e.g., blur 569, FIG. 5AB) in the user interface is modified based on a first mass-and-spring physics model (e.g., mass/spring model 567a, FIG. 5AB) with a first spring constant, and a change in size of the user interface (e.g., scale 568, FIG. 5AB) is modified based on a second mass-and-spring physics model (e.g., mass/spring model 566a, FIG. 5AB) with a second spring constant, where both the first and second behavior models are driven at least in part by a change in a characteristic intensity of the user input (e.g., intensity 564, FIG. 5AB), and where the first spring constant is different from the second spring constant. Modifying multiple output properties of user interface elements using physics-based rules (e.g., physics models) driven by a same respective input parameter provides consistency in changes to objects in the user interface and seamless user interface transitions that are more closely aligned with behaviors of real-world objects, and provides the user with a more intuitive user experience. Providing improved user experience enhances the operability of the device and makes the user-device interface more efficient (e.g., by reducing user frustration and mistakes when operating/interacting with the device), which, additionally, reduces power usage and improves battery life of the device by enabling the user to use the device more quickly and efficiently.

In some embodiments, modifying the one or more output properties of the first user interface element in accordance with detecting changes in the plurality of input parameters includes (714): modifying a second output property of the first user interface element (e.g., blur 569, FIG. 5AB) based at least in part on the change in the first input parameter (e.g., y-position 565, FIG. 5AB); and modifying a third output property of the first user interface element (e.g., y-position 570, FIG. 5AB) based at least in part on the change in the first input parameter (e.g., y-position 565, FIG. 5AB). Modifying multiple output properties of user interface elements based on a same respective input parameter provides consistency in changes to objects in the user interface and seamless user interface transitions, and provides the user with a more intuitive user experience. Providing improved user experience enhances the operability of the device and makes the user-device interface more efficient (e.g., by reducing user frustration and mistakes when operating/interacting with the device), which, additionally, reduces power usage and improves battery life of the device by enabling the user to use the device more quickly and efficiently.

In some embodiments, detecting the user input includes (716) detecting a change in a third input parameter (e.g., x-position of the input) of the plurality of input parameters. Modifying the one or more output properties of the first user interface element in accordance with detecting changes in the plurality of input parameters includes: modifying a second output property of the first user interface element (e.g., scale of the user interface element) based at least in part on the change in the third input parameter; and modifying a third output property of the first user interface element (e.g., x-position of the user interface element) based at least in part on the change in the third input parameter. Modifying multiple output properties of user interface elements based on a same respective input parameter provides consistency in changes to objects in the user interface and seamless user interface transitions, and provides the user with a more intuitive user experience. Providing improved user experience enhances the operability of the device and makes the user-device interface more efficient (e.g., by reducing user frustration and mistakes when operating/interacting with the device), which, additionally, reduces power usage and improves battery life of the device by enabling the user to use the device more quickly and efficiently.

In some embodiments, the first input parameter is (718) a characteristic intensity of the user input (e.g., intensity 564, FIG. 5AB), the second input parameter is a y-position of the user input (e.g., y-position 565, FIG. 5AB), and the first output property is a scale of the first user interface element (e.g., scale 568, FIG. 5AB). Modifying a scale of a user interface element based on both a characteristic intensity and position of the user input provides smoother user interface behaviors by taking multiple aspects of the user input into account when updating the user interface, and provides the user with a more intuitive user experience. Providing improved user experience enhances the operability of the device and makes the user-device interface more efficient (e.g., by reducing user frustration and mistakes when operating/interacting with the device), which, additionally, reduces power usage and improves battery life of the device by enabling the user to use the device more quickly and efficiently.

In some embodiments, the first input parameter is (720) a characteristic intensity of the user input (e.g., intensity 564, FIG. 5AB), the second input parameter is a y-position of the user input (e.g., y-position 565, FIG. 5AB), and the first output property is a degree of blurring in the user interface (e.g., a blur radius of one or more user interface elements, such as blur 569, FIG. 5AB). Modifying a degree of blurring in the user interface based on both a characteristic intensity and position of the user input provides smoother user interface behaviors by taking multiple aspects of the user input into account when updating the user interface, and provides the user with a more intuitive user experience. Providing improved user experience enhances the operability of the device and makes the user-device interface more efficient (e.g., by reducing user frustration and mistakes when operating/interacting with the device), which, additionally, reduces power usage and improves battery life of the device by enabling the user to use the device more quickly and efficiently.

The device updates (722) the user interface in accordance with the modified first output property of the first user interface element. In some embodiments, multiple output properties are modified in accordance with changes in a respective input parameter. In some embodiments, a respective output property is modified in accordance with changes in multiple input parameters.

In some embodiments, a second user interface element of the plurality of user interface elements is associated (724) with a second plurality of output properties, and the method includes: modifying one or more output properties of the second user interface element in accordance with detecting changes in the second plurality of input parameters, including modifying a first output property of the second user interface element (e.g., a scale of the second user interface element) based at least in part on the change in the first input parameter (e.g., intensity 564, FIG. 5AB) and the change in the second input parameter (e.g., y-position 565, FIG. 5AB); and updating the user interface in accordance with the modified first output property of the second user interface element. Modifying output properties of user interface elements based on multiple input parameters provides smoother user interface behaviors by taking multiple aspects of the user input into account when updating the user interface, and provides the user with a more intuitive user experience. Providing improved user experience enhances the operability of the device and makes the user-device interface more efficient (e.g., by reducing user frustration and mistakes when operating/interacting with the device), which, additionally, reduces power usage and improves battery life of the device by enabling the user to use the device more quickly and efficiently.

In some embodiments, modifying the first output property of the first user interface element based at least in part on the change in the first input parameter and the change in the second input parameter includes (726) modifying the first output property over time based on a first behavior model that is driven by the first input parameter and the second input parameter. The method includes: detecting a change in the user input, including detecting further changes in the first input parameter and the second input parameter; and modifying the first output property over time based on a second behavior model that is distinct from the first behavior model and driven by the first input parameter and the second input parameter, including starting changing the first output property over time based on: a value of the first output property that was determined based on the first behavior model; and a first derivative of the value of the first output property with respect to time. The first derivative of the value was determined based on the first behavior model (e.g., as described above with reference to operation 634 of method 600). Modifying output properties of user interface elements based on multiple input parameters, and transferring values of output properties between different behavior models provides smoother user interface behaviors, and provides the user with a more intuitive user experience. Providing improved user experience enhances the operability of the device and makes the user-device interface more efficient (e.g., by reducing user frustration and mistakes when operating/interacting with the device), which, additionally, reduces power usage and improves battery life of the device by enabling the user to use the device more quickly and efficiently.

It should be understood that the particular order in which the operations in FIGS. 7A-7C have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 600 and 800) are also applicable in an analogous manner to method 700 described above with respect to FIGS. 7A-7C. For example, the user interface changes, behavior models, and output properties described above with reference to method 700 optionally have one or more of the characteristics of the user interface changes, behavior models, and output properties described herein with reference to other methods described herein (e.g., methods 600 and 800). For brevity, these details are not repeated here.

FIGS. 8A-8D are flow diagrams illustrating method 800 of determining operations to perform in user interfaces in response to user inputs in accordance with some embodiments. Method 800 is performed at an electronic device (e.g., device 300, FIG. 3, or portable multifunction device 80, FIG. 1A) with a display, a touch-sensitive surface, and one or more sensors to detect intensity of contacts with the touch-sensitive surface. In some embodiments, the display is a touch-screen display and the touch-sensitive surface is on or integrated with the display. In some embodiments, the display is separate from the touch-sensitive surface. Some operations in method 800 are, optionally, combined and/or the order of some operations is, optionally, changed.

As described below, method 800 provides an intuitive way to determine operations to perform in user interfaces in response to user inputs. Performing, in response to a user input, one of multiple possible operations in the user interface (e.g., deciding between two or more operations to perform) based on whether criteria associated with the possible operations are met provides the user with additional control options for navigating in the user interface without requiring additional inputs. Reducing the number of inputs needed to perform operations enhances the operability of the device and makes the user-device interface more efficient (e.g., by helping the user to more quickly achieve an intended result and by reducing user mistakes when operating/interacting with the device), which, additionally, reduces power usage and improves battery life of the device by enabling the user to use the device more quickly and efficiently.

The device displays (802), on the display, a user interface that includes a plurality of user interface elements that are displayed in accordance with values of an associated plurality of output properties that define output attributes (e.g., position, size, blur, color, sound) of respective user interface elements in the plurality of user interface elements.

The device detects (804) a user input (e.g., a touch input, such as input 589, FIG. 5AD) on the touch-sensitive surface, including detecting changes to one or more of a plurality of input parameters that describe the user input (e.g., position (including, for example, x-position and y-position, either as sub-elements of a single position parameter, or as separate parameters), velocity, acceleration, intensity, and duration). The user input is directed to a first user interface element in the plurality of user interface elements.

In response to detecting the user input (806), the device modifies (808) a first output property value of the first user interface element based on one or more behavior models that are driven by one or more input parameters of the user input (the first output property is one of the plurality of output properties) (e.g., a scale of mail user interface 500, FIG. 5AD).

In some embodiments, the one or more behavior models that are driven by the one or more input parameters of the input include (810) one or more predefined physics models. Changing the user interface using physics-based rules provides seamless user interface transitions that are more closely aligned with behaviors of real-world objects, and provides the user with a more intuitive user experience. Providing improved user experience enhances the operability of the device and makes the user-device interface more efficient (e.g., by reducing user frustration and mistakes when operating/interacting with the device), which, additionally, reduces power usage and improves battery life of the device by enabling the user to use the device more quickly and efficiently.

In some embodiments, the one or more physics models include (812) one or more of: a mass-and-spring model that simulates movement of a mass that is coupled with one or more springs (e.g., as described above with reference to FIGS. 5W-5Y), and a friction/bounce model that simulates movement of a mass subject to friction (e.g., as described above with reference to FIGS. 5D-5H) (e.g., a physical model having a non-zero spring parameter, coefficient of friction, deceleration factor, and/or rate parameter). Changing the user interface using rules that simulate movement in a mass-and-spring model, and/or rules that simulate movement of a mass subject to friction and interacting with boundaries of a region, provides seamless user interface transitions that are more closely aligned with behaviors of real-world objects, and provides the user with a more intuitive user experience. Providing improved user experience enhances the operability of the device and makes the user-device interface more efficient (e.g., by reducing user frustration and mistakes when operating/interacting with the device), which, additionally, reduces power usage and improves battery life of the device by enabling the user to use the device more quickly and efficiently.

In some embodiments, the first output property value of the first user interface element is modified (814) based on at least one behavior model that is driven by two or more input parameters of the user input (e.g., as described herein with reference to FIG. 5AB). Modifying output properties of user interface elements using behavior models driven by multiple input parameters provides smoother user interface behaviors by taking multiple aspects of the user input into account when updating the user interface, and provides the user with a more intuitive user experience. Providing improved user experience enhances the operability of the device and makes the user-device interface more efficient (e.g., by reducing user frustration and mistakes when operating/interacting with the device), which, additionally, reduces power usage and improves battery life of the device by enabling the user to use the device more quickly and efficiently.

In accordance with a determination that the user interface meets first operation criteria, the device performs (816) a first operation in the user interface (e.g., if the y-position of the first user interface element is above the first y-position threshold, a multitasking user interface is displayed, or if the scale of the first user interface element is below a first scale threshold, the multitasking user interface is displayed, as described above with reference to FIGS. 5AD-5AF). The first operation criteria include a criterion that is met when the first output property value of the first user interface element is above a first threshold (e.g., a first y-position threshold such as $y_1$, FIG. 5AO, for example with y-position measured from the bottom edge of the display).

In some embodiments, the first operation criteria further include (818) a second criterion that is met when a second output property value of a second user interface element distinct from the first user interface element satisfies a corresponding threshold. For example, the second output property is the x-position of the second user interface element, the corresponding threshold is a particular screen position, such as a middle of the screen position, and the second criterion is met when the second output property is less than the corresponding threshold (e.g., a right edge of a user interface element is below an x-position threshold $x_{th}$, FIGS. 5AY-5BA). Determining which operation to perform in the user interface based on properties of multiple user interface elements provides smoother user interface behaviors by taking multiple user interface elements into account when determining the operation to perform, and provides the user with a more intuitive user experience. Providing improved user experience enhances the operability of the device and makes the user-device interface more efficient (e.g., by reducing user frustration and mistakes when operating/interacting with the device), which, additionally, reduces power usage and improves battery life of the device by enabling the user to use the device more quickly and efficiently.

In accordance with a determination that the user interface meets second operation criteria, the device performs (820) a second operation in the user interface that is different from the first operation (e.g., if the y-position of the first user interface element is below the first y-position threshold, an application user interface is redisplayed instead of the multitasking user interface, as described herein with reference to FIGS. 5AN-5AP). The second operation criteria include a criterion that is met when the first output property value of the first user interface element is below the first threshold. In some embodiments, displaying the user interface includes displaying a first application user interface, and operations to be performed in the user interface include redisplaying the first application user interface, displaying a multitasking user interface, displaying an application-launching (e.g., home screen) user interface, displaying a second application user interface (e.g., the second application is the last-displayed application prior to displaying the current first application), and displaying a control center user interface. For example, the first operation is one of the aforementioned operations, and the second operation is a different one of the aforementioned operations.

In some embodiments, displaying the user interface includes (822) displaying an application user interface (e.g., mail application user interface 500, FIG. 5AD). The first operation includes displaying a multitasking user interface (e.g., the multitasking user interface, FIG. 5AF). The second operation includes redisplaying the application user interface (e.g., as described above with reference to FIGS. 5AN-5AP). Switching from displaying an application user interface to displaying a multitasking user interface, or not, based on whether criteria associated with the possible operations are met provides the user with additional control options for navigating in the user interface without requiring additional inputs. Reducing the number of inputs needed to perform operations enhances the operability of the device and makes the user-device interface more efficient (e.g., by helping the user to more quickly achieve an intended result and by reducing user mistakes when operating/interacting with the device), which, additionally, reduces power usage and improves battery life of the device by enabling the user to use the device more quickly and efficiently.

In some embodiments, the first operation includes (824) displaying an application-launching (e.g., home screen) user interface (e.g., home screen 597, FIG. 5AJ). The second operation includes displaying a multitasking user interface (e.g., the multitasking user interface, FIG. 5AF). Performing an operation chosen from an application-launching user interface and a multitasking user interface based on whether criteria associated with the possible operations are met provides the user with additional control options for navigating in the user interface without requiring additional inputs. Reducing the number of inputs needed to perform operations enhances the operability of the device and makes the user-device interface more efficient (e.g., by helping the user to more quickly achieve an intended result and by reducing user mistakes when operating/interacting with the device), which, additionally, reduces power usage and improves battery life of the device by enabling the user to use the device more quickly and efficiently.

In some embodiments, the device, in response to detecting the user input, in accordance with a determination that the user interface meets third operation criteria, performs (826) a third operation in the user interface (e.g., if the y-position of the first user interface element is above the second y-position threshold (and the first y-position threshold), a home screen user interface is displayed instead of displaying the multitasking user interface or redisplaying the application user interface, or, as described herein with reference to FIGS. 5AG-5AJ, if the scale of the first user interface element is below both a first scale threshold $S_2$ and a second scale threshold $S_1$). The third operation criteria include a criterion that is met when the first output property value of the first user interface element satisfies a second threshold (e.g., the y-position of the first user interface element is above a second y-position threshold greater than the first y-position threshold, or a scale of the first user interface element is below a scale threshold, such as the second scale threshold $S_1$, as shown in FIGS. 5AG-5AJ). Performing, in response to a user input, one of multiple possible operations in the user interface (e.g., deciding between three or more operations to perform) based on whether criteria associated with the possible operations are met provides the user with additional control options for navigating in the user interface without requiring additional inputs. Reducing the number of inputs needed to perform operations enhances the operability of the device and makes the user-device interface more efficient (e.g., by helping the user to more quickly achieve an intended result and by reducing user mistakes when operating/interacting with the device), which, additionally, reduces power usage and improves battery life of the device by enabling the user to use the device more quickly and efficiently.

In some embodiments, the device, in response to detecting the user input, in accordance with a determination that the user interface meets fourth operation criteria, performs (828) a fourth operation in the user interface that is different from the first operation (e.g., if the x-position of the first user interface element (or a left edge of the first user interface element) is below the first x-position threshold, a control center user interface is displayed, as described herein with reference to FIGS. 5AY-5BA). The fourth operation criteria include a criterion that is met when the first output property value of the first user interface element is below a third threshold (e.g., a first x-position threshold, for example with x-position measured from the left edge of the display). Performing, in response to a user input, one of multiple possible operations in the user interface (e.g., deciding between four or more operations to perform) based on whether criteria associated with the possible operations are met provides the user with additional control options for navigating in the user interface without requiring additional inputs. Reducing the number of inputs needed to perform operations enhances the operability of the device and makes the user-device interface more efficient (e.g., by helping the user to more quickly achieve an intended result and by reducing user mistakes when operating/interacting with the device), which, additionally, reduces power usage and improves battery life of the device by enabling the user to use the device more quickly and efficiently.

In some embodiments, the respective threshold is (830) a first threshold (e.g., a first position threshold). The device, in response to detecting the user input, in accordance with a determination that the user interface meets fifth operation criteria, performs a fifth operation in the user interface that is different from the first operation (e.g., if the x-position of the first user interface element is above the second x-position threshold, a second application user interface is displayed (e.g., the last-displayed application prior to displaying the current first application), as described herein with reference to FIGS. 5AU-5AX). The fifth operation criteria include a criterion that is met when the first output property value of the first user interface element is above a fourth threshold (e.g., a second x-position threshold that is greater than the first x-position threshold), or optionally when a second output property value of the first user interface element (e.g., a right edge of the first user interface element) is below a fourth threshold that is the same as the third threshold (e.g., threshold $x_{th}$, FIGS. 5AU-5BA). Performing, in response to a user input, one of multiple possible operations in the user interface (e.g., deciding between five or more operations to perform) based on whether criteria associated with the possible operations are met provides the user with additional control options for navigating in the user interface without requiring additional inputs. Reducing the number of inputs needed to perform operations enhances the operability of the device and makes the user-device interface more efficient (e.g., by helping the user to more quickly achieve an intended result and by reducing user mistakes when operating/interacting with the device), which, additionally, reduces power usage and improves battery life of the device by enabling the user to use the device more quickly and efficiently.

In some embodiments, the device, in response to detecting the user input, updates (832) the user interface based on the modified first output property value of the first user interface element. In some embodiments, displaying the user interface includes displaying an application user interface, and, in response to detecting the user input, the user interface is updated such that the application user interface is displayed as one user interface element (e.g., a user interface "card," the display of which may be dynamically updated using content from the application as the content changes, as shown in FIG. 5AE) and, in some embodiments, the user interface further includes additional user interface elements (e.g., additional user interface "cards," as shown in FIG. 5AF). The additional user interface elements are also displayed in accordance with values of the plurality of output properties. In some embodiments, respective output properties of the additional user interface elements are modified based on the one or more behavior models that are driven by the one or more parameters of the user input. In some embodiments, an output property value of a second user interface element (e.g., an x-position of control center card 592, FIG. 5AF) is modified based on the modified first output property value of the first user interface element (e.g., an x-position of mail card 500, FIG. 5AF) (e.g., output properties across different user interface elements are linked/have a predefined relationship to each other). Updating the user interface based on modifications to an output property of the user interface rather than based directly on an input parameter of the user input provides seamless user interface transitions, and provides the user with a more intuitive user experience. Providing improved user experience enhances the operability of the device and makes the user-device interface more efficient (e.g., by reducing user frustration and mistakes when operating/interacting with the device), which, additionally, reduces power usage and improves battery life of the device by enabling the user to use the device more quickly and efficiently.

In some embodiments, the device determines (834) a respective operation to perform in the user interface in accordance with the first output property value of the first user interface element without regard to values of the plurality of input parameters of the user input (e.g., using values of the first output property value of the first user interface as modified by a behavior model to make determinations, rather than using values of the input parameters to make the determinations). Performing an operation in the user interface based on an output property of the user interface rather than based directly on an input parameter of the user input provides seamless user interface transitions, and provides the user with a more intuitive user experience. Providing improved user experience enhances the operability of the device and makes the user-device interface more efficient (e.g., by reducing user frustration and mistakes when operating/interacting with the device), which, additionally, reduces power usage and improves battery life of the device by enabling the user to use the device more quickly and efficiently.

In some embodiments, the device determines (836), at a first point in time, whether the user interface meets respective operation criteria based on whether a projected value of the first output property, at a second point in time subsequent to the first point in time, satisfies a respective threshold of the respective operation criteria (e.g., based on a projected y-position, as described herein with reference to y-position meter 596, FIGS. 5AK-5AM). Performing one of multiple possible operations in the user interface based on whether a projected value of an output property satisfies criteria associated with the possible operations provides the user with additional control options for navigating in the user interface without requiring additional inputs. Providing additional control options while reducing the number of inputs needed to perform operations enhances the operability of the device and makes the user-device interface more efficient (e.g., by helping the user to more quickly achieve an intended result and by reducing user mistakes when operating/interacting with the device), which, additionally, reduces power usage and improves battery life of the device by enabling the user to use the device more quickly and efficiently.

In some embodiments, the device determines (838) a respective operation to perform in the user interface in accordance with a velocity (e.g., speed and/or direction of movement) of the first user interface element (e.g., as described herein with reference to velocity meter 595, FIGS. 5AK-5AM). In some embodiments, an operation to be performed in the user interface is determined based on the speed of the first user interface element. In some embodiments, an operation to be performed is determined based on both the speed and direction of the first user interface element. For example, if the velocity of the first user interface element is above a first threshold speed and in a first direction (e.g., a direction that is within a first angular range, such as upward), then a multitasking user interface is displayed. If the velocity is above the first threshold speed and in a second direction (e.g., left, or within a second angular range that includes left (270 degrees)), then a control center user interface is displayed (e.g., FIG. 5BA). If the velocity is in a third direction (e.g., right, or within a third angular range, such as a third angular range that is opposite of the second angular range, such as a third angular range that includes right (90 degrees)) then a previously-displayed application (e.g., a most-recently accessed application other than the current application) is displayed. If the velocity is below the first threshold speed, the current application is redisplayed (e.g., FIG. 5AP) (e.g., regardless of direction). If the velocity is above a second threshold speed (that is greater than the first threshold), and, optionally, also in the first direction or within the first angular range (e.g., upward) then a home screen is displayed (e.g., FIG. 5AJ). In some embodiments, the velocity is used to determine a projected final position (e.g., of a mass moving along a surface with a non-zero coefficient of friction), and the projected final position is used to determine an operation to perform in the user interface (e.g., as described herein with reference to FIGS. 5AK-5AM). Performing one of multiple possible operations in the user interface based on a velocity of a user interface element provides the user with additional control options for navigating in the user interface without requiring additional inputs. Providing additional control options while reducing the number of inputs needed to perform operations enhances the operability of the device and makes the user-device interface more efficient (e.g., by helping the user to more quickly achieve an intended result and by reducing user mistakes when operating/interacting with the device), which, additionally, reduces power usage and improves battery life of the device by enabling the user to use the device more quickly and efficiently.

In some embodiments, the device determines (840) a respective operation to perform in the user interface in accordance with a position of the first user interface element. In some embodiments, if the position of the first user interface element is above a first threshold position, then a multitasking user interface is displayed; if below the first threshold position, the current application is redisplayed; if above a second threshold position, then a home screen is displayed, and if below the second threshold position then either a home screen is displayed or a multitasking user interface is displayed (e.g., whether to display the home screen or the multitasking user interface is further based on a velocity of the first user interface element). In some embodiments, the velocity is used to determine a projected final position (e.g., of a mass moving along a surface with a non-zero coefficient of friction), and the projected final position is used to determine the heuristics (e.g., as described herein with reference to FIGS. 5AK-5AM). Performing one of multiple possible operations in the user interface based on a position of a user interface element provides the user with additional control options for navigating in the user interface without requiring additional inputs. Providing additional control options while reducing the number of inputs needed to perform operations enhances the operability of the device and makes the user-device interface more efficient (e.g., by helping the user to more quickly achieve an intended result and by reducing user mistakes when operating/interacting with the device), which, additionally, reduces power usage and improves battery life of the device by enabling the user to use the device more quickly and efficiently.

In some embodiments, the device determines (842) a respective operation to perform in the user interface in accordance with a size (e.g., scale) of the first user interface element. In some embodiments, if the size of the first user interface element is above a first threshold size (e.g., $S_1$, FIG. 5AE), then the multitasking user interface is displayed (e.g., as described herein with reference to FIGS. 5AD-5AF); if the size of the user interface element is below the first threshold size, then a home screen is displayed (e.g., as described herein with reference to FIGS. 5AG-5AJ); if the size of the user interface element is above a second threshold size, then the current application is redisplayed; and if the size of the user interface element is below the second threshold size then either a home screen is displayed or a multitasking user interface is displayed (e.g., if the size of the user interface element is below the second threshold size, then whether to display the home en or the multitasking user interface is based on whether the size of the user interface element is above or below the first threshold size). Performing one of multiple possible operations in the user interface based on a size of a user interface element provides the user with additional control options for navigating in the user interface without requiring additional inputs. Providing additional control options while reducing the number of inputs needed to perform operations enhances the operability of the device and makes the user-device interface more efficient (e.g., by helping the user to more quickly achieve an intended result and by reducing user mistakes when operating/interacting with the device), which, additionally, reduces power usage and improves battery life of the device by enabling the user to use the device more quickly and efficiently.

In some embodiments, the device determines (844) a respective operation to perform in the user interface in accordance with the first output property value and a second output property value of the first user interface element (e.g., in accordance with a y-position and a scale of the first user interface element, or y-position and x-position of the first user interface element). Performing one of multiple possible operations in the user interface based on multiple properties of a user interface element provides the user with additional control options for navigating in the user interface without requiring additional inputs. Providing additional control options while reducing the number of inputs needed to perform operations enhances the operability of the device and makes the user-device interface more efficient (e.g., by helping the user to more quickly achieve an intended result and by reducing user mistakes when operating/interacting with the device), which, additionally, reduces power usage and improves battery life of the device by enabling the user to use the device more quickly and efficiently.

In some embodiments, the device determines (846) a respective operation to perform in the user interface in accordance with a respective first output property value of the first user interface element and a respective second output property value of a second user interface element distinct from the first user interface element. (e.g., the second output property is one of the plurality of output properties). For example, the respective first and second output properties are x positions of first and second cards (e.g., browser card 591 and mail card 500, FIG. 5AV), and determining whether to display a multitasking user interface or an application interface is determined in accordance with a predefined combination (e.g., average) of the two, or determining whether to switch to a first application or a second application is based on a comparison of the scale of a representation of the first application on the display to the scale of a representation of the second application on the display (e.g., a comparison of the scale of mail card 500 with the scale of browser card 591, FIG. 5AF). Determining which operation to perform in the user interface based on properties of multiple user interface elements provides smoother user interface behaviors by taking multiple user interface elements into account when determining the operation to perform, and provides the user with a more intuitive user experience. Providing improved user experience enhances the operability of the device and makes the user-device interface more efficient (e.g., by reducing user frustration and mistakes when operating/interacting with the device), which, additionally, reduces power usage and improves battery life of the device by enabling the user to use the device more quickly and efficiently.

It should be understood that the particular order in which the operations in FIGS. 8A-8D have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 600 and 700) are also applicable in an analogous manner to method 800 described above with respect to FIGS. 8A-8D. For example, the user interface changes described above with reference to method 800 optionally have one or more of the characteristics of the user interface changes described herein with reference to other methods described herein (e.g., methods 600 and 700). For brevity, these details are not repeated here.

The operations described above with reference to FIGS. 6A-6F, 7A-7C, and 8A-8D are, optionally, implemented by components depicted in FIGS. 1A-1B. For example, detection operations 606, 624, 704, and 804 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method, comprising:
    at an electronic device with one or more output devices and one or more input devices:
        presenting a user interface via the one or more output devices outputting information about a user interface, wherein the user interface includes an output property that represents a first type of output corresponding to the user interface;
        detecting, via the one or more input devices, a user input including a first input, comprising a first touch input, wherein liftoff of the first touch input is associated with modifying the first type of output via a first behavior model;
        in response to detecting liftoff of the first touch input:
            changing the output property over time based on the first behavior model; and
            updating the presentation of the user interface via the one or more output devices based on the changes in the output property that occur based on the first behavior model;
        while updating the presentation of the user interface via the one or more output devices based on the changes in the output property that occur based on the first behavior model, detecting a change to the user input that includes touch down of a subsequent touch input; and
        in response to detecting the change to the user input that includes touch down of a subsequent touch input:
            while the subsequent touch input is detected, changing the output property over time based on a second behavior model that is different from the first behavior model, including maintaining continuity of the output property and a first derivative of the output property when transitioning from the first behavior model to the second behavior model by using in the second behavior model a value of the output property that was determined based on the first behavior model and a first derivative of the value of the output property that was determined based on the first behavior model, wherein the first derivative is a first derivative of the value of the output property with respect to time; and updating the presentation of the user interface via the one or more output devices based on the changes in the output property that occur based on the second behavior model.

2. The method of claim 1, wherein changing the output property over time based on the second behavior model includes maintaining continuity of a second derivative of the value of the output property when transitioning from the first behavior model to the second behavior model by using in the second behavior model a second derivative of the output property that was determined based on the first behavior model, wherein the second derivative is a second derivative of the value of the output property with respect to time.

3. The method of claim 2, wherein the first derivative of the value of the output property with respect to time, as determined based on the first behavior model and then the second behavior model, corresponds to values of a first continuous function with respect to time, and wherein the second derivative of the value of the output property with respect to time, as determined based on the first behavior model and then the second behavior model, corresponds to values of a second continuous function.

4. The method of claim 2, wherein changes in the value of the output property, the first derivative of the value of the output property, and the second derivative of the value of the output property determined using the second behavior model in response to the touch down of the subsequent touch input satisfy parametric continuity with respect to values of the output property, the first derivative of the value of the output property, and the second derivative of the value of the output property determined using the first behavior model.

5. The method of claim 1, wherein a behavior model is a set of rules specifying how one or more output properties evolve over time from a current value of the output property.

6. The method of claim 1, wherein the first behavior model is a predefined physics model that simulates movement of a mass that is coupled with one or more springs in an analytical mass-and-spring model.

7. The method of claim 6, wherein changing the output property over time based on the first behavior model includes changing values of the output property over time in accordance with the analytical mass-and-spring model independently of a frame rate of the electronic device.

8. The method of claim 1, wherein the first behavior model is a predefined physics model that simulates movement of a mass subject to friction and interaction of the mass with one or more predefined boundaries.

9. The method of claim 1, including:
while updating the presentation of the user interface via the one or more output devices based on the changes in the output property that occur based on the second behavior model, detecting a second change to the user input; and
in response to detecting the second change to the user input:
changing the output property over time based on a third behavior model that is different from the second behavior model, including maintaining continuity of the output property and a first derivative of the output property when transitioning from the second behavior model to the third behavior model by using in the third behavior model a value of output property that was determined based on the second behavior model and a first derivative of the value of the output property that was determined based on the second behavior model, wherein the first derivative is a first derivative of the value of the output property with respect to time; and
updating the presentation of the user interface via the one or more output devices based on the changes in the output property that occur based on the third behavior model.

10. The method of claim 1, wherein the first input is received via a first input device, and detecting the change to the user input includes detecting a second input via a second input device.

11. The method of claim 1, wherein:
the user input includes a touch input, and detecting the user input includes detecting changes to a first input parameter in a plurality of input parameters that describe the touch input;
in response to detecting the touch input, a target value of the output property at a respective point in time is determined based on the first input parameter via the first behavior model; and
in response to detecting the touch down of the subsequent touch input, the target value of the output property is a respective predetermined value in a set of predetermined values, determined based on the changes in the output property that occur based on the second behavior model.

12. The method of claim 1, wherein:
the user input includes a touch input, detecting the user input includes detecting changes to a first input parameter in a plurality of input parameters that describe the touch input;
the first behavior model is a first predefined physics model that is driven by the change in the first input parameter; and
the second behavior model is a second predefined physics model, wherein the second predefined physics model is different from the first predefined physics model.

13. The method of claim 1, wherein:
in response to detecting the first input:
updating the presentation of the user interface includes progressing a first animation between a first state and a second state based on the changes in the output property that occur based on the first behavior model; and
in response to detecting the change to the user input:
updating the presentation of the user interface includes progressing a second animation between the second state and a third state based on the changes in the output property that occur based on the second behavior model.

14. The method of claim 1, wherein changes in the value of the output property and in the first derivative of the value of the output property in response to the touch down of the subsequent touch input satisfy parametric continuity with respect to values of the output property and the first derivative of the value of the output property determined using the first behavior model.

15. The method of claim 1, wherein the electronic device includes memory, the output property is stored in the memory, and changing the output property includes updating the stored output property.

16. The method of claim 1, wherein:
the electronic device includes memory;
the value of the output property that was determined based on the first behavior model and the first derivative of the value of the output property, with respect to time, that was determined based on the first behavior model are stored in the memory; and changing the output property over time based on the second behavior model uses the stored value of the output property and the stored first derivative of the value of the output property with respect to time.

17. The method of claim 1, wherein updating the presentation of the user interface based on the changes in the output property that occur based on a respective behavior model includes updating the presentation of the user interface in accordance with a transformation applied to values of the output property, based on a linear interpolation of values of the output property.

18. The method of claim 1, wherein:
detecting the user input includes detecting a touch input and changes to one or more of a plurality of input parameters that describe the touch input; and,
while detecting the touch input, the output property is changed over time directly in response to the changes to the one or more of the plurality of input parameters that describe the touch input.

19. The method of claim 1, wherein:
the user input includes a touch input and changes to one or more of a plurality of input parameters that describe the touch input; and,
while detecting the touch input, the output property is changed over time using one or more behavior models that are driven by changes to the one or more of the plurality of input parameters that describe the touch input, and that modify the output property in accordance with a predefined relationship.

20. The method of claim 1, wherein a target value of the output property is limited to a range of values between a first predefined value and a second predefined value.

21. The method of claim 1, wherein the value of the output property is limited to a range of values between a first predefined value and a second predefined value.

22. The method of claim 1, wherein detecting the user input includes detecting changes to two or more input parameters that describe the user input, and the first behavior model is driven by the two or more input parameters.

23. The method of claim 1, wherein:
the output property is a first output property;
the user interface includes a second output property that represents a second type of output corresponding to the user interface; and
the method includes, in response to detecting the first input:
changing the second output property over time based on the first behavior model; and
updating presentation of the user interface via the one or more output devices based on the changes in the second output property that occur based on the first behavior model.

24. The method of claim 23, wherein the change to the user input is detected while updating the presentation of the user interface via the one or more output devices based on the changes in the second output property that occur based on the first behavior model, and the method includes:
in response to detecting the change to the user input:
changing the second output property over time based on the second behavior model, including maintaining continuity of the second output property and a first derivative of the second output property when transitioning from the first behavior model to the second behavior model by using in the second behavior model a value of the second output property that was determined based on the first behavior model and a first derivative of the value of the second output property that was determined based on the first behavior model, wherein the first derivative is a first derivative of the value of the second output property with respect to time; and
updating the presentation of the user interface via the one or more output devices based on the changes in the second output property that occur based on the second behavior model.

25. The method of claim 23, wherein:
changing the first output property over time based on a respective behavior model of the first and second behavior models includes changing the first output property by a first amount over a first period of time; and
changing the second output property over time based on the first behavior model includes changing the second output property by a second amount over the first period of time, wherein the second amount is different from the first amount.

26. The method of claim 1, wherein a respective type of output represented by the output property includes one or more of: a visual output property, an audio output property, and a tactile output property.

27. The method of claim 1, wherein continuity of the value of the output property and the first derivative of the value of the output property is maintained at a time corresponding to a transition from the first behavior model to the second behavior model.

28. An electronic device, comprising:
one or more output devices;
one or more input devices;
one or more processors; and
memory storing one or more programs, wherein the one or more programs are configured to be executed by the one or more processors, the one or more programs including instructions for:
presenting a user interface via the one or more output devices outputting information about a user interface, wherein the user interface includes an output property that represents a first type of output corresponding to the user interface;
detecting, via the one or more input devices, a user input including a first input, comprising a first touch input, wherein liftoff of the first touch input is associated with modifying the first type of output via a first behavior model;
in response to detecting liftoff of the touch first input:
changing the output property over time based on the first behavior model; and
updating the presentation of the user interface via the one or more output devices based on the changes in the output property that occur based on the first behavior model;
while updating the presentation of the user interface via the one or more output devices based on the changes in the output property that occur based on the first behavior model, detecting a change to the user input that includes touch down of a subsequent touch input; and
in response to detecting the change to the user input that includes touch down of a subsequent touch input:
while the subsequent touch input is detected, changing the output property over time based on a second behavior model that is different from the first behavior model, including maintaining continuity of the output property and a first derivative of the output property when transitioning from the first behavior model to the second behavior model by using in the second behavior model a value of the output property that was determined based on the first behavior model and a first derivative of the value of the output property that was determined based on the first behavior model, wherein the first derivative is a first derivative of the value of the output property with respect to time; and updating the presentation of the user interface via the one or more output devices based on the changes in the output property that occur based on the second behavior model.

29. The electronic device of claim 28, wherein changing the output property over time based on the second behavior model includes maintaining continuity of a second derivative of the value of the output property when transitioning from the first behavior model to the second behavior model by using in the second behavior model a second derivative of the output property that was determined based on the first behavior model, wherein the second derivative is a second derivative of the value of the output property with respect to time.

30. The electronic device of claim 29, wherein the first derivative of the value of the output property with respect to time, as determined based on the first behavior model and then the second behavior model, corresponds to values of a first continuous function with respect to time, and wherein the second derivative of the value of the output property with respect to time, as determined based on the first behavior model and then the second behavior model, corresponds to values of a second continuous function.

31. The electronic device of claim 29, wherein changes in the value of the output property, the first derivative of the value of the output property, and the second derivative of the value of the output property determined using the second behavior model in response to the touch down of the subsequent touch input satisfy parametric continuity with respect to values of the output property, the first derivative of the value of the output property, and the second derivative of the value of the output property determined using the first behavior model.

32. The electronic device of claim 28, wherein the first behavior model is a predefined physics model that simulates movement of a mass that is coupled with one or more springs in an analytical mass-and-spring model.

33. The electronic device of claim 28, wherein the first behavior model is a predefined physics model that simulates movement of a mass subject to friction and interaction of the mass with one or more predefined boundaries.

34. The electronic device of claim 28, wherein the one or more programs include instructions for:
while updating the presentation of the user interface via the one or more output devices based on the changes in the output property that occur based on the second behavior model, detecting a second change to the user input; and
in response to detecting the second change to the user input:
changing the output property over time based on a third behavior model that is different from the second behavior model, including maintaining continuity of the output property and a first derivative of the output property when transitioning from the second behavior model to the third behavior model by using in the third behavior model a value of the output property that was determined based on the second behavior model and a first derivative of the value of the output property that was determined based on the second behavior model, wherein the first derivative is a first derivative of the value of the output property with respect to time; and
updating the presentation of the user interface via the one or more output devices based on the changes in the output property that occur based on the third behavior model.

35. The electronic device of claim 28, wherein the first input is received via a first input device, and detecting the change to the user input includes detecting a second input via a second input device.

36. The electronic device of claim 28, wherein:
the user input includes a touch input, and detecting the user input includes detecting changes to a first input parameter in a plurality of input parameters that describe the touch input;
in response to detecting the touch input, a target value of the output property at a respective point in time is determined based on the first input parameter via the first behavior model; and
in response to detecting the touch down of the subsequent touch input, the target value of the output property is a respective predetermined value in a set of predetermined values, determined based on the changes in the output property that occur based on the second behavior model.

37. The electronic device of claim 28, wherein:
the user input includes a touch input, detecting the user input includes detecting changes to a first input parameter in a plurality of input parameters that describe the touch input;
the first behavior model is a first predefined physics model that is driven by the change in the first input parameter; and
the second behavior model is a second predefined physics model, wherein the second predefined physics model is different from the first predefined physics model.

38. The electronic device of claim 28, wherein the one or more programs include instructions for:
in response to detecting the first input:
updating the presentation of the user interface includes progressing a first animation between a first state and a second state based on the changes in the output property that occur based on the first behavior model; and
in response to detecting the change to the user input:
updating the presentation of the user interface includes progressing a second animation between the second state and a third state based on the changes in the output property that occur based on the second behavior model.

39. The electronic device of claim 28, wherein changes in the value of the output property and in the first derivative of the value of the output property in response to the touch down of the subsequent touch input satisfy parametric continuity with respect to values of the output property and the first derivative of the value of the output property determined using the first behavior model.

40. The electronic device of claim 28, wherein updating the presentation of the user interface based on the changes in the output property that occur based on a respective behavior model includes updating the presentation of the user interface in accordance with a transformation applied to values of the output property, based on a linear interpolation of values of the output property.

41. The electronic device of claim 28, wherein:
detecting the user input includes detecting a touch input and changes to one or more of a plurality of input parameters that describe the touch input; and, while detecting the touch input, the output property is changed over time directly in response to the changes to the one or more of the plurality of input parameters that describe the touch input.

42. The electronic device of claim 28, wherein detecting the user input includes detecting changes to two or more input parameters that describe the user input, and the first behavior model is driven by the two or more input parameters.

43. The electronic device of claim 28, wherein:
the output property is a first output property;
the user interface includes a second output property that represents a second type of output corresponding to the user interface; and the one or more programs include instructions for:
in response to detecting the first input:
changing the second output property over time based on the first behavior model; and
updating presentation of the user interface via the one or more output devices based on the changes in the second output property that occur based on the first behavior model.

44. The electronic device of claim 43, wherein the change to the user input is detected while updating the presentation of the user interface via the one or more output devices based on the changes in the second output property that occur based on the first behavior model, and the one or more programs include instructions for:
in response to detecting the change to the user input:
changing the second output property over time based on the second behavior model, including maintaining continuity of the second output property and a first derivative of the second output property when transitioning from the first behavior model to the second behavior model by using in the second behavior model a value of the second output property that was determined based on the first behavior model and a first derivative of the value of the second output property that was determined based on the first behavior model, wherein the first derivative is a first derivative of the value of the second output property with respect to time; and
updating the presentation of the user interface via the one or more output devices based on the changes in the second output property that occur based on the second behavior model.

45. The electronic device of claim 28, wherein a respective type of output represented by the output property includes one or more of: a visual output property, an audio output property, and a tactile output property.

46. The electronic device of claim 28, wherein continuity of the value of the output property and the first derivative of the value of the output property is maintained at a time corresponding to a transition from the first behavior model to the second behavior model.

47. A non-transitory computer readable storage medium storing one or more programs, the one or more programs comprising instructions, which, when executed by an electronic device with one or more output devices and one or more input devices, cause the electronic device to:
present a user interface via the one or more output devices outputting information about a user interface, wherein the user interface includes an output property that represents a first type of output corresponding to the user interface;
detect, via the one or more input devices, a user input including a first input, comprising a first touch input, wherein liftoff of the first touch input is associated with modifying the first type of output via a first behavior model;
in response to detecting liftoff of the first touch input:
change the output property over time based on the first behavior model; and
update the presentation of the user interface via the one or more output devices based on the changes in the output property that occur based on the first behavior model;
while updating the presentation of the user interface via the one or more output devices based on the changes in the output property that occur based on the first behavior model, detect a change to the user input that includes touch down of a subsequent input; and
in response to detecting the change to the user input that includes touch down of a subsequent touch input:
while the subsequent touch input is detected, changing the output property over time based on a second behavior model that is different from the first behavior model, including maintaining continuity of the output property and a first derivative of the output property when transitioning from the first behavior model to the second behavior model by using in the second behavior model a value of the output property that was determined based on the first behavior model and a first derivative of the value of the output property that was determined based on the first behavior model, wherein the first derivative is a first derivative of the value of the output property with respect to time; and
update the presentation of the user interface via the one or more output devices based on the changes in the output property that occur based on the second behavior model.

48. The non-transitory computer readable storage medium of claim 47, wherein changing the output property over time based on the second behavior model includes maintaining continuity of a second derivative of the value of the output property when transitioning from the first behavior model to the second behavior model by using in the second behavior model a second derivative of the output property that was determined based on the first behavior model, wherein the second derivative is a second derivative of the value of the output property with respect to time.

49. The non-transitory computer readable storage medium of claim 48, wherein the first derivative of the value of the output property with respect to time, as determined based on the first behavior model and then the second behavior model, corresponds to values of a first continuous function with respect to time, and wherein the second derivative of the value of the output property with respect to time, as determined based on the first behavior model and then the second behavior model, corresponds to values of a second continuous function.

50. The non-transitory computer readable storage medium of claim 48, wherein changes in the value of the output property, the first derivative of the value of the output property, and the second derivative of the value of the output property determined using the second behavior model in response to the touch down of the subsequent touch input satisfy parametric continuity with respect to values of the output property, the first derivative of the value of the output property, and the second derivative of the value of the output property determined using the first behavior model.

51. The non-transitory computer readable storage medium of claim 47, wherein the first behavior model is a predefined physics model that simulates movement of a mass that is coupled with one or more springs in an analytical mass-and-spring model.

52. The non-transitory computer readable storage medium of claim 47, wherein the first behavior model is a predefined physics model that simulates movement of a mass subject to friction and interaction of the mass with one or more predefined boundaries.

53. The non-transitory computer readable storage medium of claim 47, wherein the one or more programs include instructions that, when executed by the electronic device, cause the electronic device to:
  while updating the presentation of the user interface via the one or more output devices based on the changes in the output property that occur based on the second behavior model, detect a second change to the user input; and
  in response to detecting the second change to the user input:
    change the output property over time based on a third behavior model that is different from the second behavior model, including maintaining continuity of the output property and a first derivative of the output property when transitioning from the second behavior model to the third behavior model by using in the third behavior model a value of the output property that was determined based on the second behavior model and a first derivative of the value of the output property that was determined based on the second behavior model, wherein the first derivative is a first derivative of the value of the output property with respect to time; and
    update the presentation of the user interface via the one or more output devices based on the changes in the output property that occur based on the third behavior model.

54. The non-transitory computer readable storage medium of claim 47, wherein the first input is received via a first input device, and detecting the change to the user input includes detecting a second input via a second input device.

55. The non-transitory computer readable storage medium of claim 47, wherein:
  the user input includes a touch input, and detecting the user input includes detecting changes to a first input parameter in a plurality of input parameters that describe the touch input;
  in response to detecting the touch input, a target value of the output property at a respective point in time is determined based on the first input parameter via the first behavior model; and
  in response to detecting the touch down of the subsequent touch input, the target value of the output property is a respective predetermined value in a set of predetermined values, determined based on the changes in the output property that occur based on the second behavior model.

56. The non-transitory computer readable storage medium of claim 47, wherein:
  the user input includes a touch input, detecting the user input includes detecting changes to a first input parameter in a plurality of input parameters that describe the touch input;
  the first behavior model is a first predefined physics model that is driven by the change in the first input parameter; and
  the second behavior model is a second predefined physics model, wherein the second predefined physics model is different from the first predefined physics model.

57. The non-transitory computer readable storage medium of claim 47, wherein the one or more programs include instructions that, when executed by the electronic device, cause the electronic device to:
  in response to detecting the first input:
    update the presentation of the user interface includes progressing a first animation between a first state and a second state based on the changes in the output property that occur based on the first behavior model; and
  in response to detecting the change to the user input:
    update the presentation of the user interface includes progressing a second animation between the second state and a third state based on the changes in the output property that occur based on the second behavior model.

58. The non-transitory computer readable storage medium of claim 47, wherein changes in the value of the output property and in the first derivative of the value of the output property in response to the touch down of the subsequent touch input satisfy parametric continuity with respect to values of the output property and the first derivative of the value of the output property determined using the first behavior model.

59. The non-transitory computer readable storage medium of claim 47, wherein updating the presentation of the user interface based on the changes in the output property that occur based on a respective behavior model includes updating the presentation of the user interface in accordance with a transformation applied to values of the output property, based on a linear interpolation of values of the output property.

60. The non-transitory computer readable storage medium of claim 47, wherein:
  detecting the user input includes detecting a touch input and changes to one or more of a plurality of input parameters that describe the touch input; and,
  while detecting the touch input, the output property is changed over time directly in response to the changes to the one or more of the plurality of input parameters that describe the touch input.

61. The non-transitory computer readable storage medium of claim 47, wherein detecting the user input includes detecting changes to two or more input parameters that describe the user input, and the first behavior model is driven by the two or more input parameters.

62. The non-transitory computer readable storage medium of claim 47, wherein:
  the output property is a first output property;
  the user interface includes a second output property that represents a second type of output corresponding to the user interface; and
  the one or more programs include instructions that, when executed by the electronic device, cause the electronic device to:
    in response to detecting the first input:

change the second output property over time based on the first behavior model; and update presentation of the user interface via the one or more output devices based on the changes in the second output property that occur based on the first behavior model.

63. The non-transitory computer readable storage medium of claim 62, wherein the change to the user input is detected while updating the presentation of the user interface via the one or more output devices based on the changes in the second output property that occur based on the first behavior model, and the one or more programs include instructions that, when executed by the electronic device, cause the electronic device to:

in response to detecting the change to the user input:

change the second output property over time based on the second behavior model, including maintaining continuity of the second output property and a first derivative of the second output property when transitioning from the first behavior model to the second behavior model by using in the second behavior model a value of the second output property that was determined based on the first behavior model and a first derivative of the value of the second output property that was determined based on the first behavior model, wherein the first derivative is a first derivative of the value of the second output property with respect to time; and update the presentation of the user interface via the one or more output devices based on the changes in the second output property that occur based on the second behavior model.

64. The non-transitory computer readable storage medium of claim 47, wherein a respective type of output represented by the output property includes one or more of: a visual output property, an audio output property, and a tactile output property.

65. The non-transitory computer readable storage medium of claim 47, wherein continuity of the value of the output property and the first derivative of the value of the output property is maintained at a time corresponding to a transition from the first behavior model to the second behavior model.

* * * * *